US012218791B2

(12) United States Patent
Pahud et al.

(10) Patent No.: US 12,218,791 B2
(45) Date of Patent: *Feb. 4, 2025

(54) AGENT INSTANCE LIVE-MONITORING BY A MANAGEMENT NETWORK FOR BURNOUT AND ATTRITION PREDICTION AND RESPONSE

(71) Applicant: Intradiem, Inc., Marietta, GA (US)

(72) Inventors: Tristan Pahud, London (GB); Christopher Powell Busbee, Marietta, GA (US); Omar Shetta, Southampton (GB); Akul Dewan, Sugar Hill, GA (US); Asmita Jiva, Cumming, GA (US); Michael Carl Jarus, Suwanee, GA (US); Eric Victor Drucker, Roswell, GA (US); Kevin Wilson, Bradenton, FL (US); Jennifer Lee, Hays, KS (US); Jennifer Christine East, Milton, GA (US); Kayla Heflin, Marietta, GA (US); Xiangyu Meng, Decatur, GA (US)

(73) Assignee: Intradiem, Inc., Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,651

(22) Filed: Apr. 1, 2024

(65) Prior Publication Data
US 2024/0259250 A1 Aug. 1, 2024

Related U.S. Application Data

(63) Continuation of application No. 18/477,376, filed on Sep. 28, 2023, now Pat. No. 11,949,549, which is a
(Continued)

(51) Int. Cl.
*G06F 15/173* (2006.01)
*G06F 9/54* (2006.01)
(Continued)

(52) U.S. Cl.
CPC ............. *H04L 41/046* (2013.01); *G06F 9/54* (2013.01); *H04L 63/08* (2013.01)

(58) Field of Classification Search
CPC .......... H04L 41/046; H04L 63/08; G06F 9/54
See application file for complete search history.

(56) References Cited

U.S. PATENT DOCUMENTS 5,790,798 A    8/1998  Beckett et al.
6,324,282 B1  11/2001  McIllwaine et al.
(Continued)

FOREIGN PATENT DOCUMENTS

EP    1209887 A2    5/2002

OTHER PUBLICATIONS

"Hyperautomation Platform," AppBus, https://www.appbus.com/platform/, accessed Mar. 4, 2021.
(Continued)

*Primary Examiner* — Duyen M Doan
(74) *Attorney, Agent, or Firm* — GrowIP Law Group LLC

(57) ABSTRACT

A computer-implemented method for managing a contact center having a plurality of agents includes (a) receiving real-time data associated with each of a plurality of agents servicing incoming communications for the contact center, (b) categorizing each of the plurality of agents into a respective one of a plurality of burnout risk categories by processing the real-time data associated with each of the plurality of agents using a trained supervised machine learning model having a plurality of input features, (c) determining, based on a specification of a logical directive, an operation to be performed in relation to at least one agent in the plurality of agents, wherein the specification has at least one condition relating to the categorizing of each of the plurality of agents into the respective one of the plurality of burnout risk categories, and wherein the specification
(Continued)

defines the operation to be performed in relation to the at least one agent in the plurality of agents upon the condition being satisfied, and (d) causing the operation to be performed in relation to the at least one agent instance in the plurality of agents. A computing system and article of manufacture are also provided.

30 Claims, 77 Drawing Sheets

Related U.S. Application Data continuation-in-part of application No. 18/203,021, filed on May 29, 2023, now abandoned, which is a continuation of application No. 17/966,457, filed on Oct. 14, 2022, now Pat. No. 11,665,044, which is a continuation-in-part of application No. 17/739,655, filed on May 9, 2022, now Pat. No. 11,601,322, which is a continuation of application No. 17/493,760, filed on Oct. 4, 2021, now Pat. No. 11,329,861, which is a continuation-in-part of application No. 17/382,311, filed on Jul. 21, 2021, now Pat. No. 11,228,479, and a continuation-in-part of application No. 17/364,851, filed on Jun. 30, 2021, now Pat. No. 11,356,316, which is a continuation-in-part of application No. 17/163,126, filed on Jan. 29, 2021, now Pat. No. 11,108,618, which is a continuation-in-part of application No. 17/061,024, filed on Oct. 1, 2020, now Pat. No. 11,075,794, which is a continuation of application No. 16/912,351, filed on Jun. 25, 2020, now Pat. No. 10,833,917, which is a continuation of application No. 16/804,376, filed on Feb. 28, 2020, now Pat. No. 10,833,916, which is a continuation of application No. 16/580,258, filed on Sep. 24, 2019, now Pat. No. 10,623,233, said application No. 18/477,376 is a continuation-in-part of application No. 18/203,031, filed on May 29, 2023, now Pat. No. 12,074,754, which is a continuation of application No. 17/966,457, filed on Oct. 14, 2022, now Pat. No. 11,665,044, said application No. 17/739,655 is a continuation-in-part of application No. 17/364,851, filed on Jun. 30, 2021, now Pat. No. 11,356,316.

(51) Int. Cl.
  *H04L 9/40* (2022.01)
  *H04L 41/046* (2022.01)

(56) References Cited

U.S. PATENT DOCUMENTS

| | | |
|---|---|---|
| 6,628,777 B1 | 9/2003 | Mcilwaine et al. |
| 6,700,971 B1 | 3/2004 | Cohen et al. |
| 7,023,979 B1 | 4/2006 | Wu et al. |
| 7,411,939 B1 | 8/2008 | Lamb et al. |
| 7,676,034 B1 | 3/2010 | Wu et al. |
| 8,300,797 B1 | 10/2012 | Benesh et al. |
| 8,364,509 B1 | 1/2013 | Marr |
| 8,391,465 B1 | 3/2013 | Porter |
| 8,488,769 B1 | 7/2013 | Noble, Jr. et al. |
| 8,533,743 B2 | 9/2013 | Houck et al. |
| 8,644,489 B1 | 2/2014 | Noble, Jr. et al. |
| 8,675,860 B2 | 3/2014 | Eicholz et al. |
| 8,767,948 B1 | 7/2014 | Riahi et al. |
| 8,824,664 B1 | 9/2014 | Ristock et al. |
| 8,938,063 B1 | 1/2015 | Hackbarth et al. |
| 8,971,520 B1 | 3/2015 | Bryce et al. |
| 9,047,269 B2 | 6/2015 | Armstrong et al. |
| 9,680,995 B2 | 6/2017 | Tendick et al. |
| 9,766,953 B2 | 9/2017 | Beckett et al. |
| 9,832,315 B1 | 11/2017 | Jayapalan et al. |
| 10,268,525 B2 | 4/2019 | Beckett et al. |
| 10,289,262 B2 | 5/2019 | Lockwood et al. |
| 10,554,817 B1 | 2/2020 | Sullivan et al. |
| 11,108,618 B2 | 8/2021 | Busbee et al. |
| 11,228,479 B1 | 1/2022 | McConnell et al. |
| 11,368,588 B1* | 6/2022 | Johnston ............... G06N 20/00 |
| 11,943,391 B1* | 3/2024 | Veloso ............... H04M 3/5232 |
| 2002/0114441 A1 | 8/2002 | Coussement |
| 2003/0195653 A1 | 10/2003 | Lewis et al. |
| 2004/0193468 A1 | 9/2004 | Mosquera et al. |
| 2005/0135601 A1 | 6/2005 | Whitman |
| 2006/0256953 A1 | 11/2006 | Pulaski et al. |
| 2007/0206768 A1 | 9/2007 | Bourne et al. |
| 2008/0019500 A1 | 1/2008 | Torres et al. |
| 2008/0037761 A1 | 2/2008 | Cordell et al. |
| 2008/0123839 A1 | 5/2008 | Mccormack et al. |
| 2010/0198647 A1 | 8/2010 | Bowers, Jr. et al. |
| 2010/0303225 A1 | 12/2010 | Shashkov et al. |
| 2012/0284356 A1 | 11/2012 | Luna |
| 2012/0321070 A1 | 12/2012 | Smith et al. |
| 2013/0191185 A1 | 7/2013 | Galvin |
| 2014/0079207 A1 | 3/2014 | Zhakov et al. |
| 2014/0249873 A1 | 9/2014 | Stephan et al. |
| 2015/0074170 A1 | 3/2015 | Steiner et al. |
| 2015/0092936 A1 | 4/2015 | Riefel et al. |
| 2016/0094411 A1 | 3/2016 | Brennan et al. |
| 2016/0180277 A1* | 6/2016 | Skiba ............... H04M 3/5175 379/265.06 |
| 2017/0111509 A1 | 4/2017 | McGann et al. |
| 2018/0011978 A1 | 1/2018 | Reeckmann |
| 2018/0091651 A1 | 3/2018 | Slovacek |
| 2018/0197123 A1 | 7/2018 | Parimelazhagan et al. |
| 2018/0316729 A1 | 11/2018 | Chauvet et al. |
| 2018/0375998 A1 | 12/2018 | Beilis et al. |
| 2019/0207815 A1 | 7/2019 | Kirner et al. |
| 2019/0245973 A1 | 8/2019 | Dwyer et al. |
| 2019/0260779 A1 | 8/2019 | Bazalgette et al. |
| 2021/0136222 A1 | 5/2021 | Brown et al. |
| 2021/0174288 A1* | 6/2021 | Gvildys ............... G10L 15/26 |
| 2021/0266405 A1 | 8/2021 | Stepanov et al. |
| 2022/0067630 A1* | 3/2022 | Asokan ............ G06Q 10/06398 |
| 2022/0101220 A1* | 3/2022 | Wicaksono ........ G06Q 10/0633 |
| 2023/0162834 A1 | 5/2023 | Chaplin et al. |
| 2023/0388176 A1 | 5/2023 | McConnell |
| 2023/0206160 A1 | 6/2023 | Cattaneo et al. |
| 2024/0220883 A1* | 7/2024 | Maciej ............. G06Q 10/06315 |

OTHER PUBLICATIONS

Baniadamdizaj, "Prediction of Iranian EFL Teachers' Burnout Level Using Machine Learning Algorithms and Maslach Burnout Inventory" Iran Journal of Computer Science (Aug. 19, 2022) 6:1-12, Tehran, Iran., https://doi.org/10.1007/s42044-022-00112-x.

Leba, M., Ionica, A.C., Nassar, Y., Riurean, S. (2022). Machine Learning Approach on Burnout—The Case of Principals from Southern Israel. In: Antipova, T. (eds) Comprehensible Science. ICCS 2021. Lecture Notes in Networks and Systems, vol. 315. Springer, Cham. https://doi.org/10.1007/978-3-030-85799-8_2.

Maria-Carmen, L. (2022). Classical Machine-Learning Classifiers to Predict Employee Turnover. In: Ciurea, C., Boja, C., Pocatilu, P., Doinea, M. (eds) Education, Research and Business Technologies. Smart Innovation, Systems and Technologies, vol. 276. Springer, Singapore. https://doi.org/10.1007/978-981-16-8866-9_25.

Pillai, M., Adapa, K., Foster, M., Kratzke, I., Charguia, N., Mazur, L. (2022). An Interpretable Machine Learning Approach to Prioritizing Factors Contributing to Clinician Burnout. In: Ceci, M., Flesca, S., Masciari, E., Manco, G., Raś, Z.W. (eds) Foundations of Intelligent Systems. ISMIS 2022. Lecture Notes in Computer Science( ), vol. 13515. Springer, Cham. https://doi.org/10.1007/978-3-031-16564-1_15.

QSTORY. How Intraday Automation Can Help Your Call Centre. Date unknown. www.qstory.co.uk, p. 1-8, United Kingdom.

QSTORY. Real-Time Management: Gaining real efficiencies in your Contact Centre. Date unknown. p. 1-8; www.qstory.co.uk, United Kingdom.

(56) References Cited

OTHER PUBLICATIONS

Tanasescu, LG., Bologa, AR. (2022). Machine Learning and Data Mining Techniques for Human Resource Optimization Process-Employee Attrition. In: Ciurea, C., Boja, C., Pocatilu, P., Doinea, M. (eds) Education, Research and Business Technologies. Smart Innovation, Systems and Technologies, vol. 276. Springer, Singapore. https://doi.org/10.1007/978-981-16-8866-9_22.

Zhao, Y., Hryniewicki, M.K., Cheng, F., Fu, B., Zhu, X. (2019). Employee Turnover Prediction with Machine Learning: A Reliable Approach. In: Arai, K., Kapoor, S., Bhatia, R. (eds) Intelligent Systems and Applications. IntelliSys 2018. Advances in Intelligent Systems and Computing, vol. 869. Springer, Cham. https://doi.org/10.1007/978-3-030-01057-7_56.

\* cited by examiner

Add Rule

* Rule Name

Trigger | Condition | Action | Summary

Time in Current State or Set Frequency Threshol...

Settings

Back to List

* User List: All Users ▼
  ☐ Who are also assigned to any of these Queues:
  ☐ Who are also assigned to any of these Staffing Groups:

* Current State: Active Non-Work
  ☐ Active Work
  ☐ Away
  ☐ Idle
  ☐ Logged Out
  ☐ Unknown AUX Code: Equal to ▼ [    ] Seconds ☐ Set Schedule Next >

Add Rule

* Rule Name [       ]

Trigger | Condition | Action | Summary

Question was Answered ... or Set Frequency

Settings

Back to List

* User List ⊙ [All Users ▷]
  ☐ Who are also assigned to any of these Queues: [ ▷]
  ☐ Who are also assigned to any of these Staffing Groups: [ ▷]

* Question Name ⊙ [Assistance Question ▷]

* Answer Choice ⊙ [Yes ▷]

☐ Set Schedule

[Next »]

| 2021 Q2 Data | # Calls Taken | Average ACW |
|---|---|---|
| Agent 1 | 66 | 55 |
| Agent 2 | 21 | 13 |
| Agent 3 | 60 | 18 |
| Agent 4 | 30 | 39 |
| Agent 5 | 67 | 38 |
| Agent 6 | 59 | 46 |
| Agent 7 | 28 | 40 |
| Agent 8 | 62 | 49 |
| Agent 9 | 20 | 53 |
| Agent 10 | 57 | 25 |

| 2021 Q2 Data | #Calls Taken | Average ACW | Quartile | WeightedAverage | Best | Worst |
|---|---|---|---|---|---|---|
| Agent 2 | 21 | 13 | 1st | 20 | 13 | 25 |
| Agent 3 | 60 | 18 | | | | |
| Agent 10 | 57 | 25 | | | | |
| Agent 5 | 67 | 38 | 2nd | 38 | 38 | 39 |
| Agent 4 | 30 | 39 | | | | |
| Agent 7 | 28 | 40 | 3rd | 44 | 40 | 46 |
| Agent 6 | 59 | 46 | | | | |
| Agent 8 | 62 | 49 | 4th | 52 | 49 | 55 |
| Agent 9 | 20 | 53 | | | | |
| Agent 1 | 66 | 55 | | | | |

Add Adaptive Threshold

* Rule Name [ \<Text Here\> ]

[ Adaptive Event | Threshold | Summary ]

Time in State Threshold Met

Calculation [ Best ▾ ]

Metric [ Hold ▾ ]

Quartile [ 4th Quartile ▾ ]

Period [ Previous Month ▾ ]

Optional

Lowest Possible Value [ 50 ] Seconds
Highest Possible Value [ 75 ] Seconds
Deviation From Current Threshold [ 5 ] Seconds ○ Change Automatically
◉ Recommend Only

[ 7 ] Expiration (days)
Max Value = 7

[ ‹ Previous ] [ Next › ]

| 2021 Q2 Data | # Calls Taken | Average Hold |
|---|---|---|
| Agent 1 | 66 | 25 |
| Agent 2 | 21 | 28 |
| Agent 3 | 60 | 62 |
| Agent 4 | 30 | 47 |
| Agent 5 | 67 | 63 |
| Agent 6 | 59 | 73 |
| Agent 7 | 28 | 28 |
| Agent 8 | 62 | 13 |
| Agent 9 | 20 | 65 |
| Agent 10 | 57 | 96 |

| 2021 Q2 Data | #Calls Taken | Average Hold | Quartile | WeightedAverage | Best | Worst |
|---|---|---|---|---|---|---|
| Agent 8 | 62 | 13 | | | | |
| Agent 1 | 66 | 25 | 1st | 20 | 13 | 28 |
| Agent 2 | 21 | 28 | | | | |
| Agent 7 | 28 | 28 | 2nd | 38 | 28 | 47 |
| Agent 4 | 30 | 47 | | | | |
| Agent 3 | 60 | 62 | 3rd | 63 | 62 | 63 |
| Agent 5 | 67 | 63 | | | | |
| Agent 9 | 20 | 65 | | | | |
| Agent 6 | 59 | 73 | 4th | 81 | 65 | 96 |
| Agent 10 | 57 | 96 | | | | |

RECEIVE, BY ONE OR MORE PROCESSORS DISPOSED WITHIN A MANAGEMENT NETWORK, DATA ASSOCIATED WITH PROCESSES OF ONE OR MORE SERVERS IN OR ASSOCIATED WITH AN END-USER NETWORK, WHERE EACH RESPECTIVE COMPONENT OF THE DATA IS ASSIGNED A TIME TO LIVE (TTL) VALUE BASED ON A SOURCE OR DATA TYPE OF THE RESPECTIVE COMPONENT, WHERE THE MANAGEMENT NETWORK HAS COMPUTING RESOURCES DEDICATED TO THE END-USER NETWORK, WHERE THE END-USER NETWORK CONTAINS AGENT INSTANCES, AND WHERE THE ONE OR MORE SERVERS ARE OPERABLE TO: (I) RECEIVE INCOMING COMMUNICATIONS AND/OR CASES, AND (II) ASSIGN ONE OR MORE AGENT INSTANCES TO SERVICE THE INCOMING COMMUNICATIONS AND/OR CASES. ← 1600

DETERMINE, BASED ON THE RECEIVED DATA, OPERATIONS TO BE PERFORMED BY THE ONE OR MORE SERVERS, WHERE DURING THE DETERMINING, IF THE ASSIGNED TTL VALUE OF A RESPECTIVE COMPONENT OF THE DATA EXPIRES, THE MANAGEMENT NETWORK IS CONFIGURED TO ELIMINATE THE RESPECTIVE COMPONENT ← 1610

Agent Snapshot: 1/29/2021    10:45 am    Level: Company

| One BU is selected | | | | | | | |
|---|---|---|---|---|---|---|---|
| State | Business Unit | Active-Work | Active-Non-Work | Idle | Away | Not Available | Total |
| Agent Count | 1 | 566 | 109 | 78 | 201 | 46 | 1000 |
| Agent Percentage | 1 | 56.60% | 10.90% | 7.80% | 20.10% | 4.60% | 100% |

| Several BUS are selected | | | | | | | |
|---|---|---|---|---|---|---|---|
| | Business Unit | Active-Work | Active-Non-Work | Idle | Away | Not Available | Total |
| Agent Count | 1 | 566 | 109 | 78 | 201 | 46 | 1000 |
| Agent Percentage | 1 | 22.64% | 4.36% | 3.12% | 8.04% | 1.84% | 40% |
| Agent Count | 2 | 456 | 203 | 43 | 43 | 255 | 1000 |
| Agent Percentage | 2 | 18.24% | 8.12% | 1.72% | 1.72% | 10.20% | 40.00% |
| Agent Count | 3 | 267 | 123 | 45 | 55 | 10 | 500 |
| Agent Percentage | 3 | 10.68% | 4.92% | 1.80% | 2.20% | 0.40% | 20.00% |

| Company is selected | | | | | | | |
|---|---|---|---|---|---|---|---|
| State | Business Unit | Active-Work | Active-Non-Work | Idle | Away | Not Available | Total |
| Agent Count | 1 | 566 | 109 | 78 | 201 | 46 | 1000 |
| Agent Percentage | 1 | 14.15% | 2.73% | 1.95% | 5.03% | 1.15% | 25% |
| Agent Count | 2 | 456 | 203 | 43 | 43 | 255 | 1000 |
| Agent Percentage | 2 | 11.40% | 5.08% | 1.07% | 1.07% | 6.38% | 25.00% |
| Agent Count | 3 | 267 | 123 | 45 | 55 | 10 | 500 |
| Agent Percentage | 3 | 6.68% | 3.07% | 1.12% | 1.38% | 0.25% | 12.50% |
| Agent Count | 4 | 575 | 196 | 107 | 76 | 46 | 1000 |
| Agent Percentage | 4 | 14.38% | 4.90% | 2.67% | 1.90% | 1.15% | 25.00% |
| Agent Count | 5 | 247 | 97 | 42 | 63 | 51 | 500 |
| Agent Percentage | 5 | 6.18% | 2.42% | 1.05% | 1.58% | 1.27% | 12.50% |

FIG. 23

Agent Burnout Risk Dashboard ☆

Burnout risk categories by agent - current and montly

Show [200 ▼] entries

| Agent ID ⬍ | Current Burnout Risk Category ⬍ | Monthly Burnout Risk Category ⬍ | Manager ID ⬍ | Business Unit ⬍ | Previous day's AHT (seconds) ⬍ | Previous day's Occupancy ⬍ | Previous day's Number of calls ⬍ |
|---|---|---|---|---|---|---|---|
| bbc9c77a-4627 -4492-92f5 -02e50e371278 | (A) Critical | (A) Critical | 8bda3c3a -a9a7-4712- 94c2-bd255 55d0f53 | BUS-UNIT 1 | 1221.14 | 90.32 | 3 |
| a4b7017f-c52d -42ef-b8aa- 3c157afea19f | (A) Critical | (A) Critical | e988638c-6de1 -414b-a33b-0ce 75bcd710c | BUS-UNIT 2 | 877.89 | 88 | 3 |
| 9be84d82-79a3 -4df4-b8d0-dfb8cc 1a5022 | (A) Critical | (A) Critical | 34495b83-32e5 -4cc8-b4a5-688 1f1ef617 | BUS-UNIT 3 | 923.86 | 87.06 | 1 |
| 23a1aade-5fa8 -492f-b3eb- 29c1b59eecfc | (A) Critical | (A) Critical | 397efd2e-a0ab- 417f-9de8- 7d87b781d839 | BUS-UNIT 4 | 1152.97 | 74.15 | 1 |
| 50b9d9cc-181b -4b4a-b504-b3a 0650fe021 | (A) Critical | (A) Critical | 4471 2664-9a7c- 451a-9b5f- 870cecd3789b | BUS-UNIT 5 | 743.77 | 72.2 | 6 |
| c9d0bd76-cba9 -475d-b853- 346225def093 | (A) Critical | (A) Critical | 4471 2664-9a7c- 451a-9b5f- 870cecd3789b | BUS-UNIT 6 | 957.82 | 71.3 | 8 |

AGENT INSTANCE LIVE-MONITORING BY A MANAGEMENT NETWORK FOR BURNOUT AND ATTRITION PREDICTION AND RESPONSE

CROSS-REFERENCE TO RELATED APPLICATIONS

This patent application is a continuation of U.S. patent application Ser. No. 18/477,376, filed on Sep. 28, 2023, which is a continuation-in-part of U.S. patent application Ser. Nos. 18/203,021 and 18/203,031, both filed on May 29, 2023, and both of which are continuations of U.S. patent application Ser. No. 17/966,457, filed Oct. 14, 2022, issued as U.S. Pat. No. 11,665,044 on May 30, 2023, which is a continuation-in-part of U.S. patent application Ser. No. 17/739,655, filed May 9, 2022, issued as U.S. Pat. No. 11,601,322 on Mar. 7, 2023, which is a continuation of U.S. patent application Ser. No. 17/493,760, filed Oct. 4, 2021, issued as U.S. Pat. No. 11,329,861 May 10, 2022, which is a continuation-in-part of U.S. patent application Ser. No. 17/364,851, filed Jun. 30, 2021, issued as U.S. Pat. No. 11,356,316 on Jun. 7, 2022, which is a continuation-in-part of U.S. patent application Ser. No. 17/163,126, filed Jan. 29, 2021, issued as U.S. Pat. No. 11,108,618 on Aug. 31, 2021, which is a continuation-in-part of U.S. patent application Ser. No. 17/061,024, filed Oct. 1, 2020, issued as U.S. Pat. No. 11,075,794 on Jul. 27, 2021, which is a continuation of U.S. patent application Ser. No. 16/912,351, filed Jun. 25, 2020, issued as U.S. Pat. No. 10,833,917 on Nov. 10, 2020, which is a continuation of U.S. patent application Ser. No. 16/804,376, filed Feb. 28, 2020, issued as U.S. Pat. No. 10,833,916 on Nov. 10, 2020, which is a continuation of U.S. patent application Ser. No. 16/580,258, filed on Sep. 24, 2019, issued as U.S. Pat. No. 10,623,233 on Apr. 14, 2020, the contents of all of which are entirely incorporated herein by reference for all purposes. U.S. patent application Ser. No. 17/739,655, now U.S. issued U.S. Pat. No. 11,601,322, is also a continuation-in-part of U.S. patent application Ser. No. 17/364,851, filed Jun. 30, 2021, now U.S. issued U.S. Pat. No. 11,356,316, which is a continuation-in-part of U.S. patent application Ser. No. 17/163,126, filed Jan. 29, 2021, now U.S. issued U.S. Pat. No. 11,108,618, which is a continuation-in-part of U.S. patent application Ser. No. 17/061,024, filed Oct. 1, 2020, now U.S. issued U.S. Pat. No. 11,075,794, which is a continuation of U.S. patent application Ser. No. 16/912,351, filed Jun. 25, 2020, now U.S. issued U.S. Pat. No. 10,833,917, which is a continuation of U.S. patent application Ser. No. 16/804,376, filed Feb. 28, 2020, now U.S. issued U.S. Pat. No. 10,833,916, which is a continuation of U.S. patent application Ser. No. 16/580,258, filed on Sep. 24, 2019, now U.S. issued U.S. Pat. No. 10,623,233, the contents of all of which are entirely incorporated herein by reference for all purposes.

BACKGROUND

The World Health Organization defines "burnout" as an occupational phenomenon "conceptualized as resulting from chronic workplace stress that has not been successfully managed." ("Burn-out an 'occupational phenomenon': International Classification of Diseases. World Health Organization, Departmental News, 28 May 2019, https://www.who.int/news/item/28-05-2019-burn-out-an-occupational-phenomenon-internationalclassification-of-diseases).

"Attrition" refers to an employee or other worker departing the workplace (i.e., resigning or quitting), which may be due to burnout, for example.

Burnout is particularly pervasive among contact center agents (sometimes referred to as call center agents) working to provide customer support to enterprises offering products and/or services to the customers. Contact center agent burnout is believed to be due to a variety of factors. One example factor is the recent transition by many human agents to working from home rather than in a centralized physical contact center. Such work-from-home agents utilize configured computing devices functioning as agent instances to process individual inbound or outbound telephony calls or other customer communications or interactions, such as customer chats or email exchanges. In addition to the typical stressors imposed on contact center agents, a home working environment potentially presents other, non-work-related, stressors affecting an agent's workday and mental state. The superposition of work-related and non-work-related stressors on an individual contact center agent is one exacerbating factor that can lead to agent burnout.

Another factor underlying contact center agent burnout is the sheer difficulty associated with the job of being a contact center agent. Contact volumes (communications with customers) have increased over time in a wide variety of industries. In addition, as enterprises' self-service options that can handle simple inquiries for customers have become more common, the complexity of interactions actually handled by agents has correspondingly increased. To service customers' issues, agents often have to pull up and log into a large number of specialized software systems, knowledge bases, windows, and menus in order to get the information needed to successfully resolve the customers' issues. Meanwhile, customers expect speed and urgency when dealing with a contact center. Yet any actual or apparent impatience or negativity exhibited by a contact center agent reflects negatively on the enterprise as a whole. The burden of balancing the (a) quick resolution of complex customer interactions with (b) consistent patience, emotional intelligence, and empathy toward demanding customers is another factor pushing contact center agents toward burnout.

Yet another factor making burnout prevalent among contact center agents is the rampant micromanagement in contact centers. Agents' schedule adherence, call handle times, and other key performance indicators (KPIs) are continuously tracked and reported. Calls are monitored and evaluated for quality purposes. Policies are typically strict since contact centers rely on agents to take care of the underlying enterprise's customers and hit requirements set forth in governing service level agreements.

While the primary victims of burnout are the agents themselves (e.g., a deterioration in mental health), agent burnout also adversely impacts customers and others. High-quality customer experiences are generally viewed as critical to the success and growth of an enterprise. Agent burnout often results in a lower quality customer experience since burnt-out agents are more likely to make mistakes and be pessimistic, irritable, and less productive. Therefore, enterprises and their contact centers are motivated to avoid agent burnout for business reasons, not just out of a concern for agent well-being.

Agent burnout can also lead to absenteeism. Schedules for contact centers are carefully crafted. Workforce management teams and/or other supervisory entities typically spend significant time and effort to account for anticipated contact volume and the number of agents it will take to deliver the level of service that customers expect and/or that service level agreements require. If multiple agents are unexpectedly absent from work, the average speed-of-answer time, hold times for customers, and call abandonment rates often increase. Overall (collective) stress among agents and supervisors in the contact center will usually increase as well, due to heavier workloads for each agent and canceled training and coaching sessions.

Agent burnout also tends to lead to attrition. Burnout can be considered a lead indicator to the lag indicator of attrition. Replacing a contact center agent is estimated to cost around $15,000-$35,000 total, including the cost to hire and train the new agent and the time required for the agent to attain proficiency. With attrition rates estimated to be as high as 30-45%, costs associated with agent attrition add up, estimated to exceed up to one million dollars or more per year for large contact centers.

Attempts to address similar problems have typically involved manual tracking. For example, contact center supervisors can manually mine and analyze data at the agent level to determine whether there are any indications that the agent is at risk of burnout and/or attrition. Contact center supervisors working on-site in an office can "walk the floor" and attempt to identify agents that physically appear to be burnt-out and at risk of attrition. During coaching or other one-on-one or small-group sessions, supervisors can watch for agents to present signs of burnout and/or attrition risk. Supervisors can conduct agent surveys to gauge agents' risk of burnout and/or attrition. Supervisors can manually mine and analyze data for recently departed agents to try to determine what drove attrition for these former agents. Contact centers can blindly implement various capabilities that aim to engage agents and prevent factors that are believed to drive attrition. Attempts to supplement manual tracking with rudimentary machine learning models typically have utilized specific, non-real-time data in tabular format, such as data from software logs output by Enterprise Resource Planning (ERP), Customer Relationship Management (CRM) and Interactive Voice Response (IVR) systems.

The aforementioned attempts suffer from several shortcomings. The manual processes are too labor-intensive, making it difficult for supervisors to maintain the discipline necessary to provide regular and consistent monitoring. Attempts involving rudimentary machine learning models are lacking in that they must be fed data in a very specific tabular format, which makes it difficult for supervisors to maintain ongoing, constant analysis. Additionally, even if these prior manual attempts were able to identify factors driving attrition, manual intervention is still required in order to act on the identified factors.

To reduce burnout and potential attrition of agents, contact centers would benefit from being able to identify (1) agents experiencing burnout and (2) the key drivers of agent burnout. Taking appropriate responsive actions could mitigate agent attrition risk, resulting in fewer agents leaving the contact centers, a reduced overall attrition rate, and lower operational costs. In turn, the contact centers will have more experienced and engaged agents, resulting in increased efficiency and better customer experiences.

SUMMARY

In a first example embodiment, a computer-implemented method for managing a contact center having a plurality of agents is provided. The method includes (a) receiving real-time data associated with each of a plurality of agents servicing incoming communications for the contact center, (b) categorizing each of the plurality of agents into a respective one of a plurality of burnout risk categories by processing the real-time data associated with each of the plurality of agents using a trained supervised machine learning model having a plurality of input features, (c) determining, based on a specification of a logical directive, an operation to be performed in relation to at least one agent in the plurality of agents, wherein the specification has at least one condition relating to the categorizing of each of the plurality of agents into the respective one of the plurality of burnout risk categories, and wherein the specification defines the operation to be performed in relation to the at least one agent in the plurality of agents upon the condition being satisfied, and (d) causing the operation to be performed in relation to the at least one agent instance.

In a second example embodiment, a computing system for managing a contact center is provided. The computing system includes one or more processors in a management network, wherein the one or more processors are configured to execute instructions stored on a non-transitory computer readable medium to perform tasks that include (a) receiving real-time data associated with each of a plurality of agents servicing incoming communications for the contact center, (b) categorizing each of the plurality of agents into a respective one of a plurality of burnout risk categories by processing the real-time data associated with each of the plurality of agents using a trained supervised machine learning model having a plurality of input features, (c) determining, based on a specification of a logical directive, an operation to be performed in relation to at least one agent in the plurality of agents, wherein the specification has at least one condition relating to the categorizing of each of the plurality of agents into the respective one of the plurality of burnout risk categories, and wherein the specification defines the operation to be performed in relation to the at least one agent in the plurality of agents upon the condition being satisfied, and (d) causing the operation to be performed in relation to the at least one agent instance.

In a third example embodiment, an article of manufacture including a non-transitory computer-readable medium is provided. The non-transitory medium has stored thereon program instructions that, upon execution by one or more processors in a management network, cause the one or more processors to perform tasks that include: (a) receiving real-time data associated with each of a plurality of agents servicing incoming communications for the contact center, (b) categorizing each of the plurality of agents into a respective one of a plurality of burnout risk categories by processing the real-time data associated with each of the plurality of agents using a trained supervised machine learning model having a plurality of input features, (c) determining, based on a specification of a logical directive, an operation to be performed in relation to at least one agent in the plurality of agents, wherein the specification has at least one condition relating to the categorizing of each of the plurality of agents into the respective one of the plurality of burnout risk categories, and wherein the specification defines the operation to be performed in relation to the at least one agent in the plurality of agents upon the condition being satisfied, and (d) causing the operation to be performed in relation to the at least one agent instance.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7C is a screen shot diagram illustrating a second portion of a condition specification pane of a rule design tool, in accordance with example embodiments.

FIG. 7H is a screen shot diagram illustrating a trigger specification settings pane of a rule design tool, in accordance with example embodiments.

FIG. 7J is a screen shot diagram illustrating an action specification settings pane of a rule design tool, in accordance with example embodiments.

FIG. 7M is a screen shot diagram illustrating a trigger specification settings pane of a rule design tool, in accordance with example embodiments.

FIG. 7N is a screen shot diagram illustrating a trigger specification settings pane of a rule design tool, in accordance with example embodiments.

FIG. 7R is a screen shot diagram illustrating an adaptive threshold specification pane of a rule design tool, in accordance with example embodiments.

FIG. 7V is a screen shot diagram illustrating a trigger specification pane of a rule design tool for an adaptive-threshold-eligible standard rule, in accordance with example embodiments.

FIG. 7W is a screen shot diagram illustrating a second portion of a trigger specification pane of a rule design tool for an adaptive-threshold-eligible standard rule, in accordance with example embodiments.

FIG. 7X is a screen shot diagram illustrating an example adaptive threshold specification pane of a rule design tool, in accordance with example embodiments.

FIG. 7Y is a table illustrating example agent instance call data for the example of FIG. 7X.

FIG. 7Z is a table illustrating example calculated call metrics for the example of FIG. 7X.

FIG. 7AA is a screen shot diagram illustrating an example adaptive threshold specification pane of a rule design tool, in accordance with example embodiments.

FIG. 7BB is a table illustrating example agent instance call data for the example of FIG. 7AA.

FIG. 7CC is a table illustrating example calculated call metrics for the example of FIG. 7AA.

FIG. 16 is a flow chart illustrating an example embodiment.

FIG. 23 is a screen shot illustrating an agent state report, in accordance with an example embodiment.

FIG. 28 is a screen shot illustrating a table of agents and burnout risk categorizations for an interactive dashboard that may be generated and displayed on one or more display screens, in accordance with an example embodiment.

DETAILED DESCRIPTION

Figure 1:
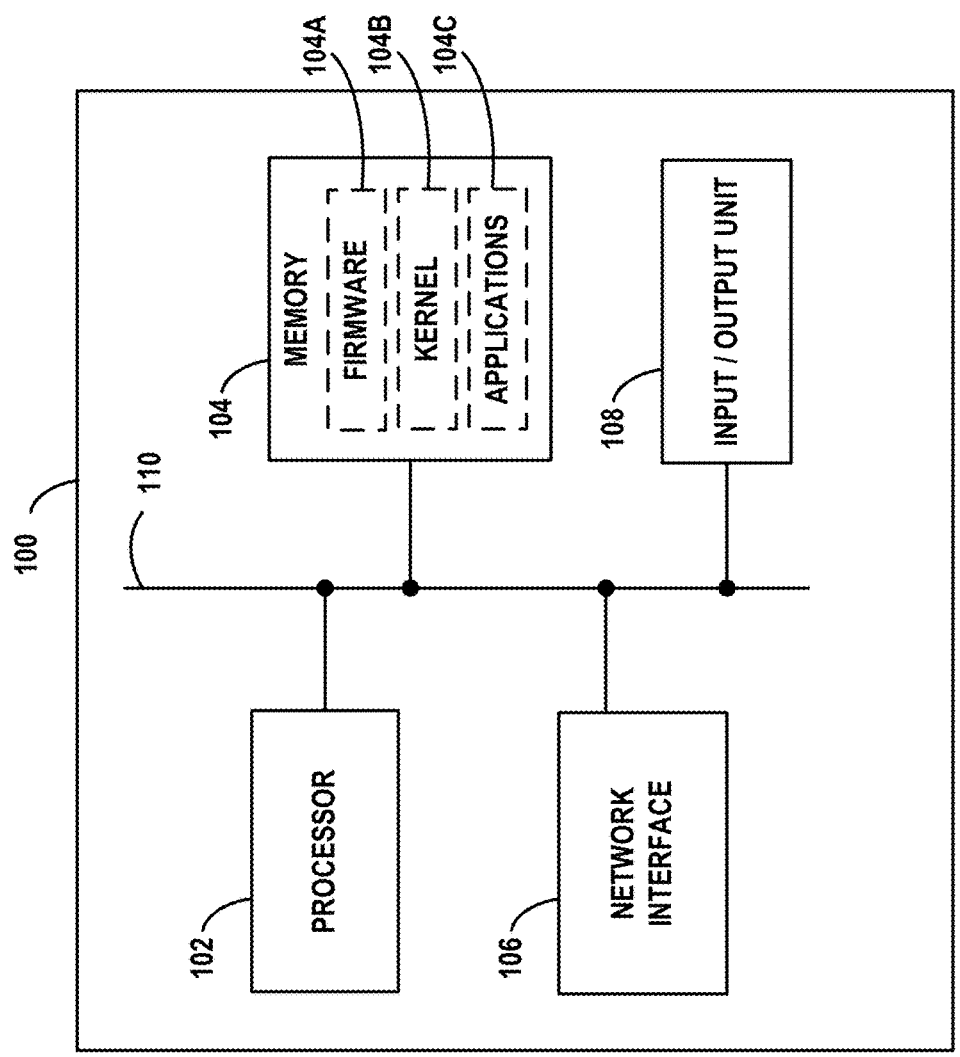
FIG. 1 is a block drawing illustrating a computing device, in accordance with example embodiments.

Example methods, devices, and systems are described herein. It should be understood that the word "example" is used herein to mean "serving as an example, instance, or illustration." Any embodiment or feature described herein as being an "example" is not necessarily to be construed as preferred or advantageous over other embodiments or features unless stated as such. Thus, other embodiments can be utilized and other changes can be made without departing from the scope of the subject matter presented herein. For instance, while many example embodiments set forth herein illustrate an end-user network in communication with a remotely-located third-party management network, other embodiments are also possible, including embodiments in which the end-user network and management network (as well as any of the servers described herein, such as communication distributor servers, workforce management servers, and back-office case systems) may be co-located and/or administered by a single enterprise or group of related enterprises.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

Prior solutions for risk prediction and response relating to contact center agent burnout and attrition are largely manual in nature. In contrast, examples set forth herein involve continuously applying artificial intelligence and/or machine learning to real-time agent interaction and performance data to predict a risk of agent burnout and/or attrition. Some example methods and systems set forth herein additionally identify factors underlying agent burnout and/or attrition. One such example utilizes a supervised machine learning model, such as a linear discriminant analysis (LDA) machine learning model, to place agents into burnout risk categories (e.g., four risk categories—low, moderate, high, or critical) and/or to identify factors that drive burnout and/or attrition. Other supervised machine learning models, such as quadratic discriminant analysis (QDA), logit (Logistic regression), survival analysis models, and others, may alternatively be used—the model used can vary for each customer as the choice may depend on the performance of each model on the specific customer's data.

In addition to predicting risk of agent burnout and/or attrition, examples set forth herein include taking an action, such as one or more automated action(s) (i.e., performing operations or causing such operations to be performed), in response to determining that one or more agents are at risk of burnout and/or attrition. Automation avoids disadvantages (e.g., lack of consistency, responsiveness, and/or observability, especially for work-from-home agents) associated with relying on manual actions to be taken, such as by supervisors overseeing contact center agents. One example automated action is sending an alert, such as a daily alert (e.g., via email or messaging application), to supervisors notifying of any agents that have moved into or out of a particular risk category, such as a "critical burnout" risk category. Another example action is causing a dashboard to be displayed (or updated) on a user's display screen (e.g., a supervisor's display screen), either in real-time or the next time the user accesses an underlying application or device for viewing the dashboard. Other actions and/or operations (e.g., those involving adjustments to schedules and/or queues for agents, as well as others) are described herein.

Some example implementations additionally involve generating and displaying an interactive dashboard accessible and viewable via one or more display screens associated with one or more computing devices. By viewing the interactive dashboard on a display screen, a contact center supervisor or other user can receive information in support of one or more contact center supervised functions. Such functions may include, for example, (a) investigating attrition within an enterprise's contact center (e.g., at an agent level, at an agent group level, and/or at an organizational (contact-center-wide) level), (b) identifying predicted burnout risk of each agent (or groups of agents), which may serve as a proxy for attrition risk, (c) exploring causality of burnout and attrition by uncovering trends and impact of specific events through visualizations and graphs, (d) understanding action(s) to take to mitigate risk of burnout and attrition, (e) reviewing data before and after action(s) taken, and (e) initiating actions to be taken by supervisors based on observations in data visualizations, such as actions based on automated recommendations provided via data communications, for example.

II. CONTACT CENTERS

Many enterprises utilize software solutions to help manage agents and agent instances (computing devices associated with agents and/or robotic chat agents, also known as chatbots) in their respective contact centers. Such software solutions may relate to customer communications, agent scheduling and/or updating, and others. Additionally, some enterprises also utilize a management network (their own management network or one administered by a third party) to help manage customer communications, agent scheduling and/or updates, and other agent-related items by interfacing with the above-described software solutions and/or with agent instances. Such a management network, which may be in the form of a true, distributed (physically or logically) network of multiple computing devices or alternatively as one or more software and/or hardware components communicatively coupled with one or more agent instances, for example, may allow a particular enterprise to define rules with associated triggers, conditions, and actions. Such rules may be triggered when certain thresholds are reached, for example.

More specifically, within an enterprise's contact center environment, it is beneficial, if not critical, to constantly monitor and evaluate performance of agent instances, both in real-time and over a period of time, to ensure continual and optimal efficiency. This may include monitoring and evaluating agent instance performance and, more specifically, how efficient a particular agent instance (or group of agent instances) is when processing individual inbound or outbound telephony calls or other customer communications or interactions, such as customer chats or email exchanges. In conventional scenarios, contact center management personnel typically attempt to manually monitor agent call efficiency (e.g., "handle time") in real-time and engage an agent directly when a specified interaction handle time threshold is exceeded.

Conventional contact centers often employ a trial-and-error approach when determining what an appropriate handle time is for various types of interactions. This is a manual process relying on best guesses or best practices provided by an enterprise's management team (which itself is dependent on each manager's level of expertise and knowledge). Additionally, typical contact centers do not have the manager bandwidth needed to continually analyze historical handle time performance manually and at the level of granularity needed for determining optimal thresholds based upon business goals and objectives. As a result, initial thresholds are rarely, if ever, changed and little to no effort is given in determining whether those initial thresholds are still relevant and realistic at later dates and/or as conditions change.

With respect to telephony calls, acceptable thresholds are typically defined for each of three distinct phases of a call: (1) Talk Time, (2) Hold Time, and (3) After Call Work (ACW) Time. Similar phases may be defined for other types of communications and interactions, such as chat sessions. If, for example, an agent spends more than the acceptable length of time in ACW during a given interaction then a member of the contact center management team would have to be monitoring for that in real-time to then personally address that agent and remediate any potential issues/behaviors. U.S. Pat. No. 10,623,233, assigned to Intradiem, Inc., assignee of the present application, is one of several patents directed generally to creating one or more rules that are capable of automatically monitoring agent instance performance in terms of call length and then triggering actions when a threshold is exceeded. U.S. Pat. No. 11,665,044, also assigned to Intradiem Inc., assignee of the present application, describes systems and methods to continually optimize such thresholds used to trigger the one or more created rules over time, in order to provide a more efficient contact center. Such systems and methods not only offer improved efficiency in terms of an increased number of communications/interactions handled per time and/or agent instance, but might additionally improve energy efficiency (i.e., power consumption) due to fewer agent instance computing devices being required to handle the same volume of communications or interactions. Since a typical contact center may have tens of thousands of agent instance computing devices, any power savings may be significant over time.

Throughout the day at many enterprises, customer service operators face any number of unexpected changes in incoming volume across various service channels, employee attendance issues, unexpected service issues, actual call volume varying from expected call volume, staffing needs varying from forecasts, scheduled staff not showing up to work, service outages creating an unexpected influx of calls, internal systems going down creating longer call handling, etc. This creates an environment where various actions should take place throughout the day to effectively manage the workforce while achieving service level goals. This results in constant workforce adjustments that may include, for example, moving agents across service channels, moving agents to service additional queues, asking agents to work overtime, asking agents to leave the day early, sending agents to an early break or lunch, scheduling and rescheduling training and other off-phone activities, etc. Knowing what action to take to what agent at what time is a challenge that is typically managed by a number of employees who are part of a real-time workforce management team. The actions taken throughout the day are often limited by how quickly and effectively this team can receive and process data in order to determine what action to take and to what agents. The technical solutions set forth herein provide these customer service operators with a way to create rules to automatically handle the above-described situations to make various adjustments to the workforce throughout the day. The disclosed technology further includes applying artificial intelligence (AI) algorithms, such as machine learning, to when these rules fire and to whom they fire, in order to identify opportunities to optimize the rules to drive out operational inefficiencies, which can improve agent performance. Further disclosed are technical solutions for predicting and responding to agent burnout and attrition risk using supervised machine learning models with selected feature sets.

The front office of an enterprise is typically staffed with personnel (largely referred to as "front-office agents" herein) and/or devices (e.g., chatbots) trained to communicate or interact with customers or potential customers. Typical front-office functions include marketing, sales, service, and contact center departments. Front-office functions are often closely tracked to attain prescribed customer-related goals (e.g., average interaction handle time, number of leads generated, conversion rates, and others), and compensation is frequently tied to attaining such goals. Software solutions, such as those offered by Intradiem, Inc. and others, utilize hardware components and/or software applications, including Software-as-a-Service (Saas) offerings, such as workforce management (WFM), automatic communication distribution (ACD) (e.g., automatic call distribution), and other custom or off-the-shelf packages, to provide insights into what each front-office agent is doing at any particular time. Conversely, back-office personnel (referred to as "back-office agents" herein) generally perform functions to support the front-office functions. Those back-office functions include work to complete the processing of a customer transaction, for example.

III. EXAMPLE MANAGEMENT NETWORK

In order to improve visibility into agent states, a management network is provided to intelligently perform operations on behalf of an end-user enterprise's management. In example embodiments, the management network may act as a Software as a Service (Saas) platform hosted remotely from the enterprise, but may access data, applications, and services within the enterprise's network (including network resources associated with the enterprise but hosted remotely and/or by a third party) by way of secure connections. Such a management network may have advantageous capabilities and characteristics. These advantages and characteristics may improve the management's ability to measure and monitor performance of agents and take appropriate corrective or rewarding actions involving agents and/or agent instances. The management network may include services offered by a third-party SaaS provider, such as Intradiem, Inc. In other example embodiments, the management network may simply consist of one or more processors co-located and/or administered with the end-user network (as well as possibly one or more of the servers described herein, such as communication distributor servers, workforce management servers, and back-office case systems). For example, a single enterprise or group of related enterprises may administer the one or more processors acting as the management network, on behalf of its own end-user network.

As an example procedure, an administrator may be tasked to create a new logical directive using the management network. First, the administrator may specify, via a Graphical User Interface (GUI) provided by the management network, data that the management network should utilize to determine whether (or when) a logical directive should occur. Then, via the GUI, the administrator may enter specific conditions that the data must adhere to in order for the logical directive to occur. Finally, via the GUI, the administrator may enter specific operations that should take place (e.g., operations on the enterprise's front-office network, communications to in-house or third-party software solutions, etc.) as an outcome of the logical directive. The GUI may be presented to the administrator via a local application that exports logical-directive information to the management network or via a web-based application hosted by the management network, for example. Accordingly, the management network may automatically create, based on the entered data, all of the corresponding database tables, procedures, classes, relationships, and so on, to accomplish the logical directive. In yet another aspect, the management network may support enterprise-grade security and utilize security procedures upon interacting with systems in the contact center and services hosted outside of the contact center, such as via one or more third-party or in-house-administered cloud-based services. Such security and/or security procedures may include using HTTPS (Port 443), SFTP (Port 22), BTB (or B2B) VPNs (Port 443), and/or other protocols or mechanisms.

Further, the management network may support Graphical User Interface (GUI) tools that facilitate reporting of tracked agent-state data and the creation and management of the logical directives. Such an approach may improve visualization, reduce setup time, and increase flexibility.

Tracking agent state via live-monitoring allows for automation of some management and oversight functions. Such functions might otherwise be performed manually, such as by supervisors physically observing agents and/or by supervisors periodically reviewing compiled agent performance data. The present disclosure describes the creation of rules that result in operations (actions) being taken upon certain triggers and conditions occurring. Under such rules, an operation can be automatically performed or initiated, based on a defined specification with logical directives including conditions that, if satisfied by the received agent live-monitoring data, define the operations.

However, simply allowing for the creation of such rules, without more, may result in sub-optimal performance over time. For example, some customers (e.g., enterprises utilizing contact center agents) may initially set rules (e.g., relating to interaction time (e.g., call-handle time or chat-handle time), time spent in after-interaction work (e.g., after-call work or after-chat work), or other scenarios) based on circumstances and conditions at that particular time. But over months or years, circumstances and conditions may change, potentially causing the rule to become obsolete or less effective. For example, a rule relating to interaction time may result in an action (e.g., supervisor intervention) that eventually improves interaction times for all agents and/or agent instances in the enterprise. The original rule, created before average interaction time improved, might fire/execute less frequently once interaction times have improved. To continue promoting improved interaction time across an enterprise's agents and/or agent instances, it may be beneficial to revise that particular rule (or add a new rule) based on the changed circumstances and conditions.

While an enterprise can certainly periodically analyze data on rules execution to manually adjust rules or add rules, such analysis is difficult, complicated, time-consuming, and/or costly, especially in the case of many rules (e.g., under a rules specification), some of which may be interdependent with one another. The amount and types of stored data (e.g., individual agent-state data, ACD data, WFM data, and others) effectively make manual analysis an unworkable solution.

By utilizing large quantities of stored historical data, possibly including data received from and/or associated with third-party software providers in some examples, including Software-as-a-Service (Saas) offerings, such as workforce management (WFM), automatic communication distribution (ACD) (e.g., automatic call distribution), and other off-the-shelf or customized packages, embodiments set forth herein can optimize rules over time and/or other domains. For example, algorithms and/or machine learning can be applied to such data to find trends and/or patterns for a particular customer's agents. Such trends and/or patterns could, in turn, be used to add new rules or modify existing rules already in use by customers.

In addition to data from third-party or in-house software providers or solutions, a second type of stored data that may be used for rules optimization is rules-execution data for a particular customer or class of customers. Rules-execution data may include, for example, how often a particular rule fires (i.e., executes) on a particular day and/or time, under prescribed conditions. For example, by applying algorithms and/or machine learning to such rules-execution data, trends and/or patterns may be identified that may be used to add new rules or modify existing rules.

The management network described herein can utilize in-house and/or third-party data and rules-execution data in raw form (as originally received or stored). Alternatively, the management network (or another entity) can process at least some of such data to create enriched data that is more conducive to applying algorithms and/or machine learning. To the extent such enriched data is saved, and original raw data discarded, data enrichment may also result in a cost savings due to a reduction in required data storage capabilities.

Other features, functionalities, and advantages of a management network may exist. This description is for purpose of example and not intended to be limiting.

The following embodiments describe architectural, functional, and technical aspects of example management networks, as well as the features and advantages thereof. As alternatives to the illustrated example management networks, other example embodiments may include involve the end-user network and management network (as well as any of the servers described herein, such as communication distributor servers, workforce management servers, and back-office case systems) being co-located and/or administered by a single enterprise or group of related enterprises. Moreover, the advantages provided by the embodiments herein are not limited to large enterprises and may be applicable to an enterprise, or any other type of organization, of any size.

IV. EXAMPLE COMPUTING DEVICES AND COMPUTING ENVIRONMENTS

FIG. 1 is a simplified block diagram showing a computing device 100, illustrating some of the components that could be included in a computing device arranged to operate in accordance with the embodiments herein. Computing device 100 could be a client device (e.g., a device actively operated by a user, such as a contact center agent), a server device (e.g., a device that provides computational services to client devices), a chatbot (or portion of a chatbot or multiple chatbots), a management network (or portion of a management network or multiple management networks), or some other type of computational platform. Some server devices may operate as client devices from time to time in order to perform particular operations, and some client devices may incorporate server features.

In this example, computing device 100 includes processor 102, memory 104, network interface 106, and an input/ output unit 108, all of which may be coupled or otherwise connected, via wires or wirelessly, by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently used instructions and data.

Memory 104 may be any form of computer-usable storage, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory, for example.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings. Such a non-transitory, computer-readable medium may comprise part of an article of manufacture, for example.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers, desktop applications (i.e., apps), and email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. Other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, mouse, touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support various network architectures. The exact physical location, connectivity, and configuration of these computing devices may be unknown and/or unimportant. Accordingly, in some cases, the computing devices may be referred to as "cloud-based" devices that may be housed at various remote data center locations.

Figure 2:
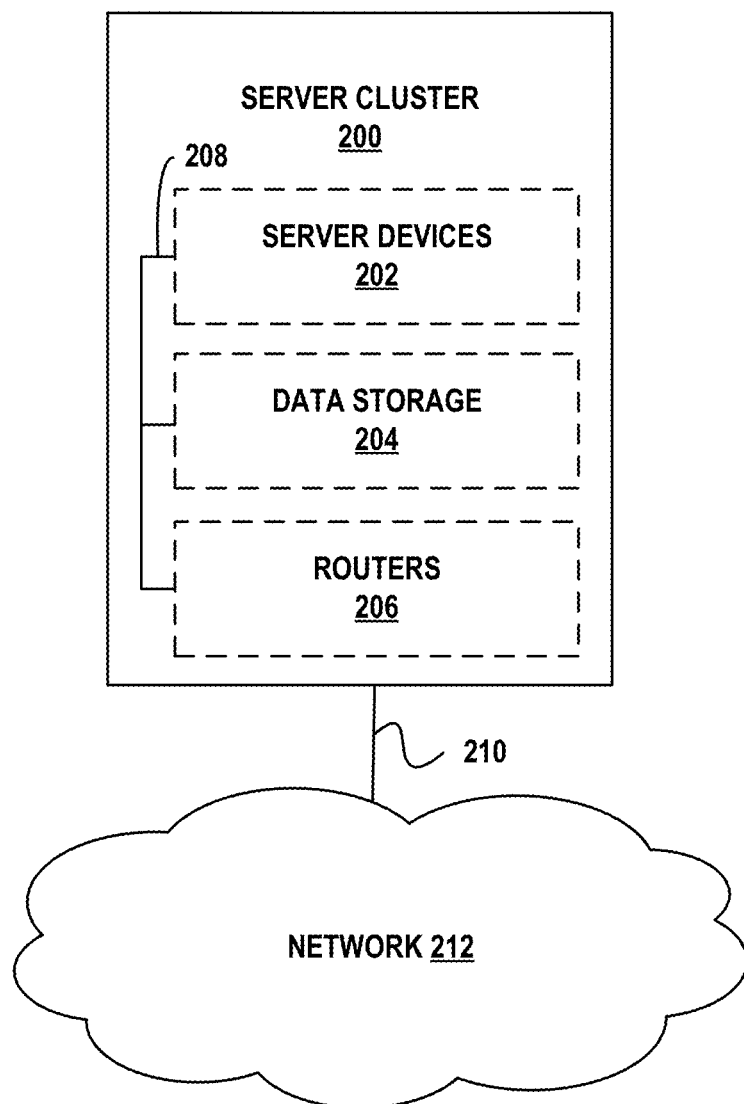
FIG. 2 is a block drawing illustrating a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200. Additionally, multiple servers or server clusters, such as from distinct third parties (e.g., enterprise(s), vendor(s), and/or management networks) or affiliated/co-owned parties may be in communication with one another via secure business-to-business (B2B or BTB) VPN connection(s), for example.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. Moreover, servers may be organized in a tiered network architecture, such as a two-tier or three-tier network architecture, with tiers being organized as one or more of a web tier (or client tier), an application server tier, and a database server tier. For purpose of simplicity, both server cluster 200 and individual server devices 202 may be referred to as a "server device" or, simply, "server." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives, for example. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used. Moreover, data may be accessed using Extract, Transform and Load (ETL) data warehousing techniques, for example, to allow for efficient access to data compiled from different sources.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices, such as other servers or server clusters, via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resilience, efficiency, security, and/or other design goals of the system architecture.

As one example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices, such as using an ETL process between an application SQL server and a data warehouse SQL server.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

V. EXAMPLE NETWORK ARCHITECTURES

Figure 3A:
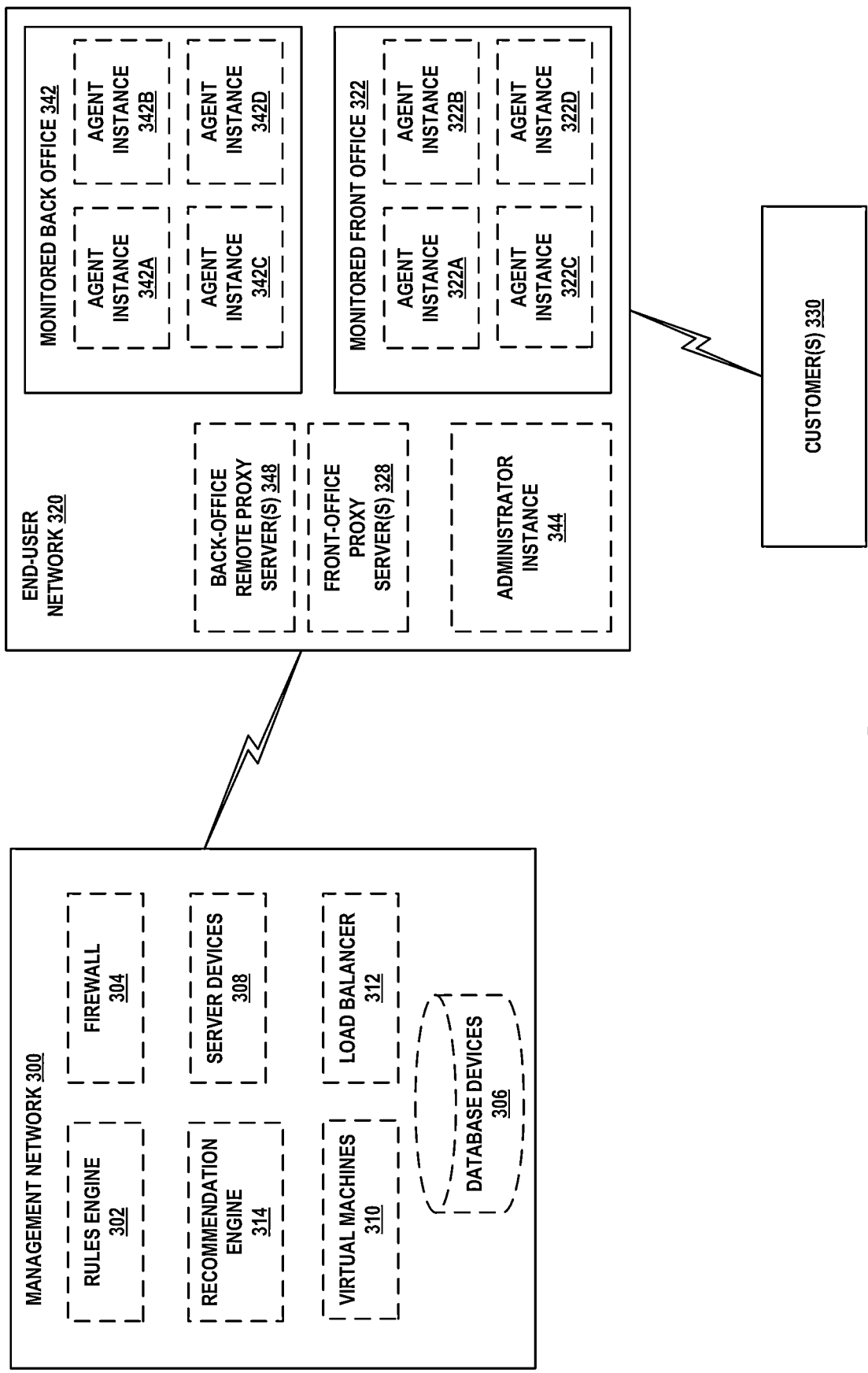
FIG. 3A is a block diagram illustrating a network architecture, in accordance with example embodiments.
Figure 3B:
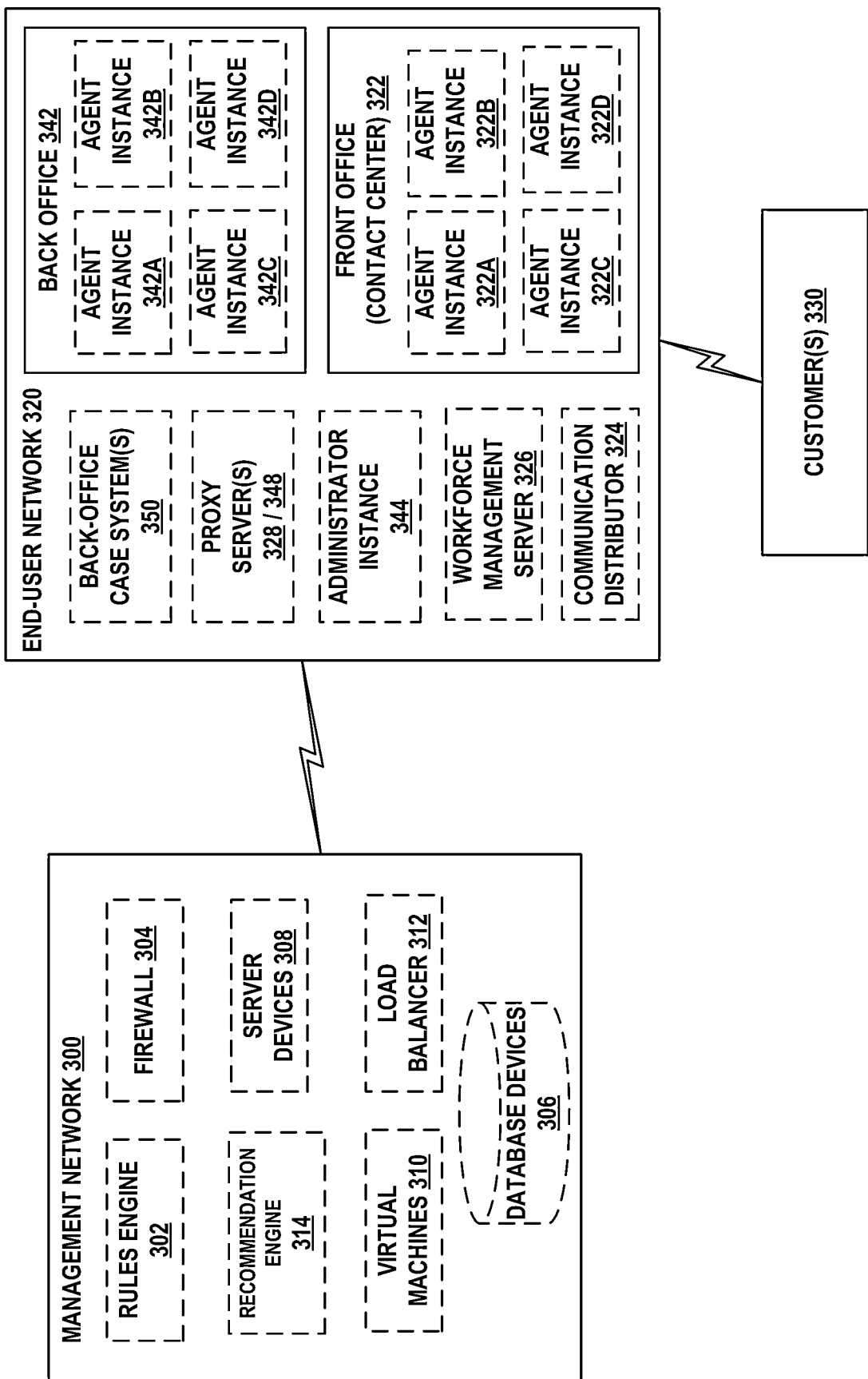
FIG. 3B is a block diagram illustrating a network architecture for a contact center, in accordance with example embodiments.
Figure 3C:
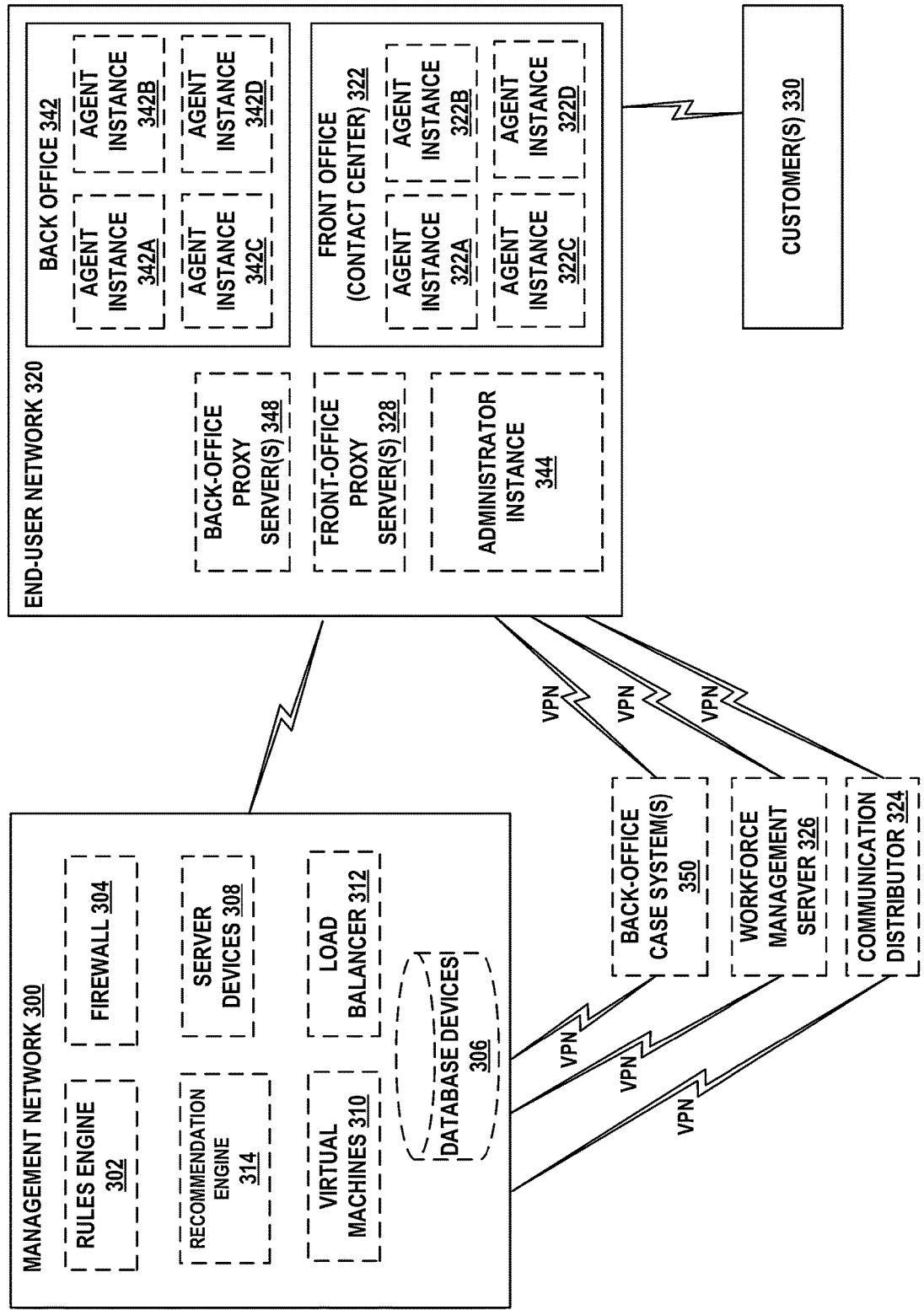
FIG. 3C is a block diagram illustrating a network architecture for a contact center, in accordance with example embodiments.

FIGS. 3A, 3B, and 3C depict example network architectures, in accordance with example embodiments. FIG. 3A illustrates an example generic front-office/back-office network architecture, FIG. 3B illustrates an example front-office/back-office network architecture for a contact center example, and FIG. 3C illustrates a front-office/back-office network architecture for a cloud-supported contact center example.

FIGS. 3A, 3B, and 3C utilize like reference numerals for like components and subcomponents. The illustrated architectures of FIGS. 3A, 3B, and 3C include three main components, (a) a management network 300, (b) an end-user (e.g., enterprise) network 320 (which may include cloud-based components/resources/services associated with the end-user network 320), and (c) customer(s) 330. While not shown, a typical third-party management network 300 may have connections with one or many end-user networks 320, each of which may, in turn, have connections with many different customers 330. Similarly, the cloud-based components/resources/services associated with the end-user network 320 may be administered by third parties that service many enterprises, each having its own end-user networks similar to the end-user network 320. Alternatively, in an "in-house" configuration, either or both of the management network 300 and/or the cloud-based components/resources/services associated with the end-user network 320 may be administered by and/or owned by the same enterprise (or a related enterprise) that owns or operates the end-user network.

Management network 300 may be a computing network that provides management services to users, particularly to end-user network 320. Such services may be configured by users from end-user network 320. For example, by way of web-based portals, users may specify logical directives, generate reports, view analytics, and perhaps perform other tasks. In order to support various capabilities described herein, management network 300 may include rules engine 302, firewall 304, database devices 306, server devices 308, virtual machines 310, load balancer 312, and recommendation engine 314, each of which may be embodied by computing device 100 and/or server cluster 200. For example, management network 300 may provide management services to users via a cloud-based SaaS system, such as via a multi-tier network architecture connected or linked to the end-user network 320 and/or one or more vendor networks (e.g., vendor networks hosting the communication distributor 324, workforce management server 326, and/or back-office case system(s) 350 shown in FIG. 3C).

Rules engine 302 may be a configurable program that, contingent on current operating parameters of end-user network 320, establishes one or more operations that should be performed, such as by management network 300, on behalf of end-user network 320. In particular, rules engine 302 may be configured by users from end-user network 320, such as via an SFTP export from the end-user network 320 to a server device 308 (e.g., an integration server) on the management network 300, to support custom operations. Further details regarding rules engine 302 are discussed below. In some embodiments, as described in further detail below, rules engine 302 interacts with recommendation engine 314 to provide at least some level of automation or assistance in setting operational rules.

Firewall 304 may be one or more specialized routers or server devices that protect management network 300 from unauthorized attempts to access the devices, applications, and services therein, while allowing authorized communication that is initiated from end-user network 320. Firewall 304 may also provide intrusion detection, web filtering, virus scanning, application-layer gateways, and other applications or services. Firewalls, such as firewall 304, typically deny all incoming communication sessions, unless such a session was ultimately initiated from behind the firewall (i.e., from a device on management network 300) or the firewall has been explicitly configured to support the session. In some embodiments (such as the example illustrated in FIG. 3C), management network 300 may include one or more virtual private network (VPN) gateways with which it communicates with end-user network 320. While not illustrated, one or more firewalls may additionally be implemented at the end-user network 320 and/or at one or more vendor networks.

Database devices 306 may include specialized hardware and/or software used to store data. For example, database devices 306 may include one or more relational databases (e.g., SQL), graph databases (e.g., neo4j), document databases (e.g., MongoDB), column databases (e.g., Cassandra) and/or other database models. Database devices 306 may take the form of one or more data lakes, having data lake services for persisting data in one more data file systems (e.g., HDFS) and/or relational databases (e.g., MariaDB). A data lake engine (e.g., Dremio) may be used to assist with data analysis and visualization. As discussed above, the database devices 306 may utilize an ETL process for improved data access efficiency and other benefits. In examples, database devices 306 may contain data related to the operations of management network 300 and/or end-user network 320. In some embodiments, as described in further detail below, database devices 306 may be utilized by recommendation engine 314 to provide at least some level of automation or assistance in setting operational rules. For example, the database devices 306 may store historical data including third-party data (if available) and rules-execution data, either or both of which may be stored in raw form (as originally received or stored) or as enriched data to which some level of processing has been applied to make the stored data more conducive to applying algorithms and/or machine learning.

Server devices 308 can be used for computational, machine learning, data storage, communication, and service hosting operations. These servers may be virtualized (i.e., the servers may be virtual machines). In some cases, the server devices 308 may be physically present on management network 300. In other cases, the server devices 308 may be remote server devices hosted by third-party networks (e.g., AMAZON WEB SERVICES® (AWS®) and MICROSOFT® AZURE®). Such cloud-hosted resources may be particularly beneficial for an enterprise's work-from-home scenarios, for example, and in cases in which scalability is desired. In some embodiments, as described in further detail below, server devices 308 may provide web-based portals to allow users from end-user network 320 to specify and/or approve services that may be configured by users from end-user network 320. For example, by way of web-based portals, users may specify logical directives, generate reports, view analytics, and perhaps perform other tasks. For example, as described in further detail below, server devices 308 may present recommended logical directives to users on end-user network 320 for approval before implementing the recommended logical directives.

Virtual machines 310 may be emulations of a computing system, and may mimic the functionality (e.g., processor, memory, and communication resources) of a physical computer. In some embodiments, virtual machines 310 may be managed by a centralized server device (e.g., one of the server devices 308) or an application that facilitates allocation of physical computing resources to individual virtual machines, as well as performance and error reporting. Virtual machines 310 may be employed in order to allocate computing resources in an efficient, as-needed fashion, such as to associate computing resources to one or more end-user networks like the end-user network 320. Providers of virtual machines 310 may include VMWARE® and MICROSOFT®. In some embodiments, virtual machines 310 may support operating-system-level virtualization that allows for multiple isolated user-space instances, or "containers". This type of virtualization may be supported by providers such as DOCKER® and in turn may be managed by a container orchestration software provider, such as KUBERNETES®.

Load balancer 312 may distribute traffic among one or more physical or virtual devices on management network 300. For instance, if management network 300 includes multiple physical or virtual computing devices, load balancer 312 may distribute network traffic and computational tasks across the multiple devices so that no one device is processing more tasks than the others (or more than its specified capabilities allow). As another example, in a cloud-based system, the load balancer 312 may be implemented at a third-party network.

Recommendation engine 314 may be a configurable program that, contingent on analysis of historical data or information relating to end-user network 320, establishes one or more recommendations for rules to be modified or created on behalf of end-user network 320. For example, modifications or additions to rules could include modifications or additions to triggers, conditions, and/or resulting operations to be performed. In particular, recommendation engine 314 may apply artificial intelligence (AI) algorithms to historical data pertaining to end-user network 320 and/or its contact center to identify trends and/or opportunities for rules optimization and/or to predict and respond to burnout and attrition risk. Such AI algorithms may include machine learning, predictive algorithms (linear discriminant algorithms (LDA)), and/or quantitative analysis, among others. The recommendation engine 314 is illustrated as part of management network 300 and operates as such; however, in some embodiments, the recommendation engine 314 may include one or more components hosted by third parties and/or by the end-user network 320, such as by cloud-based AI computing facilities. Further details regarding recommendation engine 314 and other machine-learning implementations are discussed below. In some embodiments, recommendation engine 314 accesses and analyzes data and/or information from database devices 306 and cooperates with rules engine 302 to provide at least some level of automation or assistance in setting operational rules.

Notably, the illustrated configurations of management network 300 are provided as examples. Other configurations and additional devices may exist. For example, management network 300 may contain additional components to those described above (e.g., routers, gateways, etc.). In addition, various client devices, such as personal computers or mobile devices may be connected to management network 300 at any given time. Any component on management network 300 may be replicated across multiple computing devices to provide data duplication and increase capacity of services. Replicated components may be located at various computing locations to ensure high availability in case of a power failure at one computing location. In some cases, management network 300 may consist of a few devices and a small number of components. In other cases, management network 300 may span across multiple physical locations and hundreds of devices and components. For example, one or more components on management network 300 may be physically located at another site, such as one hosted by the management network 300 (e.g., at a third-party network, such as AWS or Microsoft Azure).

End-user network 320 may be, for example, an enterprise network used by an entity for computing and communications tasks, as well as storage of data, either locally or remotely (e.g., in a cloud storage facility). In examples, end-user network 320 may provide services to customer(s) 330. As one example, these customer services may be in the form of contact center services (e.g., as shown in FIGS. 3B and 3C) for troubleshooting issues that customer(s) 330 may have. To support various capabilities as described herein, end-user network 320 may include some or all of the following components, as well as others: a monitored front office 322, a monitored back office 342, at least one administrator instance 344, front-office proxy server(s) 328, and/or back-office proxy server(s) 348. The front office 322 and/or the back office 342 are described as being "monitored" because, in at least some embodiments set forth herein, devices associated with front-office personnel and/or back-office personnel are monitored (i.e., via live monitoring) in order to provide triggers that may be used by management network 300 to cause operations to be performed on end-user network 320 under prescribed conditions. Additional details regarding monitoring, triggering, logical directives, operations, and conditions are provided below, with reference to at least FIGS. 6A and 9.

Some end-user networks 320 might include only a front office 322 or back office 342, perhaps outsourcing one or the other, while other end-user networks 320 will include both a front office 322 and back office 342 (either one or both of which may be monitored, such as by a monitoring application, as described with reference to at least FIGS. 6A and 9). In some end-user networks 320, front-office proxy server(s) 328 are combined with back-office proxy server(s) 348, so that one or more proxy server devices provide proxy service functions to both the front office 322 and back office 342. In some examples, such as the example illustrated in FIG. 3C, end-user network 320 may include, either locally or remotely, such as in a cloud-hosted configuration, server devices, routers (e.g., any type of router, switch, or gateway), firewalls, database devices, load balancers, virtual machines, and/or other additional devices having processors, as described with respect to management network 300. For example, remote cloud-hosted devices, such as the communication distributor 324, workforce management server 326, and/or back-office case system(s) 350, might be associated with the end-user network 320, but owned and/or managed by a third-party vendor, as shown in FIG. 3C. In other examples (not illustrated), the end-user network 320 might be commonly owned, controlled, and/or administered by the same enterprise (or group of enterprises) that owns, controls, and/or administers the communication distributor 324, workforce management server 326, and/or back-office case system(s) 350, or even the management network 300. Finally, end-user network 320 may include additional components beyond the four components described above and shown in FIG. 3A.

Monitored front office 322 may be a subnetwork of computing devices within end-user network 320. As shown in FIG. 3A, front office 322 includes four front-office agent instances 322A, 322B, 322C, and 322D. Agent instances 322A, 322B, 322C, and 322D may represent one or more computing devices through which web portals, services, and applications (e.g., chatbots) can operate. In practice, according to some examples, front-office personnel (e.g., contact center agents) of the entity operating end-user network 320 may utilize agent instances 322A, 322B, 322C, and 322D to provide support to customer(s) 330. In simpler terms, for some examples, each of agent instances 322A, 322B, 322C, and 322D may act as a computing device and/or system that provides front-office personnel with tools and applications to properly support customer(s) 330. Such agent instances 322A, 322B, 322C, and 322D may be co-located at a single physical site (e.g., an office), distributed among several sites (e.g., several offices), or distributed across one or more non-office sites, such as in one or more homes, co-working sites, and/or transient sites (e.g., a moving vehicle). In the case of a front office 322 acting as a contact center, as shown in FIGS. 3B and 3C, such tools and applications may be provided by, supplemented with, or work in cooperation with communication distributor 324 and/or workforce management server 326, either or both of which may be local to the end-user network 320 or remote, such as in a cloud-based configuration. Management network 300 may additionally or alternatively provide front-office agent instances 322A, 322B, 322C, and 322D with tools and applications for customer support functions. For ease of illustration, only four front-office agent instances are illustrated in FIG. 3A. A typical end-user's network's contact center will likely have a multiplicity (many hundreds or thousands or more) of such agent instances, each possibly associated with up to one or more human agents or robotic agents.

Like monitored front office 322, monitored back office 342 may be a subnetwork of computing devices within end-user network 320. As shown in FIG. 3A, back office 342 includes four back-office agent instances 342A, 342B, 342C, and 342D. Agent instances 342A, 342B, 342C, and 342D may represent one or more computing devices through which web portals, services, and applications can operate. In practice, back-office personnel (e.g., back office agents) of the entity operating end-user network 320 may utilize back-office agent instances 342A, 342B, 342C, and 342D to provide support to the front office 322. In simpler terms, each of agent instances 342A, 342B, 342C, and 342D may act as a computing device and/or system that provides back-office personnel with tools and applications to properly process back-office cases (e.g., claims), to support the customer-facing front office 322. Such agent instances 342A, 342B, 342C, and 342D may be co-located at a single physical site (e.g., an office), distributed among several sites (e.g., several offices), or distributed across one or more non-office sites, such as in one or more homes, co-working sites, and/or transient sites (e.g., a moving vehicle).

Administrator instance 344 may include one or more computing devices within or associated with end-user network 320, through which web portals, services, and applications can operate. Management personnel, such as supervisors, administrators, managers (e.g., WFM managers or operations managers), and/or teams of such personnel may utilize administrator instance 344 to oversee agents and/or front-office agent instances 322A, 322B, 322C, and 322D, and/or back-office agent instances 342A, 342B, 342C, and 342D, and to perform other functions associated with such agents or agent instances, such as monitoring or coaching. In addition, administrator instance 344 may have access to a web portal presented by management network 300 or may be situated directly in or on the management network 300. Such access may be via a GUI that allows the agent instance 344 to view one or more agent state reports, such as the reports 2200, 2300, and 2400 respectively illustrated in FIGS. 21, 22, and 23. Such reports may be available to administrator instances on end-user network 320, in accordance with an example embodiment.

As described above, the management network 300 includes one or more devices with processors to implement rules engine 302 to perform operations on behalf of end-user network 320. Administrator instance 344 may be used to design rules utilized by rules engine 302, in some embodiments. Rules can be designed by users (e.g., administrators or supervisors at administrator instance 344) from end-user network 320 through the use of a software-based design tool. Such a tool presents the rule designer with options for defining triggers, conditions, actions, and other characteristics of the rule. The tool may utilize a GUI and may be embodied as a series of one or more web pages and/or web-based applications deployed on the management network 300 and provided to authorized users at the administrator instance on end-user network 320 upon request. Entering information into the one or more web pages and/or web-based applications may be referred to as defining a "specification." Once completed, rules may be added to rules engine 302 to automatically carry out various operations, such as on end-user network 320, in an organized and efficient manner. Notably, the rule design tool may be referred to as a "low-code/no-code" solution because designers write very little code, or perhaps no code at all, for the rule. As used herein, rules may also be referred to as "logical directives."

Rules may be designed based around specific definitions of triggers, conditions, and actions. Triggers may be used to specify circumstances that start a rule, such as an event occurring on end-user network 320 (e.g., a front-office agent instance ending a communication or a back-office agent instance completing processing of a case) or according to a schedule (e.g., once per day or once per week). Conditions may be evaluated when the rule is triggered. If the conditions are met, then the rule's actions may be executed. Actions (or sometimes referred to herein as "operations") may include controlled logic that specifies operations that should occur if the triggers and conditions are met. Actions may involve operations that change the operative state of an agent instance, send a notification to an agent instance or a supervisor instance, and so on. Notably, while rules herein are discussed with regard to triggers, conditions, and actions, the embodiments herein allow for support for other types of rule design.

In some embodiments, the operations include changing a state of a particular agent instance of the agent instances, modifying an assigned schedule for the particular agent instance, modifying an assigned queue of the particular agent instance, where the operations include providing an alert to the at least one agent instance, providing an alert to a supervisor instance associated with the at least one agent instance, initiating a training plan for the at least one agent instance, penalizing the at least one agent instance, providing a communication acknowledging at least one agent instance, providing a communication indicating a level of performance of the at least one agent instance, or providing a communication indicating a level of performance of the at least one agent instance relative to other agent instances of the plurality of agent instances.

In addition to designing rules, the administrator instance 344 may communicate with the management network 300 regarding the modification of existing rules or the design of new rules. In particular, recommendation engine 314 of the management network 300 may analyze historical data or information relating to end-user network 320 and, based on that analysis, establish one or more recommendations for rules to be modified or created on behalf of end-user network 320. Such recommendations may be communicated from the recommendation engine 314 on management network 300 to the administrator instance 344 on end-user network 320, so that an administrator or supervisor (or other authorized personnel) can take any appropriate action, such as approving or declining approval of a particular recommendation. As described above and in further detail below, recommendation engine 314 may apply AI algorithms (e.g., machine learning, predictive algorithms, and/or quantitative analysis, among others) to historical data pertaining to end-user network 320 (and perhaps other data, such as industry data) to identify trends and/or opportunities for rules optimization. The resulting rules recommendations may be provided by the recommendation engine 314 to the supervisor or administrative instance 344 as suggestions, subject to approval before adoption or execution. Alternatively, the rules recommendations could be implemented without any advance approval (e.g., by administrator instance 344 or a related entity) needed. Rules having adaptive threshold triggers (described below) are an example of rules that may have rules recommendations associated with them. As another example, rules could be created or modified based on identified burnout or attrition predictors.

Front-office proxy server(s) 328 and back-office proxy server(s) 348 may be one or more local and/or remote server devices that facilitate secure communication and movement of data between end-user network 320 and management network 300. In particular, proxy server(s) 328 and 348 may establish and maintain secure communication sessions with one or more computing devices of management network 300, such as rules engine 302, virtual machines 310, recommendation engine 314, and/or virtual private network (VPN) gateways of management network 300 (not shown). By way of such a session, management network 300 may be able to obtain data from and manage aspects of end-user network 320 and its components. In examples, such as where the management network 300 and the end-user network 320 are not commonly owned or administered, proxy server(s) 328 and 348 may be placed behind a firewall of end-user network 320 (e.g., within end-user network 320 and protected by the firewall), such that the firewall might not have to be specifically configured to support incoming sessions from management network 300, thereby avoiding potential security risks to end-user network 320. As mentioned previously, front-office proxy server(s) 328 and back-office proxy server(s) 348 may be combined into one or more proxy server(s) providing proxy server functionality for both the front office 322 and back office 342.

Proxy server(s) 328 and 348 may include or serve as an adapter service utilizing plugins and/or other components to make various Application Program Interface (API) calls for incoming or outgoing traffic, such as traffic communicated with cloud-based services (see, e.g., FIG. 3C). For example, such API calls could include API calls to one or more third-party providers of conditions, events, and/or actions to the management network 300. As another example, the API calls could be for an external API to communicate user information directly between the end-user network 320 and the management network 300. As yet another example, the API calls could relate to tenant configuration (e.g., back-office configurations) of the end-user network 320 by the management network 300.

Customer(s) 330 may represent entities that communicate with the front office 322 or end-user network 320 to resolve issues. For example, if the front office 322 is part of a contact center, as illustrated in FIGS. 3B and 3C, customer(s) 330 may represent individuals, and/or devices associated with individuals, that communicate or interact with end-user network 320 to receive technical or non-technical assistance.

FIGS. 3B and 3C are block diagrams illustrating example network architectures for a monitored front-office/back-office contact center. FIGS. 3B and 3C are similar to FIG. 3A, except FIGS. 3B and 3C additionally include a communication distributor 324, a workforce management server 326, and a back-office case system 326. As previously mentioned, FIGS. 3A, 3B, and 3C utilize like reference numerals for like components and subcomponents. Further, while FIG. 3C shows each of the communication distributor 324, a workforce management server 326, and a back-office case system 326 as being cloud-based components, in other embodiments, one or more of these may be local (physically present) on the end-user network 320, such as in a hybrid architecture combining features shown in FIGS. 3B and 3C.

Workforce management server 326 may be local or remote networked hardware and/or software used to manage agent instances within the end-user network 320 (including cloud-based, work-from-home agent instances). Such agent instances may be in the front office 322 and/or the back office 342. In general, workforce management server 326 implements workforce management services with the end-user network 320 by forecasting labor requirements and creating and managing staff schedules to accomplish tasks according to an acceptable or preferred timeline. In some examples, the workforce management server 326 in the end-user network 320 is a cloud-based system (see FIG. 3C) associated with the end-user network and configured to allow for secure communications (e.g., via a VPN) between entities on the end-user network 320 and the workforce management server 326. Further details regarding workforce management server 326 are set forth below. In some examples, the recommendation engine 314 of the management network 300 may analyze data from the workforce management server 326 and/or may recommend or design rules (or rules modifications) that include triggers, conditions, and/or actions involving the workforce management server 326. In some examples, the workforce management server 326 is administered by the same enterprise that administers the management network 300, the end-user network 320, and/or other devices or networks.

Communication distributor 324 may be networked hardware and/or software used to facilitate interactions between customer(s) 330 and end-user network 320. In particular, for example, communication distributor 324 may receive customer communications or interactions and route the communications/interactions to channels and/or queues based on the communication medium and/or content. In addition, communication distributor 324 may assign front-office agent instances, for example, agent instances 322A, 322B, 322C, and 322D, to provide support to each queue. Communication distributor 324 may include information pertaining to the customer communications. This information may include, for example, how long communications from customer(s) 330 are postponed until being served by a front-office agent instance, whether a communication is abandoned, and so on, as well as information pertaining to the front-office agent instances assigned to queues (e.g., which agent instances are assigned to which queues). In some examples, the recommendation engine 314 of the management network 300 may analyze data from the communication distributor 324 and/or may recommend or design rules (or rules modifications) that include triggers, conditions, and/or actions involving the communication distributor 324. In some examples, the workforce management server 324 is administered by the same enterprise that administers the management network 300, the end-user network 320, and/or other devices or networks.

In some examples, communication distributor 324 may have a software component (e.g., a softphone) disposed on front-office agent instances within the front office (contact center) 322. As further described below, the management network 300 may utilize information from communication distributor 322 to perform front-office-related operations on behalf of the front office 322 of end-user network 320. In some examples, communication distributor 324 in the end-user network 320 is a cloud-based system (see FIG. 3C) associated with the end-user network and configured to allow for secure communications (e.g., via a VPN) between entities on the end-user network 320 and the communication distributor 324.

During operations, workforce management server 326 may receive information from communication distributor 324 regarding expected communication volumes from customer(s) 330. For cloud-based configurations, such as the one illustrated in FIG. 3C, workforce management server 324 may communicate with communication distributor 324 using one or more VPN connections, for example. Using this data, workforce management server 326 may generate schedules for front-office agent instances to cover the expected volume. For example, the workforce management server 326 may generate a schedule for front-office agent instance 322A that stipulates: "work on Monday from 8 AM-5 PM", "work on Wednesday from 4 PM-8 PM", and so on. As further described below, the management network 300 may utilize information from the operations of workforce management server 326 to perform operations on behalf of the front office 322 of end-user network 320. In addition, the recommendation engine 314 of the management network 300 may analyze data or information from the workforce management server 326 and/or communication distributor 324. The recommendation engine 314 may additionally recommend or design rules (or rules modifications) that include triggers, conditions, and/or actions involving the workforce management server 326 and/or communication distributor 324.

Back-office case system(s) 350 may be networked hardware and/or software used to facilitate processing of back-office cases, such as claims to be processed. In particular, back-office case system(s) may receive incoming cases from the front office 322 or another entity within or external to the end-user network 320. The back-office case system(s) may then route the case(s) to appropriate back-office channels (e.g., appropriately qualified groups of back-office agents) for processing. In addition, back-office case system(s) 350 may assign back-office agent instances, for example, agent instances 342A, 342B, 324C, and 342D, to provide support to each queue of cases. Alternatively, the back-office case system(s) may manage cases needing to be processed by the back office 342, such as through a First-In-First-Out (FIFO) queue system, and back-office agents may "pull" new cases to process as they complete processing of other cases. Back-office case system(s) may, but need not, maintain information including, for example, how long cases are queued before being processed, for example. The back-office case system(s) may also store information pertaining to which back-office agent instances are assigned to which case queues, in some implementations. In some examples, back-office case system 350 in the end-user network 320 is a cloud-based system (see FIG. 3C) associated with the end-user network 320 and configured to allow for secure communications (e.g., via a VPN) between entities on the end-user network 320 and the back-office case system 350. In some examples, the recommendation engine 314 of the management network 300 may analyze data from the back-office case system(s) 350 and/or may recommend or design rules (or rules modifications) that include triggers, conditions, and/or actions involving the back-office case system(s) 350.

While workforce management server 326 would typically be used to manage front-office agents, in some cases, the workforce management server 326 additionally or alternatively may be used to manage back-office agent instances within the end-user network 320. For example, workforce management server 324 may receive information from back-office case system(s) 350 to determine an anticipated workload to be processed. In such a scenario, the workforce management server 326 may generate work schedules for back-office agent instances to process available non-customer-facing work, as informed by back-office case system(s) 350. For example, the workforce management server 326 may generate a schedule for back-office agent instance 342A that stipulates: "work on Monday from 8

AM-5 PM", "work on Wednesday from 4 PM-8 PM", and so on. As further described below, the management network 300 may utilize information from the operations of workforce management server 326 (which may be located on the end-user network 320 or accessible as a cloud-based server (see FIG. 3C)) to perform operations on behalf of the back office 342 of end-user network 320.

With regard to the front office 322, to effectively address communications from customer(s) 330, end-user network 320, including cloud-based components associated with end-user network 320, may perform operations to (i) forward incoming communications from customer(s) 330 to channels/queues, and (ii) assign front-office agent instances from the contact-center front office 322 to service channels/queues. As used herein, the operations of forwarding incoming communications to channels/queues may be referred to as "routing," whereas the operations of assigning agent instances to service channels/queues may be referred to as "assignment."

Similarly, with regard to the back office 342, to effectively process back-office cases, such as claims or other work originating from the front office 322, end-user network 320, including cloud-based components associated with end-user network 320, may perform operations to (i) forward incoming cases to channels/queues, and (ii) assign back-office agent instances from the back office 342 to service the channels/queues of cases to be processed. Alternatively, as discussed above, rather than the end-user network 320 forwarding incoming cases to back-office agent instances, the back-office agent instances may instead "pull" or accept or obtain new incoming cases from a new case repository maintained, e.g., by back-office case system(s) 350.

Figure 4A:
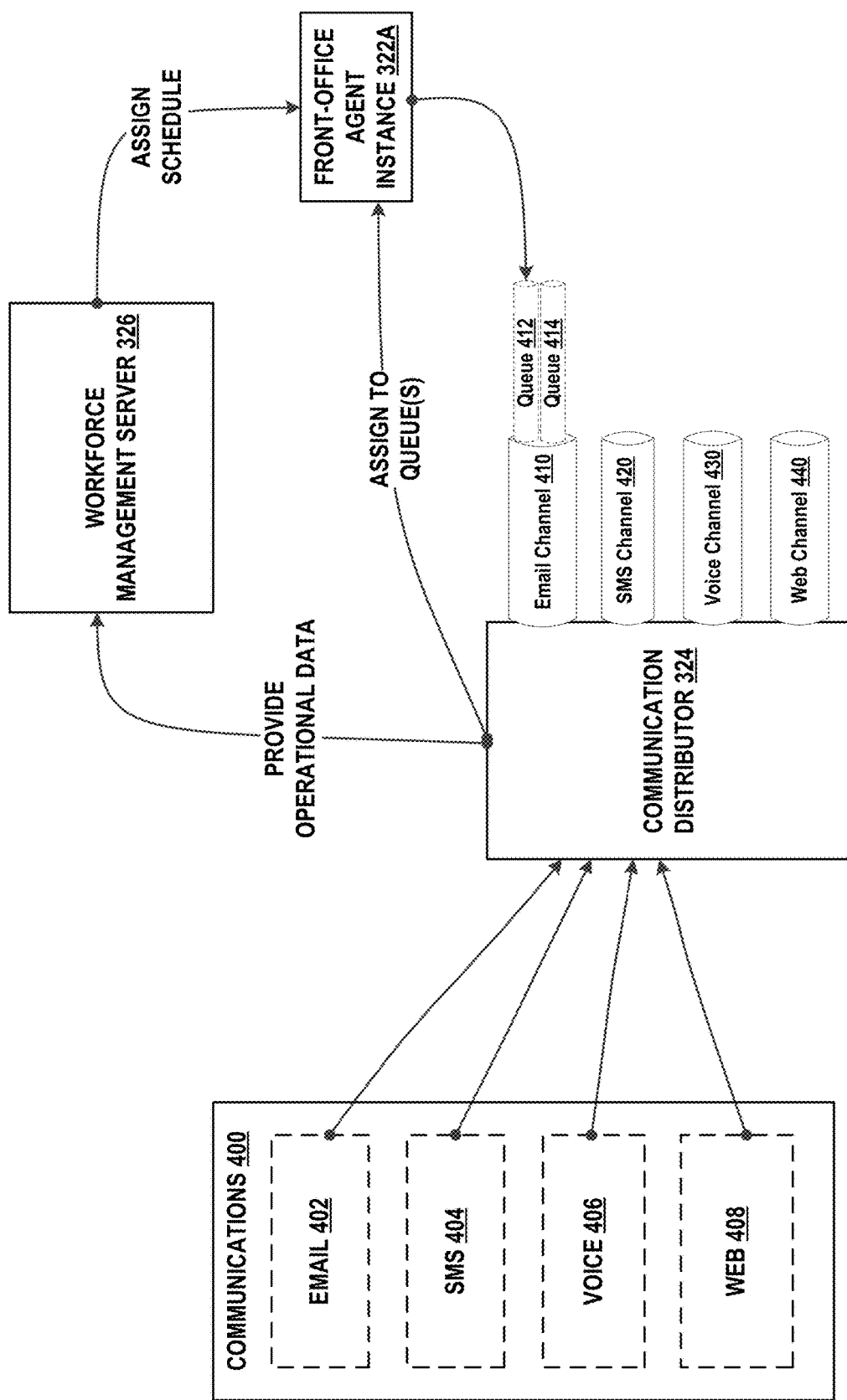
FIG. 4A is a block diagram illustrating routing and assignment for a front office, in accordance with example embodiments.
Figure 4B:
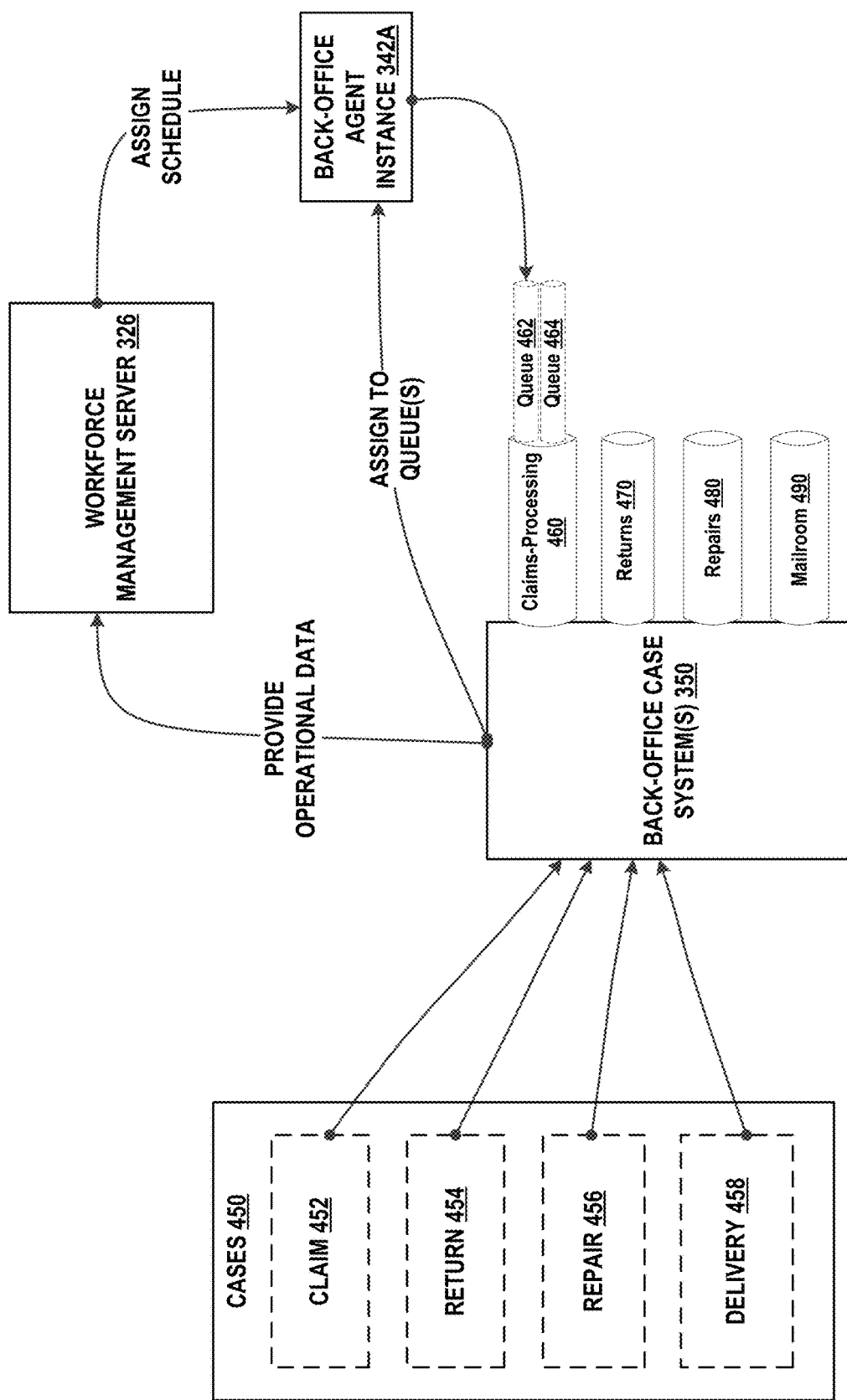
FIG. 4B is a block diagram illustrating routing and assignment for a back office, in accordance with example embodiments.

FIGS. 4A and 4B are block diagrams illustrating routing and assignment for a front office and a back office, respectively, of a contact center, in accordance with example embodiments. In particular, FIG. 4A shows how the communication distributor 324 and workforce management server 326 shown in FIGS. 3B and 3C can be used to facilitate routing and assignment of communications from customer(s) 330. As discussed, one or both of the communication distributor 324 and the workforce management server 326 may be physically located on the end-user network 320 or may instead be accessible as cloud-based services, such as those provided by third-party vendors. Such a cloud-based service might include a relatively small client software component (i.e., a thin client) on the end-user network 320 or may utilize an API to allow for data communications.

For purpose of the embodiments herein, in the context of a front office, a "communication" may refer to any form of contact (i.e., interaction) between customer(s) 330 and the front office 322 of the end-user network 320. For example, a communication may be in the form of a call, a chat session or portion thereof, a text, an instant message, a web page form, an email, and so on. Example communications 400 are shown in FIG. 4A. In particular, communications 400 include email communication 402, which may take the form of an email from customer(s) 330, short message service (SMS) communication 404, which may take the form of a text message from customer(s) 330, voice communication 406, which may take the form of a voice call placed from a telephonic device of customer(s) 330, and web communication 408, which may take the form of a chat message from customer(s) 330. Notably, communications 400 are presented for the purpose of example. In practice, other types of communications may exist. Communications 400 may involve computing devices as agent instances, such as chatbots engaging in chat sessions, for example.

As communications 400 are received by communication distributor 324, each incoming communication may be received by a particular communication channel based on the medium of the incoming communication. As used herein, a "communication channel" (or colloquially, just "channel") may refer to an interface within communication distributor 324 that is designed to receive communications over a specific medium. For example, to facilitate email communication 402, communication distributor 324 may include email channel 410 (which may involve a simple mail transfer protocol (SMTP) server configured to receive emails sent to a designated email address). To facilitate SMS communication 404, communication distributor 324 may include SMS channel 420 (which may involve an SMS gateway configured to receive SMS messages sent over a telecommunications network to a designated phone address). To facilitate voice communication 406, communication distributor 324 may include voice channel 430 (which may involve an automatic call distributor (ACD) service configured to receive calls sent over a telecommunications network to a designated phone address). And to facilitate web communication 408, communication distributor 324 may include web channel 440 (which may involve an Internet Relay Chat (IRC) server configured to receive chat messages sent over a network). Notably, other types of devices to facilitate communication channels may exist.

As shown in FIG. 4A, each channel in communication distributor 324 may include one or more queues. As used herein, in the context of a front office, a "queue" may refer to a backlog of communications waiting to be serviced by a front-office agent instance. During operations, communication distributor 324 may route communications 400 to queues based on the content of each respective communication, for example.

To clarify the concept of routing, FIG. 4A illustrates queue 412 and queue 414. In an example scenario, if communication distributor 324 is used to resolve mobile device issues, then queue 412 and queue 414 may each represent different mobile device models. For instance, communications regarding Model X issues may be routed to queue 412, while communications regarding Model Y issues may be routed to queue 414. Then, communication distributor 324 may assign front-office agent instances to service the communications on queue 412 and queue 414. For example, front-office agent instance 322A is depicted as assigned to queue 412. In examples, communication distributor 324 may assign front-office agent instances to queues based on the skill sets of agent instances, the volume of calls within a certain queue, and/or other agent attributes.

In examples, several techniques may be used to garner the content of a communication in order to route the communication to an appropriate queue. In some cases, the content of the communication may be provided by customer(s) 330. For instance, during a voice communication, customer(s) 330, via an interface on a telephonic device, may enter an input (such as pressing a key or speaking a word, phrase, or number) to indicate the content of the voice communication (also known as an interactive voice response (IVR) system). Or, in the case of an email communication, communication distributor 324 may include different email addresses directed to different issues. In further examples, communication distributor 324 may include one or more algorithms to parse incoming communications to deduce content. For instance, text and voice analysis algorithms may be used.

Once within a queue, a communication will remain in abeyance until being served by front-office agent instances assigned to the queue, according to example embodiments. Alternatively, the communication may drop out of the queue or become abandoned. Because one or more front-office agent instances may service a given queue, communication distributor 324 may utilize several techniques for distributing calls among agent instances assigned to the given queue. For instance, linear call distribution, circular call distribution, uniform call distribution, simultaneous call distribution, and/or weighted call distribution algorithms may be used. Other techniques may also exist.

In addition to routing and assignment, communication distributor 324 may provide data to workforce management server 326. Such data may include information regarding incoming communications, the number of communications per channel, the number of communications per queue, average queue length, and so on. Workforce management server 326 may utilize the received data to inform decisions regarding the scheduling of front-office agent instances. For example, if communication distributor 324 reports to workforce management server 326 that an influx of calls occurs every day around noon, workforce management server 326 may assign schedules for front-office agent instances that are able to satisfy such demand. Communications between the communication distributor 324 and workforce management server 326 may be via a VPN connection, for example, in embodiments utilizing one or more cloud-based services and/or where the communication distributor 324 and workforce management server 326 are not administered by the same enterprise. Communication distributor 324 may additionally provide data to recommendation engine 314 (perhaps via workforce management server 326) for analysis using AI algorithms to evaluate and modify existing rules and/or design new rules.

FIG. 4B is a block diagram illustrating routing and assignment for a back office, such as the back office 342 of FIGS. 3B and 3C. In particular, FIG. 4B shows an example in which the back-office case system(s) 350 and workforce management server 326 shown in FIGS. 3B and 3C can be used to facilitate routing and assignment of cases to be processed. As previously mentioned, many back offices do not utilize a workforce management server like the one illustrated in FIG. 4B. Moreover, while FIG. 4B illustrates the back-office case system(s) 350 assigning back-office agent instances to process case queues (i.e., a "push" workflow), a more typical scenario might be for a back-office agent instance to "pull" new cases out of an appropriate queue, based on skill set, required tools or facilities, or other factors. One or both of the back-office case system(s) 350 and the workforce management server 326 may be physically located on the end-user network 320 or may instead be accessible as cloud-based services, such as those provided by third-party vendors. Such a cloud-based service might include a relatively small client software component (i.e., a thin client) on the end-user network 320 or may utilize an API to allow for data communications.

For purpose of the embodiments set forth herein, in the context of a back office, a "case" may refer to any unit of work that needs to be processed by a back-office agent 342 of the end-user network 320. For example, a case may be in the form of a claim, returned item, a repair, a delivery to be initiated, and so on. Example cases 450 are shown in FIG. 4B. In particular, cases 450 include claim 452, return 454, repair 456, and delivery 458, each of which may require a different back-office channel (e.g., group of agent instances), based on skill set, required tools or facilities, or other factors. Notably, cases 450 are presented for the purpose of example. In practice, other types of cases may exist.

As cases 450 are being received by back-office case system(s) 350, such as from the front office 322 or elsewhere within or outside of end-user network 320, each incoming case may be received by a particular case channel based on the type of the incoming case. For example, to facilitate claim 452, back-office case system(s) may route to a claims-processing channel 460, which may, for example, include agent instances having suitable applications for processing claims. To facilitate return 454, back-office case system(s) may route to a returns channel 470, which may, for example, including agent instances suited for facilitating inspection and documentation of returned items for completeness and suitability for resale. To facilitate repair 456, back-office case system(s) may route to a repairs channel 480, which may, for example include agent instances having appropriate service manuals and/or tools for effecting repairs. And to facilitate delivery 458, back-office case system(s) may route to a mailroom channel 490, which may include agent instances having suitable applications for addressing outgoing deliveries, computing and paying delivery charges, and so on. Notably, other types of case channels may also exist, and will likely depend on the particular business of the end-user network 320. Moreover, some back-office case system(s) 350 may only manage cases destined to a single channel, so that no routing need occur.

As shown in FIG. 4B, each channel in back-office case system(s) 450 may include one or more queues. As used herein, in the context of a back office, a "queue" may refer to a backlog of cases waiting to be serviced by a back-office agent instance. During operations, back-office case system(s) 350 may route cases 450 to queues based on agent skill set, required tools or facilities, or other factors, for example.

To clarify the concept of back-office routing, FIG. 4B illustrates queue 462 and queue 464. In an example scenario, if back-office case system(s) 350 is used to process insurance claims, then queue 462 and queue 464 may each represent different types of insurance. For instance, health-insurance claims may be routed to queue 462, while automobile-insurance claims may be routed to queue 464. Then, back-office case system(s) 350 may assign back-office agent instances to process the cases on queue 462 and queue 464. For example, back-office agent instance 342A is depicted as assigned to queue 462. Back-office case system(s) 350 may assign back-office agent instances to queues based on agent skill set, required tools or facilities, or other factors, for example.

In examples, several techniques may be used to garner the content of a case in order to route the case into an appropriate queue. In some cases, the type of the case may be provided by a communication or other data from the front office 322. As another example, a document or file associated with a case may have a case identifier (e.g., a tag or an alphanumeric code/sequence) that identifies a particular case as being of a certain case type. In further examples, back-office case system(s) 350 may include one or more algorithms to parse content (e.g., textual content) of incoming cases to deduce a case type. For instance, text analysis algorithms may be used.

Once within a queue, according to example embodiments, a case will remain in abeyance until being processed by back-office agent instances assigned to the queue. Because one or more back-office agent instances may process a given queue, back-office case system(s) 350 may utilize several techniques for distributing cases among agent instances assigned to the given queue. For instance, linear case distribution, circular case distribution, uniform case distribution, simultaneous case distribution, and/or weighted case distribution algorithms may be used. Other techniques may also exist. And, as mentioned, rather than the back-office case system(s) 350 assigning, back-office agent instances my retrieve or otherwise "pull" cases from the back-office case system(s) 350.

In addition to routing and assignment, back-office case system(s) 350 may provide data to workforce management server 326, if such functionality is provided for the back office in question. Such data may include information regarding incoming cases, the number of cases per channel, the number of cases per queue, average queue length, and so on. Workforce management server 326 may utilize the received data to inform decisions regarding the scheduling of back-office agent instances. For example, if back-office case system(s) 350 reports to workforce management server 326 that an influx of returns occurs every year just after Christmas, workforce management server 326 may assign schedules for back-office agent instances that are able to satisfy such demand. Communications between the communication distributor 324 and back-office case system(s) 350 may be via a VPN connection, for example, in embodiments utilizing one or more cloud-based services. Back-office case system(s) 350 may additionally provide data to recommendation engine 314 (perhaps via workforce management server 326) for analysis using AI algorithms to evaluate and modify existing rules and/or design new rules.

Figure 5A:
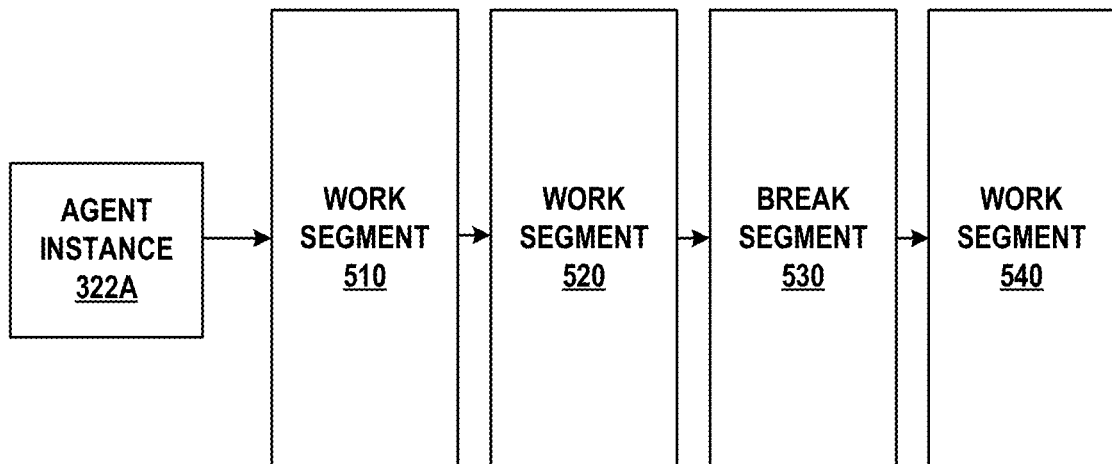
FIG. 5A is a block diagram illustrating a schedule assignment, in accordance with example embodiments.

FIG. 5A illustrates a schedule assignment, in accordance with example embodiments. In particular, as an example, FIG. 5A conceptually demonstrates how an agent instance (in this case, front-office agent instance 322A) may be assigned to different work segments by workforce management server 326. As used herein, a "work segment" (or colloquially, just "segment") may refer to a block of time in which an agent instance is assigned to a specific task. For example, work segment 510 may be a segment in which front-office agent instance 322A is assigned to work, work segment 520 may be a segment in which front-office agent instance 322A is also assigned to work, work segment 530 may be a segment in which front-office agent instance 322A is assigned to break, and work segment 540 may be a segment in which front-office agent instance 322A is assigned to work or be active. Work segments 510-540 are presented for the purpose of example.

In practice, many different work segments or orders of work segments may be assigned to agent instances to satisfy the needs of end-user network 320. Notably, within a given work segment, an agent instance may perform various functions, each of which may be captured by a respective "operative state." While the aforementioned examples are directed to assignments of time blocks for front-office agent instance 322A, the workforce management server 326 (or another entity within or outside of end-user network 320) may similarly assign blocks of time to back-office agent instances, such as back-office agent instance 342A. In other cases, schedules are assigned to front-office agent instances, but not to back-office agent instances, or vice-versa. Workforce management server may communicate some or all (or none) of the operative states described above to the management network 300 (e.g., for analysis by the recommendation engine 314, perhaps after enrichment of the agent-state data), in some examples.

Figure 5B:
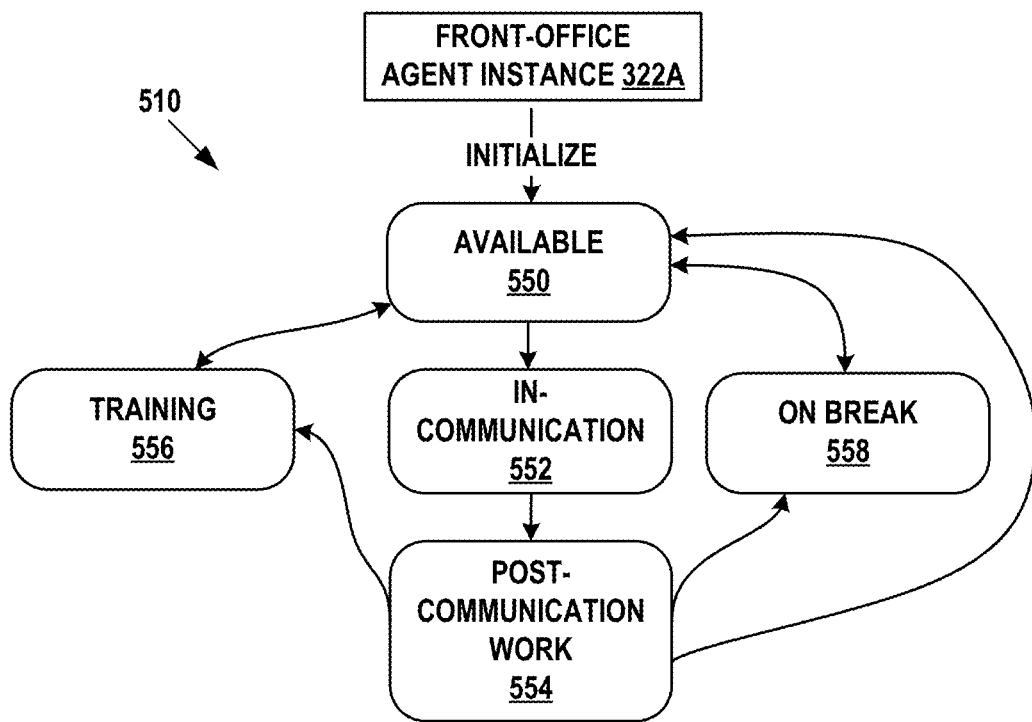
FIG. 5B is a block diagram illustrating operative states within a work segment, in accordance with example embodiments.

FIG. 5B illustrates operative states within work segment 510, in accordance with example embodiments. In particular, FIG. 5B conceptually demonstrates a front-office example, in which front-office agent instance 322A may move between various operative states during the course of an assigned work segment. Back-office agent instances, like back-office agent instance 342A, may similarly move between various operative states, such as one or more of the following states: logged-in state, logged-out state, idle state, active state, unapproved application state, unapproved website state, locked-state, and/or shut-down state. As used herein, operative state (or colloquially, just "state") may refer to a current status of or function being performed by an agent instance. Some operative states may be visited zero times or more than one time. Also, operative states may have more than one possible next state, thus representing a decision to be made by communication distributor 324, for example.

When beginning a work segment, front-office agent instance 322A may initialize into available state 550. Available state 550 may represent a state in which agent instance 322A is capable of taking on any function. From available state 550, agent instance 322A may transition to training state 556, in-communication state 552, or on-break state 558. In particular, training state 556 may represent a state in which agent instance 322A is performing a training module, in-communication state 552 may represent a state in which agent instance 322A is performing a communication with customer(s) 330, and on-break state 558 may represent a state in which the agent instance 322A is in a period of respite. In examples, communication distributor 324 may assign agent instance 322A to any of states 552, 556, or 558 based on current needs and communication demands.

FIG. 5B also depicts post-communication work state 554. This state may represent a state in which front-office agent instance 322A is performing survey and/or evaluation work about a recent communication. Transitions to post-communication work state 554 may occur from in-communication state 552. From post-communication work state 554, communication distributor 324 may assign agent instance 322A to any of states 550, 556, or 558 based on current needs and communication demands.

It should be noted that the descriptions of FIGS. 5A and 5B are used for the purpose of example and are not intended to be limiting with respect to the embodiments herein. In practice, many different work segments or operative states may exist. Moreover, while the example of FIG. 5B was presented in the context of communication distributor 324 assigning front-office agent instance 322A to various states, back-office case system(s) 350 (or another entity) could similarly assign back-office agent instances, such as agent instance 342A, to various states pertaining to case processing. For example, such states could include states pertaining to processing a return, post-return documentation, training, receiving a software update, and a break or powering-down, for example. In addition, instead of temporal work segments, back-office agent instances might additionally or alternatively have non-temporal work "units" to be processed, such as a prescribed number of cases to be processed.

VI. Monitoring of Agent Instances

As detailed above, management network 300 may use data from communication distributor 324, workforce management server 326, and/or back-office case system(s) 350 to perform operations on behalf of end-user network 320. Typically, in example embodiments, management network 300 obtains the data though a "back-end integration." For example, communication distributor 324, workforce management server 326, and/or back-office case system(s) 350 may provide an application programming interface (API) for obtaining data. This API may be a representational state transfer (REST) API using HTTP, for instance. Using the API, management network 300 may (perhaps via proxy server(s) 328 and/or 348) place a request for data and receive a corresponding response, perhaps in the form of JavaScript Object Notation (JSON) or extensible Markup Language (XML). As another example, in the case of a cloud-based system, management network 300 may obtain the data from communication distributor 324, workforce management server 326, and/or back-office case system(s) 350 via one or more business-to-business (B2B or BTB) VPNs, for example. Or, where the end-user network 320, management network 300, communication distributor 324, workforce management server 326, and/or back-office case system(s) 350 are administered by a single enterprise, the data may be exchanged directly, such as via disparate software modules communicating data and/or variables with one another. In some examples, such received data may be used by the recommendation engine 314 for analysis using AI algorithms in order to evaluate existing rules, recommend or implement modifications to existing rules, and/or design and recommend or implement new rules.

In addition to or as an alternative to data from communication distributor 324, workforce management server 326, and/or back-office case system(s) 350, management network 300 may use data (i.e., "monitor data") from a monitoring application installed on one or more agent instances in front office 322 and/or back office 342, to perform operations on behalf of end-user network 320. This monitor data could be used instead of, in addition to, or as a supplement to data from other sources, such as communication distributor 324, workforce management server 326, and/or back-office case system(s) 350. For example, the recommendation engine 314 could use monitor data for analysis using AI algorithms in order to evaluate existing rules, recommend or implement modifications to existing rules, and/or design and recommend or implement new rules. As a result, management network 300 is able to receive a more complete picture of what any particular agent instance (or group of agent instances) is working on. For the back office, in particular, use of monitor data from a monitoring application installed on a back-office agent instance can provide insights into what applications and/or web sites are being actively used, for example. This allows for greater transparency into activities and states of the back-office agent instance, which might otherwise be unavailable or difficult to ascertain. While most of the following discussion is presented for an example of a back-office agent instance, a monitoring application could be just as applicable to monitoring a front-office agent instance.

Figure 6A:
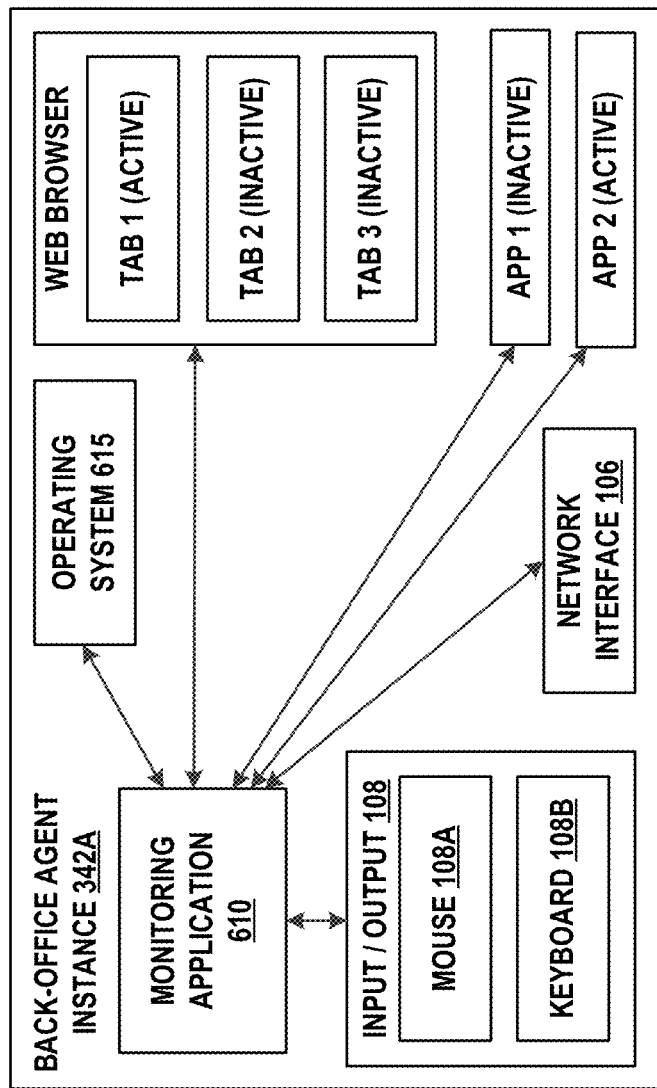
FIG. 6A is a block diagram illustrating an agent instance having a monitoring application, in accordance with example embodiments.

FIG. 6A is a block diagram illustrating a back-office agent instance 342A having a monitoring application 610 (e.g., a thin client), in accordance with example embodiments. The monitoring application 610 acts as a discovery module to collect monitor information pertaining to the agent instance 342A. Such monitor information may include whether an agent instance is (a) actively working (e.g., an agent is actively working on the agent instance 342A), (b) idle (e.g., an agent is logged in, but not actively working on the agent instance 342A), (c) the agent instance is locked, or (d) the agent instance is shut down. Other monitor information could be collected instead or in addition. The monitor information may be communicated as monitor data to an integration server on the management network 300 via an encrypted HTTPS (Port 443) communications, for example.

The integration server (in effect, acting as the database devices 306 and server devices 308 in FIG. 3A) can, in turn, provide the data to the recommendation engine 314 for analysis using AI algorithms in order to evaluate existing rules, recommend or implement modifications to existing rules, and/or design and recommend or implement new rules.

Moreover, if the agent instance 342A is determined to be actively working, the application monitor 610 could additionally determine what application and/or web site the application instance 342A is currently working in. For example, the monitoring application 610 may collect an active title (e.g., specifying an application that is currently active) and/or URL/Domain information for a web site in an active web browser tab or window. In the example shown in FIG. 6A, the monitoring application 610 could determine that Tab 1 of a web browser having three tabs open (with Tabs 2 and 3 being inactive) is displaying a website corresponding to the following URL: https://www.uspto.gov. Similarly, the monitoring application 610 could determine that App 1 (e.g., an email client) is open, but inactive, while App 2 (e.g., a Solitaire game) is open and active. The monitoring application 610 could determine whether the determined Tab 1 URL (https://www.uspto.gov) is an approved web site and whether the determined App 1 (email client) and App 2 (Solitaire game) are approved applications by comparing to a preconfigured list of approved sites and applications. Such a preconfigured list may be defined by one or more administrators or supervisor instances of the end-user network 320. For example, the management network 300 may present the administrator instance 344 with a web portal having a GUI for defining approved and/or unapproved web sites and/or applications. In addition to active web browser tabs/windows and/or applications, the monitoring application 610 may also determine whether inactive web browser tabs/windows are at approved or unapproved URLs and/or whether inactive applications are approved or unapproved. Hence, even in a multi-tasking environment, monitor data may be collected for possible utilization in state determination or other actions. In some examples, the recommendation engine 314 may analyze the monitor data to recommend and/or implement rule modifications or new rules pertaining to applications to add to or remove from the approved list of approved sites and applications.

The monitor application 610 could also track how long the agent instance 342A is active in each particular application and/or site. Alternatively, the monitor application 610 could track how long the agent instance 342A is in approved applications and/or sites versus unapproved applications and/or sites. This information could be collected as monitor data to be stored by monitoring application 610, to be provided to the management network 300, for use in causing operations to be performed on behalf of end-user network 320. In some examples, the recommendation engine 314 may analyze the monitor data to recommend and/or implement rule modifications or new rules pertaining to how long the agent instance 342A is in approved applications and/or sites versus unapproved applications and/or sites. For example, if a particular rule pertaining to time in an unapproved application is never or rarely triggered, then the recommendation engine 314 may recommend reducing the time threshold at which the rules triggers or executes or suggest replacing this rule with monitoring an alternative unapproved application where agents are spending time.

Whether a particular application or window/tab within a particular application is active or inactive may be based on the application being a foreground application, as defined by an operating system 615 being used on the agent instance 342A. This determination, like many others described with reference to the monitoring application 610 of FIG. 6A may utilize Microsoft Windows' UI Automation Framework and/ or other accessibility frameworks offered for Windows or other operating systems. As an example of an API that may be utilized by monitoring application 610 to determine various states and status information for agent instance 342A, the present application hereby incorporates by reference in its entirety, the Windows Accessibility API and associated documents available at the following web page, as of the time of this application: https://docs.microsoft.com/ en-us/windows/win32/winauto/windows-automation-api-portal. Other APIs, such as for other operating systems, may also be utilized by monitoring application 610 to determine a state or status information of agent instance 342A. Notably, while FIG. 6A illustrates operating system 615 as an isolated block for simplicity, in many implementations, the operating system 615 may be a main source of information to be collected as monitor data by the monitoring application 610. As such, operating system 615 will likely be in communication with all components illustrated in FIG. 6A.

The monitoring application 610 may also monitor input/ output unit 108 to determine whether the agent instance 342A is active or idle. For example, if the monitoring application 610 determines that no movement of mouse 108A or presses on keyboard 108B have occurred within a threshold period of time (e.g., 1 minute), then the agent instance 342A may be determined to be idle. As another, more advanced, example, the monitoring application 610 might detect movement of mouse 108A, but that the detected movement is irregular, such as repeated back-and-forth or circular movements over a short distance. Similarly, the monitoring application 610 might classify as irregular repeated key presses (e.g., 4 or more) of the same key on keyboard 108B. This information could be collected as monitor data to be stored by monitoring application 610, to be provided to the management network 300, including recommendation engine 314, for use in causing operations to be performed, and/or rule modifications or additions to be recommended or implemented, on behalf of end-user network 320.

The monitoring application 610 may be configured to collect monitor data on the agent instance 342A at predetermined intervals. For example, the monitoring application 610 may be configured to collect monitor data every 1 s, 10 s, 30 s, or 60 s. Other intervals may also be used, and could depend on the nature of the business of the end-user network 320. For example, the interval duration could be proportional to an average amount of time needed to process a case. As another example, the interval duration could be adjusted based on network bandwidth or data storage constraints—if too much monitor data is being collected and communicated, then a longer interval duration could be used. Configuration of the monitoring application 610 could be via an interface on the administrator instance 344 on the end-user network 320, such as via a web portal (hosted by the management network 300) that allows an administrator from the end-user network 320 to perform remote configuration. In the latter case, configuration data may be communicated from the management network 300 to the monitoring application 610 on the end-user network 320. Configuration could be performed using a GUI at the administrator instance 344, such as one associated with, accessible from, or similar to the GUI illustrated with respect to FIGS. 7A-7P, below.

The monitoring application 610 may communicate collected data to the management network 300 via a proxy server, for example, such as proxy server(s) 348. This could, in turn, include using a plug-in and/or adapter service on the end-user network 320 to convert collected monitor data to a format compatible with a particular REST API format being used, for example. The proxy server(s) 348 could establish and cache one or more WebSocket connections, for example.

Figure 22:
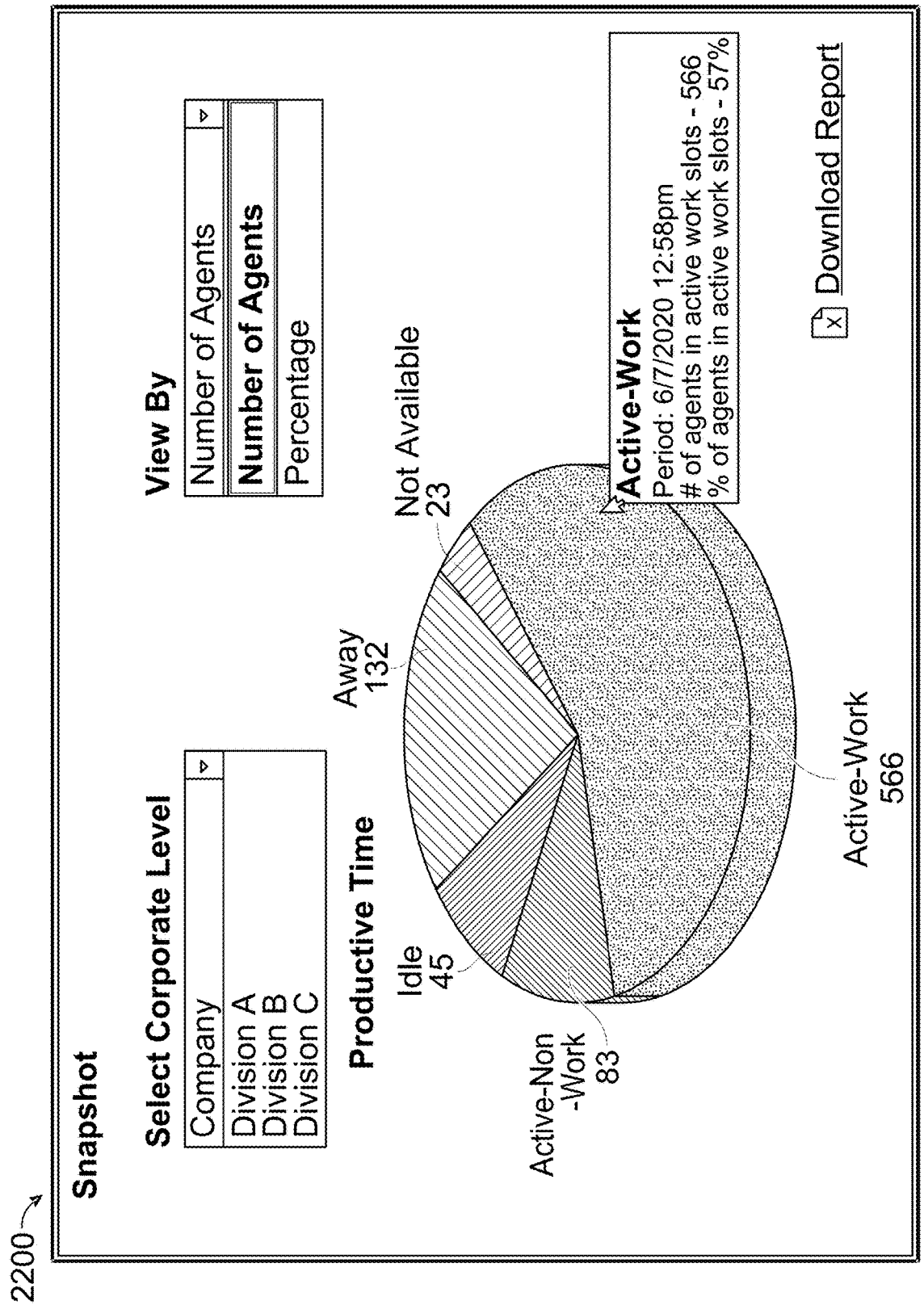
FIG. 22 is a screen shot illustrating an agent state report, in accordance with an example embodiment.
Figure 24:
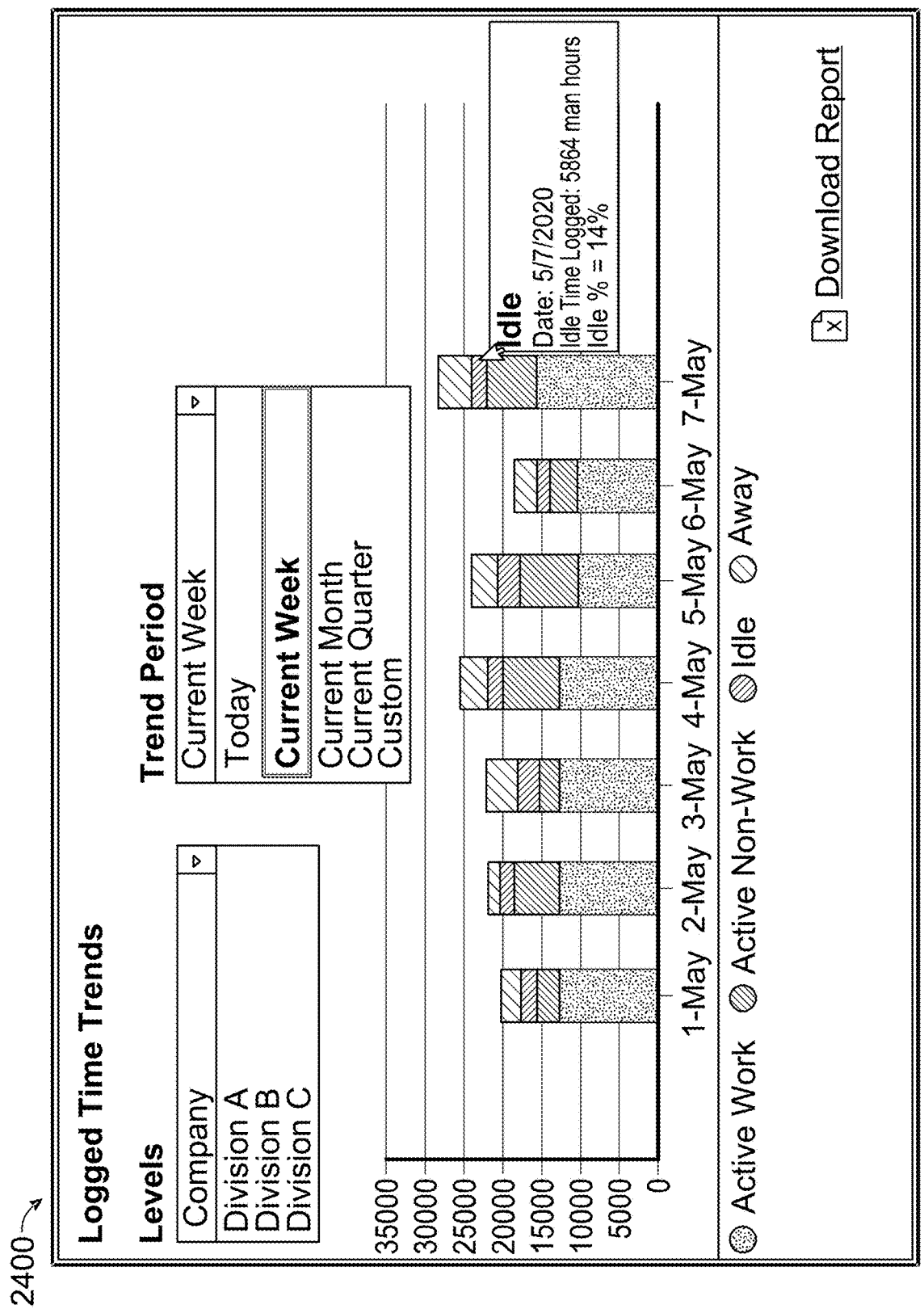
FIG. 24 is a screen shot illustrating an agent state report, in accordance with an example embodiment.

In addition to using received monitor data to cause operations to be performed or rules to be added/modified on behalf of end-user network 320, management network 300 may also use monitor data (and/or other received data from end-user network) to make available one or more agent state reports, such as the reports 2200, 2300, and 2400 respectively illustrated in FIGS. 22, 23, and 24. FIGS. 22-24 illustrate three example forms of agent state report 2200, 2300, and 2400, that may be provided, in accordance with an example embodiments. Other reports, such as those illustrating agent usage of approved and/or unapproved applications or sites, as well as others, may also be provided. Such reports may be available to administrators and/or supervisor instances via administrator instance 344 on end-user network 320, in accordance with an example embodiment.

VII. EXAMPLE RULES ENGINES

In line with the discussion above, while communication distributor 324, back-office case system(s) 350, and/or workforce management server 326 may provide some benefits to end-user network 320, such components may fail to provide end-user network 320 with the capability to logically transition operations to address unpredictable or undesirable (or desirable) events. For example, if front-office agent instances become idle due to low incoming communication volume, an advantageous operation may be to send the agents on break (e.g., power-down) or provide agents with training modules or software updates to occupy the downtime. Similarly, back-office agent instances could be alerted or issued training in the event that monitoring detects use of an unapproved application or site, for example.

To address this and other issues, management network 300 may be used to intelligently perform operations, or cause operations to be performed, on behalf of end-user network 320. Management network 300 may access data, applications, and services within the end-user network 320 by way of proxy server(s) 328, for example. As another example, at least some data, applications, and/or services associated with end-user network 320 may be hosted by management network 300 in a cloud-based configuration or the end-user network 320 and management network 300 could be administered by a single enterprise or enterprise group. Moreover, management network 300 may support the ability to configure the operations using logical directives. This allows management network 300 to be rapidly adapted by the end-user network 320 to meet specific needs.

Figure 6B:
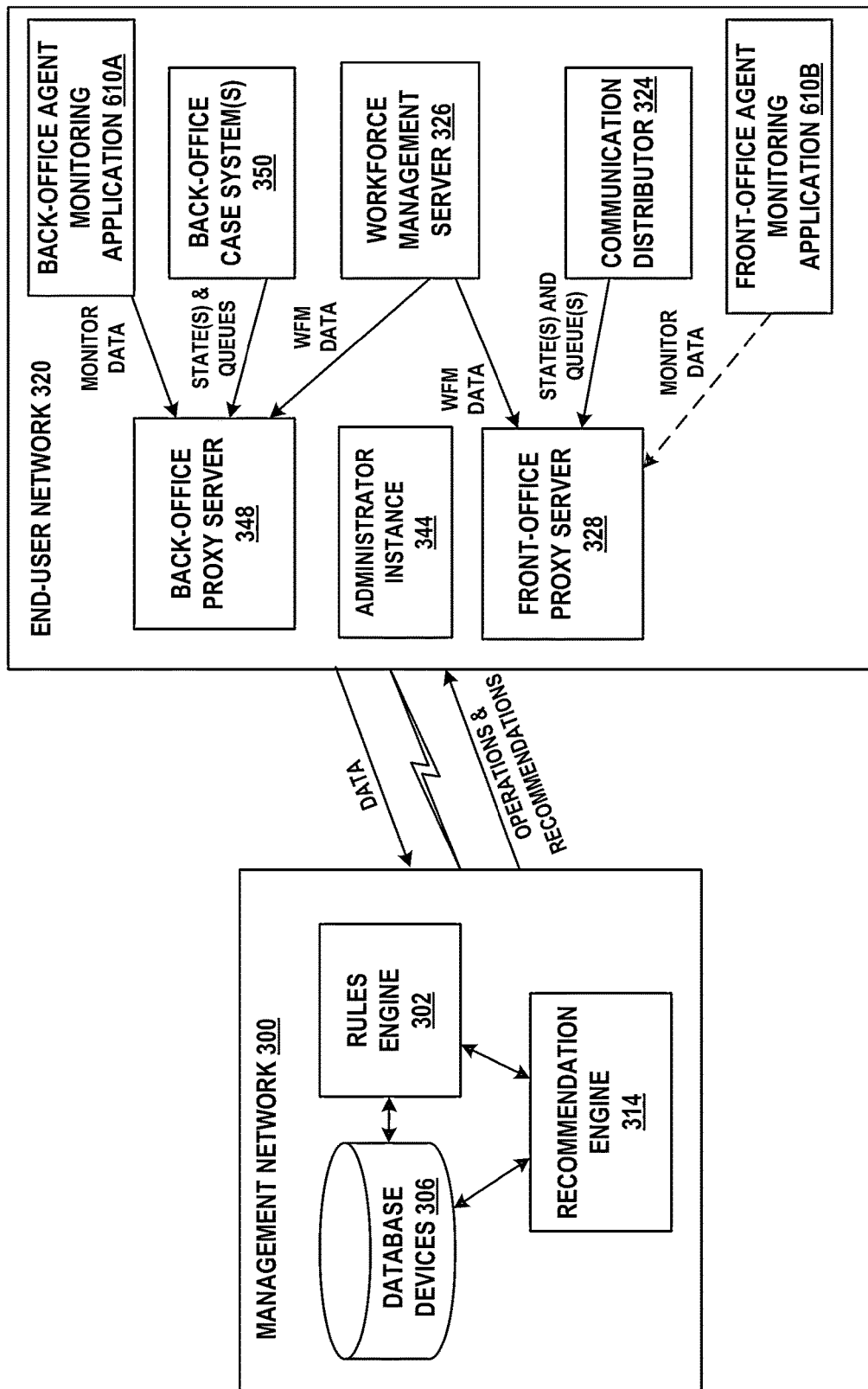
FIG. 6B is a block diagram illustrating a communication environment between a management network and an end-user network, in accordance with example embodiments.

FIG. 6B illustrates a communication environment between management network 300 and end-user network 320, in accordance with some examples. Some components illustrated in FIGS. 3A-3C are omitted from FIG. 6B for simplicity and ease of illustration. Rules engine 302 may be communicatively coupled with proxy server(s) 328 and 348. In a cloud-based configuration, one or more of the communication distributor 324, workforce management server 326, or back-office case system(s) 350 may include resources, such as servers and/or data storage, that are "associated with" the end-user network 320, but hosted elsewhere, such as in a remotely accessible network (e.g., via a VPN connection over the internet or another Wide Area Network (WAN)) maintained by a third-party vendor. Such a cloud-based configuration would differ from what is illustrated in FIG. 6B by the positioning of one or more components (e.g., one or more of the communication distributor 324, workforce management server 326, or back-office case system(s) 350) being outside of the box delineating the end-user network 320. Such component(s) may be in communication (e.g., via VPN connections) to the management network 300, end-user network 320, and/or other entities, for example. Other components, besides those listed above, could also be primarily cloud-based.

As described, proxy server(s) 328 and 348 may include one or more server devices on end-user network 320. Proxy server(s) 328 and 348 may be configured to request/receive and consolidate data from communication distributor 324, back-office case system(s) 350, workforce management server 326, agent monitoring applications 610A and 610B, and/or other devices on end-user network 320, including devices associated with the end-user network 320, but hosted elsewhere.

For example, from communication distributor 324, proxy server(s) 328 may request/receive data associated with operative states, channels, and queues associated with front-office agent instances. Such data may include queue statistics (e.g., average wait times for queues), events (e.g., an agent instance transitioning from an "in communication" agent state to a "post-communication work" agent state), and perhaps other metrics, for example. From back-office case system(s) 350, proxy server(s) 348 may request/receive data associated with operative states, channels, and queues associated with back-office agent instances. From workforce management server 326, proxy server(s) 328 and/or 348 may request/receive data associated with work segments. For example, such data may include staffing groups (e.g., groups of agent instances assigned to work similar work segments), work segment start times/end times, and perhaps other metrics. From agent monitoring applications 610A and 610B, proxy server(s) 328 and/or 348 may request/receive data pertaining to a monitored agent instance's device state and/or activity, such as whether the monitored agent instance is active, using an approved application/site, using an unapproved application/site, idle, locked, or logged-out. Once received, proxy server(s) 328 and/or 348 may transmit the data to management network 300 for processing, including for recommending and/or implementing additional rules and/or modifications to existing rules. Alternatively, in some cloud-based configurations, cloud-based configurations of communication distributor 324, back-office case system(s) 350, and/or workforce management server 326 may communicate directly with the management network 300, such as via VPN connections.

Data transmitted by proxy server(s) 328 and 348 may be received by rules engine 302, such as via servers 308 (not shown in FIG. 6B) and database devices 306. As described, rules engine 302 may be a computational entity (e.g., one or more processors) on management network 300 that, depending on the data received from proxy server(s) 328 and/or 348, performs operations on behalf of end-user network 320. Example operations may include changing the state of an agent instance (via commands to the communication distributor 324 and/or back-office case system(s) 350), changing the work segment of an agent instance (via commands to workforce management server 326), or sending notifications (e.g., in the form of emails or SMS messages) directly to an agent instance or supervisor. In some cases, data received from proxy server(s) 328 and/or 348 may be persisted into database devices 306 on the management network 300 for later reporting or other uses, including for analysis by recommendation engine 314 using AI algorithms to recommend or implement rules modifications or new rules. In some examples, management network 300 may utilize buffers (e.g., message queues) to ensure guaranteed delivery of incoming data and outgoing operations.

Operations performed by rules engine 302 are the result of rules. Rules can be designed by users from end-user network 320 through the use of a software-based design tool, such as an online tool provided at administrator instance 344. Such a tool presents the rule designer with options for defining triggers, conditions, actions, and other characteristics of the rule. The tool may utilize a GUI, for example, and may be embodied as a series of one or more web pages and/or web-based applications deployed on the management network 300 and provided to authorized users from end-user network 320 at the administrator instance 344 upon request, periodically, or as new recommendations from recommendation engine 314 are formulated. Entering information into the one or more web pages and/or web-based applications may be referred to as defining a "specification." Once completed, rules may be added to rules engine 302 to automatically carry out various operations, such as on end-user network 320, in an organized and efficient manner. Notably, the rule design tool may be referred to as a "low-code/no-code" solution because designers write very little code, perhaps no code at all, for the rule. As used herein, rules may also be referred to as "logical directives."

Rules may be designed based around specific definitions of triggers, conditions, and actions. Triggers may be used to specify circumstances that start a rule, such as an event occurring on end-user network 320 (e.g., a front-office agent instance ending a communication or a back-office agent instance completing processing of a case) or according to a schedule (e.g., once per day or once per week). Conditions may be evaluated when the rule is triggered. If the conditions are met, then the rule's actions may be executed. Actions (or sometimes referred to herein as "operations") may include controlled logic that specifies operations that should occur if the triggers and conditions are met. Actions may involve operations that change the operative state of an agent instance, send a notification to an agent instance or a supervisor instance, and so on. Notably, while rules herein are discussed with regard to triggers, conditions, and actions, the embodiments herein allow for support for other types of rule design.

Figure 7A:
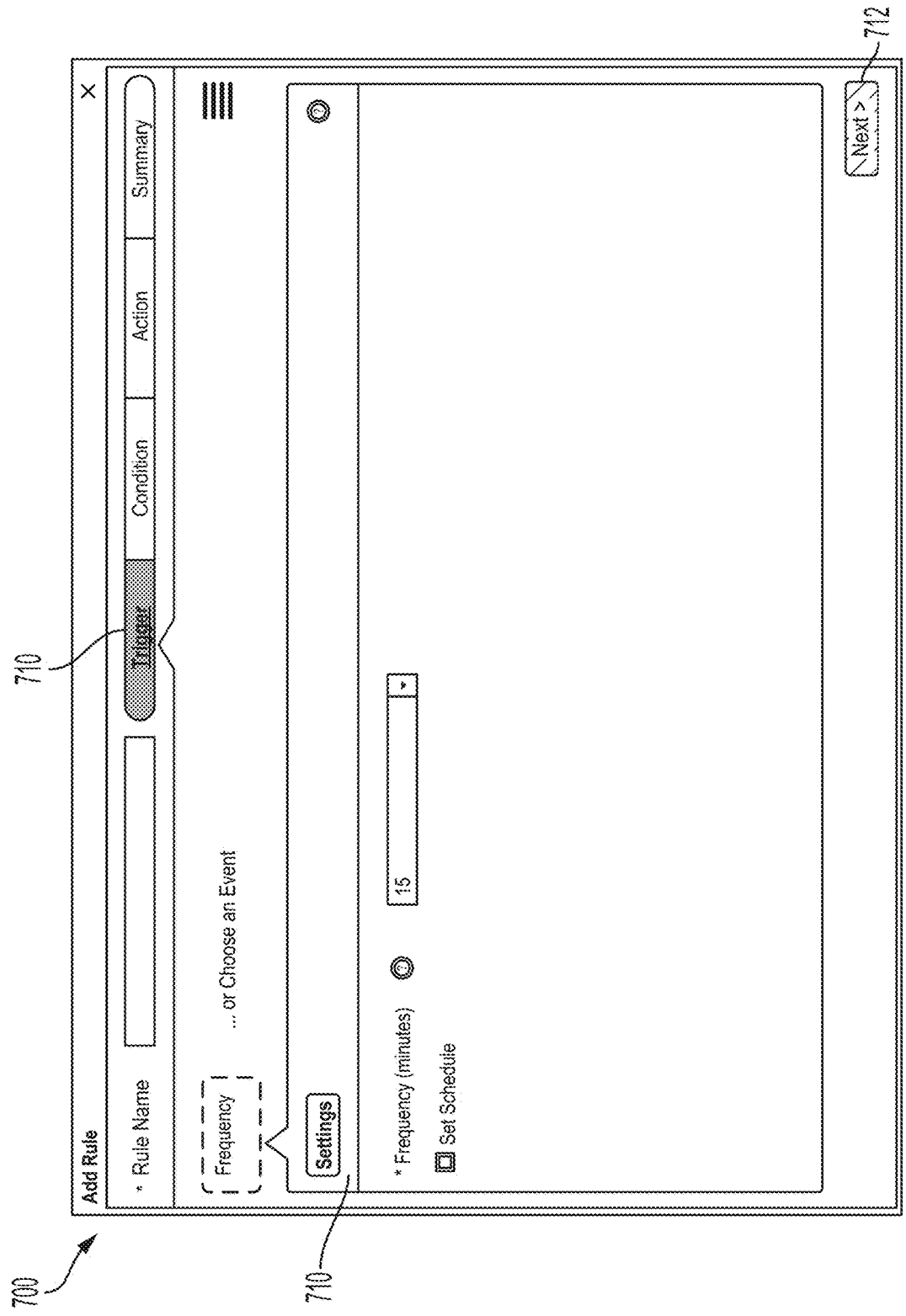
FIG. 7A is a screen shot diagram illustrating a trigger specification pane of a rule design tool, in accordance with example embodiments.
Figure 7B:
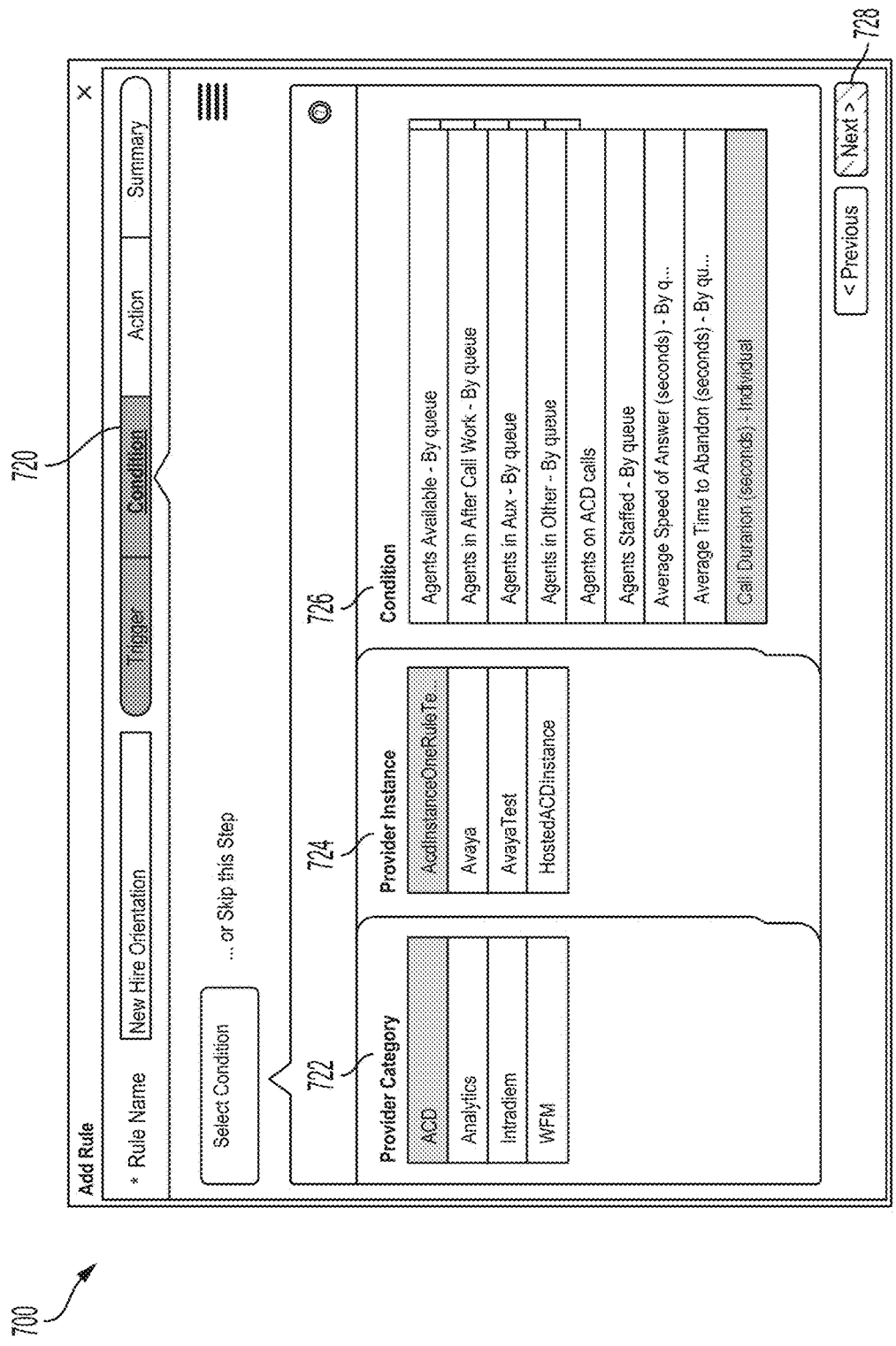
FIG. 7B is a screen shot diagram illustrating a condition specification pane of a rule design tool, in accordance with example embodiments.
Figure 7C:
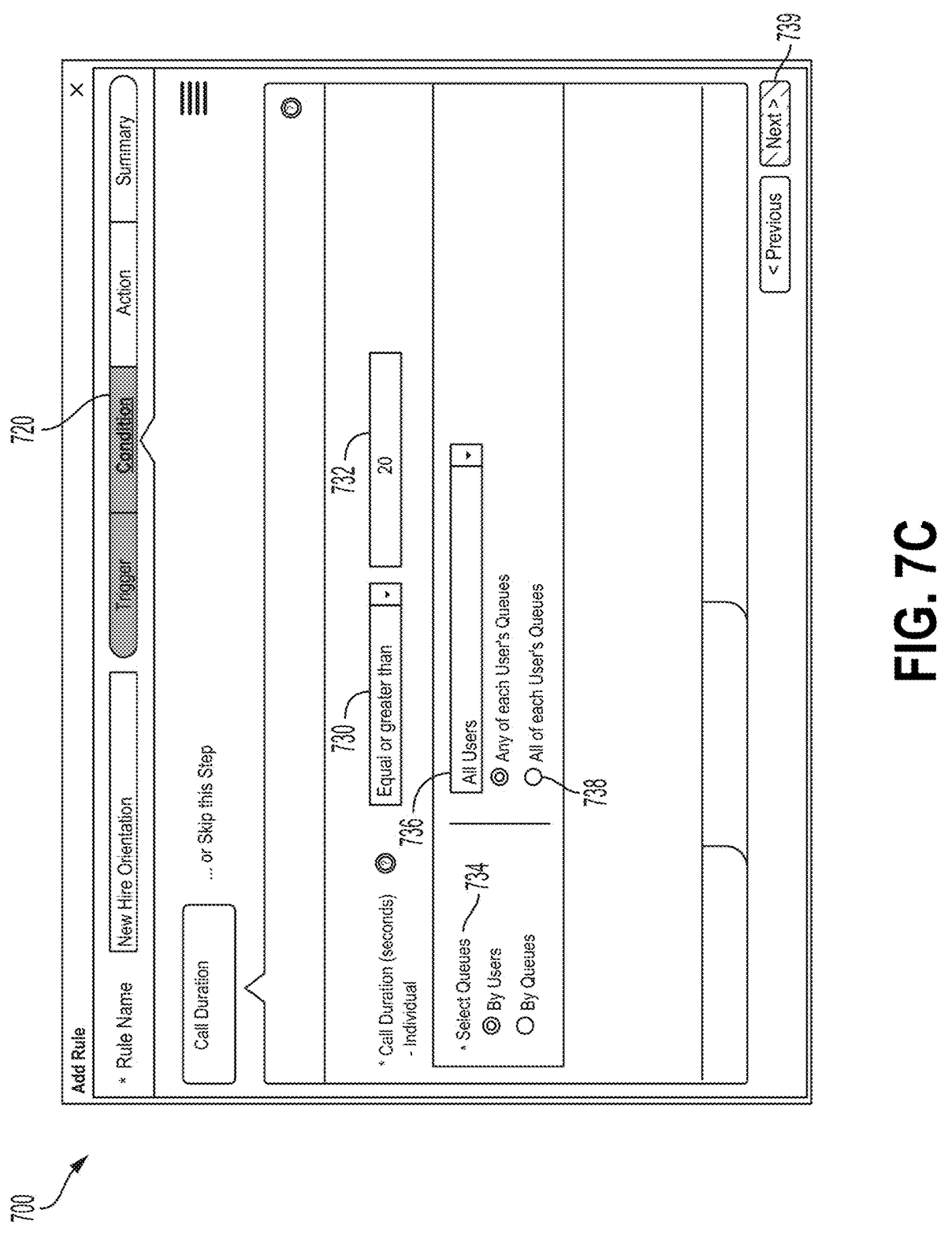
Figure 7D:
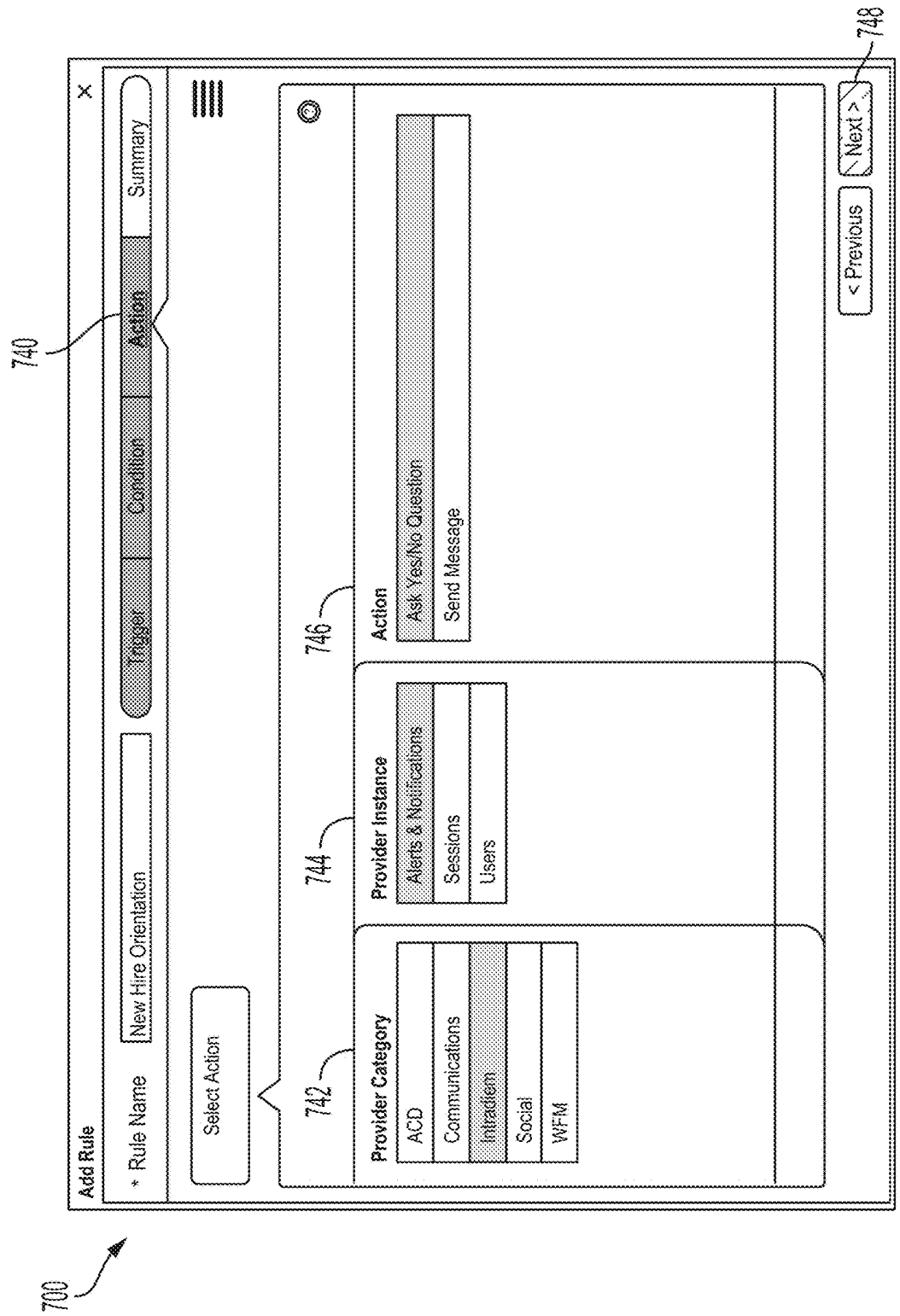
FIG. 7D is a screen shot diagram illustrating an action specification pane of a rule design tool, in accordance with example embodiments.
Figure 7E:
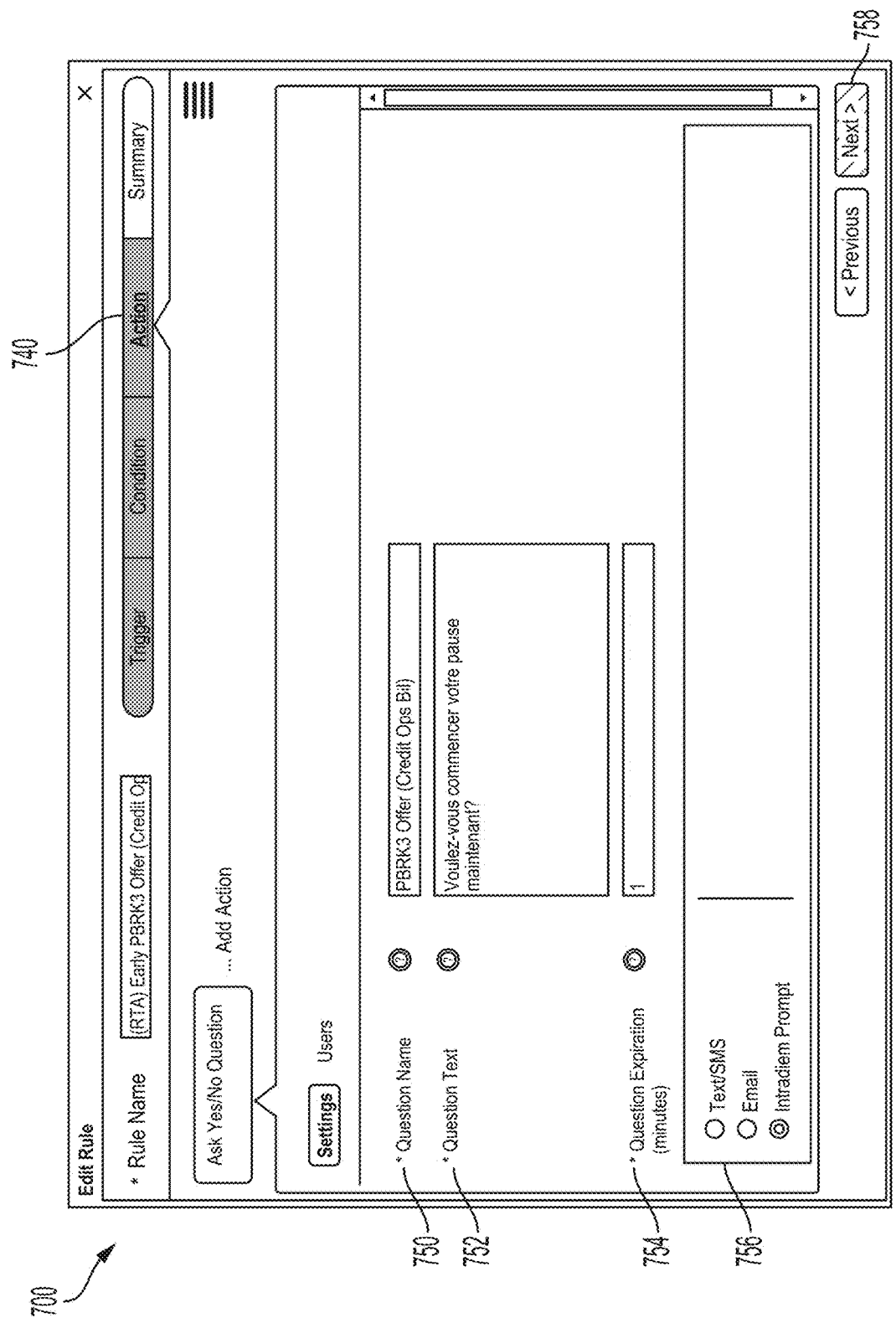
FIG. 7E is a screen shot diagram illustrating a second portion of an action specification pane of a rule design tool, in accordance with example embodiments.
Figure 7F:
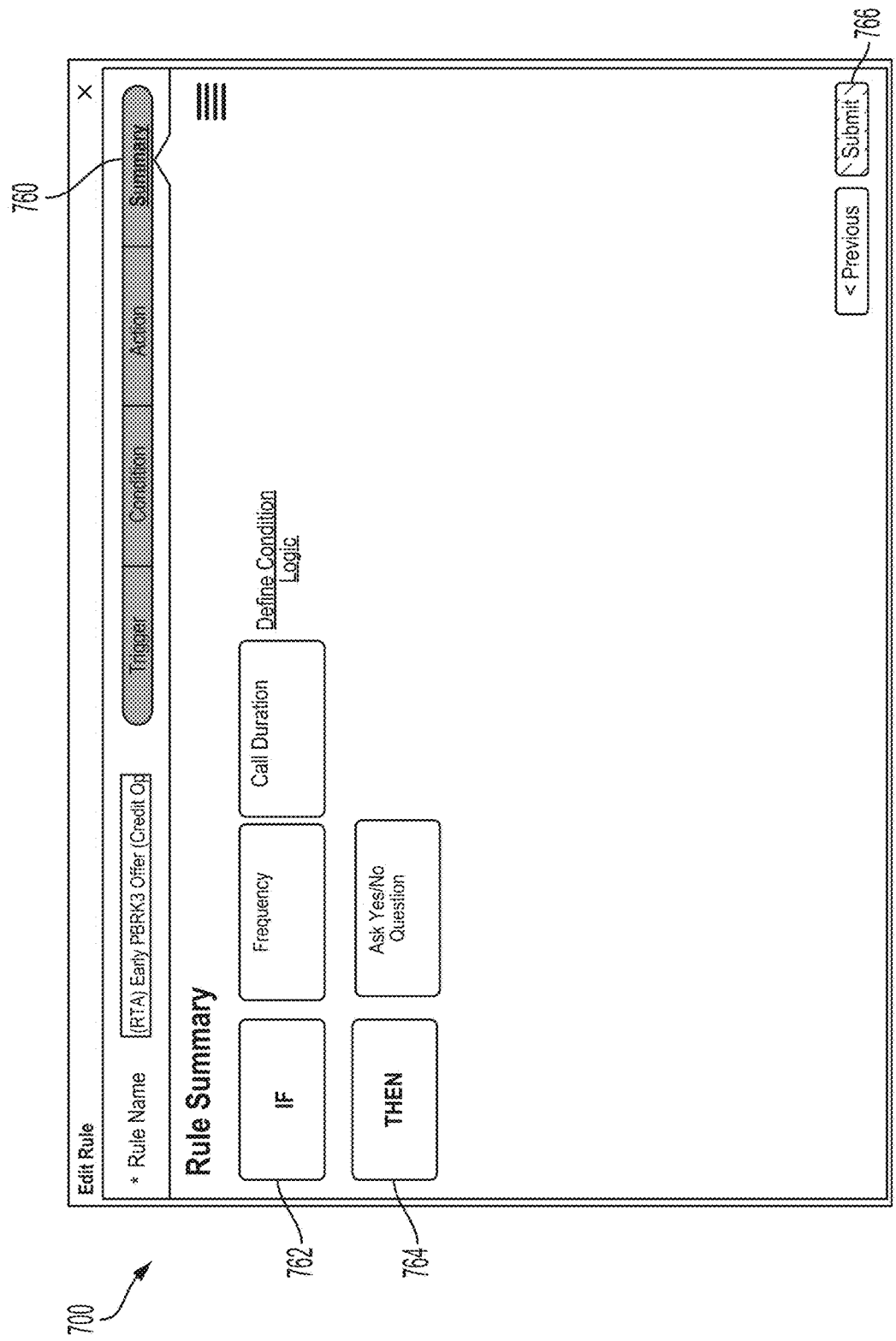
FIG. 7F is a screen shot diagram illustrating a Rule Summary, in accordance with example embodiments.
Figure 7G:
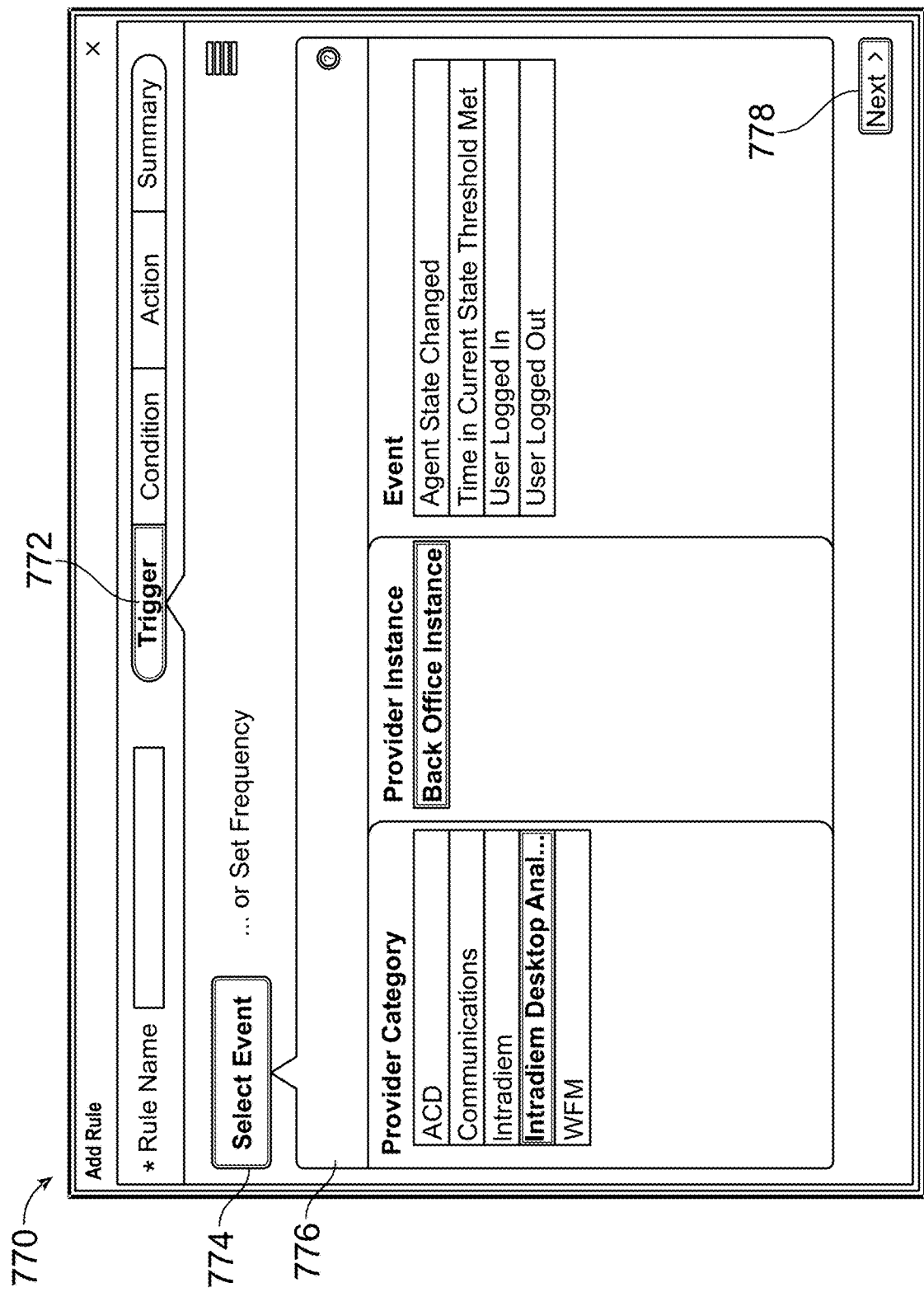
FIG. 7G is a screen shot diagram illustrating a trigger specification pane of a rule design tool, in accordance with example embodiments.
Figure 7I:
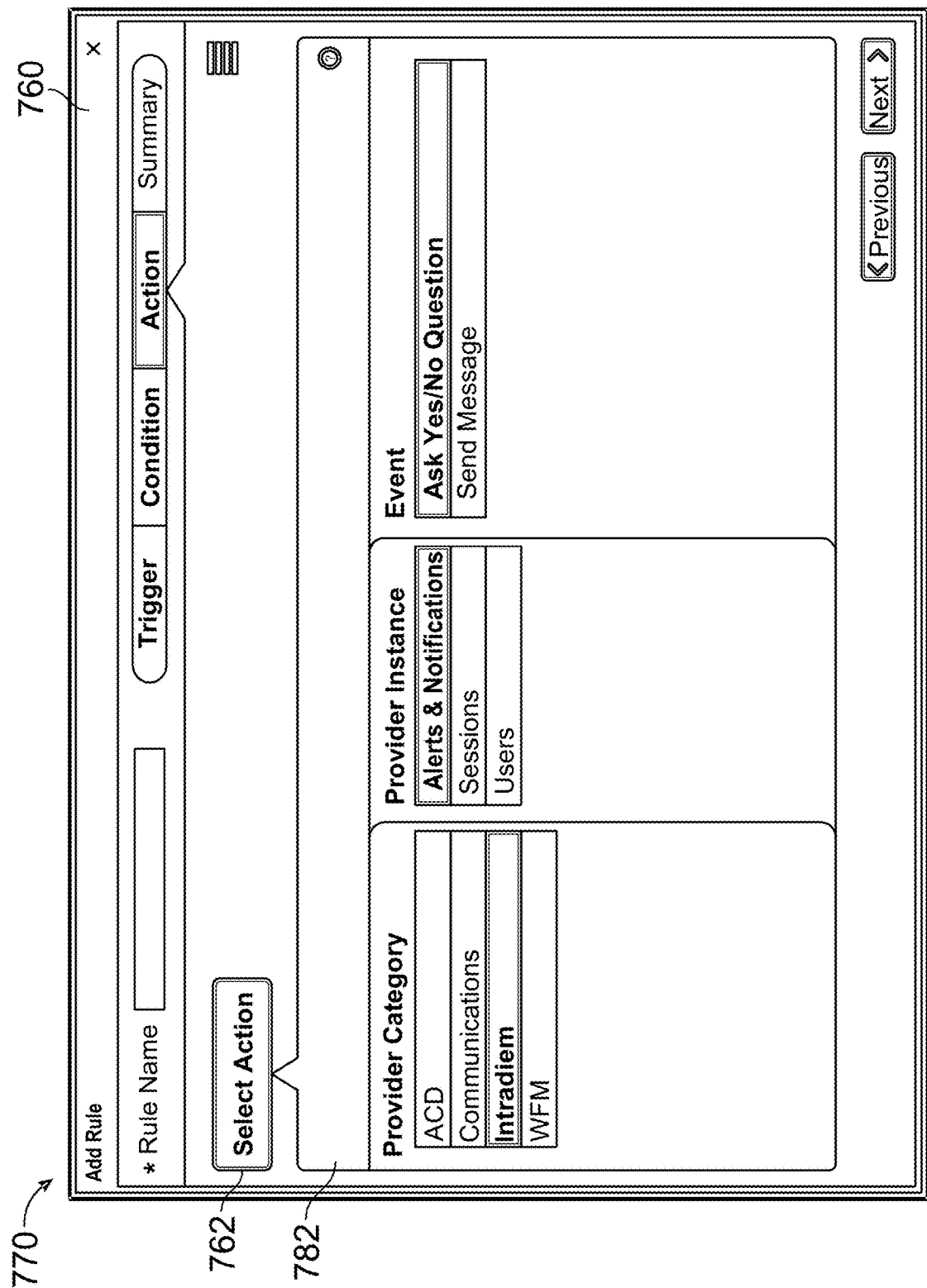
FIG. 7I is a screen shot diagram illustrating an action specification pane of a rule design tool, in accordance with example embodiments.
Figure 7J:
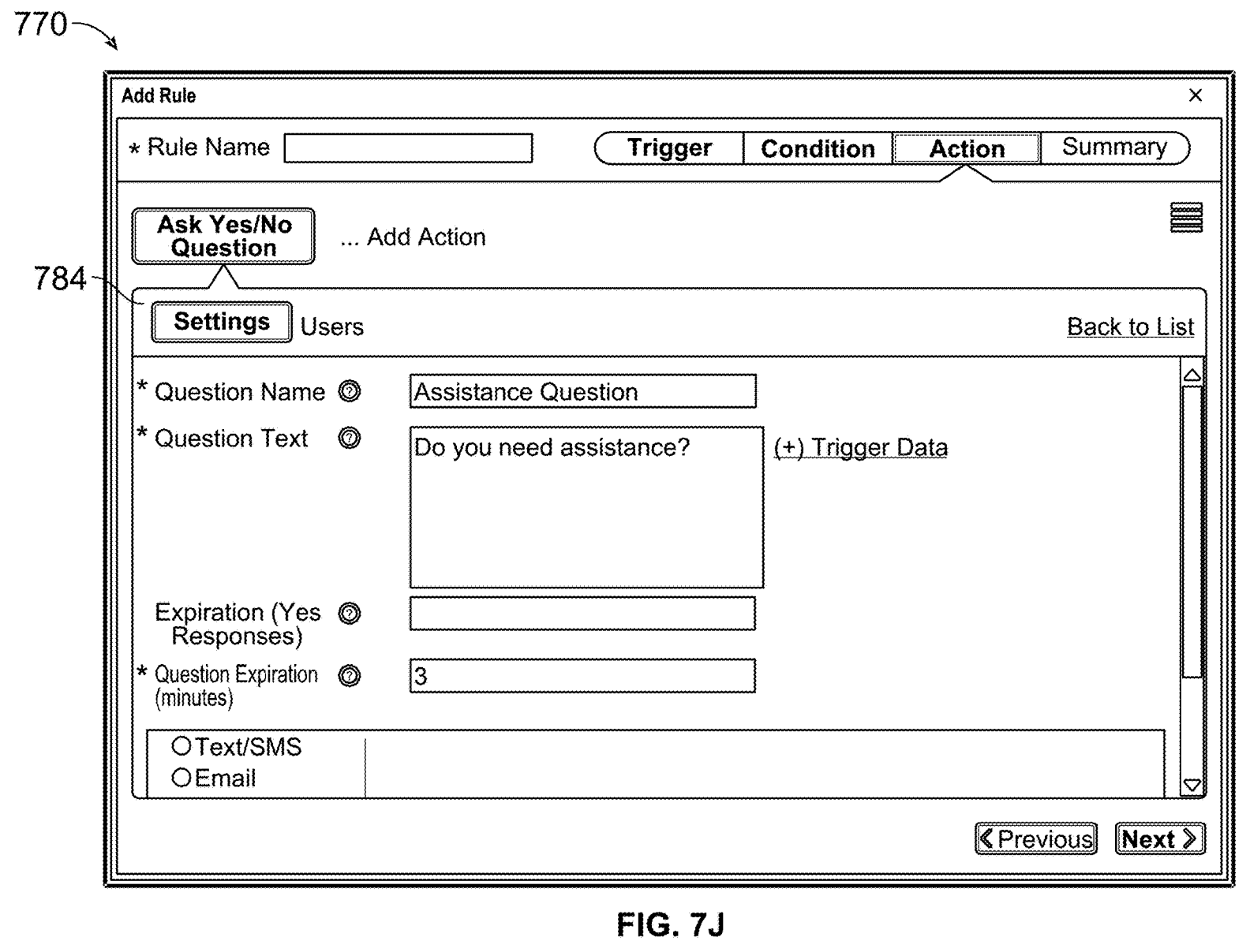
Figure 7K:
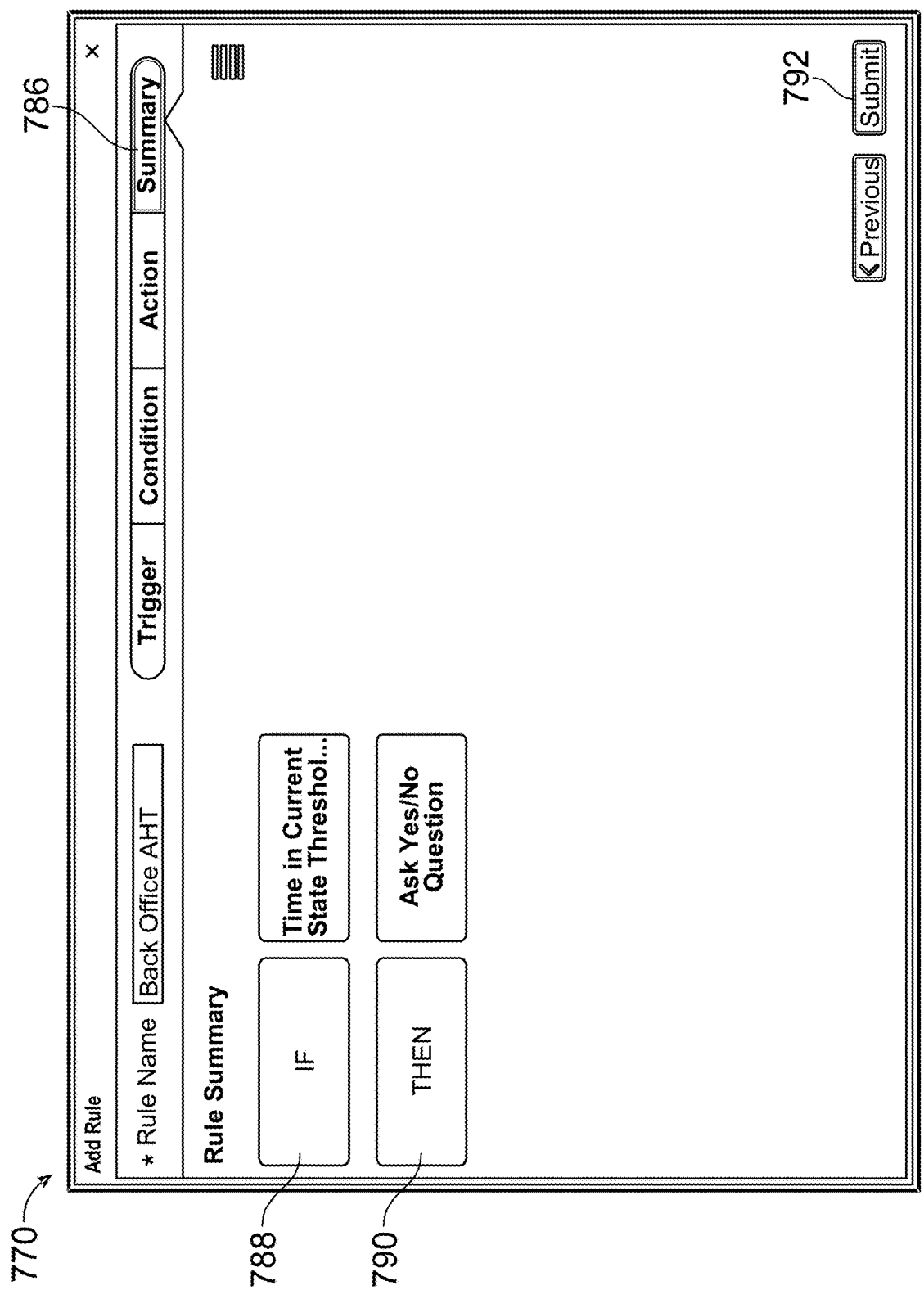
FIG. 7K is a screen shot diagram illustrating a Rule Summary of a rule design tool, in accordance with example embodiments.
Figure 7L:
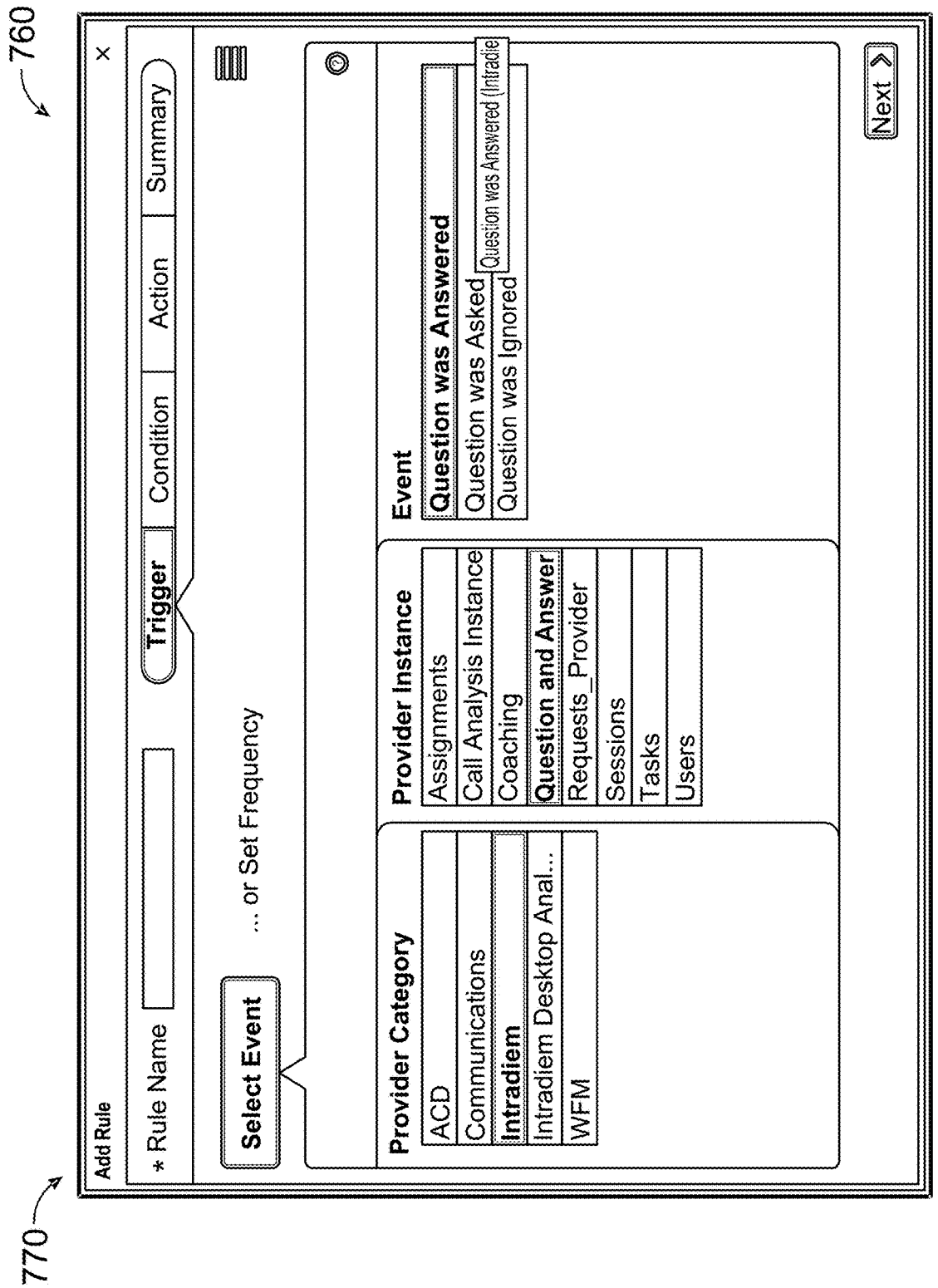
FIG. 7L is a screen shot diagram illustrating a trigger specification pane of a rule design tool, in accordance with example embodiments.
Figure 7M:
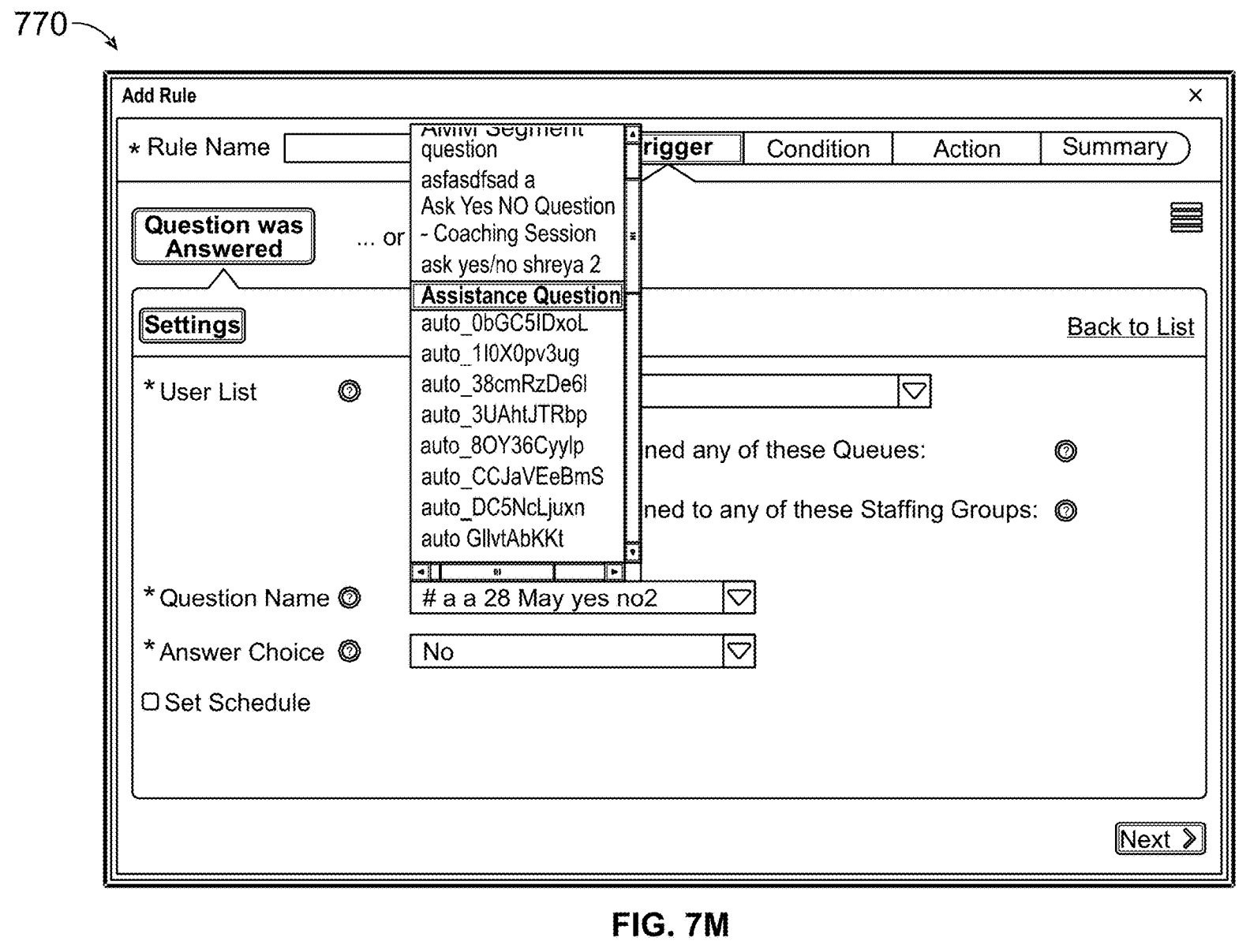
Figure 7O:
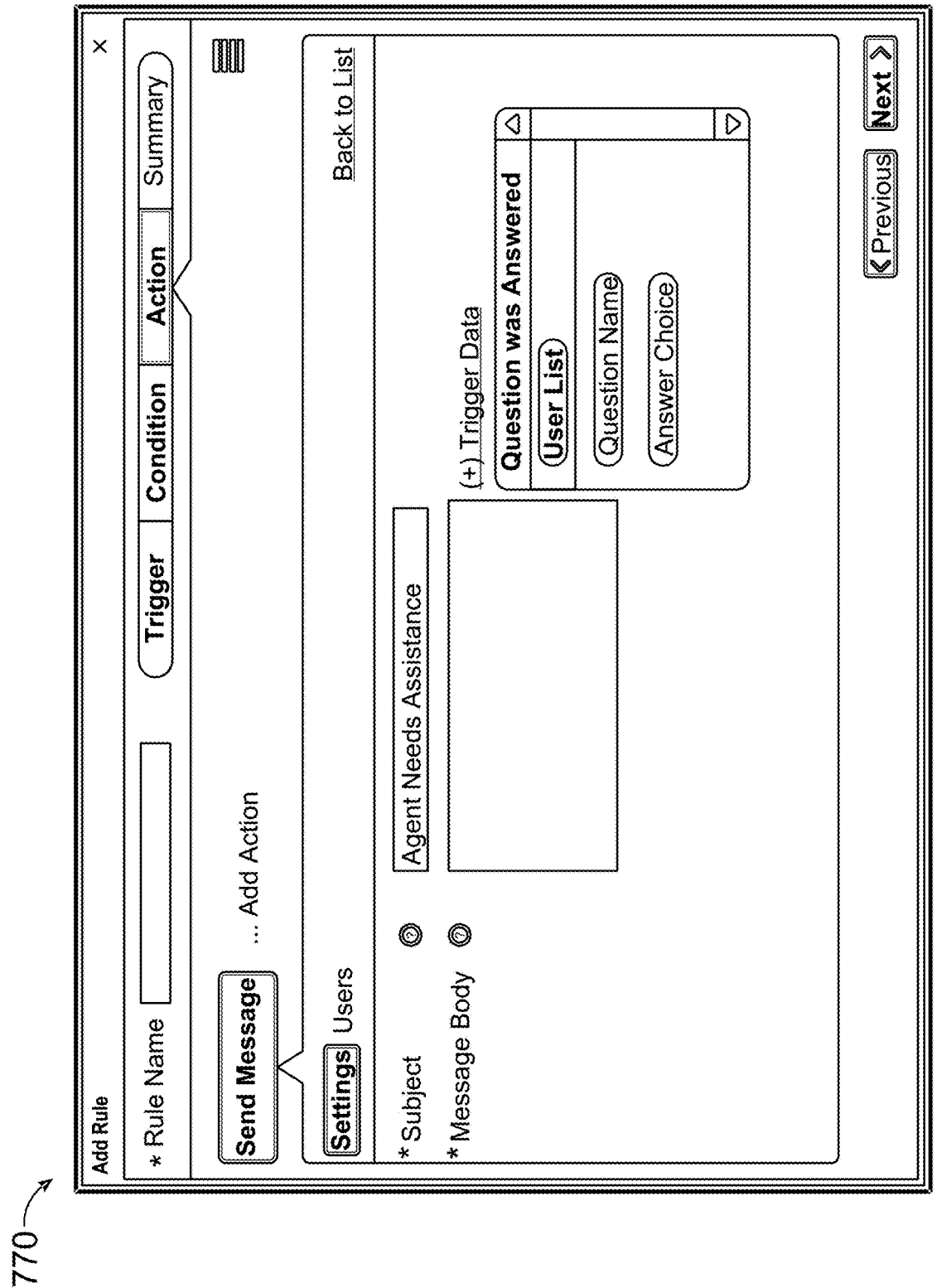
FIG. 7O is a screen shot diagram illustrating an action specification settings pane of a rule design tool, in accordance with example embodiments.
Figure 7P:
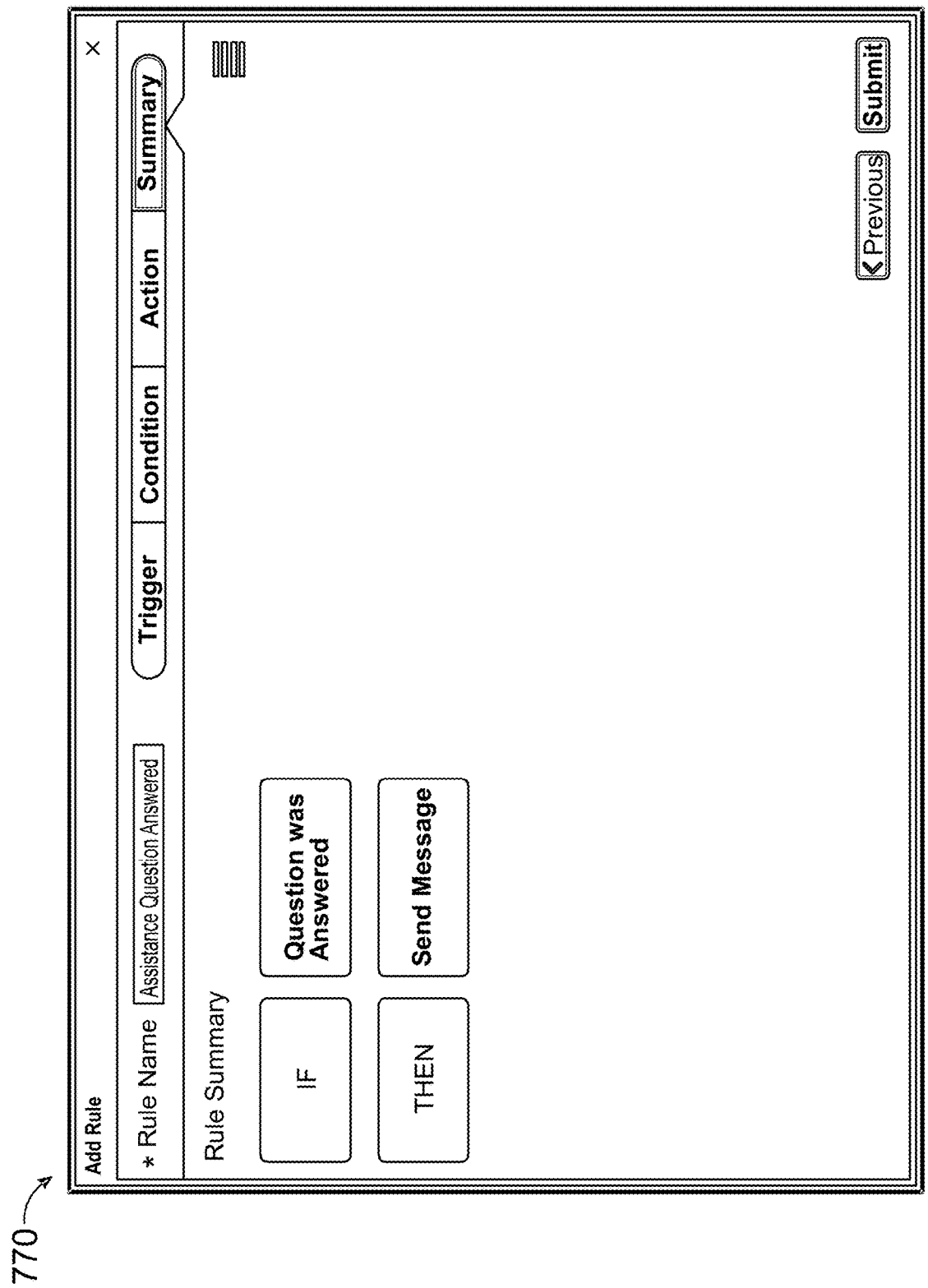
FIG. 7P is a screen shot diagram illustrating a Rule Summary of a rule design tool, in accordance with example embodiments.

FIGS. 7A-7P are associated with two scenarios, scenario 700 and scenario 770 for a front office and back office, respectively. FIGS. 7A-7F are associated with front-office scenario 700 for a rule-design tool, such as one accessible at administrator instance 344, while FIGS. 7G-7P are associated with back-office scenario 770 for the same rule-design tool. In scenario 700, a rule designer may be presented with a series of GUI panes that allow the designer to define a rule. As described herein, the term "pane" may refer to a GUI component that contains one or more locations in which to display information, and/or one or more user-selectable items such as buttons or tabs. In some embodiments, a pane may be equivalent to, or contained within, a page or a GUI window, though such a window may contain multiple panes.

In particular, scenario 700 may be associated with a situation in which end-user network 320 does not have a sufficient amount of front-office agent instances to service incoming communications. Accordingly, it may be advantageous to (i) identify high performing front-office agent instances (e.g., based on length of call durations), and (ii)

offer extra work segments to the identified agent instances in order to satisfy communication requests. As such, the goals of the rule may be to: (i) look up and identify agent instances with short call durations, and (ii) request that the identified front-office agent instances add extra work segments to their current schedule.

Notably, scenario 700 and the panes of FIGS. 7A-7F are examples used merely for purposes of illustration and not intended to be limiting. In practice, the rule design tool may be able to provide other panes including alternative arrangements of information usable for designing rules. In alternative embodiments, different types of information may be displayed, and there may be more or fewer buttons potentially with different functionality.

Scenario 700 may begin at FIG. 7A, which depicts a trigger specification pane 710 of a rule design tool, in accordance with example embodiments. In alternative embodiments, different types of information about the trigger may be displayed, and there may be more or fewer buttons potentially with different functionality. Moreover, the word "Trigger" is shown bolded, underlined, and in a dark color background to indicate that a trigger is being specified, while the words "Condition," "Action," and "Summary" are shown in a lighter color background to indicate that these specifications are not taking place.

As noted previously, at least two types of triggers may be supported by the rule design tool. Frequency-based triggers may cause a rule to be executed at one or more specified times. For example, a frequency-based trigger may be scheduled to execute every X minutes, hourly, daily, weekly, monthly, just once (at a specified time), or to repeat at a user-specified interval. Event-based triggers may cause a rule to be evaluated when an event occurs on management network 300 or end-user network 320. For example, event-based triggers may be based on events occurring on communication distributor 324 (e.g., the changing of an operative state of an agent instance), events occurring on the management network 300, (e.g., a training module transmitted to an agent instance, etc.), and perhaps other types of events. In examples, some or all of the possible event-based triggers may be provided based on the data received by rules engine 302 from proxy server(s) 328. In some embodiments, multiple triggers can be specified and can be joined together using AND/OR logical statements. As described below, triggers can have adaptive thresholds, in some examples, making the triggers dynamic in nature.

In trigger specification pane 710, the dashed line around "Frequency" indicates that the user has selected a frequency-based trigger and set the frequency to 15 minutes. Once the user is satisfied with the information entered in trigger specification pane 710, scenario 700 may continue to FIG. 7B with the user selecting or otherwise activating the "Next" button 712.

FIG. 7B depicts condition specification pane 720 of a rule design tool, in accordance with example embodiments. In particular, condition specification pane 720 may allow the user to specify a condition, which may include (i) an operational metric and (ii) a logical comparison for the operational metric that, if evaluated to true, cause the rule's action(s) to be performed. In some embodiments, multiple conditions can be specified and can be joined together using AND/OR logical statements. Conditions may be optional and, if not specified, may cause an action to be performed upon a trigger being initiated. In alternative embodiments, different types of information about the conditions may be displayed, and there may be more or fewer buttons potentially with different functionality. Moreover, the word "Condition" is shown bolded, underlined, and in a dark color background to indicate that a condition is being specified, while the words "Action" and "Summary" are shown in a lighter color background to indicate that these specifications have yet to take place. Further, the word "Trigger" is shown in dark color background to show that trigger(s) have already been specified by the user.

As shown in condition specification pane 720, the user may utilize category menu 722, provider instance menu 724, and condition menu 726 to specify an operational metric.

Provider category menu 722 displays several categories, some or all of which may be automatically populated based on entities from which proxy server(s) 328 receives data, for example. Categories may be used to classify types of operational metrics. For example, the "ACD" category may include metrics from communication distributor 324 operations. The "Intradiem" category may include metrics from management network 300 operations. The "WFM" category may include metrics from workforce management server 326 operations. And the "Analytics" category may include metrics based on analysis of network traffic on end-user network 320, desktop analytics on agent instances 322A-322D, and so on. Other categories may also exist. In FIG. 7B, provider category menu 722 indicates, with a darker background, that the user has selected the "ACD" category. This may cause provider instance menu 724 to be displayed.

Provider instance menu 724 contains a number of options, some or all of which may be populated based on the user's selection from provider category menu 722. Because communication distributor 324 may utilize several computational instances during operations (e.g., communication distributor 324 may take the form of three distinct server devices), provider instance menu 724 may be populated to reflect each computational instance of communication distributor 324. Accordingly, the selection from provider instance menu 724 may specify a particular computational instance for which the operational metric should be evaluated. In FIG. 7B, provider instance menu 724 indicates, with a darker background, that the user has selected the "AcdInstanceOneRule" instance from the "ACD" provider category. This may cause condition menu 726 to be displayed.

Condition menu 726 contains a number of options, some of which may be populated based on the user's selections from provider category menu 722 and provider instance menu 724. Particularly, condition menu 726 may be populated to reflect specific operational metrics. For example, as shown in FIG. 7B, the user is presented with various operational metrics relating to the operations of communication distributor 324. These include operational metrics related to operative state, such as "Agents in After Call work", operational metrics related to queues, such as "Agents Staffed-By Queue", and operational metrics related to communication lengths, such as "Call Duration". Notably, had the user selected "WFM" from provider category menu 722, then operational metrics related to workforce management server 326 may be displayed in condition menu 726, such as "Shift Start Time" and "Shift End Time". And had the user selected "Intradiem" from provider category menu 722, then operational metrics related to management network 300 may be displayed in condition menu 726, such as "Number of Agents Logged In" and "Percent of Agents Logged In". In FIG. 7B, provider instance menu 726 indicates, with a darker background, that the user selected the "Call Duration" metric.

Once the user is satisfied with the information entered in condition specification pane 720, scenario 700 may continue to FIG. 7C with the user selecting or otherwise activating the "Next" button 728.

FIG. 7C depicts a second portion of a condition specification pane 720 of a rule design tool, in accordance with example embodiments. The pane depicted in FIG. 7C assumes that the selection shown in FIG. 7B has been finalized. Thus, FIG. 7C depicts an additional window that may allow a user to further specify details for the operational metric specified in FIG. 7B.

FIG. 7C contains a number of drop-down menus and radial buttons, some or all of which may be populated based on the user's selections from FIG. 7B. Particularly, FIG. 7C includes operator menu 730, operator input 732, selection buttons 734, selection dropdown 736, and logic selection 738.

Operator menu 730 may include options for inequalities (and equalities) that compare operational metrics to the value of operator input 732. In examples, operator menu 730 may include options for "Equal or greater than", "Equal To", "Greater Than", "Greater than or equal to", "Less than", and "Less than or equal to". In FIG. 7C, operator menu 730 indicates that the user selected the "Equal or greater than" inequality.

Operator input 732 may be an input field that allows users to enter a value for which operational metrics will be compared against. In FIG. 7C, operator input 732 indicates that the user entered the value of "20".

Together, the selection from operator menu 730 and the input of operator input 732 form a logical comparison. This logical comparison may be evaluated against the operational metric specified in FIG. 7B. If the operational metric selected in FIG. 7B satisfies (i.e., evaluates to true) the logical comparison, then the rule's action(s) may be performed.

As an example, FIG. 7C indicates that the user selected "Call Duration" as the operational metric. Thus, call duration may be compared to the operator input 732 using the inequality specified by operator menu 730. In particular, if the call duration is equal to or greater than 20 seconds, then the condition will evaluation to true. And if the call duration is less than 20 seconds, the condition will not evaluate to true. Other possible entries for operator menu 730 and operator input 732 may exist.

Selection menu 734 and selection dropdown 736 may be used to filter operational metric calculations. Particularly, selection dropdown 736 may contain a number of options, some or all of which may be populated based on the user's selection from selection menu 734.

In FIG. 7C, selection menu 734 indicates the user has selected the "By Users" option. This selection may cause selection dropdown 736 to display a plurality of user groups (e.g., subsets of agent instances). In examples, user groups may be defined based on geographic regions of the agent instances (e.g., Southeast Regional Group), skill sets of agent instances (e.g., Mobile Devices Group), and so on. Selecting a particular user group from selection dropdown 736 may filter an operational metric to be calculated with respect to agent instances within the particular user group. In FIG. 7C, selection dropdown 736 indicates that the user has selected the "All Users" user group. Notably, had the user selected the "By Queues" option on selection menu 734, selection dropdown 736 may have displayed queue groups and the operational metric filter could have been based on queue groups. Other types of filters may also exist.

Logic selection 738 may be used to define the way in which logical comparisons should be evaluated with respect to particular criteria. Prospective criteria may be demarcated by selection menu 734 and may include queues, user groups, and so on. In the example shown, logic selection 738 contains two options: "Any Of" and "All Of".

In examples, the "Any of" option may be used to specify a logical disjunction (e.g., a logical OR). More specifically, selecting the "Any of" option may cause a rule's action(s) to be performed if any of the criteria satisfy the logical comparison. For instance, as shown in FIG. 7C, the "Any of" option indicates that, for a given user from the "All Users" user group, if any of the given user's queues satisfy the logical comparison defined in FIG. 7B, then the rule's action should be performed for that given user.

In examples, the "All of" option may be used to specify a logical conjunction (e.g., a logical AND). More specifically, selecting the "All of" option may cause a rule's action to be performed if and only if all of the criteria satisfy the logical comparison. For instance, as shown in FIG. 7C, the "All of" option indicates that, for a given user from the "All Users" user group, if all of the given user's queues satisfy the logical comparison defined in FIG. 7B, then the rule's action should be performed for that given user.

Once the user is satisfied with the information entered in FIG. 7C, scenario 700 may continue FIG. 7D with the user selecting or otherwise activating the "Next" button 739.

FIG. 7D depicts an action specification pane 740 of a rule design tool, in accordance with example embodiments. As noted previously, actions may allow the user to specify operations that management network 300 may be perform on behalf of end-user network 320. In alternative embodiments, different types of information about the actions may be displayed, and there may be more or fewer buttons potentially with different functionality. In some embodiments, multiple actions can be specified. These multiple actions can be sequenced and can be joined together using AND/OR logical statements. Moreover, the word "Action" is shown bolded, underlined, and in a dark color background to indicate that an action is being specified, while the word "Summary" is shown in a lighter color background to indicate that this specification has yet to take place. Further, the words "Trigger" and "Condition" are shown in a darker color background to show that trigger(s) and condition(s) have already been specified by the user.

Similar to condition specification pane 720, the user may specify actions by way of provider category menu 742, provider instance menu 744, and action menu 746.

Provider category menu 742 displays several categories, some or all of which may be populated based on the entities from which proxy server(s) 328 receives data, for example. Categories may be used to classify types of operations. For example, the "ACD" category may include operations that may be performed on communication distributor 324. The "Intradiem" category may include operations that may be performed on management network 300. The "WFM" category may include operations that may be performed on workforce management server 326. The "Communications" category may include operations that may be performed via email, SMS, or telephone. And the "Social" category may include operations that may be performed on a social media platform operated by end-user network 320, such as TWITTER® or FACEBOOK®. Other categories may also exist.

In FIG. 7D, provider category menu 742 indicates, with a darker background, that the user has selected the "Intradiem" category. This may cause provider instance menu 744 to be displayed.

Provider instance menu 744 contains a number of options, some or all of which may be populated based on the user's selection from provider category menu 742. In particular, the selection of an instance from provider instance menu 744 may be used to specify a computational instance upon which operations will be performed. In FIG. 7D, provider instance menu 744 indicates, with a darker color background, that the user has selected the "Alerts & Notifications" instance from the "Intradiem" provider category. This may cause action menu 746 to be displayed.

Action menu 746 contains a number of options, some of which may be populated based on the user's selections from provider category menu 742 and provider instance menu 744. Particularly, action menu 746 may be populated to reflect the types of operations that may be performed on the instance selected from provider instance menu 744. For example, as shown in FIG. 7D, the user is presented with operations that include questions, such as "Ask Yes/No Question," or messages, such as "Send Message." Notably, had the user selected "ACD" from provider category menu 742, then operations relating to communication distributor 324, such as changing operative state or modifying an agent instance's queues, may be displayed in condition menu 746. And had the user selected "WFM" from provider category menu 742, then operations relating to workforce management server 326, such as modifying work segments, may be displayed in condition menu 746. In FIG. 7D, action menu 746 indicates, with a darker color background, that the user has selected the "Ask Yes/No question" operation.

Once the user is satisfied with the information entered in FIG. 7D, scenario 700 may continue to FIG. 7E with the user selecting or otherwise activating the "Next" button 748.

FIG. 7E depicts a second portion of action specification pane 740 of a rule design tool, in accordance with example embodiments. The pane depicted in FIG. 7E assumes that the selection shown in FIG. 7D has been finalized. Thus, FIG. 7E depicts an additional window that may allow a user to further specify details for the action specified in FIG. 7D. In alternative embodiments, different types of information about the action may be displayed, and there may be more or fewer buttons potentially with different functionality.

Continuing in scenario 700, FIG. 7E contains a number of textual input regions that may allow users to specify the yes/no question that is asked. In particular, text region 750 may allow users to input the question name and text region 752 may allow users to input the question text. Text region 754 may allow users to input the duration of the question (i.e., how long the prompt of the question will be accessible to the user to answer). Radial buttons 756 may allow users to specify the delivery medium of the yes/no question.

Once the user is satisfied with the information entered in FIG. 7E, scenario 700 may continue to FIG. 7F with the user selecting or otherwise activating the "Next" button 758.

FIG. 7F depicts summary pane 760 of a rule design tool, in accordance with example embodiments. The word "Summary" is shown bolded, underlined, and in a dark color to indicate that a summary is being shown, while the words "Trigger", "Condition", and "Action" are also shown in a dark background indicate that these specifications have already taken place. In alternative embodiments, different types of information may be displayed, and there may be more or fewer buttons potentially with different functionality.

In particular, summary pane 760 depicts a summary of the triggers, conditions, and actions defined in FIGS. 7A-7E. For example, at 762, the triggers and conditions specified in FIGS. 7A, 7B, and 7C are displayed in summary form. At 764, the actions specified in FIGS. 7D and 7E are displayed in summary form. Once the user is satisfied with the summary information depicted in summary pane 760, scenario 700 may conclude with the user selecting or otherwise activating the "Submit" button 766. Upon doing so, the triggers, conditions, and actions defined in scenario 700 may be made available to management network 300 (by way of rules engine 302) to evaluate data from and perform operations on behalf of end-user network 320.

FIGS. 7G-7P are associated with back-office scenario 770 for the same rule-design tool as described above (e.g., one accessible at administrator instance 344) for scenario 700. The mechanics of the rule-design tool illustrated for scenario 770 are identical or similar to those of scenario 700, so the above discussion with reference to FIGS. 7A-7F is incorporated herein with respect to FIGS. 7G-7P.

In particular, scenario 770 may be associated with a situation in which end-user network 320 identifies whether any back-office agent states are in a particular state (e.g., an idle state) for more than a threshold amount of time (e.g., 5 minutes). If so, the agent state is sent a question asking if assistance is needed, and the agent instance is monitored for a response to the question, which may result in additional action being taken.

Notably, scenario 770 and the panes of FIGS. 7G-7P are examples used merely for purposes of illustration and not intended to be limiting. In practice, the rule design tool may be able to provide other panes including alternative arrangements of information usable for designing rules. In alternative embodiments, different types of information may be displayed, and there may be more or fewer buttons potentially with different functionality.

Scenario 770 may begin at FIG. 7G, which depicts a trigger specification pane 772 of a rule design tool, similar to the trigger specification pane 710 of FIG. 7A. While FIG. 7A illustrated a frequency-based trigger, FIG. 7G instead illustrates that an event-based trigger has been selected, as shown by selection of the "Select Event" button 774.

In trigger specification pane 776, the user has selected the "Intradiem Desktops Analytics" Provider Category and "Back Office Instance" Provider Instance. The next step is for the user to select one of four events available under the selected Provider Category and Provider Instance: (1) Agent State Changed, (2) Time in Current State Threshold Met, (3) User Logged In, or (4) User Logged Out. Assume for purposes of the example scenario 770 that the user has selected "Time in Current State Threshold Met" as the event, which may cause the trigger event settings pane 780 shown in FIG. 7H, to be displayed, in accordance with example embodiments. As illustrated, the user has selected "All Users" in the "User List" dropdown menu. The user may choose additional settings, such as an agent state logical comparison setting, before moving to the next step.

FIG. 7I illustrates a "Select Action" pane 782, in which the user has selected an action having a Provider Category of "Intradiem" and a Provider Instance of "Alerts & Notifications." In the illustrated example, the user has selected "Ask Yes/No Question" from a list of two possible actions for the selected Provider Category and Provider Instance. As an alternative, the user could have selected "Send Message" as an action. Since the user selected "Ask Yes/No Question" as an action, the user is then presented with the Action Settings pane 784 illustrated in FIG. 7J, which allows the user to specify a Question Name (e.g., "Assistance Question"), Question Text (e.g., "Do you need assistance?"), Question Expiration (e.g., 3 minutes), and other settings.

FIG. 7K depicts summary pane 786 depicting of the rule defined in FIGS. 7G-7J. For example, at 788, the triggers specified in FIGS. 7G and 7H are displayed in summary form. At 790, the actions specified in FIGS. 7I and 7I are displayed in summary form. Once the user is satisfied with the summary information depicted in summary pane 786, scenario 700 may conclude with the user selecting or otherwise activating the "Submit" button 792. Upon doing so, the triggers and actions defined in scenario 770 may be made available to management network 300 (by way of rules engine 302) to evaluate data from and perform operations on behalf of end-user network 320.

FIGS. 7L-7O illustrate follow-on rule that may be defined to handle responses to the "Ask Yes/No Question" rule defined in FIGS. 7G-7K. Without repeating the description of the various panes of the rule design tool, FIG. 7L illustrates, via user-selected boxes, an event-based trigger being defined with a Provider Category of "Intradiem," a Provider Instance of "Question and Answer," and an event of "Question was Answered." FIGS. 7M and 7N illustrate a selected setting of "Assistance Question" as a Question Name to be used for the trigger, as shown by the selection of "Assistance Question" in the pullout menu, with an Answer Choice of "Yes" for All Users. FIG. 7O illustrates a "Send Action" settings pane, in which the user can specify parameters (e.g., a message subject and message body) for a message to be sent. Finally, FIG. 7P illustrates a summary of the follow-on rule defined in FIGS. 7L-7O, summarizing that, if Question was Answered (i.e., from the Rule defined in FIGS. 7G-7J, above), then Send Message.

By using the rule design tool described, arbitrarily complex rules can be rapidly designed. The designer need not write any code and is guided through the rule design by a series of GUIs that help the designer with appropriate menus and other interface elements. As a result, the rule design tool saves a significant amount of time. Of course, code-based rule-design tools could alternatively be used, in some embodiments.

Figure 8A:
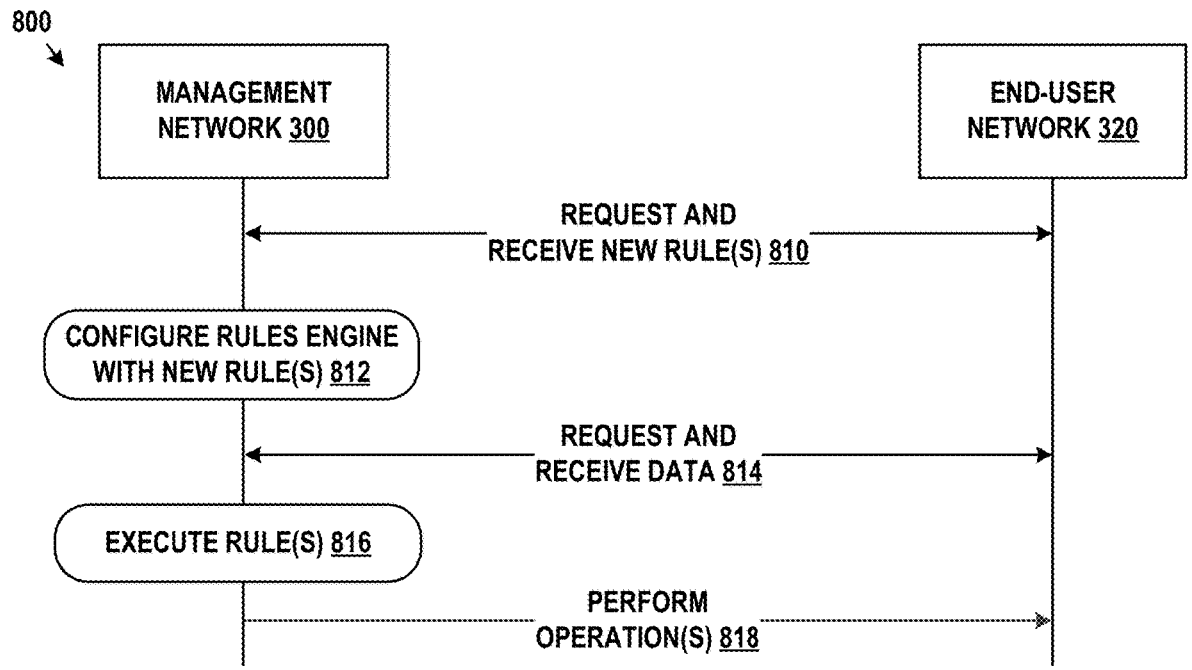
FIG. 8A is a message flow diagram illustrating a procedure, in accordance with example embodiments.

FIG. 8A depicts a message flow diagram for procedure 800, in accordance with example embodiments. In particular, procedure 800 may represent a specific sequence or series of actions that, when performed, allows management network 300 to perform operations on behalf of end-user network 320. By way of example, procedure 800 may utilize management network 300 and end-user network 320 during operation. However, additional components, steps, or blocks, may be added to procedure 800. In some examples, the rules engine 302 acts on behalf of the management network 300 and the administrator instance 344 (or another entity) is involved with some of the actions attributed to the end-user network 320. As discussed above, the management network 300 and end-user network 320 can be administered by a single enterprise (or enterprise group), and can even be co-located, in some examples.

At step 810, management network 300 may request and receive new rule(s) from end-user network 320. To facilitate step 810, management network 300 may prompt a user from end-user network 320 to enter the appropriate data into a rule design tool, such as one accessible at administrator instance 344. This may be accomplished by way of a web page or series of web pages hosted by management network 300 and provided to the user upon request, for example. Entering data for a rule may include, for example, populating entries in trigger specification pane 710, condition specification pane 720, and action specification pane 740. At step 812, management network 300 may receive the populated entries and can configure rules engine 302 to implement the new rules. In some examples, steps 810 and 812 (or variations thereof) may be utilized in response to recommendations issued by recommendation engine 314, such as in the modification of an existing rule or during an approval process for a new recommended rule.

At step 814, management network 300 may request and receive data from end-user network 320. This step may include, for example, rules engine 302 requesting and receiving data from proxy server(s) 328, as discussed above with respect to FIG. 6B. The data received by management network 300 may include operational data related to communication distributor 324, workforce management server 326, back-office case system(s) 350, agent monitoring application 610, and/or other entities on end-user network 320, including entities associated (e.g., administered by) with end-user network 320, but physically located on a different network, such as in a third-party vendor's cloud-based server site.

At step 816, the data received from end-user network 320 may be evaluated by one or more processors against the rules defined by step 812. This may include, for example, (i) identifying whether a trigger has been fired, (ii) identifying whether conditions evaluate to true, or (iii) identifying operations that should be performed on behalf of end-user network 320. At step 818, management network 300 (via one or more processors) may perform operations, or cause operations to be performed, on behalf of end-user network 320. This may include, for example, changing the operative state of an agent instance, modifying the work segments of an agent instance, and/or other operations. In some cases, the operations may be performed by issuing commands (e.g., application programming interface (API) requests) to entities on end-user network 320. In some cases, the operations may be performed by issuing commands to entities on management network 300 or elsewhere.

Figure 8B:
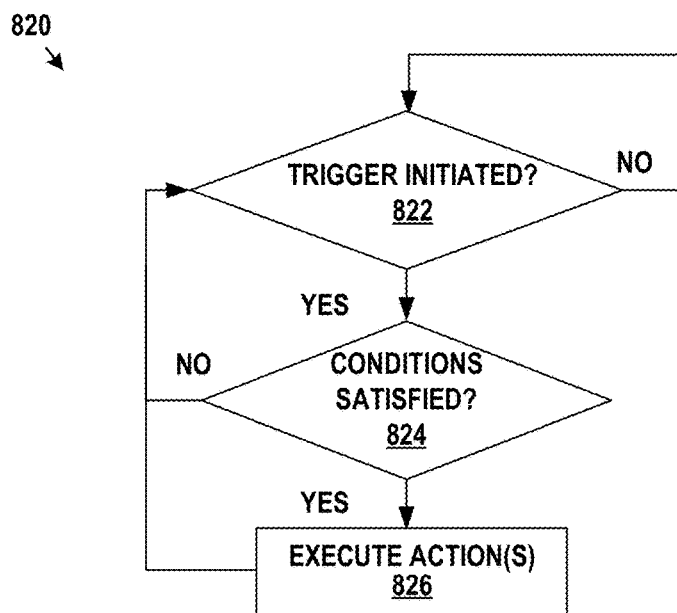
FIG. 8B is a flow diagram for a procedure, in accordance with example embodiments.

FIG. 8B depicts a flow diagram for procedure 820, in accordance with example embodiments. In particular, procedure 820 may represent a specific sequence or series of actions that, when performed, allows management network 300 or any other processor(s) to evaluate whether an operation should be performed on behalf of end-user network 320. By way of example, procedure 820 may occur on rules engine 302; however, in alternative examples, procedure 820 may be performed on other computational entities on management network 300 or elsewhere. Moreover, additional components, steps, or blocks, may be added to procedure 820 without departing from the scope of the method.

Procedure 820 may begin at block 822, when rules engine 302 determines whether a trigger is initiated. As described with respect to trigger specification pane 710, triggers may be either event-based triggers (i.e., based on events occurring on management network 300 and/or end-user network 320) or frequency-based triggers (i.e., based on a period of time). It follows that block 822 may be considered a "default state" of rules engine 302, since each block in procedure 820 may return to block 822. If a trigger is initiated, procedure 820 can continue to block 824. Otherwise, procedure 820 will remain at block 822

At block 824, rules engine 302 may determine whether the conditions for a given rule are satisfied. As described with respect to condition specification pane 720, conditions may be satisfied if the operational metrics specified by the user satisfy (i.e., evaluate to true) the logical comparisons specified by the user. If all the conditions are satisfied, procedure 820 can continue to block 826. Otherwise, procedure 820 will return back to block 822.

At block 826, rules engine 302 may execute actions for a given rule. As described with respect to action specification pane 740, actions may include operations performed on management network 300, end-user network 320, and/or other computational entities associated with management network 300 or end-user network 320 (e.g., third-party networks, such as cloud-based services, used by end-user network 320). After the actions are executed, procedure 820 may return to block 822 to wait for another trigger to be initiated.

Notably, the procedure of 820 may be referred to as a "real-time" solution, because the procedure may continuously monitor and respond to existing events occurring on, e.g., management network 300 and/or end-user network 320. Advantageously, rather than using reactive techniques, such as data mining, to identify the exact operations that should occur on end-user network 320, the procedure of 820 provides a preemptive approach that allows anticipatory operations to occur on end-user network 320.

VIII. EXAMPLE DATA FEEDS, STORAGE, AND RECOMMENDATION ENGINE

Figure 6C:
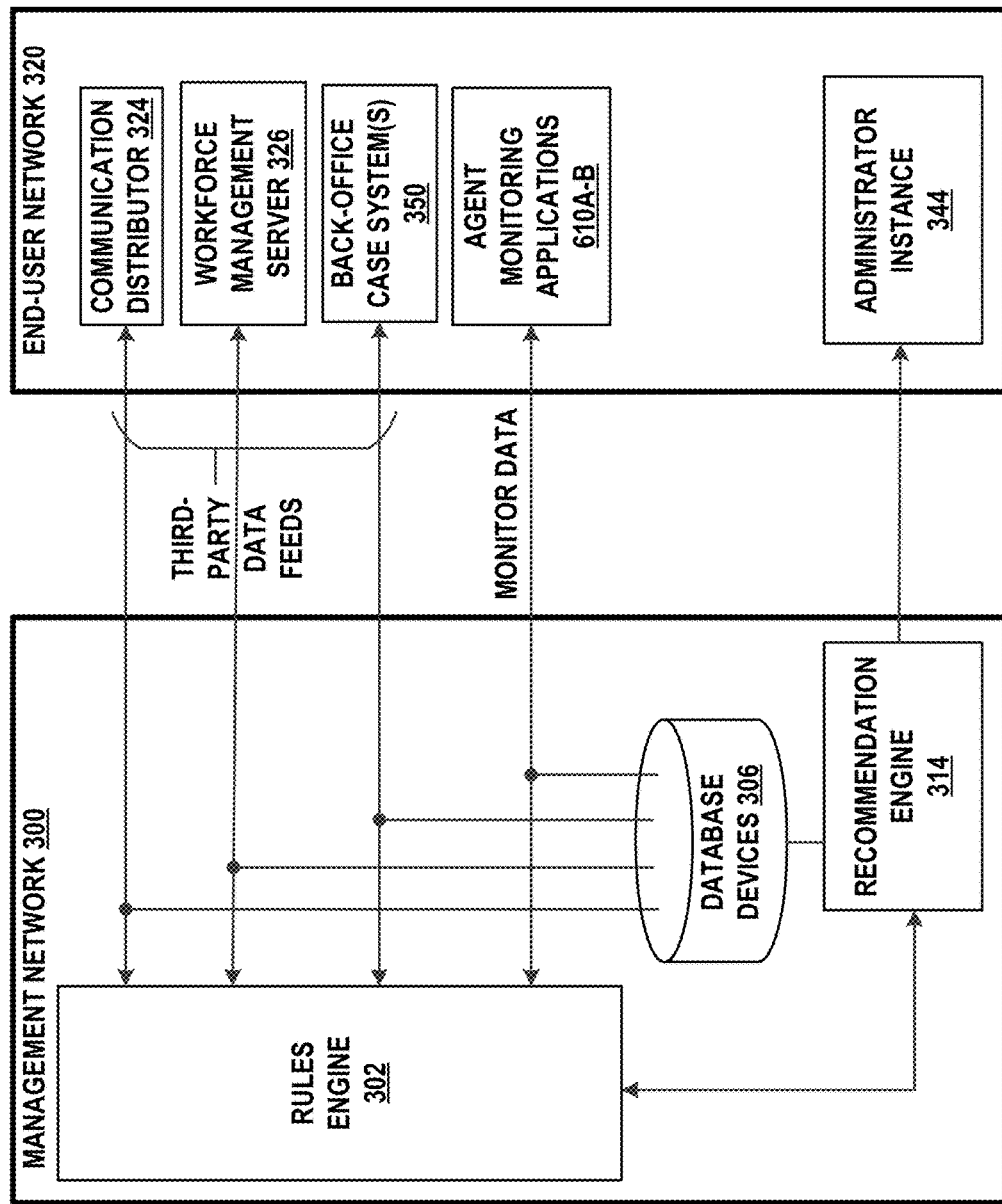
FIG. 6C is a block diagram illustrating data feeds and communications between an end-user network and a management network, in accordance with example embodiments.

FIG. 6C is a block diagram illustrating data feeds and communications between an end-user network 320 and a management network 300, in accordance with example embodiments. Many components from the end-user network 320 and management network 300 are omitted from FIG. 6C for ease of illustration. The data feeds received by the management network 300 include (a) third-party data feeds providing data from third-party servers associated with the end-user network 320 and (b) monitor data providing data from agent monitoring applications. The third-party data feeds may include data from communication distributor 324, workforce management server 326, and/or back-office case system(s) 350, any or all of which may originate locally from the end-user network, such as via one or more proxy servers, consolidation servers, cloud servers, or other configurations associate with the end-user network 320. While the example of FIG. 6C focuses on third-party servers, such servers could alternatively be implemented at the end-user network 320 or management network 300. The monitor data may include data from agent monitoring applications such as agent monitoring applications 610A and 610B, for example. Such agent monitoring applications will typically, but need not be, provided by the management network 300 for installation at agent instances on the end-user network 320. The third-party data feeds and monitor data feeds are transmitted from the end-user network 320 (possibly via one or more intermediate entities, servers, or connections) to the management network 300.

As examples of the above, from communication distributor 324, management network 300 may receive data associated with operative states, channels, and queues associated with front-office agent instances. Such data may include queue statistics (e.g., average wait times for queues), events (e.g., an agent instance transitioning from an "in communication" agent state to a "post-communication work" agent state), and perhaps other metrics, for example. From back-office case system(s) 350, management network 300 may receive data associated with operative states, channels, and queues associated with back-office agent instances. From workforce management server 326, management network 300 may receive data associated with work segments. For example, such data may include staffing groups (e.g., groups of agent instances assigned to work similar work segments), work segment start times/end times, and perhaps other metrics. From agent monitoring applications 610A and 610B, management network 300 may receive data pertaining to a monitored agent instance's device state and/or activity, such as whether the monitored agent instance is active, using an approved application/site, using an unapproved application/site, idle, locked, or logged-out. The management network 300 may receive and store other types of data beyond the examples provided above, such as data from chat systems, for example.

At the management network 300, the data feeds are received, individually or consolidated in a single feed, cached, and passed on to the rules engine 302 for processing/analysis, according to example embodiments. Data from each of the data feeds, including the third-party data feeds and the monitor data, is also saved in database devices 306 (which may also serve as the cache, in some examples). Data saved in the database devices 306 can be accessed as historical data by the recommendation engine 314, the rules engine 302, or other entities on management network 300. In particular, recommendation engine 314 can access the third-party historical data and the monitor data (or enriched versions of such data) in conjunction with rules-execution data to analyze and optimize existing rules (e.g., by modifying rule thresholds) pertaining to end-user network 320, for example. Rules-execution data may be exposed on a customer-by-customer basis (i.e., for each end-user network), aggregated across an industry, or on another basis. Examples of rules-execution data include what rules fired, when the rules fired, who the rules fired against, etc.

Figure 6D:
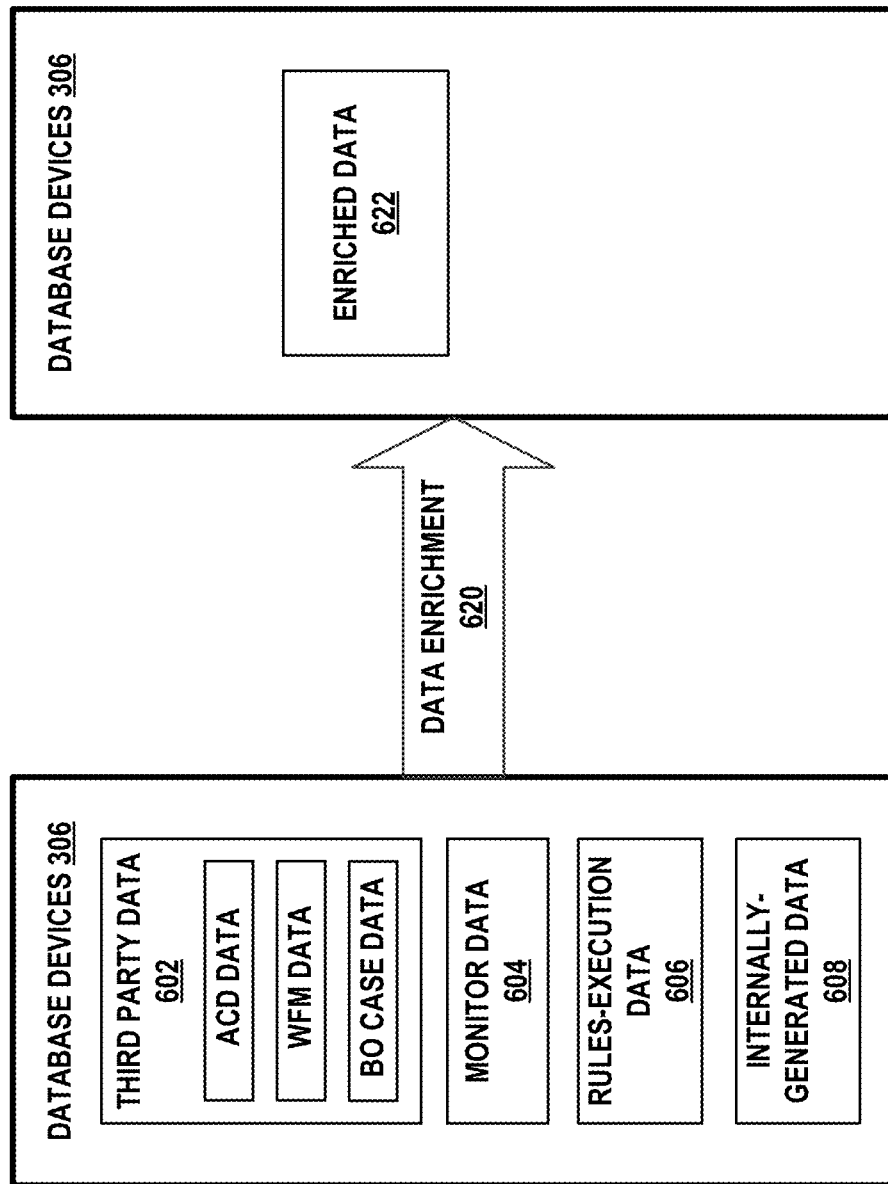
FIG. 6D is a block diagram illustrating example types of data stored in database devices, such as for use for analysis by recommendation engine using AI algorithms, in accordance with example embodiments.

FIG. 6D is a block diagram illustrating example types of data stored in database device 306, such as for use in analysis by recommendation engine 314 using AI algorithms, for example. On the left side of the illustration, database devices 306 are shown as storing at least three main types of data—third party data 602 (e.g., communication distributor data, workforce management server data, and/or back-office case system data), monitor data 604 (e.g., from agent monitoring applications), and rules-execution data 606. Rules execution data 606, according to one example, is an archive of data relating to (a) what rules are active (or have been active) for one or more end-user networks, (b) how often such rules are triggered, (c) what users the rules took action on, and/or (d) the underlying triggers, conditions, and/or actions/operations for those rules. Rules execution data 606 could include additional or alternative data relating to rules pertaining to end-user network 320 and other end-user networks, for example.

In addition to storing data from incoming data feeds, management network 300 may also generate its own internal data on behalf of end-user network 320 and other end-user networks associated with third-party enterprises, in the same, similar, and/or different industries. Such internally generated data could include data relating to how many training sessions are offered and/or provided to agents or agent instances over a prescribed time period, which agents or agent instances are accepting training sessions when offered, and metrics (e.g., time-based, agent-group comparisons, industry-wide statistics) relating to training sessions. Other types of internally generated and/or utilized data may also be stored by management network 300, such as in database devices 306.

In some example embodiments, at least a portion of the aforementioned data stored in database devices 306 is acted on by a computing device in a data enrichment process 620, to create enriched data 622 stored in database devices 306. Much of the data stored in database devices 306 may be high-volume time-series data. Stored received data may be modified to create "enriched data" that is also stored, and which may even replace the originally stored received data. Enriched data 622 may include data that is compressed over the time domain. As an example, instead of storing data for every agent instance's state for all time (or even a subset of time), the stored agent instance state data may be accumulated over predefined time periods, such as every 10 minutes, every half hour, every hour, every four hours, daily, weekly, etc. While the granularity of every agent instance's state data for all time (or at least the previous 3 or 4 states) might be useful for some analysis performed by rules engine 302 or recommendation engine 314, in most cases, extreme granularity is not required. Enriched (e.g., compressed) data can provide cost savings in data storage space, as well as potentially faster computations (due to less data over longer time periods) during analyses of the enriched data by AI algorithms utilized by the recommendation engine 314. Data can be enriched (e.g., compressed or otherwise modified) after the original received data is stored in database 306 or some other data storage, such as temporary cache. Alternatively, data can be enriched "on the fly," as it comes in, by buffering and summing (or otherwise combining) high-volume data over predefined time periods. Enriched data also may be referred to herein as "information."

As an example of data enrichment, consider an enterprise with a contact center. The originally received data, which might be received by the management network 300 from communication distributor 324, could include data pertaining to every single call that is placed on hold. Storing such data might require storing a large quantity of data, including data that is not overly relevant for AI algorithms pertaining to metrics identified as being applicable/valuable. According to one example, data enrichment may include simply storing the number of times calls are placed on hold over predetermined time increments. All other data could be discarded or stored in less expensive or less accessible data storage, for example.

As another example, if a particular important metric for a contact center tracks average hold time over a shift, then data enrichment might comprise compiling and storing the average hold time for that particular shift, rather than storing the hold times for every single call during the shift.

In essence, then, enriched data in the time domain can be thought of as time-boxing the data based on the needs of the rules. The needs of the rules may be configured by users of the end-user network 320 via a web portal accessible at administrator instance 344 and hosted by the management network 300, for example. Priorities, goals, requirements of the user, and relevant time periods for which granular data is needed (e.g., every agent state change) may be ascertained via web-served questionnaires, menu selections, slide-bars, or other GUI-based mechanisms, for example. Examples of goals that may be input at administrator instance 344 include the following: service level thresholds across queues (e.g., answer 75%-80% of all calls within 20 seconds), specific wait times, occupancy thresholds (agent instances are occupied a prescribed percent of time, helping productivity), staffing tolerances, and goals (internal constraints) specific to the management network 300 (e.g., agent instances have fewer than three outstanding assignments, agent instances receive a prescribed number of training sessions each month, etc.).

The recommendation engine 314 accesses data stored in the database devices 306 and uses AI algorithms to analyze rules and performance of a particular end-user network, such end-user network 320 relating to those rules. Such analysis could include, for example, determining whether and how often each rule is triggered, whether and how often each rule satisfies one or more conditions stated in each rule, whether actions are successfully executed upon conditions being satisfied for each rule, what resulted from such actions being executed (e.g., changes to metrics and/or statistics, such as handle time, hold time, service level adherence, etc.), whether to modify a rule threshold, and others. The analyzed data could include stored received raw data, enriched data, or a combination of raw data and enriched data.

The recommendation engine 314 could also analyze what actions could have been taken in response to rules being triggered and conditions being satisfied, as well as likely corresponding results of such hypothetical actions. Likely corresponding results could be determined or estimated based on linear or non-linear estimation using historical data, by interpolating from rules-execution data from other end-user networks in the same industry as end-user network 320, or other techniques, for example. By utilizing data across enterprises for an entire industry (e.g., the financial industry), AI algorithms used by recommendation engine 314 will likely be able to obtain more reliable estimates and predictions of likely results for hypothetical rules. An example output that recommendation engine 314 could provide to administrator instance 344 of end-user network 344 is a recommendation accompanied by a comparative statement such as the following: "Your financial institution has a rule set characterized by R1 (triggers, conditions, actions) and accomplished M1 (metrics) in the most recent quarter. Other financial institutions have a rule set characterized by R2 (triggers, conditions, actions) and accomplished M2 (averaged metrics) in the most recent quarter. Such information could be provided via a web dashboard hosted by management network 300 and accessible via administrator instance 344 on end-user network 320.

To analyze rules and related performance of a particular end-user network, recommendation engine 314 applies AI algorithms to identify trends and/or opportunities for optimization. Such AI algorithms may include, but are not limited to, machine learning (ML) algorithms, predictive algorithms, and quantitative analysis, among others. By applying AI algorithms to data stored in database devices 306, recommendation engine 314 essentially solves optimization problems relating to rules associated with end-user network 320. The AI algorithms employed by recommendation engine 314 are preferably deterministic, so that the reasons underlying recommended rules modifications and/or new rules are explainable and transparent, compared to black-box algorithms such as those utilizing neural networks. Explainability and transparency are typically important to enterprises considering whether to modify rules or add new rules relating to enterprise personnel. Simply telling the customer (e.g., a user on end-user network 320) that "the computer said it was a good ideal to change the rule," is typically suboptimal. Deterministic AI algorithms may help to avoid some sources of unconscious bias that might otherwise permeate some black-box algorithms, such as human-trained machine-learning algorithms. The technology set forth herein is operable with non-deterministic, non-explainable algorithms too, if transparency is less of a concern.

The recommendation engine's 314 application of AI algorithms to stored data includes identifying trends in the stored data. Trend-identification may include identifying outliers in a normal distribution around a central mean for a particular type of data, for example. The trend may be a time-based trend (i.e., changes tracked over time) or a trend based on some other independent variable, such as day of the week, shift, agent group, queue type, skill set, or others. The identified outliers can be analyzed using quantitative/statistical analysis (e.g., change in outlier distribution, residual analysis, etc.), for example. Once trending data is pulled out of the initial data set, the remaining members of the initial data set should have a normal mean distribution (i.e., white noise). Any data points outside of the normal mean distribution (i.e., outliers) should be further analyzed by the AI algorithms utilized by the recommendation engine 314. By encoding optimized value (e.g., cost, low volatility, practicality, etc., for various use cases) into the AI algorithm(s), the recommendation engine 314 can deconflict between two or more potential recommendations for rules modifications or new rules.

Once trends are identified by AI algorithms, those trends may be analyzed by the recommendation engine 314 to optimize existing rules (e.g., modify trigger thresholds, conditions, and/or actions) or suggest new rules. The goals of the end-user network 320 (described above with respect to enriched data and time aggregation) can be stored in database devices 306 and referenced by the recommendation engine 344 to determine an optimal solution for the recommendation engine 314 and its applied AI algorithms to calculate toward. As rules are modified and/or new rules are created, the management network 300 receives feedback that can be utilized to evaluate those rule modifications and/or new rules to determine whether the feedback indicates that the end-user network 320 is moving toward or away from the optimal solutions specified for the end-user network 320. In another example, industry-aggregated data, including data from enterprises other than the enterprise with which end-user network 320 is associated, may be used to assist in setting the optimal solution or goal. This may be appropriate for an enterprise just beginning the process of creating rules for workplace automation.

Once the recommendation engine 314 determines an appropriate recommendation for a rules modification or a new rule for end-user network 320, it initiates a process for implementing or executing the pertinent rules modification or new rule with respect to end-user network 320. Determining whether a recommendation is appropriate for initiating implementation or execution within end-user network 320 may involve the recommendation engine 314 determining that the recommendation is projected to result in an improvement (move toward an optimal solution or goal) that exceeds a predetermined improvement threshold. In other words, the recommendation engine may, for example, refrain from recommending every single rules modification or new rule that might bring even a negligible improvement, which might otherwise make it difficult to identify a cause-effect relationship between rules modifications or new rules and resulting performance (due to the sheer number of rules modifications/additions that would likely be executed).

Initiating the process for implementing or executing a recommended rules modification (e.g., a modified trigger threshold) or new rule could involve any of a number of possibilities along a spectrum ranging from (a) full approval required before implementation/execution to (b) notification of impending rules modifications or new rules to be implemented in the future (e.g., in two days) to (c) automatic implementation by the management network 300 on behalf of the end-user network 320, without any approval or notification required. The approval and/or notification of a rules modification or new rule may involve the recommendation engine 314 communicating with the administrator instance 344, such as via a GUI presented via a web portal/dashboard hosted by the management network 300, with recommendation approval/notification details (if any) being provided by the recommendation engine 314. For example, the recommendation may explain the rule parameters (e.g., trigger, condition, action), including any deviations from previous rule parameters (e.g., an amount by which a trigger threshold is proposed to be modified), reasons for the recommended rules modification or new rule, and/or predicted outcomes to follow implementation of the recommended rules modification or new rule. Other approval/notification techniques may alternatively be used.

In response to an approval request from recommendation engine 314, the administrator instance 344 may approve or decline the recommendation to modify an existing rule or add a new rule. Upon receiving approval from the administrator instance 344, the recommendation engine 314 may modify an existing rule and/or add a new rule by communicating directly with the rules engine 302 to provide the types of information (triggers, conditions, actions) described with respect to FIGS. 7A-7P. Upon not receiving an approval from the administrator instance 344 or if the administrator instance 344 expressly declines, then the recommendation engine 314 can record the declined rule in database devices 306 to avoid recommending the same rules modification or new rule again within a threshold time period. Tracking of approved and declined recommendations may be included in future analyses conducted by recommendation engine 314 using AI algorithms. This may allow the recommendation engine 314 to improve recommendation performance over time.

Recommended new rules, as opposed to modifications to existing rules, may require additional analysis on the part of recommendation engine 314. This may include, for example, analyzing the complete rule set currently in force for the end-user network 320 to determine whether any available rule types (e.g., rule types popular among industry peers) are not presently being utilized by the end-user network 320. For example, the end-user network 320 may be using "After-Call Work (ACW)" rules and "long-call" rules but might not be using any "hold" rules, which the recommendation engine 314 might determine is a common rule type used by industry peers. The recommendation engine 314 might then determine that the end-user network 320 should add a "hold" rule and can suggest rule parameters (e.g., trigger, condition, action) based on rule parameters for the same (or similar) rules used in the industry or based on rule parameters for other rule types used by the end-user network 320, for example. The recommendation engine 314 may, for example, recommend an adaptive threshold rule, described in detail below, to periodically monitor and modify a threshold for a standard rule (described above) as historical performance data is stored and analyzed by the recommendation engine 314.

As another example of how the recommendation engine might determine a new rule for recommendation to the end-user network, a particular use case might present opportunities to add rule sets. For example, AI analysis of data stored in the database devices 306 might identify a trend indicating that unexpected agent downtime/shrinkage frequently occurs every Wednesday between 10:00 am and 12:00 pm. The recommendation engine 314 may recommend a new rule with an action/operation to send agents home or power-down devices during that time interval or reduce agent staffing during that interval by two people. As yet another example, if AI analysis of data stored in the database devices 306 indicates that the end-user network 320 has extra idle time throughout an average week, then the recommendation engine 314 can create a new rule to provide coaching to idle agent instances.

The following are three examples in which the recommendation engine 314 of the management network 300 analyzes data stored in the database devices 306 to identify and make rule optimization recommendations to users (e.g., administrator instances 344) on the end-user network 320. In each of these three examples, the analyzed data includes both data from incoming data streams (e.g., from ACD and/or WFM systems) and rules-execution data. The third example, described in the detail, utilizes adaptive threshold rules for making recommendations relating to modifying trigger thresholds for standard rules (e.g., interaction time rules, such as rules pertaining to call handle time, chat handle time (e.g., human-initiated chat or bot chat), or interaction time for other types of contact center communications).

In a first example, relating to agent-staffing shrinkage, the end-user network 320 has existing rules running to monitor the real-time status of all incoming service queues. By exposing and analyzing the rules execution data, the recommendation engine 314 can determine the days and timeframes where it most often finds unexpected downtime for specific queues. For example, the AI algorithm(s) utilized by recommendation engine 314 may determine that the most minutes of downtime (i.e., outliers) are found on Thursdays between 2:00 pm and 4:00 pm EST each week. This determination can be leveraged by recommendation engine 314 to recommend new rules to the administrator instance 344 on end-user network 320. For example, the recommendation engine 314 may recommend a new rule with an action that offers agents and/or agent instances voluntary time off on Thursdays when queue conditions are outperforming a specified service level. Another possible recommendation for the recommendation engine 314 would be to modify an existing rule action to reduce the number of agents and/or agent instances staffed and/or running during the 2:00 μm and 3:00 pm intervals on Thursdays. Both of these recommendations would potentially reduce overall operational cost by avoiding unnecessary hourly expenses for the staffed agents or running agent instances. A third possible rule recommendation would be to staff the 2:00 μm and 3:00 pm intervals on Thursdays with flex workers or devices that are "on call" if that interval becomes busy, but otherwise do not log in for the day. When unexpected downtimes are discovered, a subset of agents and/or agent instances servicing queues that are currently overperforming are removed from interaction handling and provided with time to complete training or updates, receive coaching from a supervisor, or update software, hardware, or AI algorithms, models, or data sets. Without the recommendation engine 314 applying AI algorithms to monitor rules and identify these unexpected downtimes, these activities would normally need to be specifically scheduled and the time needed to complete these activities would be considered "shrinkage." With the management network 300 now finding production time to leverage for these activities, schedule shrinkage is reduced, allowing contact centers associated with the end-user network 320 to have higher availability for agents and/or agent instances. That being said, when the recommendation engine 314 applies AI algorithms to stored data and identifies these unexpected periods of downtime, the recommendation engine 314 is inherently identifying possible areas of overstaffing in general. For example, if the recommendation engine 314 identifies time to deliver 50 minutes of training (10 minutes to 5 agents) every Tuesday at 10:00 am, this suggests that the contact center associated with end-user network 320 may be consistently overstaffing the 10 am interval on Tuesdays. By exposing and analyzing the rules execution data, the recommendation engine 314 can recommend rules modifications or new rules that change the agent staffing mix on specific days and time intervals to help ensure that the contact center associated with end-user network 320 is not unnecessarily overstaffed, thus saving the contact center significant labor costs. With the recommendation(s), the recommendation engine 314 can provide to the administrator instance 344 insight into when unexpected downtime is most often found, in what queues it is found, on what days and timeframes it is found, etc.

In a second example, relating to agent training, assume that the end-user network 320 has existing rules running, via the management network 300, to monitor the real-time status of all incoming service queues and identify unexpected periods of downtime that are automatically leveraged for off-phone working, such as training, coaching, reviewing communications, etc. If the enterprise associated with the end-user network 320 has a new training program that needs to be deployed that requires a prescribed number of hours of each agent's time over the next 30 days, the recommendation engine 314 can apply AI algorithms to data from incoming data streams cached and stored in the database devices 306 to recommend to the customer what each queue threshold would have to be set at in order to a) maintain service levels, while b) finding the prescribed number of hours per agent of training time needed over the next 30 days. The recommendation engine 314 would recommend a rules modification to set the specific thresholds by queue that would ensure that (a) training could be delivered (b) without causing overall service level commitments to be missed. This second example also could be appropriately modified to apply to rules recommendations for training or updating of agent instance devices.

Finally, in a third example, relating to interaction time for a contact center associated with the end-user network 320 and its underlying enterprise, assume that the end-user network 320 has existing rules (i.e., logical directives) running, via the management network 300, to identify which agent instances are taking too long to handle distinct phases of a customer communication, such as a telephony call, video conference, screenshare session, remote login session, human chat session, bot chat session, or other type of customer communication and/or interaction. In the context of a telephony call, these phases may include (1) Talk Time, (2) Hold Time, and (3) After Call Work (ACW) Time, for example, where the initial capitalization of these terms simply serves to call out distinct terminology rather than to refer to any type of trademark, service mark, or other product/service identifier. Therefore, the end-user network's 320 existing rules may include defined acceptable (or unacceptable) trigger thresholds for each of the aforementioned three distinct phases of a call: (1) Talk Time, (2) Hold Time, and (3) After Call Work (ACW) Time. Similar distinct phases may be defined for other types of interactions, such as chat sessions, for example. While the present example is described in the context of interaction time (i.e., call handle time) for a telephony call, the concepts set forth herein are equally applicable to other types of interactions, as set forth in the appended claims.

By exposing and analyzing the rules execution data stored in the database devices 306, the recommendation engine 314 knows how often (e.g., the number of times) agent instances have spent more than a specified amount of time in ACW. In addition, by storing and analyzing the agent state data received by the rules engine 302 from the end-user network 320 or its associated servers, the recommendation engine 314 can also determine, for example, that setting the ACW threshold to be two seconds lower that its current setting would result in, for example, targeting the desired 25% of agent instances in an effort to reduce handle time. The recommendation engine 314 could accordingly recommend a rules modification (i.e., a modified trigger threshold) to administrator instance 344 to reduce the ACW threshold for a particular group of agents or queues in order to address a larger percentage of the outlier population.

Figure 6E:
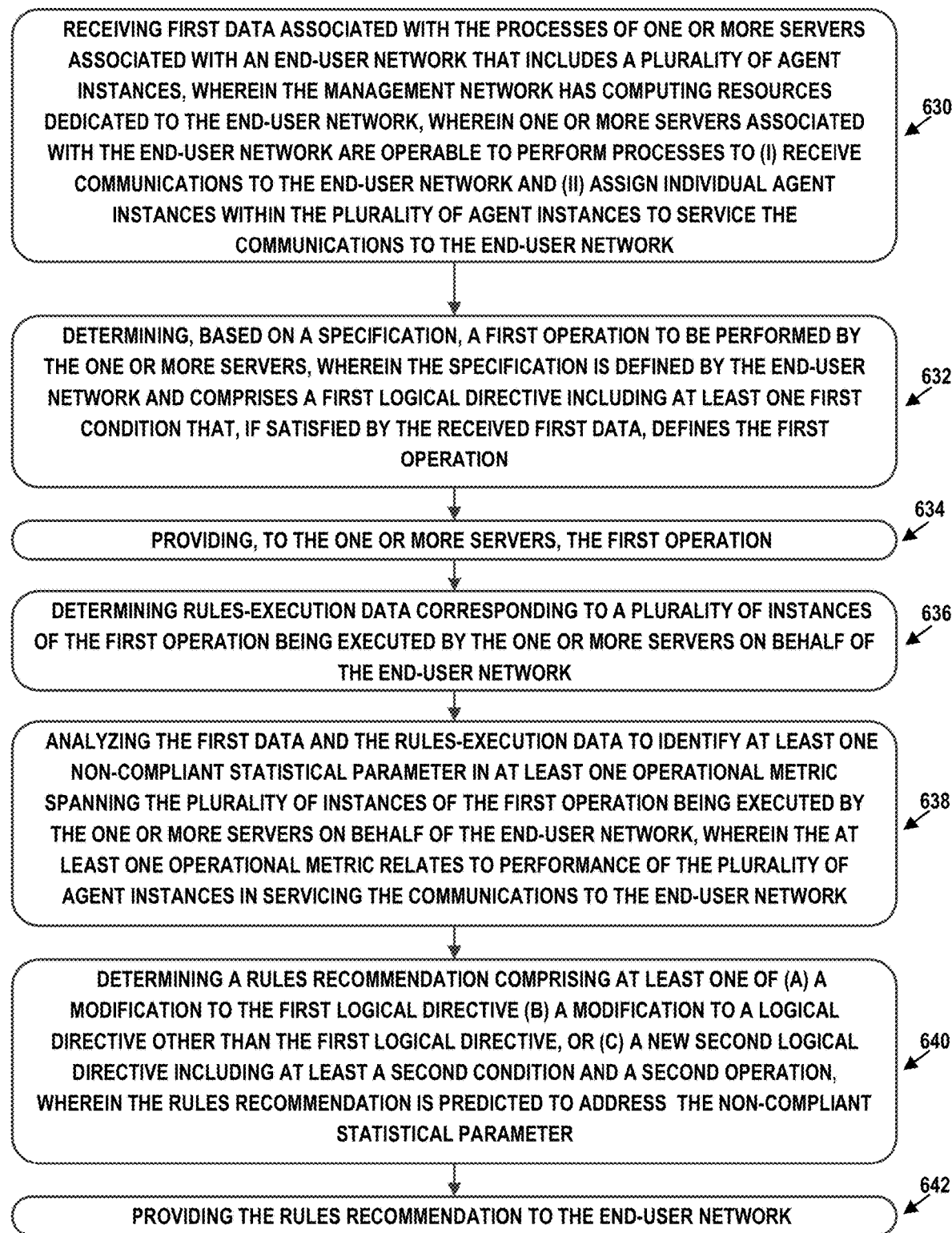
FIG. 6E is a flow chart illustrating an example embodiment for rules recommendations.

FIG. 6E is a flow chart illustrating an example embodiment for determining and providing a rules recommendation to an end-user network. The process illustrated by FIG. 6E may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 6E may be simplified by the removal of any one or more of the features shown therein. Further, these embodiments may be combined with features, aspects, and/or implementations of any of the previous figures or otherwise described herein. The method could be embodied in an article of manufacture including a non-transitory computer-readable medium, having stored thereon program instructions that, upon execution by one or more processors disposed within a management network, cause the one or more processors to perform tasks set forth in the embodiment of FIG. 6E.

Block 630 involves receiving, by one or more processors disposed within a management network, first data associated with processes of one or more servers associated with an end-user network that includes a plurality of agent instances, wherein the management network has computing resources dedicated to the end-user network, wherein one or more servers associated with the end-user network are operable to perform processes to (i) receive communications to the end-user network and (ii) assign individual agent instances within the plurality of agent instances to service the communications to the end-user network. The plurality of agent instances could be a subset of a larger plurality of agent instances, for example, such as a grouping of agent instances based on at least one of the following: assigned channel, assigned queue, assigned supervisor, tenure, or agent location, for example. The one or more servers could include a workforce management server and/or a communication distribution server, for example.

Block 632 involves determining, based on a specification, a first operation to be performed by the one or more servers, wherein the specification is defined by the end-user network and comprises a first logical directive including at least one first condition that, if satisfied by the received first data, defines the first operation.

Block 634 involves providing, to the one or more servers, the first operation.

Block 636 involves determining rules-execution data corresponding to a plurality of instances of the first operation being executed by the one or more servers on behalf of the end-user network.

Block 638 involves analyzing the first data and the rules-execution data to identify at least one non-compliant statistical parameter (e.g., an outlier or a variance exceeding a threshold) in at least one operational metric spanning the plurality of instances of the first operation being executed by the one or more servers on behalf of the end-user network, wherein the at least one operational metric relates to performance of the plurality of agent instances in servicing the communications to the end-user network. Analyzing could include applying an artificial intelligence algorithm to the data, such as a machine learning algorithm, a predictive algorithm, or a quantitative analysis algorithm, for example. The at least one operational metric could include at least one of the following, for example: interaction time, number of leads generated, time spent in after-interaction work (e.g., after-call work), hold time, number of times placed on hold, service level adherence, or conversion rate. Analyzing the first data and the rules-execution data could additionally or alternatively include analyzing an enriched version of at least one of the first data or the rules-execution data, where the enriched version is an accumulation of data over a predetermined period of time.

Block 640 involves determining a rules recommendation comprising at least one of (a) a modification to the first logical directive (b) a modification to a logical directive other than the first logical directive, or (c) a new second logical directive including at least a second condition and a second operation, wherein the rules recommendation is predicted to address the non-compliant statistical parameter.

Block 642 involves providing the rules recommendation to the end-user network.

In an example embodiment, blocks 630 and 638 could include (a) determining, for each of the plurality of agent instances, the at least one operational metric from the received first data associated with the processes of the one or more servers, (b) determining a performance distribution of the compiled at least one operational metric associated with the plurality of agent instances, and (c) identifying the at least one non-compliant statistical parameter in the determined performance distribution of the compiled at least one operational metric associated with the plurality of agent instances. For example, the non-compliant statistical parameter in the determined performance distribution could be a distribution that is too wide (variance is too large).

In another example embodiment, blocks 630 and 638 could include (a) determining, for each of the plurality of agent instances, the at least one operational metric from the received first data associated with the processes of the one or more servers, (b) determining a performance distribution of the compiled at least one operational metric associated with the plurality of agent instances to identify at least one agent instance in the plurality of agent instances that constitutes a statistical outlier relative to the plurality of agent instances for the at least one operational metric, and (c) determining whether the identified at least one agent instance is a long-term statistical outlier by analyzing the at least one operational metric associated with the identified at least one agent instance over a time period spanning a plurality of the communications serviced by the identified at least one agent instance, wherein the at least one non-compliant statistical parameter comprises the determined long-term statistical outlier. Identifying the at least one agent instance in the plurality of agent instances that constitutes a statistical outlier could include identifying any agent instances falling outside a multiple of a standard deviation of a set comprising the at least one compiled operational metric for each of the plurality of agent instances, for example. In this example involving an outlier, the rules execution data could be used to show that a rule historically triggered a certain number of times per day, but is more recently triggering significantly more or less frequently. The recommendation engine 314 could base a rules recommendation (e.g., a threshold change recommendation) on this determination.

The first operation and/or the second operation in the embodiment of FIG. 6B could include (a) changing a state of a particular agent instance of the agent instances, (b) modifying an assigned schedule for the particular agent instance, (c) modifying an assigned queue of the particular agent instance, or (d) modifying an assigned channel of the particular agent instance, for example.

The method could further include (a) providing, to each of the agent instances, a monitoring application that is configured to store, in a computer readable medium, monitor data associated with each agent instance, (b) receiving, from the monitoring application, the stored monitor data, for example, in which case, the step of analyzing additionally includes analyzing the stored monitor data. Moreover, the analyzing could additionally or alternatively include analyzing an enriched version of at least one of the first data, the rules-execution data, or the stored monitor data, wherein the enriched version is an accumulation of data over a predetermined period of time.

The method could further include (a) requesting approval from the end-user network for the rules recommendation before implementing the rules recommendation or (b) implementing the rules recommendation without first requesting approval from the end-user network for the rules recommendation, for example.

IX. EXAMPLE ADAPTIVE THRESHOLDS

In accordance with example embodiments, one or more processors, such as in the management network 300 or elsewhere, provide computer-generated recommendations on which rule thresholds (e.g., handle time trigger thresholds) can be optimized based on analyzing historical performance and/or via machine learning. According to some example embodiments, the processor(s), e.g., the management network 300, via its rules engine 302, provides the end-user network 320 with an option for an "adaptive threshold rule," which differs somewhat from the standard rules described above with respect to FIGS. 7A-7P, for example. A user (e.g., an administrator and/or administrator instance 344) on the end-user network 320 can create and configure one or more adaptive threshold rules using a low-code/no-code rule-design tool similar to the GUI panes shown and described with respect to FIGS. 7A-7P. The adaptive threshold rule set forth herein allows the user to create and configure a rule that includes functionality (e.g., an action/operation provided by the management network 300) to either recommend a change to or automatically update an existing threshold of an eligible standard rule (as described above). Such an eligible standard rule includes one or more eligible triggers (each having a trigger threshold), conditions, and/or actions for adaptive use cases. One example of such an adaptive use case is an adaptive trigger for handle time rules, as described in the third example set forth above, relating to handle time for a contact center.

According to an example embodiment relating to adaptive threshold rule creation and configuration, the management network 300 or other entity having processor(s) first presents the user on the end-user network 320 with a software-based design tool, such as web-based rule-design tool provided at administrator instance 344. The rule-design tool receives one or more user inputs relating to the proposed adaptive threshold rule, including, for example, a selection of the adaptive threshold rule type, an indication which adaptive model (e.g., Quartile, Outlier, AI/ML, etc., each with its own set of user inputs/parameters) to use in analyzing data to make a rules recommendation, and/or an indication of any calculations and/or parameters relevant to a selected set of agents and/or agent instances for the proposed adaptive threshold rule. The user may also be requested to identify which eligible standard rule(s) the proposed adaptive threshold rule applies to, which may take place in the rule-design tool for the pertinent standard rule(s), such as when specifying a rule trigger (see, e.g., FIGS. 7V and 7W).

As was the case for the rule-design tool shown and described with respect to FIGS. 7A-7P, the adaptive threshold rule-design tool (which may comprise or constitute part of the same rule-design tool set forth above) may utilize a GUI, for example, and may be embodied as a series of one or more web pages and/or web-based applications provided to authorized users from end-user network 320 at the administrator instance 344 upon request, periodically, or as new recommendations from recommendation engine 314 are formulated. Entering information into the one or more web pages and/or web-based applications may be referred to as defining a "specification." Once completed, adaptive threshold rules may be added to rules engine 302 to automatically carry out various recommendations and/or modifications to eligible standard rules relating to the end-user network 320, in an organized and efficient manner.

Figure 7Q:
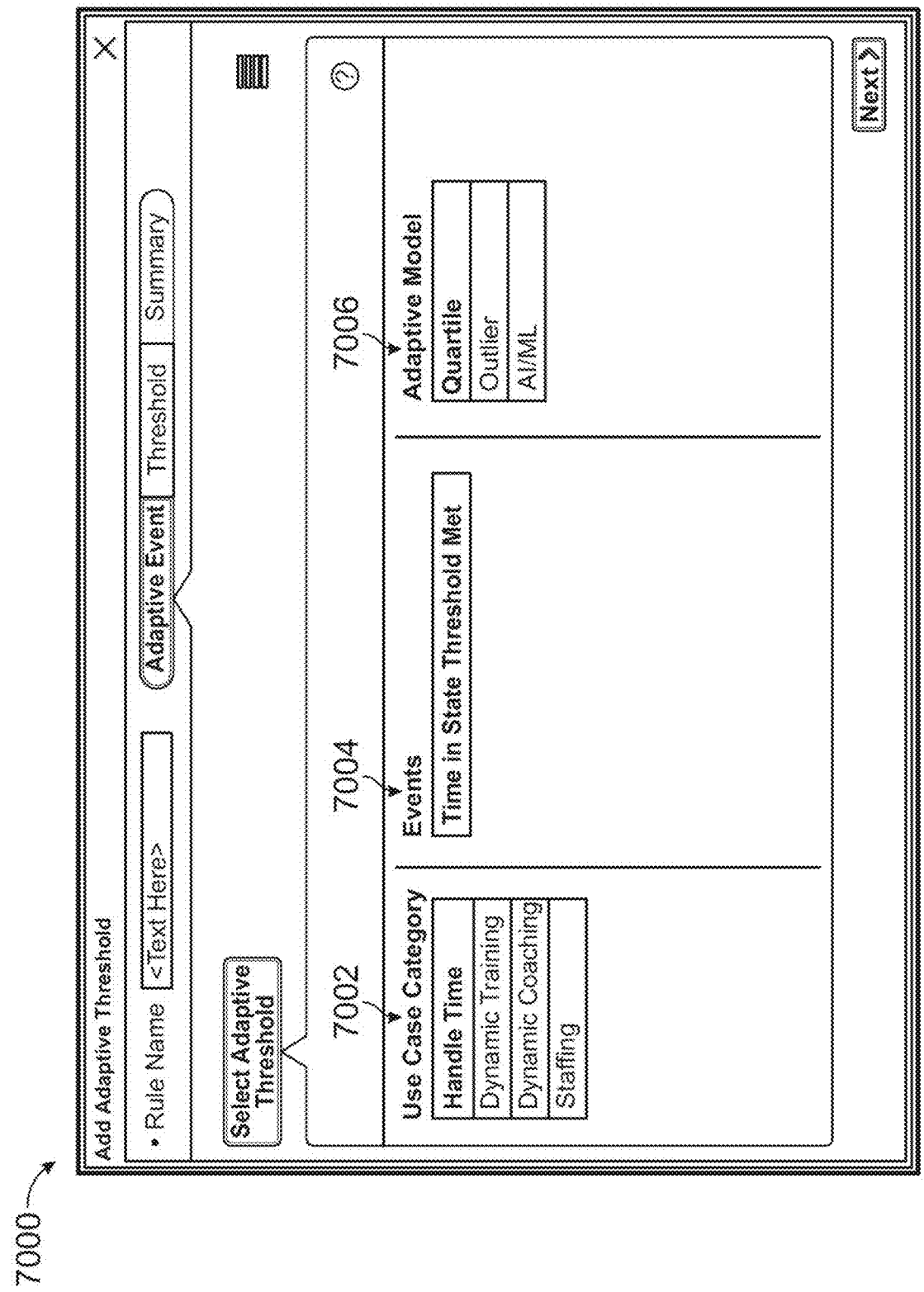
FIG. 7Q is a screen shot diagram illustrating an adaptive threshold selection pane of a rule design tool, in accordance with example embodiments.

FIGS. 7Q-7CC illustrate example scenarios, GUI panes, and consoles for a rule-design tool associated with adaptive threshold rules relating to handle time in a front-office 322. In each of the illustrated scenarios, a rule designer (i.e., an administrator at administrator instance 344) may be presented with a series of GUI panes that allow the designer to define an adaptive threshold rule relating to handle time. As described herein, the term "pane" may refer to a GUI component that contains one or more locations in which to display information, and/or one or more user-selectable items such as buttons or tabs. In some embodiments, a pane may be equivalent to, or contained within, a page or a GUI window, though such a window may contain multiple panes.

FIG. 7Q is a screen shot diagram illustrating an adaptive threshold selection pane 7000 of a rule design tool, in accordance with example embodiments. Such an adaptive threshold selection pane may be displayed to a user of the end-user network 320 when the user chooses to utilize an "adaptive threshold" as a trigger for a standard rule, for example. In the illustrated example, the pane 7000 includes a number of selectable fields for selecting a type of adaptive threshold rule, including a use case category (e.g., handle time, dynamic training, dynamic coaching, and staffing), along with other fields that may vary depending on the particular use case category highlighted or selected. In the illustrated "handle time" example, the "Events" field lists "Time In State Threshold Met" as an adaptive threshold trigger and the "Adaptive Model" field lists three adaptive models that can be used by recommendation engine 314 in analyzing stored data to make recommendations. These adaptive models include, by way of example, a "Quartile" model, an "Outlier" model, and an AI/ML model. With "Handle Time," "Time In State Threshold Met," and "Quartile" selected, the user can accept the selections and proceed to the next pane 7008 (FIG. 7R) by selecting the "Next" button in the bottom right of the pane 7000.

Figure 7R:
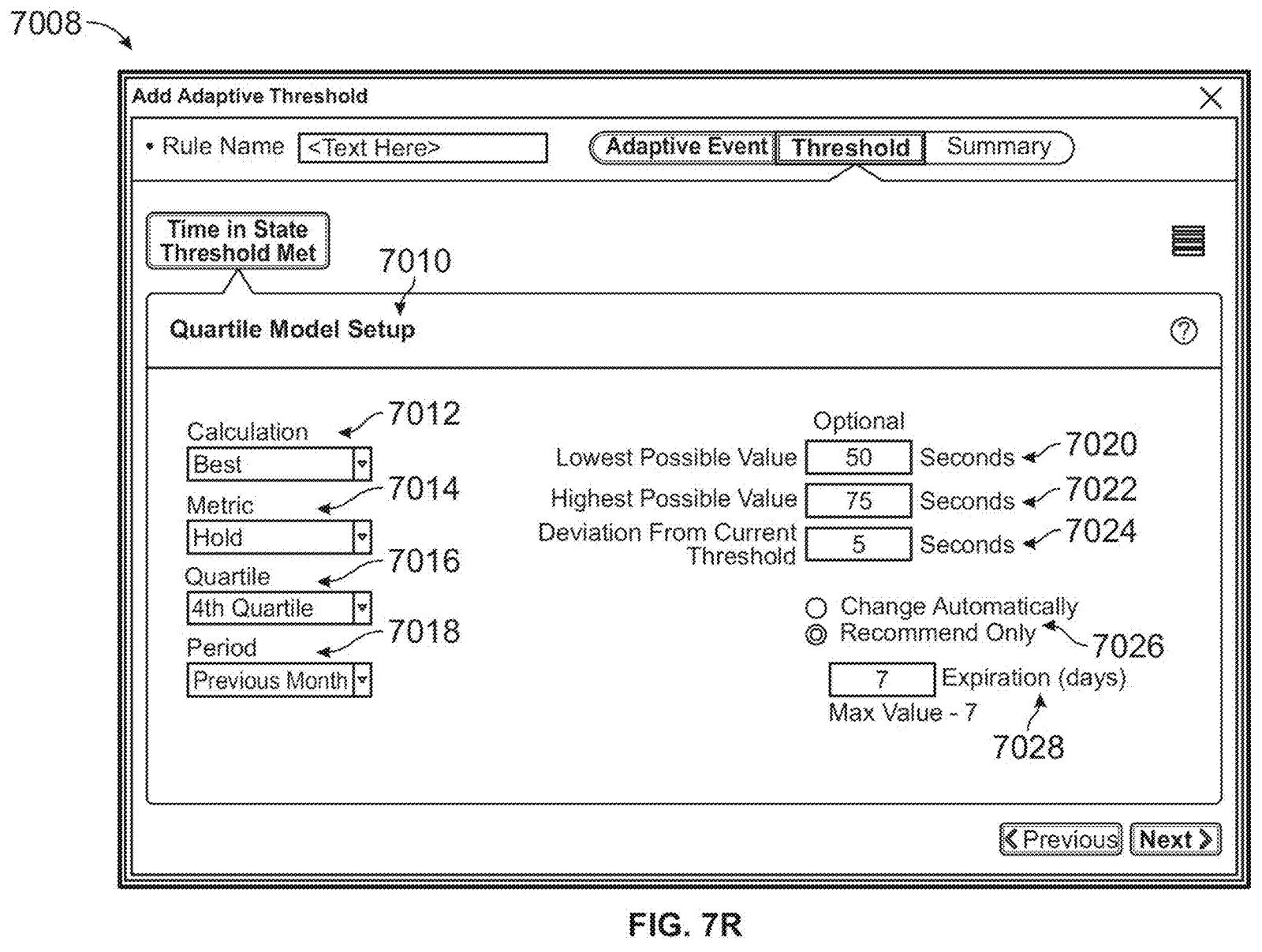

FIG. 7R is a screen shot diagram illustrating an adaptive threshold specification pane 7008 of a rule design tool, in accordance with example embodiments. The pane 7008 presents the user with configuration options relating to the Quartile adaptive model selected in pane 7000 shown in FIG. 7Q. For the particular "Adaptive Handle Time—Time In State Threshold Met (Quartile Model)" example illustrated in FIGS. 7Q and 7R, the selectable fields include the following: Calculation 7012, Metric 7014, Quartile 7016, and Period 7018. Each of these will now be described.

The Calculation field 7012 defines whether to calculate a weighted average for all agent instances, or to find the agent instance with either the Best (minimum) or Worst (maximum) metric value within the selected quartile during the selected period.

The Metric field 7014 defines which metric (e.g., Talk time, Hold time, or ACW time) will be used as part of the calculation by the recommendation engine 314.

The Quartile field 7016 defines which subset of agent instances (grouped into quartiles for the period selected based on actual metric values) within a standard rule's user filter will be used in the calculation. For example, the quartiles could be delineated as follows: 1st Quartile: the lowest 25% of numbers; 2nd Quartile: between 25.1 and 50% (up to the median); 3rd Quartile: 50.1% to 75% (above the median); and 4th Quartile: the highest 25% of numbers).

The Period field 7018 defines the range of relative dates on which the recommendation engine 314 is to perform the calculation (e.g., previous week, previous month, or previous quarter). The period selection will also then determine the frequency of how often this adaptive threshold rule will run, according to an example embodiment. For example, if "previous quarter" is selected, then this rule will run the first day of every calendar quarter at 12:00 am UTC and will perform the indicated calculation for the previous calendar quarter's data. If "previous week" is selected, then, as an example, this rule will run every Sunday at 12:00 am UTC and will perform the indicated calculation for the previous week's data.

The pane 7008 also includes a number of optional fields. In the illustrated example, these optional fields include: (a) Lowest Possible Value (LPV) field 7020—the lower limit at which an adaptive threshold rule is allowed to set/recommend a threshold (e.g., if LPV is set to 60, but the rule calculation equals 50, then the rule will set/recommend 60), (b) Highest Possible Value (HPV) field 7022—the upper limit at which an adaptive threshold rule is allowed to set/recommend a threshold (e.g., if HPV is set to 90, but rule calculation equals 110, then the adaptive threshold rule will set or recommend 90), and (c) Threshold Deviation from Current Value field 7024—the deviation from the current standard rule threshold that an adaptive threshold rule must meet or exceed in order to make an auto-change/recommendation. The purpose of Threshold Deviation from Current Value optional field 7024 is to provide an option for the user to limit the number of "insignificant" recommendations/changes. For example, a user associated with the end-user network 320 may decide that there is not enough benefit to warrant a recommendation that is only a one-second reduction in threshold time. Thus, for example, this field 7024 would allow a user to specify that the management network 300 only makes a change/recommendation if the new threshold is at least +/−5 seconds from the current threshold.

To further illustrate, assume, for example, that the Threshold Deviation From Current Value is set to 5 and the corresponding standard rule to which the proposed adaptive threshold rule applies has a threshold set to 60 for Time In State Threshold Met. If the adaptive threshold rule calculation equals 63, then no auto-change/recommendation will execute since the deviation from the current threshold is less than 5. However, if the adaptive threshold rule calculation equals 54, then the auto-change/recommendation will execute since the deviation (i.e., difference) from the current threshold is greater than 5. In the event that the user does not enter a value for the Threshold Deviation From Current Value field, and the adaptive threshold rule recommended value equals the current threshold value, then no automatic threshold change or recommendation will execute since there is technically no change in threshold being recommended.

The pane 7008 of FIG. 7R also includes an Auto-Change/Recommend selection field 7026 to allow the user to select whether a recommended adaptive threshold is automatically implemented (e.g., a trigger threshold is changed, such as for a handle time standard rule) or is instead simply presented as a recommendation to the user. According to some example embodiments, for adaptive threshold rules that are set to "recommend," users may be asked to set an expiration length (in units of time) via an Expiration field 7028, which could have a maximum input value of 7 days, for example. Whenever such a "recommend" adaptive threshold rule runs, the recommendation engine 314 will provide a new recommendation to be provided to the user, such as in a list displayed in a GUI report displayed at the administrator instance 344. The rules recommendation, in this case, a recommended threshold modification, will be considered active until the specified expiration length has passed or the user accepts or rejects the recommendation, whichever occurs first.

Continuing with the discussion of the Expiration field 7028, in accordance with example embodiments, once an adaptive threshold rule has been associated with at least one eligible standard rule, one of two expected outcomes will take place whenever that adaptive threshold rule runs. As a first outcome, if the adaptive threshold rule is set to "automatic," then the corresponding threshold (e.g., "Time In State Threshold Met") will be automatically updated per the adaptive threshold rule configuration. As a second outcome, if the adaptive threshold rule is set to "recommend," then a new recommendation for that rule will be displayed to the user, such as via a list of all active recommendations (see, e.g., FIGS. 7S and 7T). Once the recommendation is presented to the user, the adaptive threshold rule effectively enters a pending state until either a user response is received or the specified expiration time has passed.

Figure 7S:
FIG. 7S is a screen shot diagram illustrating an adaptive threshold recommendations pane of a rule design tool, in accordance with example embodiments.
Figure 7T:
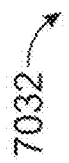
FIG. 7T is a screen shot diagram illustrating an adaptive threshold recommendations modification pane of a rule design tool, in accordance with example embodiments.

FIG. 7S is a screen shot diagram illustrating an adaptive threshold recommendations pane 7030 of a rule design tool, in accordance with example embodiments. FIG. 7T is a screen shot diagram illustrating an adaptive threshold recommendations modification pane 7032 of a rule design tool, in accordance with example embodiments. The recommendations pane 7030 includes a list of all active recommendations (organized by standard rule in the example of FIG. 7S) that have been triggered as a result of an adaptive threshold rule. If a recommendation expires before the user either accepts or rejects the recommendation, then that recommendation is removed from the recommendations list and possibly archived for later reporting or analysis/recommendation purposes, according to one example embodiment. If the user selects an "accept" button (without first selecting a "modify" button), then the corresponding threshold for that rule will be automatically updated to the recommended value without further effort on user's part. If the user selects a "reject" button, then that recommendation is removed from the list of active recommendations and archived for later reporting purposes, according to an example embodiment.

As shown in FIGS. 7S and 7T, the user may also be presented with an option to "modify" the recommendation in some embodiments. When the user selects "modify" for a particular recommendation, a "modification" column 7034 is displayed, along with a user input box 7036, as shown in FIG. 7T. The user can then enter a value (which may be lower or higher than the original recommendation) into the user input box 7036 and select the corresponding "accept" button to cause the threshold modification to be processed with the modified value. The corresponding standard rule is updated with the modified threshold value from the input box.

Figure 7U:
FIG. 7U is a screen shot diagram illustrating an adaptive threshold rule console, in accordance with example embodiments.

FIG. 7U is a screen shot diagram illustrating an adaptive threshold rule console 7038, in accordance with example embodiments. The adaptive threshold rule console 7038 serves as a GUI through which a user can create one or more adaptive threshold rules that can then be associated with one or more standard rules for those triggers/conditions/actions that are eligible for adaptive use cases. In the example of FIG. 7U, the adaptive threshold rule console 7038 is shown as a table with default columns for Rule Name, Use Case, Event, Adaptive Model, and Status (e.g., Paused or Running). Refer to the description accompanying FIG. 7Q for a discussion of the adaptive threshold rule configuration fields represented by these columns. In addition, a "Last Executed Date" column can be included to specify the Date/Time each adaptive threshold rule was last executed (e.g., 9/20/2022 9:33:31 AM). A "Run Now" button 7040 allows a user to manually execute one or more selected adaptive threshold rules to allow the user to immediately execute any of the selected adaptive threshold rules whether the rules are paused or running. An additional action icon can be included for each adaptive threshold rule in the adaptive threshold rule console 7038 to allow the user to view a list of standard rules with which each adaptive threshold rule is associated.

Additional columns and/or fields that can be included in the adaptive threshold rule console 7038 include, but are not limited to, the following: (a) Created By, (b) Created Date, (c) Last Modification Date, and (d) Last Modified By. Filterable Criteria may include, but are not limited to, the following: (a) Adaptive Model, (b) Created By, (c) Created Date, (d) Event, (e) Last Modification Date, (f) Last Modified By, (g) Name, (h) Status, and (i) Use Case.

Referring to FIG. 7U, to create a new adaptive threshold rule, a user clicks the "Add" button 7042 to create a new adaptive threshold rule. Using a rule-design tool like the one illustrated in FIGS. 7Q and 7R, the user will then: (1) define the rule name, (2) select which use case category the new adaptive threshold rule applies to (e.g., handle time), (3) select which specific field/threshold will be adaptive (e.g., "Time In State Threshold Met"), (4) select which adaptive model will be used (e.g., quartile adaptive model), (5) complete all required and any desired optional fields for the chosen model, (6) define whether the rule will be automatic or recommendation only, and (7) save the newly created adaptive threshold rule. Adaptive threshold rules can be modified, as opposed to created, using a similar process.

Figure 7V:
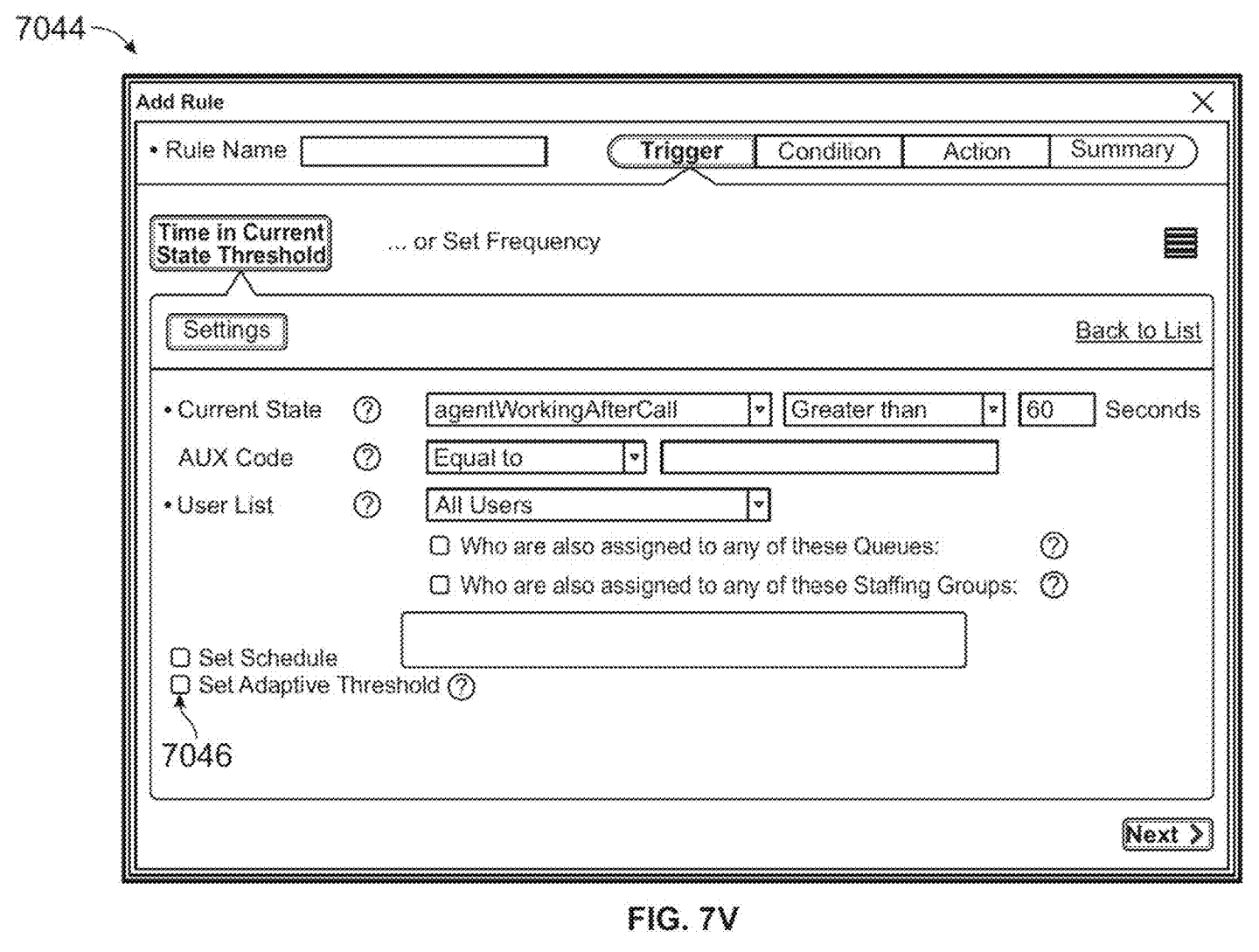
Figure 7W:
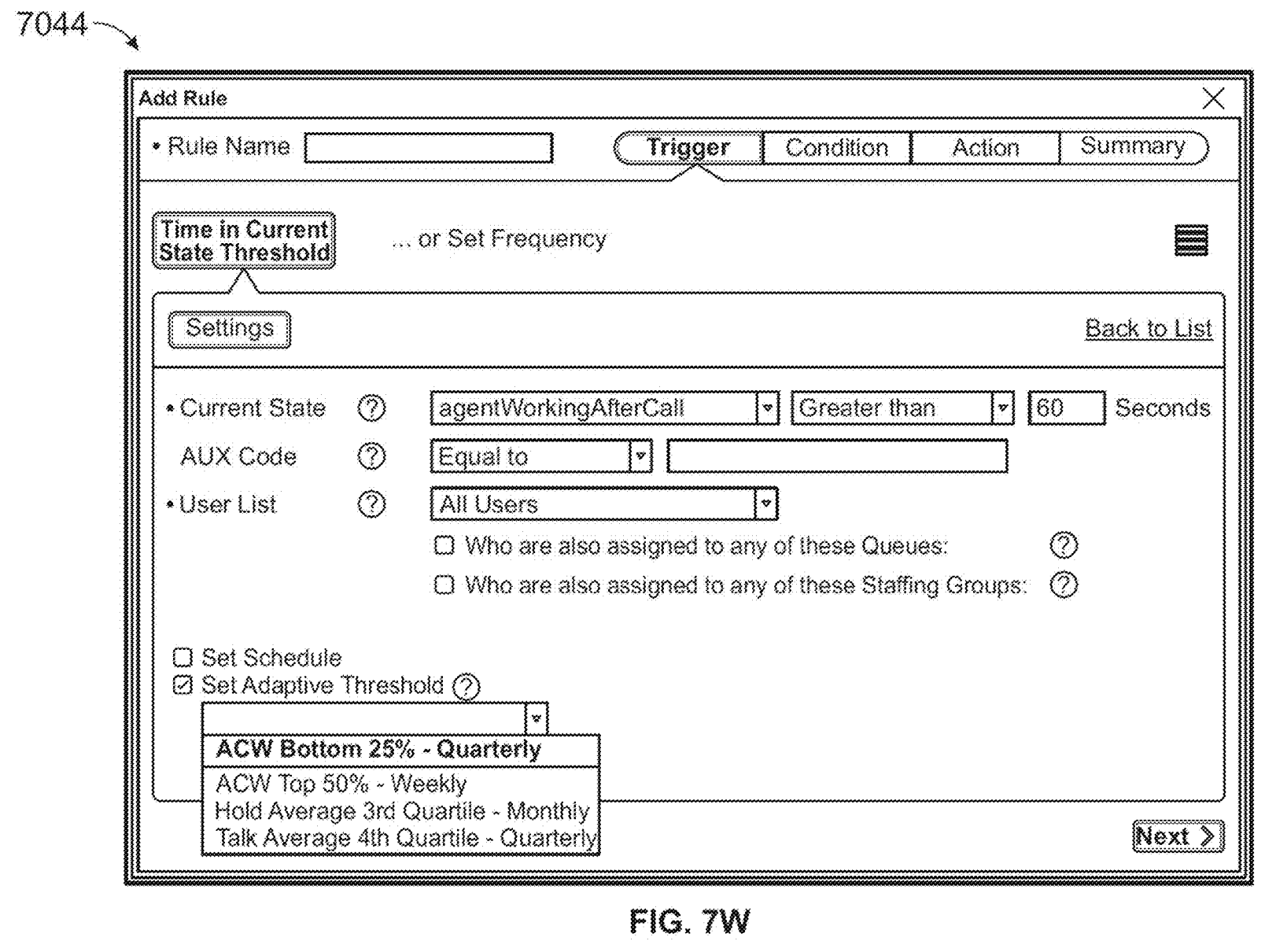

FIG. 7V is a screen shot diagram illustrating a trigger specification pane 7044 of a rule design tool for an adaptive-threshold-eligible standard rule, in accordance with example embodiments. FIG. 7W is a screen shot diagram illustrating a second portion of the trigger specification pane 7044 of a rule design tool for an adaptive-threshold-eligible standard rule, in accordance with example embodiments. As illustrated, the pane 7044 of FIG. 7V is very similar to the pane 770 of FIG. 7H for a standard rule, except that FIG. 7V includes a "Set Adaptive Threshold" checkbox 7046 on the trigger specification pane 7044 while FIG. 7H does not include such a checkbox in the pane 770.

Upon selecting the "Set Adaptive Threshold" checkbox 7046 and selecting/specifying any other necessary and/or desired information (e.g., user group filters), the user is presented with the second portion of the pane 7044 shown in FIG. 7W, according to the illustrated example. This second portion includes a dropdown menu listing available adaptive thresholds for the particular standard rule being designed in FIGS. 7V and 7W. In the illustrated example, these selectable adaptive thresholds include the following: ACW Bottom 25% —Quarterly, ACW Top 50% —Weekly, Hold Average $3^{rd}$ Quartile—Monthly, and Talk Average $4^{th}$ Quarterly, all of which are shorthand variations of the adaptive threshold configurations set forth in FIGS. 7Q and 7R.

Figure 7X:
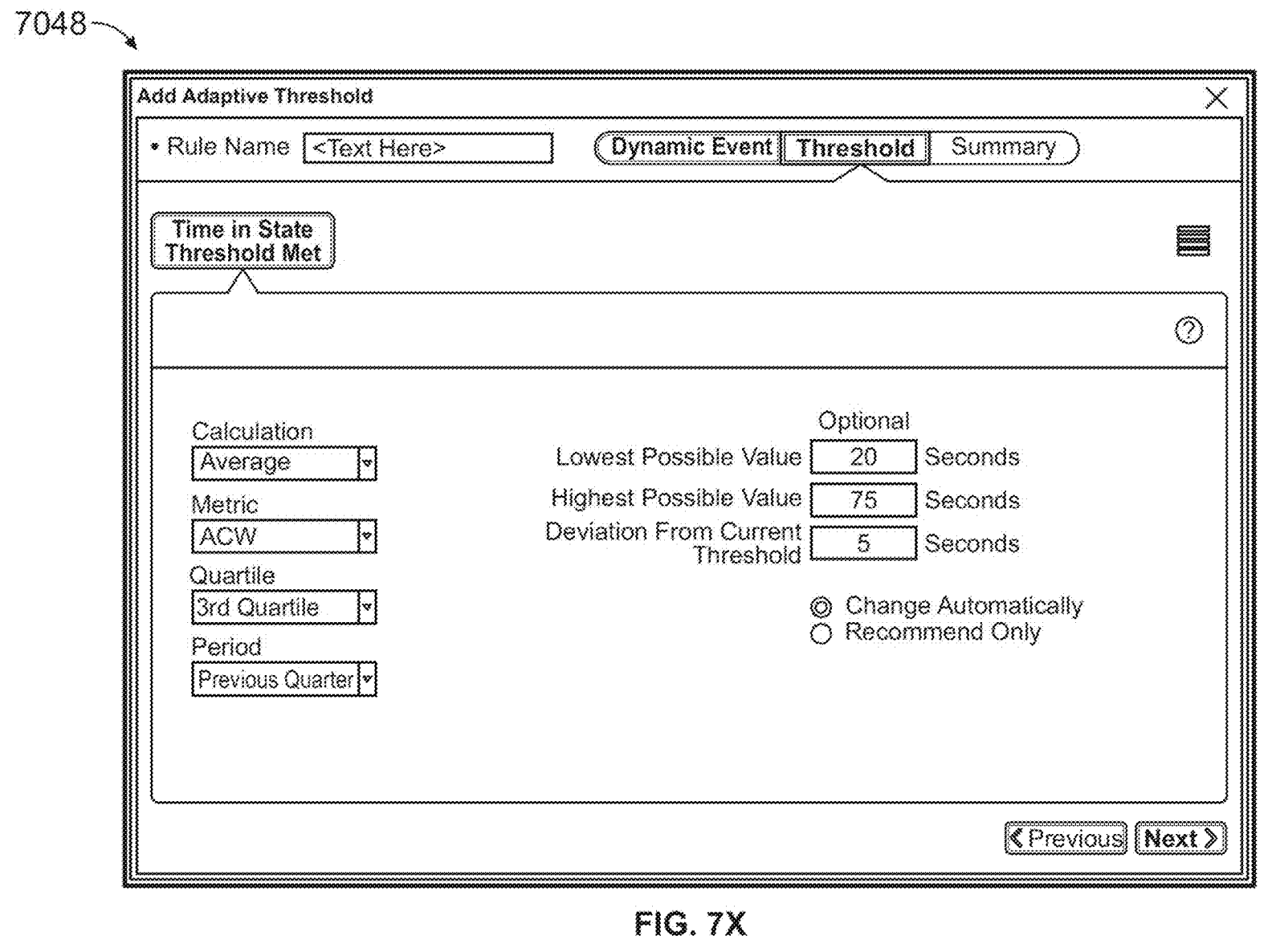

FIG. 7X is a screen shot diagram illustrating an example adaptive threshold specification pane 7048 of a rule design tool for a first example scenario. FIG. 7Y is a table 7050 illustrating example agent instance call data for the example first scenario of FIG. 7X. FIG. 7Z is a table 7052 illustrating example calculated call metrics for the example first scenario of FIG. 7X.

FIGS. 7X, 7Y, and 7Z set forth a first specific fictitious end-user network data example of an adaptive threshold and associated calculations to be made by at least one processor, such as in the recommendation engine 314 in the management network 300. For this example, assume that each quarter, a user on the end-user network 320 wants to optimize its front-office agent instances' "long ACW time rule" threshold based on actual ACW time performance data. As shown in the pane 7048 in FIG. 7X, the user decides to specify that the management network 300 should use the previous quarter's overall ACW time averages to determine the new threshold. The user also decides to parse their in-scope agent instance population into quartiles and then calculates the weighted average ACW for the fourth quartile. The user uses the calculated third-quarter weighted average ACW as the new threshold for "Time In State Threshold Met" trigger for the end-user network's 330 "long ACW time rule."

Referring to table 7050 in FIG. 7Y and continuing with the first specific fictitious end-user network data example, assume also that the end-user network's 330 "long ACW time rule" runs for a subgroup of 10 agent instances (labeled Agent 1, Agent 2, . . . , Agent 10). Each of these agents has a respective number of calls taken and average ACW metrics, as listed in the table 7050 of FIG. 7Y. This data in table 7050 is aggregated for the previous quarter. According to an example embodiment, the recommendation engine 314 of the management network 300 transforms the data in table 7050 by parsing the data into four quartiles and then calculating the weighted average, best, and worst values for each quartile. These calculations, for the fictitious data in table 7050 of FIG. 7Y, are shown in the table 7052 of FIG. 7Z. From these results, the adaptive threshold rule would set the new threshold for the end-user network's 330 "long ACW time rule" to be 44 seconds. This is the value shown in the $3^{rd}$ Quartile weighted average box 7054 of the table 7052.

FIG. 7AA is a screen shot diagram illustrating an example adaptive threshold specification pane 7056 of a rule design tool, in accordance with example embodiments. FIG. 7BB is a table illustrating example agent instance call data for the example second scenario of FIG. 7AA. FIG. 7CC is a table illustrating example calculated call metrics for the example second scenario of FIG. 7AA.

FIGS. 7AA, 7BB, and 7CC set forth a second specific fictitious end-user network data example of an adaptive threshold and associated calculations to be made by the recommendation engine 314 in the management network 300. For this second example, assume that each month, a user on the end-user network 320 wants to optimize its front-office agent instances' "long Hold time rule" threshold based on actual Hold time performance data. As shown in the pane 7056 in FIG. 7AA, the user decides to specify that the management network 300 should use the previous month's best Hold time averages to determine the new threshold. The user also decides to parse their in-scope agent instance population into quartiles and then utilizes the Best Hold time value for the fourth Quartile. The user uses the calculated fourth-Quartile Best Hold time value as the new threshold for "Time In State Threshold Met" trigger for the end-user network's 330 "long Hold time rule."

Referring to table 7058 of FIG. 7BB and continuing with second specific fictitious end-user network data example, assume also that the end-user network's 330 "long Hold time rule" runs for a subgroup of 10 agent instances (labeled Agent 1, Agent 2, . . . , Agent 10). Each of these agents has a respective number of calls taken and average Hold metrics, as listed in the table 7058 of FIG. 7BB. This data in table 7058 is aggregated for the previous month. According to an example embodiment, the recommendation engine 314 of the management network 300 transforms the data in table 7050 by creating four quartiles and then calculating the weighted average, best, and worst values for each quartile. These calculations, for the fictitious data in table 7058 of FIG. 7BB, are shown in the table 7060 of FIG. 7Z. From these results, the adaptive threshold rule would set the new threshold for the end-user network's 330 "long Hold time rule" to be 65 seconds. This is the value shown in the 4th Quartile Best box 7062 of the table 7060.

With respect to the example of a handle time rule as an eligible standard rule, the underlying adaptive threshold rule will primarily involve the recommendation engine 314 and/or rules engine 302 performing calculations and analytics on a specified dataset/subset of historical data (i.e., metrics) stored in the database devices 306. For example, the recommendation engine 314 may analyze data in the database devices 306 to determine the average ACW time of those agent instances falling into the 3rd quartile for a particular eligible standard rule having a trigger relating to handle time. The recommendation engine 314 could then recommend setting (or could automatically set) a "Time In ACW State Threshold Met" trigger equal to that value in the particular eligible standard rule. The condition(s) and/or action(s) for that particular eligible standard rule may or may not be modified—in many cases, it may be sufficient to simply modify the rule trigger.

For example, user A may configure the rule to calculate the average ACW time of agents who fall into the third quartile for the previous quarter. User A can then associate this adaptive threshold rule with one or more standard handle time rules. Then, on the first day of the next quarter, the adaptive threshold rule will perform the configured calculation and create a new recommendation to update the associated standard handle time rule(s) with the calculated value. If user A accepts that recommendation, then the standard handle time rule will be updated for the remainder of that quarter. If user A rejects that recommendation, then no further action is taken. This process is then repeated each quarter.

User B, however, may want to use a different calculation. User B therefore configures the adaptive threshold rule to find the best Hold time of those agents who fall into the fourth quartile for the previous month. This will help ensure that user B's handle time rule always targets the bottom 25% of outliers based on actual monthly performance.

In both examples, adaptive handle threshold rules help ensure that as actual agent performance changes over time, the triggerable rules (logical directives) adapt accordingly to ensure that the right thresholds are set for the right length of time. For example, in the case of adaptive handle time, an eligible trigger/condition/action that can be adaptive is "Time in State Threshold Met," where Current State=Talk, ACW, and Hold.

The at least one processor, such as in the recommendation engine 314 in the management network 300, performs data calculations to determine adaptive threshold recommendations. For example, the recommendation engine 314 may calculate weighted averages across multiple agent instances for relative time periods and then aggregate those calculated weighted averages at the rule level. Data points used by the recommendation engine 314 for calculation may be received from the end-user network's 320 communication distributor 324 and stored in a database device, such as the database devices 306 of the management network 300, for example. For an adaptive threshold rule specific to handle time, such data point types may include: (1) number of calls taken, (2) total talk time (seconds), (3) total hold time (seconds), and (4) total ACW time (seconds). According to some example embodiments, the management network 300 or other entity having processor(s), receives and stores, in the database devices 306, the aforementioned data points by agent, by date, and by communication distributor 324 instance, for more efficient data transformation.

Given that adaptive threshold rules are associated with standard rules, where standard rules are then associated with user filters (e.g., filtering subsets of agent instances), in example embodiments, the management network 300 aggregates and calculates data dynamically for the set of agent instances included in a particular standard rule's user filter each time an adaptive threshold rule executes. Thus, the recommendation engine 314 only performs calculations for those agent instances included in the user filter at the time of adaptive threshold rule execution, according to an example embodiment. The following is a list of results that can be calculated and/or derived by the recommendation engine 314 using the four types of data points described immediately above: (a) average Talk/Hold/ACW time for each agent instance (e.g., Average Talk=Sum[Total Talk Time]/Sum [#Calls Taken] in a given date range), (b) aggregate average Talk/Hold/ACW time for a subset of agent instances in a given date range (e.g., the Average ACW time of agent instances falling into the 3rd quartile for the previous quarter), (c) quartile values/ranges for a set of agent instances in a given date range, and (d) an identification of those agent instances falling into a particular quartile, in order to derive minimum, maximum, and average values for that quartile.

According to some example embodiments, situational scenarios involving adaptive threshold rules and/or recommendations include the following. A first situational scenario involves overlapping recommendations. Adaptive threshold rules should not offer a new recommendation if a previous recommendation is still active for that same rule. In other words, if an adaptive threshold rule tries to prompt a new recommendation while an existing recommendation for that same rule is still active (i.e., it is still actionable for a user in the end-user network 320 to either accept or reject), then that new recommendation should be effectively canceled/ignored.

A second situational scenario for adaptive threshold rules and/or recommendations involves simultaneous changes, in which a user tries to manually update a standard rule at the same time that an adaptive threshold rule attempts to update the same standard rule (either by another user accepting a recommendation or through an auto-change). According to an example embodiment, whichever change is processed last will be the change that stays in effect.

A third situational scenario for adaptive threshold rules and/or recommendations involves adaptive threshold rule deletion. If a user attempts to delete an adaptive threshold rule that is associated with one or more standard rules, then they can be presented with an error message (e.g., transmitted to the end-user network 320 from the management network 300) indicating that that particular adaptive threshold rule is associated with one or more standard rules, which can be displayed to the user for further review, in accordance with an example embodiment.

Finally, a fourth situational scenario for adaptive threshold rules and/or recommendations involves two users responding to the same recommendation (e.g., a threshold change recommendation), with one user accepting and the other user rejecting the recommendation. According to an example embodiment, whichever change response is received first is the one that is processed. If a user manually changes (e.g., via the rule-design tool illustrated in FIG. 7A-7P, 7V, or 7W) a threshold of a standard rule that also has an adaptive threshold rule associated with it, then that user-initiated change becomes the new threshold until the next run of the adaptive threshold rule, according to one example embodiment.

Figure 6F:
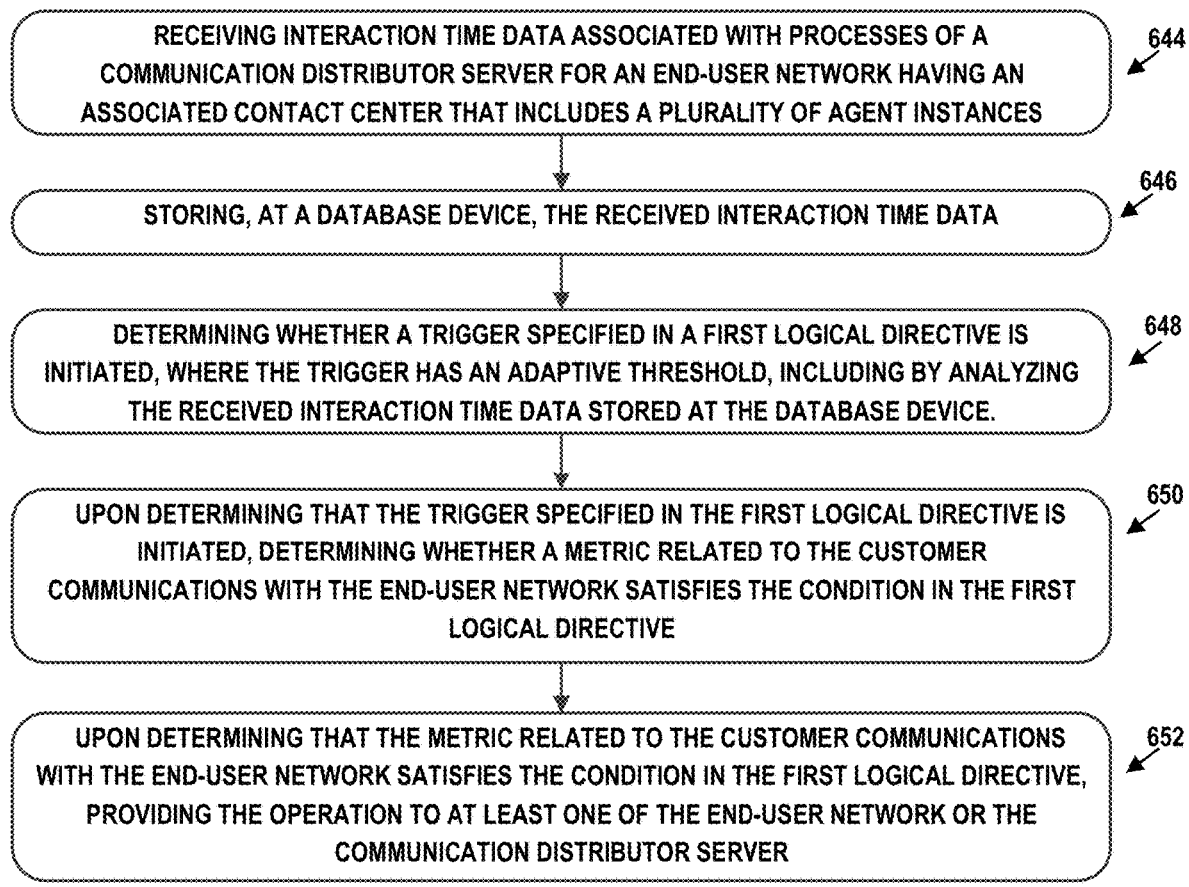
FIG. 6F is a flow chart illustrating an example embodiment of a method involving adaptive thresholds for managing interaction time in a contact center.

FIG. 6F is a flow chart illustrating an example embodiment of a method involving adaptive thresholds for managing interaction time in a contact center. The process illustrated by FIG. 6F may be carried out by at least one processor in a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 6F may be simplified by the removal of any one or more of the features shown therein. Further, these embodiments may be combined with features, aspects, and/or implementations of any of the previous figures or otherwise described herein. The method could be embodied in an article of manufacture including a non-transitory computer-readable medium, having stored thereon program instructions that, upon execution by one or more processors disposed within a management network, cause the one or more processors to perform tasks set forth in the embodiment of FIG. 6F.

Block 644 involves receiving interaction time data associated with processes of a communication distributor server for an end-user network having an associated contact center that includes a plurality of agent instances. The interaction time data relates to the plurality of agent instances in the contact center. The communication distributor server for the end-user network assigns individual agent instances within the plurality of agent instances to service customer communications with the end-user network.

Block 646 involves storing, the received interaction time data.

Block 648 involves determining whether a trigger specified in a first logical directive is initiated, where the trigger has an adaptive threshold. This determination includes analyzing the received interaction time data stored at the database device. In addition to the trigger having the adaptive threshold, the first logical directive comprises a condition and an operation.

Block 650 involves upon determining that the trigger specified in the first logical directive is initiated, determining whether a metric related to the customer communications with the end-user network satisfies the condition in the first logical directive.

Block 652 involves upon determining that the metric related to the customer communications with the end-user network satisfies the condition in the first logical directive, providing the operation to at least one of the end-user network or the communication distributor server.

X. EXAMPLE MONITORING APPLICATIONS USING EMBEDDED APPLICATIONS FROM SERVERS

As detailed above, management network 300 may use data from communication distributor 324, workforce management server 326, back-office case system(s) 350, and/or agent monitoring application 610 to perform operations on behalf of end-user network 320 and/or to recommend or implement rules modifications or new rules. Typically, management network 300 obtains the data though a "back-end integration." For example, communication distributor 324, workforce management server 326, back-office case system(s) 350, and/or agent monitoring application 610 may provide an application programming interface (API) for obtaining data. This API may be a representational state transfer (REST) API using HTTP, for instance. Using the API, management network 300 may (perhaps via proxy server(s) 328 and/or 348) place a request for data and receive a corresponding response, perhaps in the form of JavaScipt Object Notation (JSON) or extensible Markup Language (XML).

Sometimes, back-end integration becomes unavailable. For example, the entity that operates end-user network 320, communication distributor 324, workforce management server 326, and/or back-office case system(s) 350 may differ from the entity that operates management network 300. If the two (or more) entities disagree on communication designs, then back-end integration may be unattainable. As another example, the entity/entities that operate(s) communication distributor 324, workforce management server 326, and/or back-office case system(s) 350 may choose to limit or restrict back-end access to protect sensitive information or prevent security risks. Other reasons for stopping back-end integration also exist, all of which may hamper the ability for management network 300 to perform operations on behalf of end-user network 320.

The present disclosure provides a technical improvement to management network 300 to address this and other issues. In particular, the embodiments herein provide systems and methods to monitor "embedded applications," which herein refer to components of communication distributor 324, workforce management server 326, and/or back-office case system(s) 350 that operate on agent instances within end-user network 320. Examples of embedded applications include softphone applications, scheduling applications, and so on. Since embedded applications regularly communicate with communication distributor 324, workforce management server 326, and/or back-office case system(s) 350, monitoring the activity of these embedded applications provides valuable data to management network 300. After management network 300 collects information from the embedded applications on each individual agent instance, a complete state of end-user network 320 can be inferred.

The technical improvements described herein provide numerous advantages to both management network 300 and end-user network 320. For one, management network 300 (and/or proxy server(s) 328) need not maintain a back-end integration with communication distributor 324, workforce management server 326, and/or back-office case system(s) 350. Instead, management network 300 can utilize a monitoring application similar to the aforementioned monitoring application 610 to obtain data for performing operations on behalf of end-user network 320. This saves management network 300 significant time and resources, as setting up back-end integrations can be labor intensive and unduly time consuming. Furthermore, monitoring applications may monitor the activity of embedded applications not typically associated with communication distributor 324, workforce management server 326, and/or back-office case system(s) 350—for instance, chat applications, email application, and so on. Monitoring the activity of these applications provides management network 300 with additional, potentially valuable, data. Other advantages and improvements are also possible and will be understood from the discussion herein.

Figure 9:
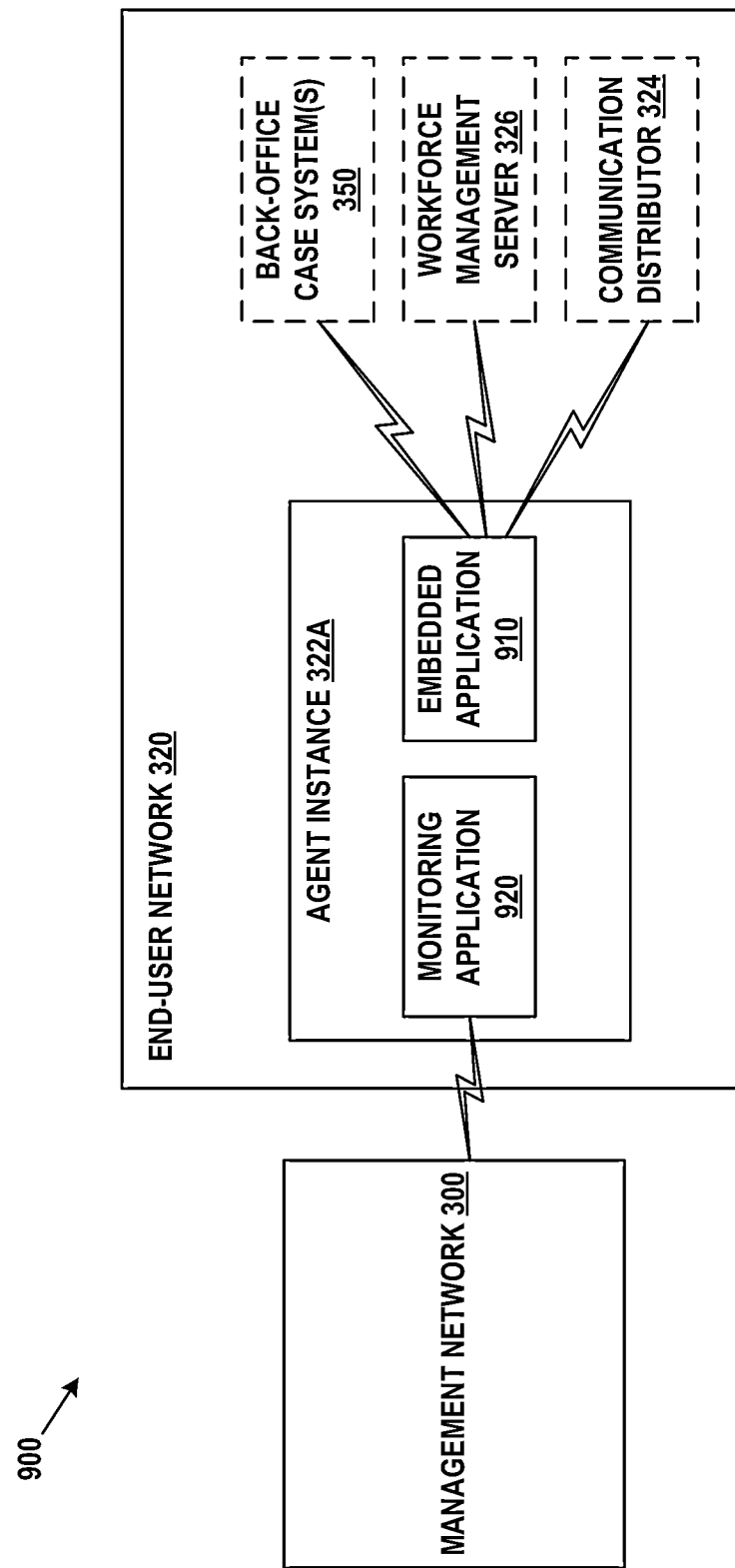
FIG. 9 depicts a network architecture for a monitoring application for use with an embedded application, in accordance with example embodiments.

FIG. 9 depicts a network architecture 900 for monitoring one or more embedded applications, in accordance with example embodiments. The network architecture 900 includes management network 300 and end-user network 320. End-user network 320 includes agent instance 322A, communication distributor 324, and workforce management server 326. Note that agent instance 322A is used solely as an example agent instance; in reality the embodiments described herein can apply to any or all agent instance (including back-office agent instances) in end-user network 320. Moreover, while the communication distributor 324, workforce management server 326, and back-office case system(s) are shown in FIG. 9 as being part of end-user network 320, in a cloud-based configuration, one or more of these may include resources, such as servers and/or data storage, that are "associated with" the end-user network 320, but hosted elsewhere, such as in a remotely accessible network (e.g., via a VPN connection over the internet or another Wide Area Network (WAN)) maintained by a third-party vendor. Such a cloud-based configuration would differ from what is illustrated in FIG. 9 by the positioning of one or more components (e.g., one or more of the communication distributor 324, workforce management server 326, or back-office case system(s) 350) being outside of the box delineating the end-user network 320. Such component(s) may be in communication (e.g., via VPN connections) with the management network 300, end-user network 320, and/or other entities, for example.

As described above, management network 300 uses data from communication distributor 324, workforce management server 326, back-office case system(s) 350, and/or agent monitoring application 610 to perform operations on behalf of end-user network 320 and/or to recommend or implement rules modifications or new rules. For example, communication distributor 324 and/or back-office case system(s) 350 may provide queue information (or other information) to management network 300, workforce management server 326 may provide agent instance scheduling information (or other information) to management network 300, and agent monitoring application 610 may provide monitor data (or other information) to management network 300. The data provided to management network may be stored in database devices for later analysis by recommendation engine 314, for example.

In examples, communication distributor 324, workforce management 326, and/or back-office case system(s) 350 provide agent instance 322A with embedded application 910. Embedded application 910 may be thought of as a "client component" of communication distributor 324, workforce management 326, and/or back-office case system(s) 350. For example, embedded application 910 may be a softphone application that provides an interface to respond to communications from communication distributor 326. As another example, embedded application 910 may be a scheduling application that indicates to a user which work segment they are currently assigned to. As yet another example, embedded application 910 could be part of a claims-processing application for a back-office agent instance. Other embodiments of embedded application 910 are also possible.

In line with the discussion above, management network 300 may be unable to directly access data from communication distributor 324, workforce management server 326, and/or back-office case system(s) 350. To otherwise ascertain this data, management network 300 can use monitoring application 920 similar to the monitoring application 610 described with reference to FIG. 6A (but with less functionality in example embodiments). In examples, end-user network 320 installs monitoring application 920 onto agent instance 322A on behalf of management network 300. Upon installation, monitoring application 920 may be granted root privileges to agent instance 322A. That is, monitoring application 920 can read, modify, and execute programs, files, and directories on agent instance 322A. Since embedded application 910 is also installed on agent instance 322A, monitoring application 920 can leverage root privileges to monitor the operations of embedded application 910.

In some embodiments, monitoring application 920 operates on the network level to intercept packets sent to embedded application 910 by communication distributor 324, workforce management server 326, and/or back-office case system(s) 350. For example, monitoring application 920 may intercept TCP/IP packets by monitoring the network interface (e.g., network interface 106) of agent instance 322A. Monitoring application 920 can then determine patterns using these intercepted packets.

In some embodiments, monitoring application 920 uses an unsupervised learning algorithm to determine baseline patterns of the intercepted packets. The algorithm may then detect a variation from the baseline patterns. Depending on the source of the packets (e.g., whether from communication distributor 324, workforce management server 326, and/or back-office case system(s) 350, variations can be correlated, for example, to state changes for agent instances, work segment changes for agent instances, and so on.

In some embodiments, monitoring application 920 uses a machine learning model trained using a supervised or semi-supervised machine learning approach. During a training phase, the machine learning model could be trained with labeled data that includes intercepted packets from known conditions (e.g., packets intercepted during a state change). During a prediction phase, the trained machine learning model can be applied to unlabeled, intercepted packets sent from communication distributor 324, workforce management server 326, and/or back-office case system(s) 350 to embedded application 910.

The models/algorithms described above could be implemented using, for example, a logistic or linear regression, a support vector machine (SVM), a Bayes network, among other possibilities. A training phase could include evaluating how well the given model predicts an outcome given the labeled data as input. For example, the training phase could include determining a loss function based on a difference between the predicted outcome and the labeled outcome. Various optimization algorithms are possible, including maximum likelihood estimation (MLE) or other fitting algorithms. During the prediction phase, the machine learning model could be applied at run-time to predict or infer conditions based on the real-time network packets intercepted by monitoring application 920 from embedded application 910. These predictions may be transmitted to management network 300. In some cases, predictions are made on management network 300 itself.

In some embodiments, monitoring application 920 operates on a user interface of an agent instance, such as agent instance 322A or 342A, for example. More specifically, monitoring application 920 may observe the user interface of agent instance 322A to detect pixel changes, color changes, and/or new objects that enter the interface. Changes on the user interface may be correlated to commands sent to embedded application 910 by communication distributor 324, workforce management server 326, and/or back-office case system(s) 350. For example, if communication distributor 324 shifts agent instance 322A from an "available" state to an "in-communication state," the shift may materialize on the user interface of agent instance 322A as an image change. The machine learning models described above may similarly be trained/applied to ascertain changes on the user interface of agent instance 322A.

Figure 10:
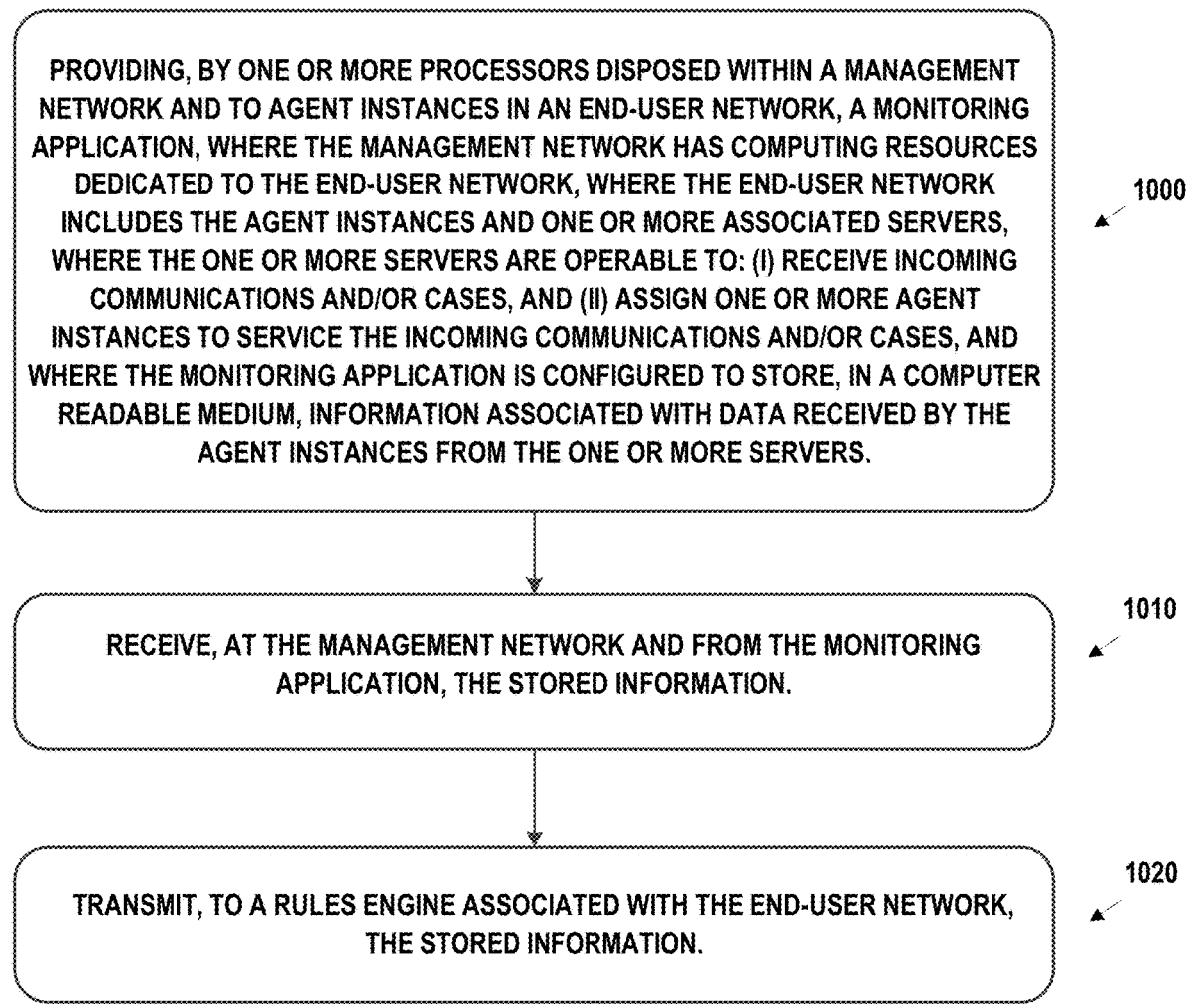
FIG. 10 is a flow chart illustrating an example embodiment.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 involves, providing, by one or more processors disposed within a management network and to agent instances in an end-user network, a monitoring application, where the management network has computing resources dedicated to the end-user network, where the end-user network contains the agent instances and one or more servers (e.g., one or more cloud-based servers associated with the end-user network), where the one or more servers are operable to: (i) receive incoming communications and/or cases, and (ii) assign one or more agent instances to service the incoming communications and/or cases, and where the monitoring application is configured to store, in a computer readable medium, information associated with data received by the agent instances from the one or more servers.

Block 1010 involves receiving, at the management network and from the monitoring application, the stored information.

Block 1020 involves transmitting, to a rules engine associated with the end-user network, the stored information. The transmitted stored information may then be stored at the management network 300, such as in the database devices 306, for later analysis by the recommendation engine 314 using AI algorithms for recommending and/or implementing rules modifications or new rules based on identified patterns and/or trends.

In some embodiments, the one or more servers are managed by an entity distinctly different than the management network.

In some embodiments, the one or more servers include at least one of: a workforce management server, a communication distributor server, or a back-office case system.

In some embodiments, receiving the stored information involves aggregating the stored information across the agent instances, and transmitting the stored information to the rules engine comprises transmitting the aggregated information.

In some embodiments, receiving the stored information comprises the monitoring application observing the data received by the embedded application.

In some embodiments, observing the embedded application involves observing a graphical user interface component of the embedded application.

In some embodiments, observing the embedded application involves determining network traffic associated with the embedded application.

In some embodiments, the monitoring application has access to root privileges of the agent instances.

XI. EXAMPLE AUTOMATED ACTIONS

Every so often, end-user network 320 experiences a deviation from typical operations. For example, communication distributor 324 may undergo an unexpected spike in incoming communication volume. Or back-office case system(s) 350 may undergo an unexpected spike in case volume. Or several agent instances in contact center 322 may suddenly become unavailable. In these situations, an administrative team may act to resolve the deviation on behalf of end-user network 320. Specifically, the administrative team may manually evaluate data from various sources on end-user network 320 to perform appropriate adjustments. Example adjustments may include moving agent instances to service high volume channels, assigning agent instances to additional queues, scheduling additional agent instances, and so on.

Similarly, a back-office administrative team may manually "walk the floor" to determine whether back-office agents are diligently processing cases or not. Adjustments to improve efficiency and increase the volume of work processed could include rewarding back-office personnel appearing to be working hardest and/or reprimanding those back-office personnel appearing to be less productive.

While providing some benefits, administrative teams generally cannot consistently and accurately make adjustments on behalf of end-user network 320. For one, the amount of data generated by end-user network 320 may be immense, and thus, manually evaluating the data becomes unduly time consuming. Similarly, manually evaluating which adjustment to make at what time may be too difficult for the administrative team to handle. In the case of back-office observations, it may be difficult to consistently evaluate any particular back-office agent instance over the course of an entire day, especially as more personnel transition to remote-work scenarios. Rather than deal with these complications, the administrative team may start to increase their tolerance and react less frequently to address deviations, which becomes problematic for end-user network 320 and its underlying enterprise.

The present disclosure provides a technical improvement to management network 300 to address this and other issues. In particular, the embodiments herein provide systems and methods to automatically analyze potentially large volumes of data from end-user network 320, create conditions to evaluate this data, and identify specific actions to automatically take place, such as on end-user network 320, when a deviation occurs. Moreover, the embodiments herein allow management network 300 to optimally target agent instances/subsystems on end-user network 320 that can best address the deviation. Advantageously, end-user network 320 need not spend significant time and resources to address deviations and can instead rely on management network 300 to provide adjustments. Other advantages and improvements are also possible and will be understood from the discussion herein.

Figure 11:
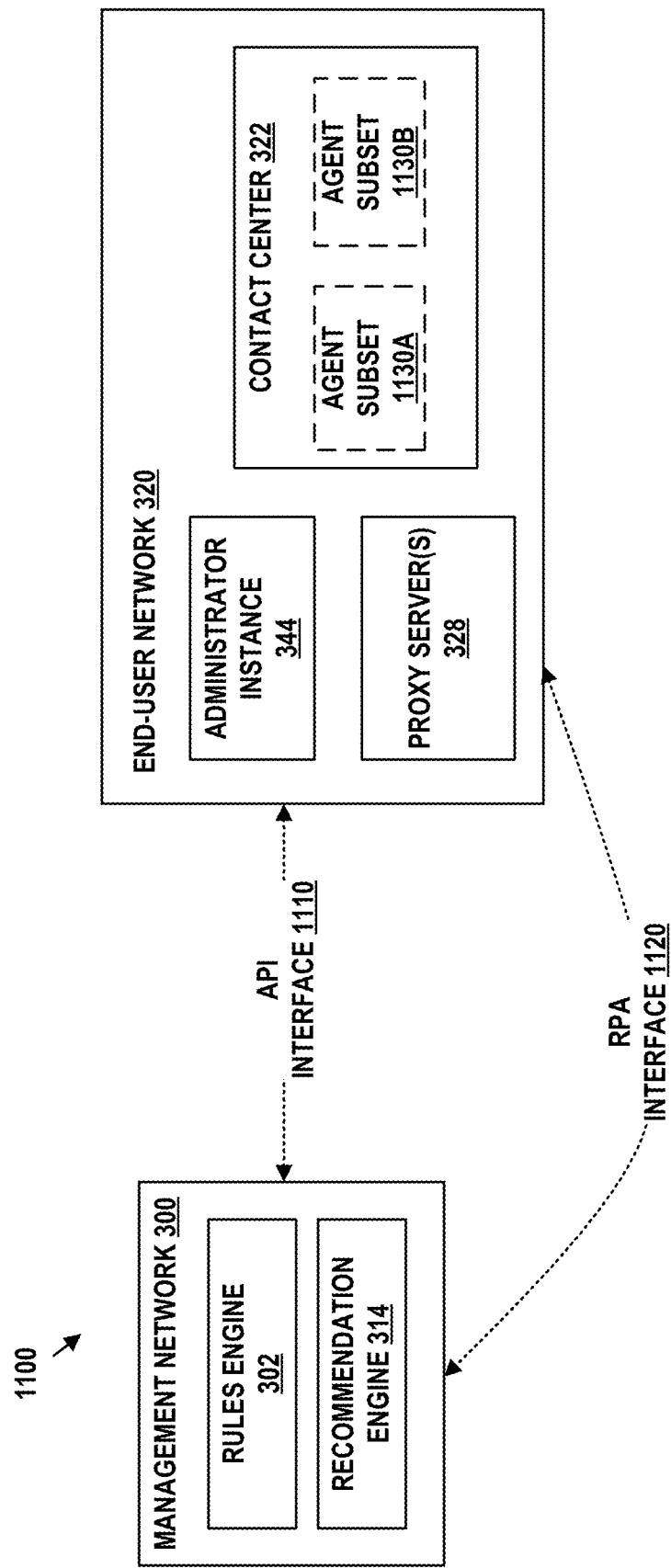
FIG. 11 depicts a network architecture for automated actions, in accordance with example embodiments.

FIG. 11 provides a network architecture 1100 for automated actions, in accordance with example embodiments, and in particular, with example front-office embodiments in a call center. Network architecture 1100 includes management network 300 and end-user network 320.

Management network 300 includes various devices and software services used to administer aspects of end-user network 320. Specifically, management network 300 may use rules engine 302 to identify one or more operations that should be performed on behalf of end-user network 320 and recommendation engine 314 to analyze stored data, including data from end-user network 320, for example, using AI algorithms for recommending and/or implementing rules modifications or new rules based on identified patterns and/or trends. In line with the discussion above, users from end-user network 320 may configure rules engine 302, such as via administrator instance 344, to support custom operations. Users from end-user network 320 may also interact with recommendation engine 314 to approve, review, or adopt rules modifications or new rules. Management network 300 may also include other devices and software applications as described above, but these are omitted from FIG. 11 for purposes of simplicity.

End-user network 320 may be an enterprise network used by an entity for computing and communications tasks, as well as storage of data. To support its capabilities, end-user network 300 may include contact center 322, proxy server(s) 328, and administrator instance 344.

Contact center 322 may be a subnetwork of computing devices (e.g., local or remotely-networked, such as for work-from-home agents) within end-user network 320. As shown in FIG. 11, contact center 322 includes agent subset 1130A and agent subset 1130B, each of which contains one or more agent instances. As briefly described with respect to FIG. 7C, an agent subset (or user group) refers to one or more agent instances with a same categorization. This may include being assigned to the same queue in communication distributor 320, being assigned to the same staffing group (e.g., have the same schedule assignment from workforce management server 326), being within the same geographic region (e.g., Southeast Regional Group), having the same skill set (e.g., Mobile Devices Group), and so on. In examples, agent subset 1130A and agent subset 1130B may be mutually exclusive (e.g., no overlapping agent instances). End-user network 320 may also include other devices and software applications as described above, but these are omitted from FIG. 11 for purposes of simplicity.

Proxy server(s) 328 may facilitate communication and movement of data between end-user network 320 and management network 300. In particular, proxy server(s) 328 may establish and maintain secure communication sessions with one or more computing devices of management network 300, such as rules engine 302. By way of such a session, management network 300 may be able to obtain data from and manage aspects of end-user network 320 and its components.

Administrator instance 344 was described with reference to FIGS. 3A-3C and provides users of end-user network 320 with an interface (e.g., a web portal) to the management network 300. In examples, the administrator instance 344 can be used to configure rules via rules engine 302 and/or to approve, review, or adopt rules modifications or new rules via recommendation engine 314.

During a communication session, end-user network 320 transmits (e.g., in response to a request from management network 300) data to management network 300 and, in turn, management network 300 transmits commands and/or rules recommendations to end-user network 320. Data transmitted from end-user network 320 to management network 300 may include, but is not limited to: queue level statistics from communication distributor 324, schedule information from workforce management server 326, agent state data from communication distributor 324, and so on. In the case of cloud-based services, such information could originate from third-party servers associated with the end-user network 320. Commands transmitted from management network 300 to end-user network 320 may include, but are not limited to, changing the state of the agent instance on communication distributor 324, adding, modifying, or deleting work segments on workforce management server 326, moving an agent instance from one queue on the communication distributor 324 to a different queue in order to handle fluctuating call volume, logging an agent instance out of communication distributor 324, and so on. In a cloud-based configuration, with resources "associated with" the end-user network 320, but hosted elsewhere, at least some of the commands transmitted from management network 300 to end-user network 320 could be transmitted to these resources associated with the end-user network. For example, the management network 300 could modify a work segment on a cloud-based workforce management server 326 by transmitting a command identifying the end-user network 320 over a VPN connection to the cloud-based workforce management server 326. The cloud-based workforce management server 326 would them modify the appropriate work segment on behalf of the end-user network 320, according to some embodiments. Rules recommendations transmitted from management network 300 (i.e., recommendation engine 314) to end-user network 320 may include, but are not limited to, recommendations for modifications to existing rules, review requests for recommended rules modifications, approval requests for recommended rules modifications, notifications of implemented recommended rules modifications, recommendations for new rules, review requests for recommended new rules, approval requests for recommended new rules, notifications of implemented recommended new rules, and others.

In some embodiments, management network 300 transmits commands and/or rules recommendations to end-user network 320 via API interface 1110. API interface 1110 may be provided as part of proxy server(s) 328, communication distributor 324, workforce management server 326, administrator instance 344, or perhaps another computational entity operating on end-user network 320. Management network 300 may transmit commands and/or rules recommendations in the form of a REST, Simple Object Access Protocol (SOAP), or GraphQL request, for example. Other forms, particularly in the case of rules recommendations, may alternatively be used, such as pushed messages, emails, web notifications, and others. In one example, a transmitted rules recommendation is simply a link to an updated web portal page with a particular rules recommendation. In addition, in some examples commands are transmitted via API interface 1110, while rules recommendations are transmitted via another interface (e.g., HTTPS).

In some embodiments, management network 300 transmits commands to end-user network 320 via robotic process automation (RPA) interface 1120. RPA interface 1120 allows management network 300 to transmit commands to end-user network 320 via a GUI. Specifically, RPA interface 1120 may be computer software that emulates actions of a human interacting with a GUI. And since communication distributor 324 or workforce management server 326 may each have user interface components, RPA interface 1120 allows management network 300 to mimic a human clicking and taking actions on these user interface components. This allows management network 300 to transmit commands via the "front end," rather than through the "back-end" as with API interface 1110. In some embodiments, RPA interface 1120 is provided with authentication mechanisms for communication distributor 324 or workforce management server 326 and uses these mechanisms when transmitting commands to end-user network 320.

The example set forth in FIG. 11 was described in the context of a contact center (front office); however, the above discussion would similarly apply to a back office.

Figure 12:
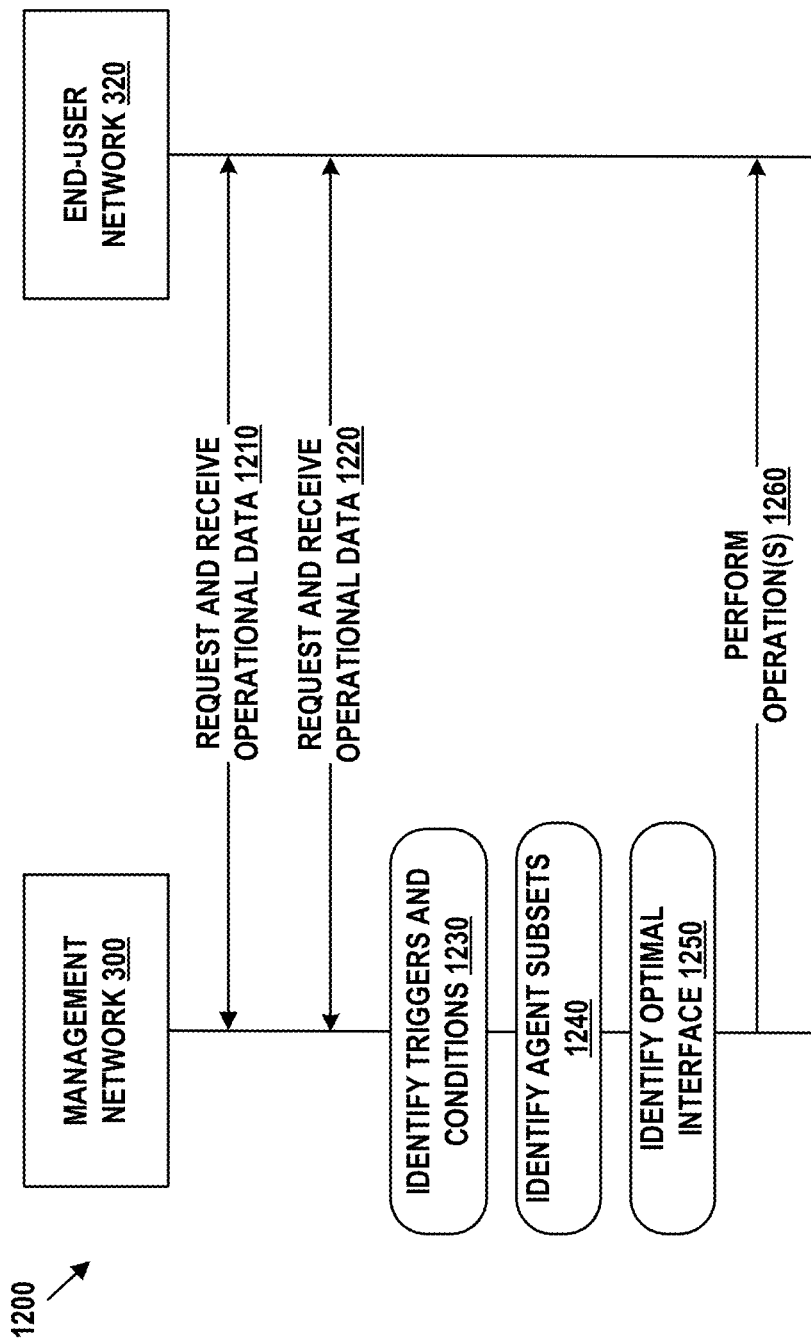
FIG. 12 depicts a message flow diagram, in accordance with example embodiments.

FIG. 12 depicts a message flow diagram for procedure 1200, for the example case of commands from rules engine 302. In particular, procedure 1200 may represent a specific sequence or series of actions that, when performed, allows management network 300 to perform operations on behalf of end-user network 320. By way of example, procedure 1200 may utilize management network 300 and end-user network 320 during operation. However, additional components, steps, or blocks, may be added to procedure 1200.

At step 1210, management network 300 may request and receive data from end-user network 320. This step may include, for example, rules engine 302 requesting and receiving data from proxy server(s) 328 and/or 348, as discussed above with respect to FIG. 6B. The data received by management network 300 may include operational data related to communication distributor 324, workforce management server 326, back-office case system(s) 350, agent monitoring application 610, and/or other entities on end-user network 320, including entities associated with the end-user network 320, but not physically located on the end-user network 320 (i.e., cloud-based entities).

The process of step 1210 may repeat any number of times. Put differently, management network 300 requests and receives data from end-user network 320 in "real-time". For example, at step 1220, management network 300 again requests and receives data from end-user network 320. The time period between real time requests may vary. For example, the time period between step 1210 and step 1220 may be 1 ms, 1 s, or 10 s. Further, management network 300 may request data from different entities on end-user network 320 at different rates. For example, management network 300 may request operational data related to communication distributor 324 every 1 ms while requesting operational data related to workforce management server 326 and back-office case system(s) 350 every 10 s. Other rates are also possible.

At step 1230, the real-time data received from end-user network 320 from steps 1210 and 1220 may be evaluated against the rules defined in rules engine 302. This may include, for example, (i) identifying that a trigger has been fired, (ii) identifying that conditions evaluate to true, and (iii) identifying operations that should be performed on behalf of end-user network 320. Again, step 1230 may represent a continuous step. That is, step 1230 may continuously occur as data is being received from end-user network 320.

At step 1240, management network 300 identifies one or more subsets of agent instances that pertain to the operations identified in step 1230. This may include, for example, identifying subsets that satisfy the logic selection 738 or identifying subsets that were selected via selection menu 734 or selection dropdown 736. Other methods of selecting agent subsets may also exist.

At step 1250, management network 300 identifies the optimal interface through which to transmit the operations identified in step 1230. For example, management network 300 may identify API interface 1110 or RPA interface 1120 as the optimal interface to transmit operations. Optimality can be defined by which interface has the lowest latency, which interface is available (API interface 1110 may be cut off, for example), which interface has connectivity to a targeted recipient, and other metrics. Optimality need not be an extreme characterization (i.e., the best); relative advantage may also be a determining factor to whether one interface is preferred over another.

At step 1260, management network 300 performs operations on behalf of end-user network 320. This may include, for example, performing the operations via the interface identified in step 1250 and/or performing the operations on the agent subsets identified in step 1240. Operations may include changing the operative state of each agent instance in a subset, modifying the work segments of each agent instance in a subset, notifying an agent instance and/or a supervisor instance of a particular trigger, condition, or other item, recognizing good performance of an agent instance (e.g., via "publishing" a commendation item, such as in an enterprise newsletter or intranet page), reprimanding poor performance of an agent instance (e.g., via a performance review entry), and/or other operations.

As a specific example related to procedure 1200, management network 300 may be interested in performing adherence automation for the "Southeast Regional Group" of front-office agent instances 322 on end-user network 320. To do so, management network 300 may, at steps 1210 and 1220, request the state of each agent instance in end-user network 320 every 1 ms. Then at steps 1230 and 1240, management network 300 determines, via rules engine 302, all the agent instances in the Southeast Regional Group that have been in a "hold" state for greater than X seconds (e.g., X=30 s, 60 s). At step 1250, management network 300 identifies that API interface 1110 is optimal. Then at step 1260, management network 300 sends a message, via API interface 1110, to all the identified agent instances in the Southeast Regional Group asking if they require assistance.

Figure 13:
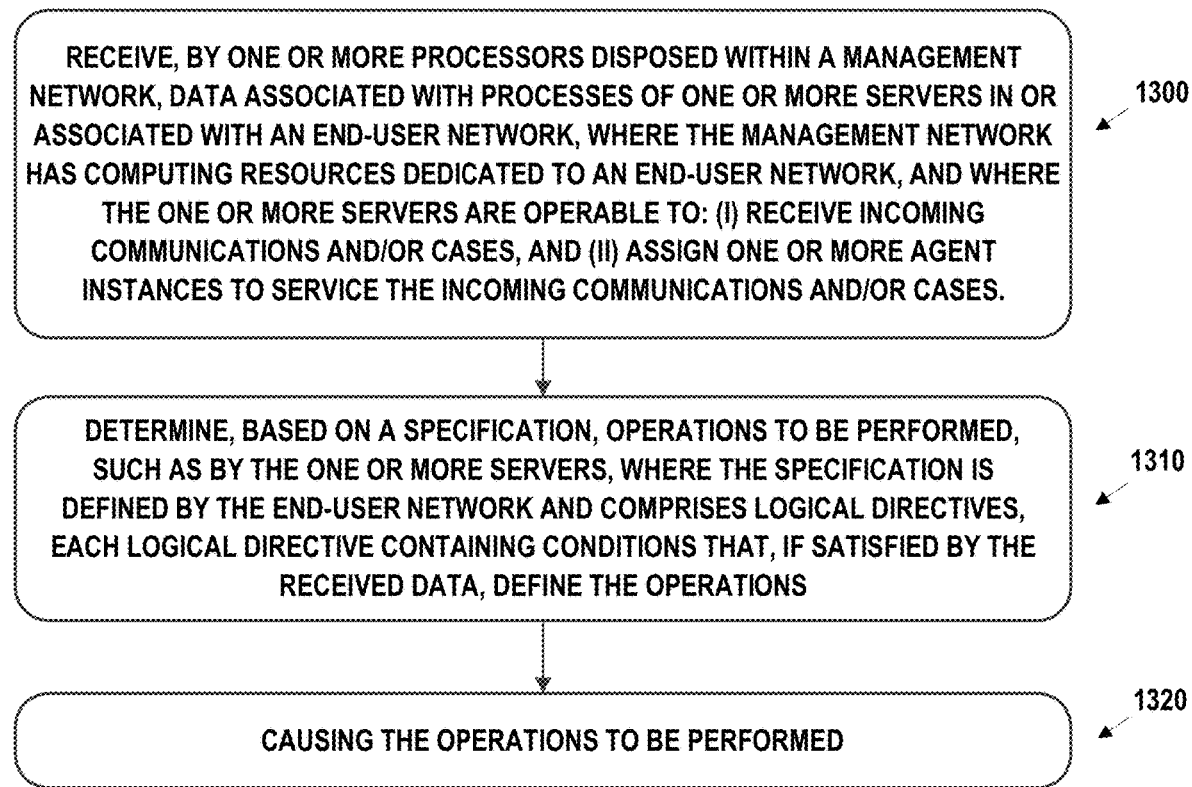
FIG. 13 is a flow chart illustrating an example embodiment.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 involves receiving, by one or more processors disposed within a management network 300, data associated with processes of one or more servers contained in an end-user network 320, including servers associated with the end-user network 320, but not physically located on the end-user network 320 (i.e., cloud-based servers), where the management network 300 has computing resources dedicated to the end-user network 320, where the end-user network 320 contains agent instances, and where the one or more servers are operable to: (i) receive incoming communications and/or cases, and (ii) assign one or more agent instances to service the incoming communications and/or cases. The management network 300 may store the received data for analysis by recommendation engine 314, for example.

Block 1310 involves determining, based on a specification, operations to be performed, such as by the one or more servers, where the specification is defined by the end-user network 320 and comprises logical directives, each directive containing conditions that, if satisfied by the received data, define the operations.

Block 1320 involves causing the operations to be performed. This may include, for example, providing, to the one or more servers (e.g., via commands sent across a VPN connection, in the case of cloud-based servers), the operations.

In some embodiments, the one or more servers comprise a workforce management server, a communication distributor server, and/or a back-office case system, each of which may be local to the end-user network or cloud-based.

In some embodiments, causing the operations to be performed comprises providing the operations to the one or more servers via the management network making an application programming interface (API) request to the one or more servers by way of a wide-area network.

In some embodiments, making the API request to the one or more servers includes making an API request to a proxy server disposed on the end-user network.

In some embodiments, providing the operations comprises the management network logging on to the one or more servers by way of robotic process automation.

In some embodiments, the specification includes an authentication mechanism for the one or more servers and logging on to the one or more servers by way of robotic process automation comprises logging on to the one or more servers in accordance with the authentication mechanism.

In some embodiments, the operations include changing a state of a particular agent instance of the agent instances, modifying an assigned schedule for the particular agent instance, modifying an assigned queue of the particular agent instance, where the operations include providing an alert to the at least one agent instance, providing an alert to a supervisor instance associated with the at least one agent instance, initiating a training plan for the at least one agent instance, penalizing the at least one agent instance, providing a communication acknowledging the at least one agent instance, providing a communication indicating a level of performance of the at least one agent instance, or providing a communication indicating a level of performance of the at least one agent instance relative to other agent instances of the plurality of agent instances.

In some embodiments, the conditions include Boolean expressions.

In some embodiments, the tasks further comprise providing, to a subset of the agent instances, the operations, where a respective agent instance of the agent instances is in the subset if any or all queues serviced by the respective agent instance are in compliance with the specification.

In some embodiments, the tasks further comprise providing, to a subset of the agent instances, the operations, where a respective agent instance of the agent instances is in the subset if any or all staffing groups to which the respective agent instance is associated are in compliance with the specification.

In some embodiments, the one or more servers are managed by an entity distinctly different than the management network.

XII. EXAMPLE SYSTEMS AND METHODS FOR PROCESSING HIGH-VOLUME DATA

As described above, in some embodiments, management network 300 constantly requests data from end-user network 320 to perform actions. This data may be split into individual data segments. For example, every state change in communication distributor 324 and/or back-office case system(s) 350, every work segment change in workforce management server 326, and every action taken by agent instances in front office 322 and/or back office 342 (e.g., as monitored by agent monitoring application 610) may be recorded and transmitted as a data segment to management network 300. Management network 300 may, in turn, store the transmitted data for analysis by recommendation engine 314, for example. Undoubtedly, as end-user network 320 expands and adds additional agent instances, server devices, and so on, the data segments produced by end-user network 320 may start to balloon.

A common solution to handle ballooning data segments is to add additional computing resources (e.g., databases, virtual machines, software applications, and/or other resources) to increase data throughput. These resources are typically leased via public-cloud providers (e.g., AMAZON WEB SERVICES® and MICROSOFT® AZURE®) and can be dynamically scaled to meet data requirements. However, in a non-public-cloud environment, such a solution may be unfeasible. For example, due to privacy concerns, management network 300 may operate using a private-cloud environment, and thus the ability to dynamically scale and meet data demands may be limited. Consequently, other methods to efficiently process high-volume data from end-user network 320 may be desirable.

The present disclosure provides a technical improvement to management network 300 to address this and other issues. In particular, the embodiments herein provide systems and methods to process large volumes of data from end-user network 320 by appropriately assigning time to live (TTL) values to data segments and dropping unnecessary data segments. Advantageously, the embodiments herein may increase the data throughput of management network 300 without scaling computing resources. Other advantages and improvements are also possible and will be understood from the discussion herein.

Figure 14:
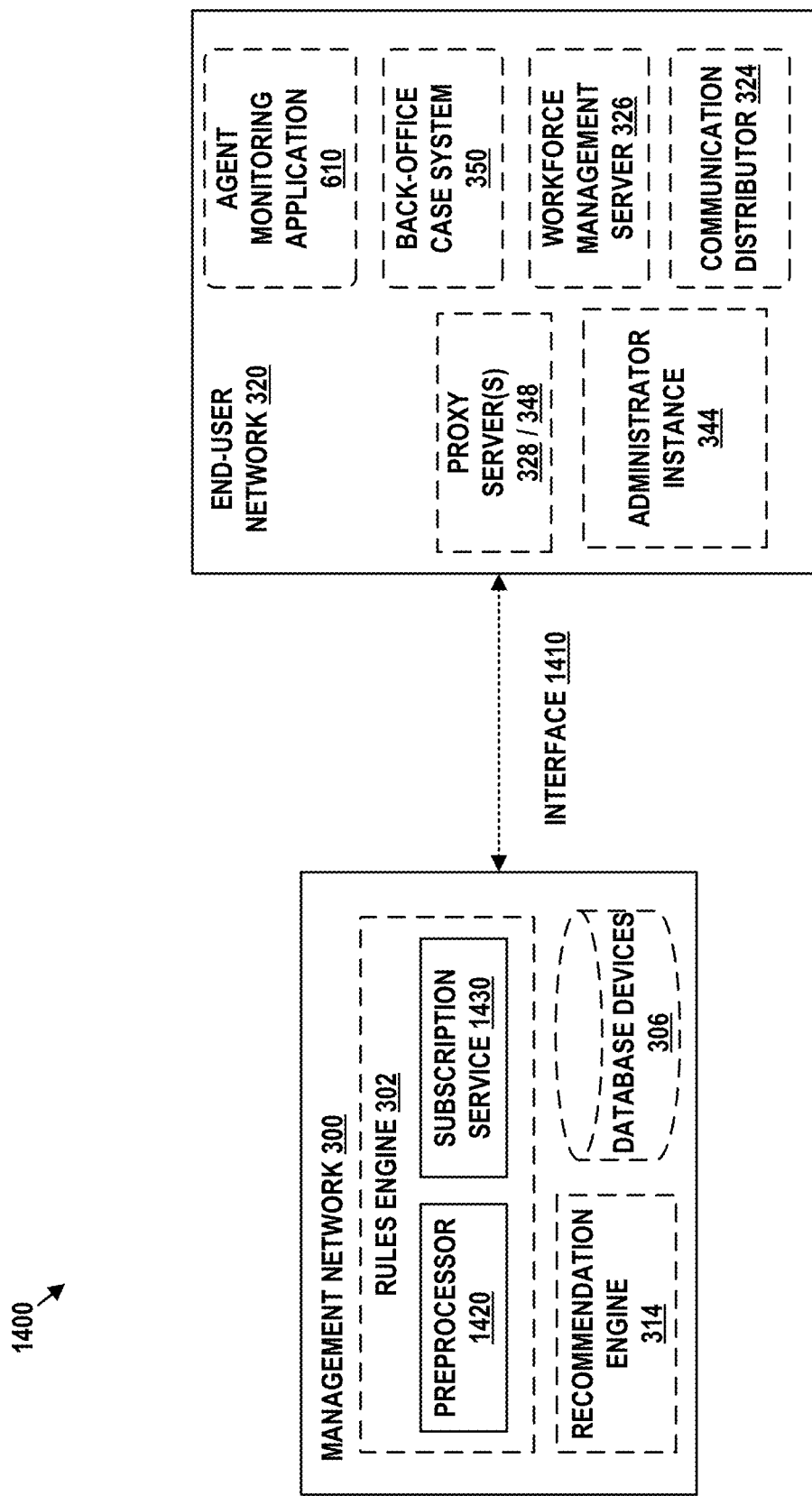
FIG. 14 depicts a network architecture for processing data, in accordance with example embodiments.

FIG. 14 depicts network architecture 1400, in accordance with example embodiments. Network architecture 1400 includes management network 300 and end-user network 320. Communication between management network 300 and end-user network 320 may be established via interface 1410.

End-user network 320 may be an enterprise network used by an entity for computing and communications tasks, as well as storage of data. To support its capabilities, end-user network 320 may include proxy server(s) 328 and/or 348, communication distributor 324, workforce management server 326, back-office case system(s) 350, administrator instance 344, and/or agent monitoring application 610. End-user network 320 may also include other devices and software applications as described above, but these are omitted from FIG. 14 for purposes of simplicity. Additionally or alternatively, end-user network 320 may include one or more servers (or other resources) that are cloud-based. For example, one or more of the communication distributor 324, workforce management server 326, or back-office case system 350 may be associated with the end-user network 320, but physically located and/or owned or managed by a third-party cloud-based vendor.

Management network 300 includes various devices and software services used to administer aspects of end-user network 320. To support its capabilities, management network 300 may include rules engine 302 and recommendation engine 314, according to some examples. Management network 300 may also include other devices and software applications as described above, but these are omitted from FIG. 14 for purposes of simplicity.

As described, rules engine 302 may operate to identify one or more operations that should be performed on behalf of end-user network 320. To do so, rules engine 302 requests and receive data segments from end-user network 320 (e.g., via proxy server(s) 328 and/or 348). Data segments may be individually processed by rules engine 302 to determine whether an operation should be performed. But processing many data segments may be computationally expensive. Therefore, to efficiently process high volume data from end-user network 320, rules engine 302 may utilize preprocessor 1420 and subscription service 1430.

Preprocessor 1420 includes various devices and software services to truncate data pulled into rules engine 302. Specifically, during the execution of a rule in rules engine 302, preprocessor 1420 may discontinue processing a data segment if it determines that the data segment will not qualify for an action at the end of the rule. To do this, preprocessor 1420 examines whether the data segment relates to any trigger or condition specified in rules engine 302. For example, rules engine 302 may not have any triggers or conditions for when an agent instance changes state from "idle" to "on communication" or "processing case." Accordingly, preprocessor 1420 may drop all data segments in which an agent instance changes state from "idle" to "on communication" or "processing case," as those data segments will never result in an action. This saves rules engine 302 computational time, as the data segment no longer needs to be fully processed.

Subscription service 1430 includes various devices and software services to limit that amount of data pulled into rules engine 302. Specifically, subscription service 1430 will only pull data from end-user network 320 if there is a rule associated with that data. For example, if rules engine 302 has no rules pertaining to queue length in communication distributor 324, then subscription service 1430 ensures that no data pertaining to queue length is pulled into management network 300. However, if recommendation engine 314 is configured (e.g., by an administrator of management network 300 or end-user network 320) to analyze data relating to queue length, then such data may still be pulled into management network 300, for possible future analysis by recommendation engine 314.

In general, the idea behind preprocessor 1420 and subscription service 1430 is to truncate/limit unnecessary data to maximize high-volume data flow from end-user network 320 to management network 300. In addition, management network 300 may also be interested in dropping data segments that become "irrelevant," or in other words, a data segment that no longer pertains to any action in rules engine 302. As an example, management network 300 may receive two data segments from the same agent instance. Both data segments may contain a state change for the agent instance (e.g., one data segment contains a state change from "available" to "in-communication" or "processing case," while the other data segment contains a state change from "training" to "available"). Yet, the earlier state change is irrelevant, as it is superseded by the later state change. To account for this, each data segment may be assigned a time to live (TTL) upon being received at management network 300. When the data segment's TTL expires, the data segment may be dropped by management network 300. This prevents network congestion from "older" data segments that are not relevant to management network 300. Once again, however, if recommendation engine 314 is configured (e.g., by an administrator of management network 300 or end-user network 320) to analyze data relating to older (beyond-TTL expiration) data, then such data may be retained by management network 300 (e.g., in databases 306), for possible future analysis by recommendation engine 314. Alternatively, in management networks utilizing a recommendation engine 314, TTL values could be automatically extended (e.g., by a multiple or fixed amount), based on perceived value of the underlying historical data.

Assigning TTL values may be complex. For one, to ensure that dropped data segments will be replaced by new data segments, assignments should account for the rate at which management network 300 receives data. Further, assignments of TTL values should depend on the location of the data segment within management network 300. For example, because of extra memory capacity, database devices 306 may need to drop packets less frequently than rules engine 302. Additionally, the assignments of TTL values should not only be for data ingested by management network 300, but should be similarly applied for commands/operations being transmitted from management network 300 to end-user network 320 or elsewhere. The systems and methods herein provide a technical improvement to management network 300 that can address these issues.

Figure 15:
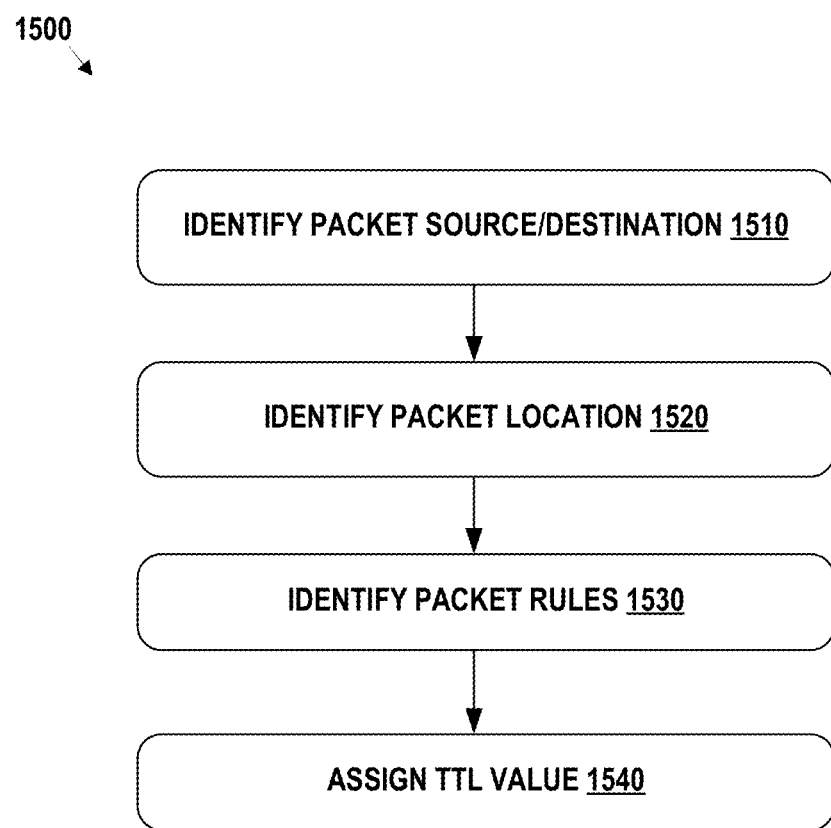
FIG. 15 depicts a method for assigning a time to live (TTL) value, in accordance with example embodiments.

FIG. 15 depicts method 1500, in accordance with example embodiments. In particular, method 1500 may represent a specific sequence or series of actions that, when performed, allows management network 300 to evaluate and assign a TTL value to a data segment. By way of example, method 1500 may be performed by or on any computational entity on management network 300 that wishes to evaluate and assign a TTL value to a data segment, for example, database devices 306, rules engine 302, and/or recommendation engine 314. Moreover, additional components, steps, or blocks, may be added to method 1500 without departing from the scope of the method.

At step 1510, the source/destination of a data segment is identified. For example, the source/destination of a data segment can be identified via the data segment's header (e.g., source/destination IP address from an IP header, a source/destination port from the TCP header, a source/destination MAC address an Ethernet frame header, etc.). As another example, the data segment could contain or be part of a message payload, which can be parsed to glean the source/destination of the data segment. Other methods of identifying the source/destination are also possible.

As an example related to step 1510, if the source/destination of a data packet is communication distributor 324, then a smaller TTL value may be assigned to the data packet, as management network 300 may constantly receive data from/transmit commands to communication distributor 324. On the other hand, if the source/destination of a data packet is workforce management server 326 or back-office case system(s) 350, then a larger TTL value may be assigned to the data packet, as management network 300 may sporadically receive data from/transmit commands to workforce management server 326 and/or back-office case system(s) 350.

At step 1520, the location of the data segment in management network 300 is identified. For example, the data segment may be stored in database devices 306 and/or may be waiting to undergo evaluation in rules engine 302. And if management network 300 utilizes buffers (e.g., message queues) to ensure guaranteed delivery of incoming data and outgoing operations, then the data segment may reside in a buffer on management network 300. Each location may have different TTL needs. For example, buffers may process data quickly; thus, assigning short TTL values to data segments within buffers is preferred. On the other hand, database devices 306 persist data segments for later reporting. Thus, longer TTL values may be assigned to data segments in database devices 306.

At step 1530, custom rules relating to the data segment are identified. Custom rules may be provided by users from end-user network 320. For example, due to an internal business decision, a user may want to quickly expire data received from communication distributor 324.

At step 1540, a TTL value is assigned to the data segment. In particular, step 1540 uses the identifications from steps 1510, 1520, and 1530 to appropriately assign a TTL value to the data segment. In some embodiments, the identifications from steps 1510-1530 may each be weighted to indicate how much each identification should contribute to the assigned TTL value. In some examples, the recommendation engine 314 may extend the TTL by a multiple or fixed amount, to allow for an acceptable amount of historical data to be stored for future analysis by the recommendation engine 314.

FIG. 16 is a flow chart illustrating an example process. The process illustrated by FIG. 16 may be carried out by a computing device, such as computing device 100, and/or a cluster of computing devices, such as server cluster 200. However, the process can be carried out by other types of devices or device subsystems, located locally or remotely (i.e., cloud-based). For example, the process could be carried out by a portable computer, such as a laptop or a tablet device.

The example of FIG. 16 may be simplified by the removal of any one or more of the features shown therein. Further, this example may be combined with features, aspects, and/or implementations of any of the previous figures or as otherwise described herein.

Block 1600 involves receiving, by one or more processors disposed within a management network, data associated with processes of one or more servers in or associated with an end-user network, where each respective component of the data is assigned a time to live (TTL) based on a source or data type of the respective component, where the management network has computing resources dedicated to the end-user network, where the end-user network contains agent instances, and where the one or more servers are operable to: (i) receive incoming communications and/or cases, and (ii) assign one or more agent instances to service the incoming communications and/or cases.

Block 1610 involves determining, based on the received data, operations to be performed by the one or more servers, where during the determining, if the assigned TTL value of a respective component of the data expires, the management network is configured to eliminate the respective component. If the management network has a recommendation engine that analyzes historical data, then the management network could be configured to store the respective component and not eliminate it. Alternatively, the TTL value could be extended by a multiple or fixed amount.

Some embodiments involve transmitting, to the end-user network, the operations, where each respective operation is assigned a TTL value based on an end destination or data type of the respective operation, and where during the transmitting, if the TTL value of the respective operation expires, the management network is configured to eliminate the respective operation.

In some embodiments, the data type of the respective component is determined by a header of the respective component.

In some embodiments, the operations to be performed by the one or more servers are determined based on a specification that is defined by the end-user network, where the specification comprises logical directives, each directive containing conditions that, if satisfied by the received data, define the operations.

In some embodiments, for each respective directive of the logical directives, if a component of the received data will fail to satisfy at least one condition of the conditions associated with the respective directives, the management network is configured to prevent the respective directive from evaluating the component of the received data.

In some embodiments, receiving data associated with the processes of the one or more servers involves the management network requesting, from a proxy server disposed on the end-user network, data associated with at least one directive from the logical directives.

XIII. EXAMPLE SYSTEMS AND METHODS FOR IDENTIFYING VALUABLE ACTIONS

As previously described, end-user network 320 may experience unexpected deviations from typical operations. For example, communication distributor 324 may experience or identify a spike in communication volume or other unexpected service issues may arise. To handle the deviations, management network 300 makes adjustments or takes actions on behalf of end-user network 320. Example adjustments may include moving agent instances to service high volume channels, assigning agent instances to additional queues, scheduling additional agent instances, and so on.

Similarly, in the case of the back office 342 in end-user network 320, there may be a spike in the number of cases to be processed (e.g., returns after the Christmas holiday). Or some back-office agent instances may be frequently using unapproved applications or visiting unapproved sites. Or some back-office agent instances may be flagged as being idle for more than a threshold amount of time during which they are scheduled for active case processing.

In some cases, management network 300 may take one of several actions to handle an unexpected or undesired deviation. For example, management network 300 may deal with the spike in communication volume by scheduling additional agent instances to service the extra communications or by reassigning current agent instances; for example, agent instances that are in a "training" state, to service the extra communications. Each action has its own benefits and drawbacks. For example, scheduling additional agent instances may improve response time, but may result in additional costs for end-user network 320. Reassigning current agent instances may also improve response time but may prevent the reassigned agent instances from receiving critical training modules. It may not be immediately obvious which action provides greater benefit to end-user network 320, and thus ascertaining the optimal action to take at what time can become a challenging task.

The present disclosure provides a technical improvement to management network 300 to address this and other issues. In particular, the embodiments herein provide systems and methods to automatically determine optimal actions for management network 300 to perform on behalf of end-user network 320 at any given time. Advantageously, the embodiments herein allow end-user network 320 to simply specify constraints and objectives, through which management network 300 may use to deduce optimal actions. This saves end-user network 320 time and resources, as there is no longer a need for a manual analysis of optimal actions. Other advantages and improvements are also possible and will be understood from the discussion herein.

Figure 17:
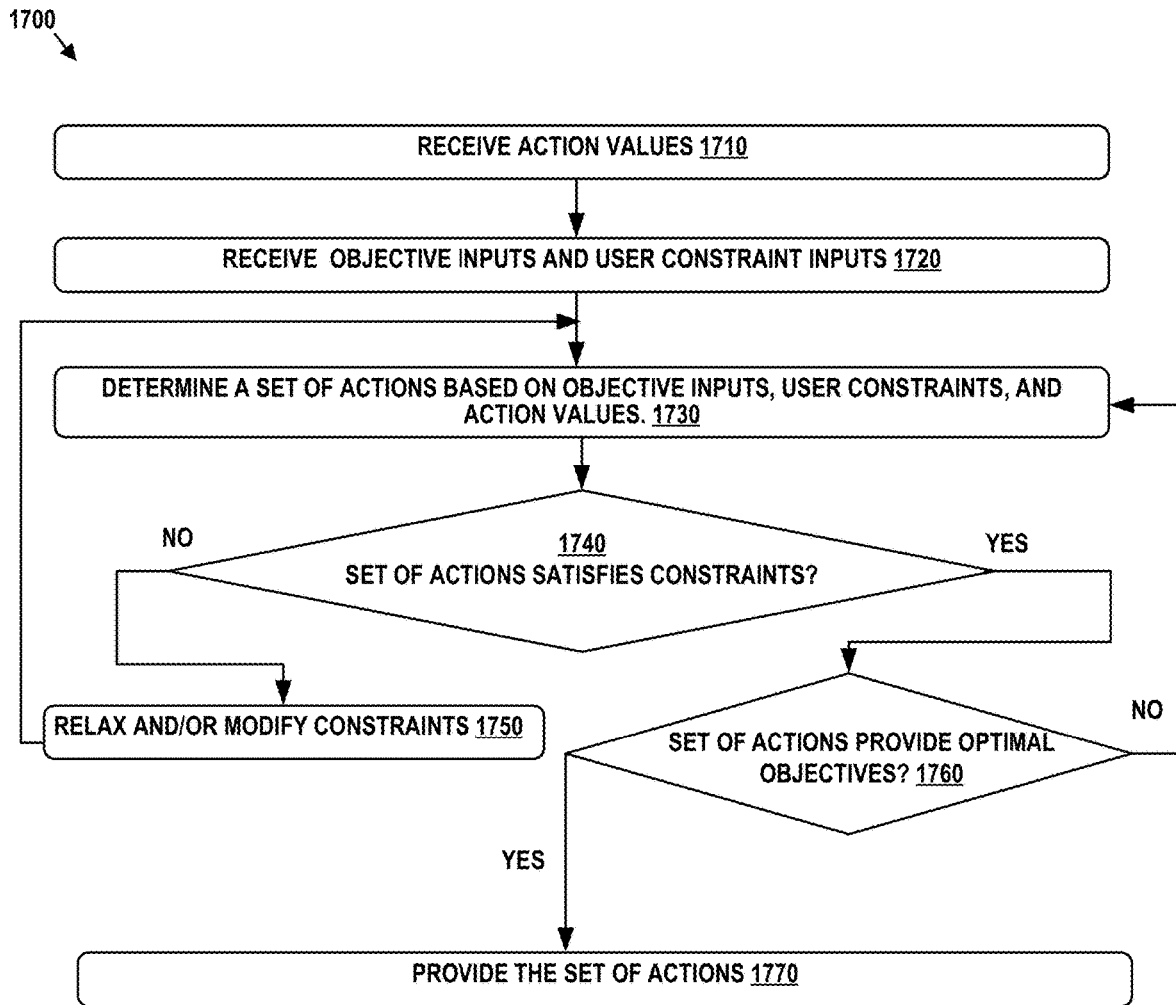
FIG. 17 illustrates a method for determining optimal actions, in accordance with example embodiments.

FIG. 17 is a flowchart of method 1700, in accordance with an example embodiment. Method 1700 may represent a specific sequence or series of actions that, when performed, allows management network 300 to determine a set of optimal actions and/or operations to perform on behalf of end-user network 320. Method 1700 can be carried out by a computing device, such as computing device 100. Moreover, additional components, steps, or blocks may be added to method 1700 without departing from the scope of the method.

Method 1700 can begin at block 1710, where the computing device receives action values. As referred to herein, an action value is a numerical value assigned to an operation performed by management network 300 on behalf of end-user network 320. In particular, the action value indicates how performing that operation affects an operational metric. Operational metrics were previously described with respect to FIGS. 7B and 7C. For example, the operation of moving an agent instance from "available" state to "in-communication" or "processing case" state may be assigned an action value related to a cost metric. More specifically, moving the agent instance from "available" state to "in-communication" or "processing case" may decrease the cost metric by $X.

A single operation and/or action performed by management network 300 may be associated with many action values. Continuing from the example above, the operation of moving an agent instance from "available" state to "in-communication" or "processing case" state may similarly be assigned an action value related to a service level metric. More specifically, moving the agent instance from "available" state to "in-communication" or "processing case" may increase the service level metric by X percent. Other types of action values are also possible.

In some embodiments, management network 300 determines action values by evaluating operations applied on end-user network 320 over a given time period. For example, throughout a given time period, management network 300 may perform operations on behalf of end-user network 320. Management network 300 may track each operation performed. Then at the end of the time period, management network 300 can determine how much each performed action contributed to a final operational metric, thereby deducing action values.

In some embodiments, users from end-user network 320 can specify action values. For example, a user from end-user network 320 can access, via administrator instance 344, one or more web pages and/or web-based applications hosted by management network 300 and provided to authorized users from end-user network 320 upon request. As one example, the user from end-user network 320 can specify that assigning an additional work segment to an agent instance increases a cost metric by $X and decreases an average speed of answer metric by Y seconds.

In some embodiments, management network 300 determines action values by analyzing networks similar to end-user network 320. For example, end-user network 320 may be associated with a logistics enterprise and management network 300 may provide services to other networks associated with logistics enterprises. The idea here is that action values determined for these other networks may be suitable for end-user network 320. In particular, unsupervised learning algorithms, for example k-means clustering, can be used to identify similar networks to end-user network 320.

In some embodiments, management network 300 may have predefined action values. For example, management network 300 may recognize that every time an agent instance changes into a "training" state, the value for a "training completion" metric goes up by Z.

At block 1720, the computing device receives objective inputs and constraint inputs, each of which is discussed in detail below.

Constraint inputs can provide user-specified constraints on operational metrics. Examples of constraints include, but are not limited to, cost-based constraints (e.g., a schedule has to cost less than $X), queue-based constraints (e.g., no queue in communication distributor 324 should have a waiting time of more than Y seconds), agent instance related constraints (the time in which the agent is available to handle customer interactions), service level constraints (e.g., the service level should be between 80-90%), and combinations of these types of constraints (e.g., a schedule has to cost less than $X and also the average waiting time should be less than Z seconds). Other types of constraint inputs are also possible. The set of actions determined by the computing device should be able to meet some, and perhaps all, of the specified constraints.

In some embodiments, when multiple constraints are specified, one or more constraints can be prioritized over other constraints. Constraints can be prioritized based on user input. As an example, constraints can be scored using a multi-valued priority scheme using a 3-2-1-0 scale of priorities, where a high priority for a constraint has a value of 3, a medium priority for a constraint has value of 2, a low priority for a constraint has a value of 1, and a zero priority for a constraint has a value of 0. Other example scales of priorities can use different values than used in the 3-2-1-0 scale.

Objective inputs may include numerical goals for operational metrics. Example objective inputs may include minimizing costs, maximizing a service level of end-user network 320, and so on. In some cases, multiple objectives can be specified. For example, objective inputs can include minimizing costs while maximizing the service level for a specific communication queue in communication distributor 324. In these cases, each of the multiple objectives can be prioritized as similarly described above. Other types of objective inputs are also possible.

At block 1730, the computing device determines a set of actions based on the objective inputs and user constraints from block 1720 and the actions values from block 1710. For example, the computing device may use the objectives, constraints, and action values to formulate an optimization problem. If the constraints solely include linear constraints, then the optimization problem may be solved by a linear programming or other linear solution technique. If the constraints include non-linear constraints, then non-linear techniques may be used to solve the optimization problem.

The optimization problem can be formulated as a maximization problem or a minimization problem.

At block 1740, the computing device determines whether the set of actions determined by block 1730 satisfies all constraints from block 1720. Using the service level example above, the computing device may determine whether the values for the set of actions result in the service level being between 80-90%. This can entail, for example, adding the action value for each action in the set of actions. If the computing device determines that the set of actions does not satisfy the constraints, then method 1700 can proceed to block 1750. Otherwise, computing device 1400 can determine that the set of actions satisfies the constraints, and method 1700 can proceed to block 1760.

At block 1750, the computing device can modify/relax constraints in order to satisfy the unsatisfied constraints specified in block 1720. Upon completion of block 1750, method 1700 can proceed back to block 1730 to determine a new set of actions using the modified/relaxed constraints. Generally speaking, blocks 1730, 1740, and 1750 form a feedback loop by gradually modifying/relaxing constraints until all unsatisfied constraints become satisfied by the set of actions.

In some embodiments, priority information can be used to relax constraints. For example, if no set of actions can be determined that satisfy all constraints indicated in block 1720, then constraints associated with relatively-low-priority tasks can be relaxed and/or eliminated. Then, a search for a set of actions that satisfy the now-relaxed constraints can be performed.

In some embodiments, numerical techniques can be used to relax constraints. For example, if eliminating a cost-based constraint allows searching through 50 additional sets of actions, while eliminating a service-level-based constraint allows searching through 75 additional sets of actions (or vice versa), then eliminating or relaxing the cost-based constraint can be prioritized over eliminating or relaxing the service-level-based constraint (or vice versa).

At block 1760, the computing device determines whether the set of actions determined by block 1730 provides the optimal objective value for the objective input(s) from block 1720. For example, the computing device can compare the set of actions to a previously stored set of actions to determine whether the objective value for the objective input is more optimal than the previously stored set of actions. As another example, the computing device can compare the objective value for the objective input to a predefined threshold value. If the computing device determines that the set of actions provides the optimal objective value, then method 1700 can proceed to block 1770. Otherwise, method 1700 can proceed back to block 1730 to determine a new set of actions. Generally speaking, blocks 1730, 1740, and 1760 form another feedback loop by gradually determining new sets of actions until a minimum/maximum objective(s) is achieved. In some embodiments, the computing device may keep executing the feedback loop of blocks 1730, 1740, and 1760 for a predefined number of iterations and may exit the loop by proceeding to block 1770 on the last iteration.

At block 1770, the computing device can provide the set of actions. This can involve, for example, providing the set of actions to rules engine 302 to use in performing operations on behalf of end-user network 320.

Figure 18:
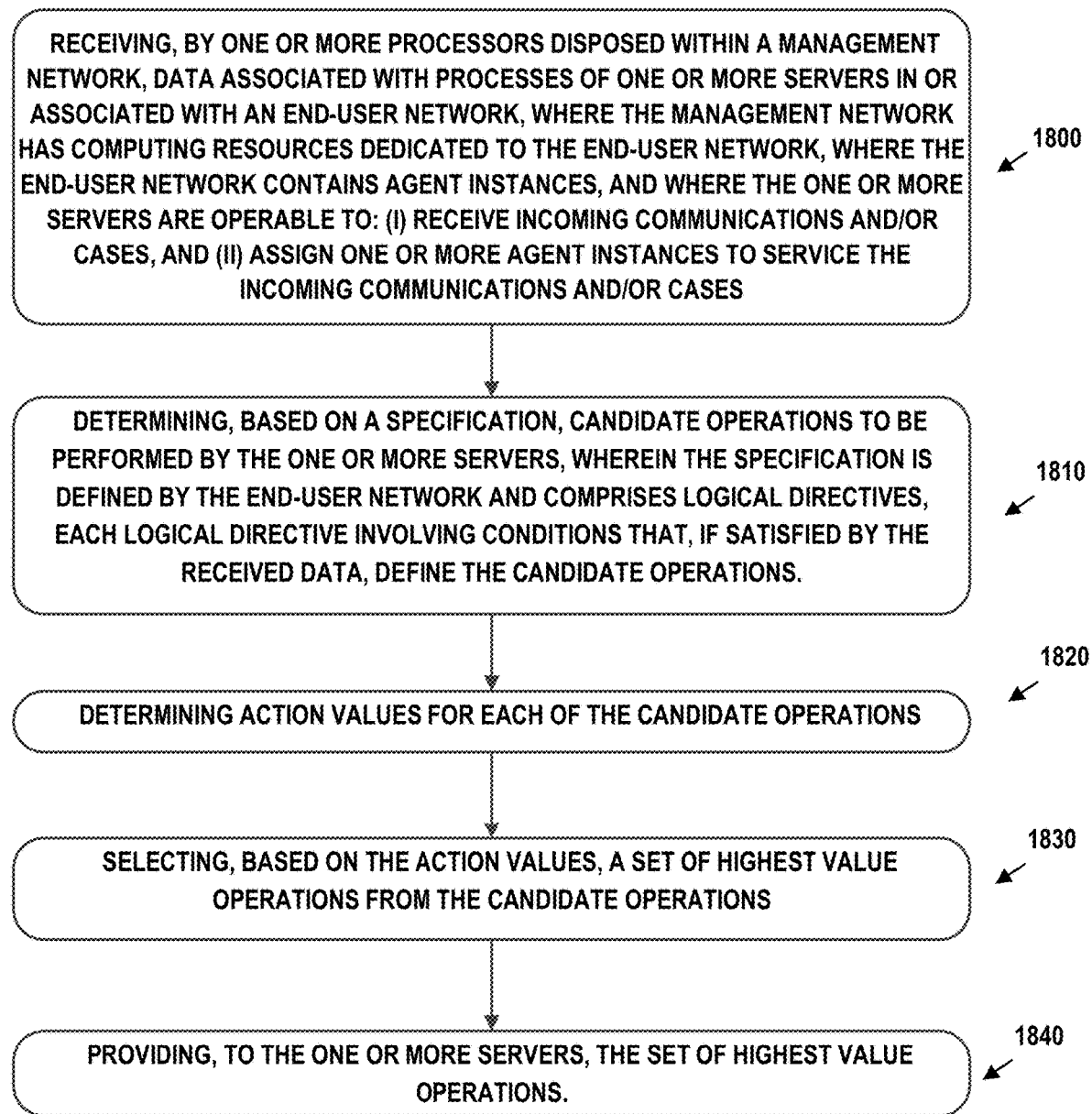
FIG. 18 is a flow chart illustrating an example embodiment.

FIG. 18 is a flow chart illustrating an example embodiment. The process illustrated by FIG. 18 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 18 may be simplified by the removal of any one or more of the features shown therein. Further, these embodiments may be combined with features, aspects, and/or implementations of any of the previous figures or otherwise described herein.

Block 1800 involves receiving, by one or more processors disposed within a management network, data associated with processes of one or more servers in or associated with (e.g., as a cloud-based service) an end-user network, where the management network has computing resources dedicated to the end-user network, where the end-user network contains agent instances, and where the one or more servers are operable to: (i) receive incoming communications and/or cases, and (ii) assign one or more agent instances to service the incoming communications and/or cases.

Block 1810 involves determining, based on a specification, candidate operations to be performed by the one or more servers, where the specification is defined by the end-user network and comprises logical directives, each directive involving conditions that, if satisfied by the received data, define the candidate operations Block 1820 involves determining action values for each of the candidate operations.

Block 1830 involves selecting, based on the action values, a set of highest value operations from the candidate operations, and Block 1840 involves providing, to the one or more servers, the set of highest value operations.

XIV. EXAMPLE COACHING SYSTEMS AND METHODS

As previously described, end-user network 320 may experience unexpected deviations from typical operations. For example, communication distributor 324 may experience or identify a spike in communication volume, back-office case system(s) 350 may experience or identify a spike in case volume, or other unexpected service issues may arise. End-user network 320 can make internal adjustments to handle these deviations. Example adjustments may include moving agent instances to service high volume channels, assigning agent instances to additional queues, scheduling additional agent instances, and so on.

Sometimes, the adjustments made by end-user network 320 adversely impact pre-scheduled events (e.g., events that are scheduled to occur at a specific time in the future). An example of a pre-scheduled event is a coaching session, which, as used herein, refers to a training session for agent instances on end-user network 320. Coaching sessions may depend on both (i) the availability of a supervisor instance (a computing device and/or system within end-user network 320 that is assigned supervised/administrative privileges and/or granted greater authoritative rights on end-user network 320 than agent instances; such a supervisor instance may be, but need not be, the same as administrator instance 344) from end-user network 320 to administer a coaching session, and (ii) the availability of one or more agent instances to receive a coaching session. In examples, coaching sessions involve either a single agent instance communicating with a supervisor instance or multiple agent instances (perhaps an agent subset or user group as discussed in FIG. 11) communicating with a supervisor instance.

To ensure the availability of agent instances and supervisor instances, end-user network 320 may pre-schedule coaching sessions based on forecasted communication and/or case volume and/or forecasted work segments for agent instances. But if end-user network 320 experiences a higher communication volume than forecasted, the pre-scheduled coaching sessions may be rescheduled or even canceled so that the agent instances can remain available to service the additional communications and/or cases. This negatively impacts the ability for end-user network 320 to consistently deliver coaching sessions to agent instances.

To address this issue, end-user network 320 may add auxiliary agent instances, with the notion that the auxiliary agent instances can handle the additional incoming communications while other agent instances undergo coaching sessions. But this solution results in an unnecessary cost for end-user network 320.

The present disclosure provides a technical improvement to management network 300 to address this and other issues. In particular, the embodiments herein provide systems and methods to automatically determine optimal times to initiate coaching sessions with agent instances. The embodiments allow end-user network 320 to provide one or more conditions to management network 300, such as via administrator instance 344, which uses the conditions to (i) determine whether a supervisor instance from end-user network 320 is available to administer a coaching session, (ii) determine segments of idle time for agent instances on end-user network 320, and (iii) initiate coaching sessions during the identified idle time segments, either to individual agent instances or groups of agent instances. This saves end-user network 320 time and resources, as there is no longer a need to allocate auxiliary agent instances. Furthermore, the challenge of having to pre-schedule/cancel coaching sessions at various times is alleviated. Other advantages and improvements are also possible and will be understood from the discussion herein.

Figure 19:
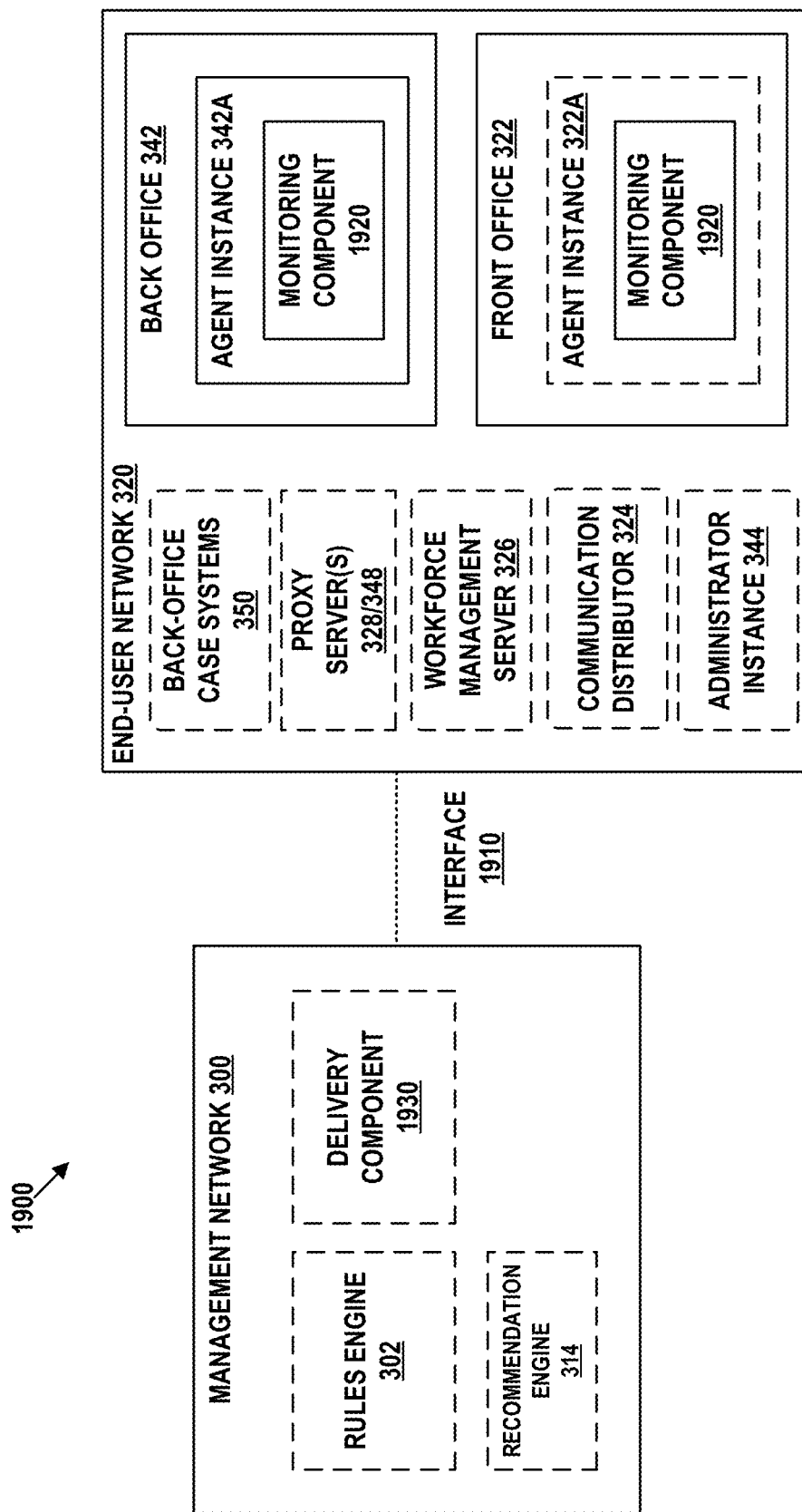
FIG. 19 depicts a network architecture, in accordance with example embodiments.

FIG. 19 depicts network architecture 1900, in accordance with example embodiments. Network architecture 1900 includes management network 300 and end-user network 320. Communication between management network 300 and end-user network 320 may be established via interface 1910.

End-user network 320 may be an enterprise network used by an entity for computing and communications tasks, as well as storage of data. To support its capabilities, end-user network 320 may include front office 322, back office 342, communication distributor 324, workforce management server 326, back-office case system(s) 350, administrator instance 344, and proxy server(s) 328. While the communication distributor 324, workforce management server 326, and back-office case systems 350 illustrated in FIG. 19 are shown in the box delineating end-user network 320, one or more of these components may be cloud-based and associated with the end-user network 320, but physically located elsewhere (e.g., accessible via one or more VPN connections). Front office 322 may include one or more front-office agent instances, including front-office agent instance 322A, and back office 342 may include one or more agent instances, including back-office agent instance 342A. While the following example is described with respect to the front-office agent instance 322A, in reality, the embodiments described herein can apply to any or all agent instances, including back-office agent instances, in end-user network 320.

As shown in FIG. 19, agent instance 322A includes monitoring component 1920, which may be a monitoring application to monitor an embedded application, as described with reference to FIG. 9. The monitoring component 1920 may monitor the communications of agent instance 322A with customers to determine if agent instance 322A is available for other activities (e.g., a coaching session). In the case of a back-office agent instance, monitoring component 1920 may monitor applications and/or sites used by the back-office agent instance in processing a case, to determine if the back-office agent instance is available for other activities. Monitoring component may act similarly to monitoring application 920 as described above with respect to FIG. 9. Monitoring component 1920 may transmit data from its activities to management network 300 via interface 1910.

End-user network 320 may also include other devices and software applications as described above, but these are omitted from FIG. 19 for purposes of simplicity.

Management network 300 includes various devices and software services used to administer aspects of end-user network 320. To support its capabilities, management network 300 may include rules engine 302, recommendation engine 314, and delivery component 1930. Management network 300 may also include other devices and software applications as described above, but these are omitted from FIG. 19 for purposes of simplicity.

As described above, rules engine 302 may continuously receive data from the operations of communication distributor 324, workforce management server 326, or back-office case system(s) 350 (e.g., via proxy server(s) 328 or one or more VPN connections). Alternatively or additionally, rules engine 302 may continuously receive data via monitoring component 1920 (or monitoring application 610 or 920). With the received data, rules engine 302 may determine a current state of end-user network 320. As an example, the current state of end-user network 320 may include information on the current agent state and/or current work segment for each agent instance in end-user network 320. Rules engine 302 may also receive one or more conditions entered by users from end-user network 320. Conditions were described above with respect to FIG. 7. With these conditions and the current state of end-user network 320, rules engine 302 can identify one or more agent instances that are currently available to receive a coaching session. For example, a condition may specify that all agent instances currently in an "on-break" or "idle" state are eligible to receive a coaching session.

Additionally, rules engine 302 may receive input data from a supervisor instance of end-user network 320. The input data may identify whether the supervisor instance can administer a coaching session. Supervisor instance may additionally be used to configure rules via rules engine 302, such as by accessing (e.g., via administrator instance 344) a web portal hosted by the rules engine 302 or another component on management network 300. Similarly, Supervisor instance may communicate with recommendation engine 314 (e.g., via administrative instance 344) regarding recommended rules modifications and/or new recommended rules.

Delivery component 1930 can initiate a time-bound coaching session between (i) supervisor instances that are available to administer a coaching session and (ii) agent instances that are available to receive a coaching session. As described above, coaching sessions can be initiated between either a single agent instance and a supervisor instance or multiple agent instances (perhaps an agent subset or user group as discussed in FIG. 11) and a supervisor instance. In some embodiments, the time-bound coaching session includes an HTTP session, a TCP session, a Session Initiation Protocol (SIP) session, a chat session, or a video session. The time-bound coaching session may span a period of 10 minutes, 15 minutes, or 30 minutes, among other possibilities.

Figure 20:
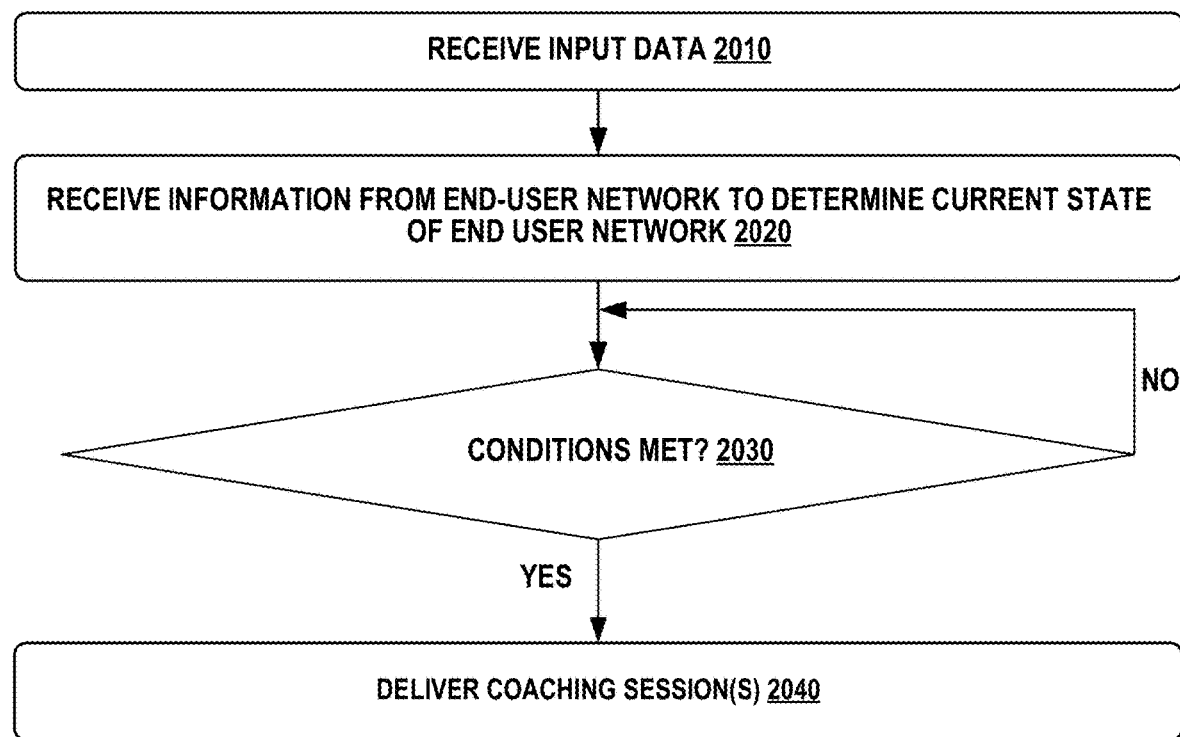
FIG. 20 illustrates a method for delivering coaching sessions, in accordance with example embodiments.

FIG. 20 is a flowchart of method 2000, in accordance with an example embodiment. Method 2000 may represent a specific sequence or series of actions that, when performed, allows management network 300 to schedule coaching sessions for agent instances on end-user network 320. Method 2000 can be carried out by a computing device, such as computing device 100. Moreover, additional components, steps, or blocks, may be added to method 2000 without departing from the scope of the method.

Method 2000 can begin at block 2010, when the computing device receives input data, perhaps from a user from end-user network 320. The input data may be entered via a GUI, such as at administrator instance 344, similar to the GUIs described in FIGS. 7A-7P. The input data may include one or more conditions specifying, for example, (i) which agent instances on end-user network 320 are due for coaching, (ii) how much coaching time each agent instance needs, (iii) a priority order in which agent instances need to be coached (e.g., high priority, medium priority, low priority), (iv) under what conditions agent instances can receive coaching sessions, and (v) whether any supervisor instances are available to administer a coaching session.

As an example related to item (iv) in the previous paragraph, the input data may indicate that an agent instance must be in an available state and not currently handling a communication in order to receive a coaching session. As another example related to item (iv), the input data may indicate that an agent instance's upcoming work segment must be available in order to receive a coaching session, meaning that the agent instance should not be scheduled for an upcoming break or other conflicting activity. As yet another example related to item (iv), the input data may indicate a minimum time between coaching sessions to ensure that a particular agent instance does not receive two coaching sessions back-to-back. With this, the computing device can offer a coaching session to another agent rather than repeat a session with a particular agent instance. As even yet another example related to item (iv), the input data may indicate a maximum number of concurrent coaching sessions that are allowed at any given time. Other conditions for item (iv) (and other examples set forth above) are also possible.

At block 2020, the computing device receives information from one or more systems on end-user network 320 (which may include one or more cloud-based systems associated with, but not physically located on, end-user network 320) to determine a current state of end-user network 320. For example, the computing device may receive data from communication distributor 324, workforce management server 326, back-office case system(s) 350, and/or monitoring component 1920 (or monitoring application 610 or 920), as described above, to determine the work segments/agent states for each agent instance on end-user network 320.

At block 2030, the computing device determines whether the conditions described with reference to block 2010 (for example, those specified in example (iv), above), are met by the current state determined in block 2020. If the conditions are met, method 2000 can proceed to block 2040. Otherwise, method 2000 may remain at block 2030 until the current state of end-user network 320 meets the conditions specified in block 2010.

In some embodiments, the decision at block 2030 may also depend on whether a supervisor instance is available to administer a coaching session. For example, if no supervisor instances are available, method 2000 may remain at block 2030 until a supervisor instance is available.

At block 2040, the computing device delivers, to the one or more agent instances specified from item (i) of block 2010, a coaching session. Delivering a coaching session may include providing a communication interface between the one or more agent instance and a supervisor instance from end-user network 320. In some embodiments, if only a certain number of coaching sessions can be delivered, block 2040 may involve delivering a coaching session to the highest priority agent instances, as specified by item (iii) in block 2010. In some embodiments, upon being delivered a coaching session, the one or more agent instances are automatically placed in a coaching auxiliary agent state on communication distributor 324 such that they do not receive any new communications for a prescribed period of time.

In some embodiments, an agent instance may need an immediate coaching session. In such a case, a supervisor instance from end-user network 320 may bypass the conditions of specified from item (iv) of block 2010 and may deliver a coaching session directly to the agent instance at issue.

Figure 21:
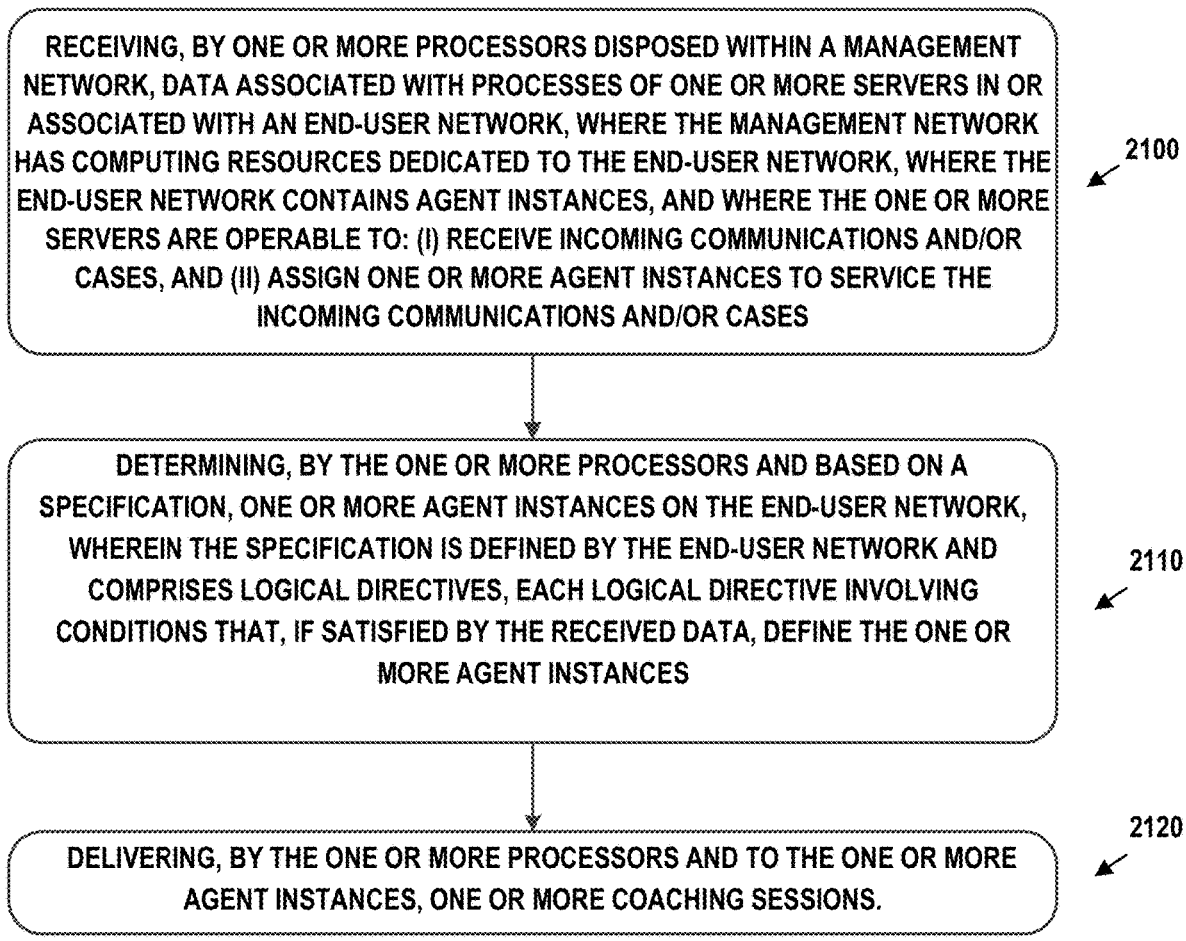
FIG. 21 is a flow chart illustrating an example embodiment.

FIG. 21 is a flow chart illustrating an example embodiment. The process illustrated by FIG. 21 may be carried out by a computing device, such as computing device 100, and/or a cluster of computing devices, such as server cluster 200. However, the process can be carried out by other types of devices or device subsystems, either local or cloud-based. For example, the process could be carried out by a portable computer, such as a laptop or a tablet device.

The embodiments of FIG. 21 may be simplified by the removal of any one or more of the features shown therein. Further, these embodiments may be combined with features, aspects, and/or implementations of any of the previous figures or otherwise described herein.

Block 2100 involves receiving, by one or more processors disposed within a management network, data associated with processes of one or more servers in or associated with an end-user network, where the management network has computing resources dedicated to the end-user network, where the end-user network contains agent instances, and where the one or more servers are operable to: (i) receive incoming communications and/or cases, and (ii) assign one or more agent instances to service the incoming communications and/or cases.

Block 2110 involves determining, by the one or more processors and based on a specification, one or more agent instances on the end-user network, where the specification is defined by the end-user network and comprises logical directives, each directive involving conditions that, if satisfied by the received data, define the one or more agent instances.

Block 2120 involves delivering, by the one or more processors and to the one or more agent instances, one or more coaching sessions.

In some embodiments, delivering the one or more coaching sessions comprises initiating one or more communication sessions between the one or more agent instances and one or more available supervisor instances disposed on the end-user network.

In some embodiments, the specification further comprises priority values for each of the one or more agent instances, and wherein communication sessions are only initiated between the one or more available supervisors and agent instances with high priority values.

In some embodiments, at least one of the conditions comprises a work segment condition, wherein an agent instance is defined by the work segment condition if the agent instance is in an available work segment.

In some embodiments, at least one of the conditions comprises a state condition, wherein an agent instance is defined by the state condition if the agent instance is currently in an available state.

In some embodiments, at least one of the conditions comprises a communication and/or case condition, wherein an agent instance is defined by the communication condition if the agent instance is not currently handling an incoming communication or processing a case.

In some embodiments, upon being delivered a coaching session, an agent instance becomes unavailable to receive incoming communications.

In some embodiments, upon termination of a coaching session, an agent instance becomes available to receive incoming communications.

XV. EXAMPLE SYSTEMS AND METHODS FOR PREDICTING AND RESPONDING TO BURNOUT AND ATTRITION

As discussed above, burnout pervades contact center agents for a variety of reasons relating to work-related and non-work-related stressors, innate difficulties and expectations associated with being a contact center agent, and constant micromanagement of contact center agents by supervisors and support software. Agents experiencing or at risk of burnout are prime candidates for attrition—some agents choose to resign or quit the contact center as a way to improve mental well-being. But burnout and attrition also adversely impact enterprises and their contact centers. For example, burnt-out agents are more likely to make mistakes and be pessimistic, irritable, and less productive, impacting customer service performance. Agent attrition is costly to contact centers, as new agents must be hired and trained to replace departing agents. While many of the example technologies described above relate to improving efficiency and performance without focusing on agent well-being, the following description sets forth technical computer-implemented solutions for predicting, characterizing, and responding to contact center agent burnout and attrition risk.

Figure 25:
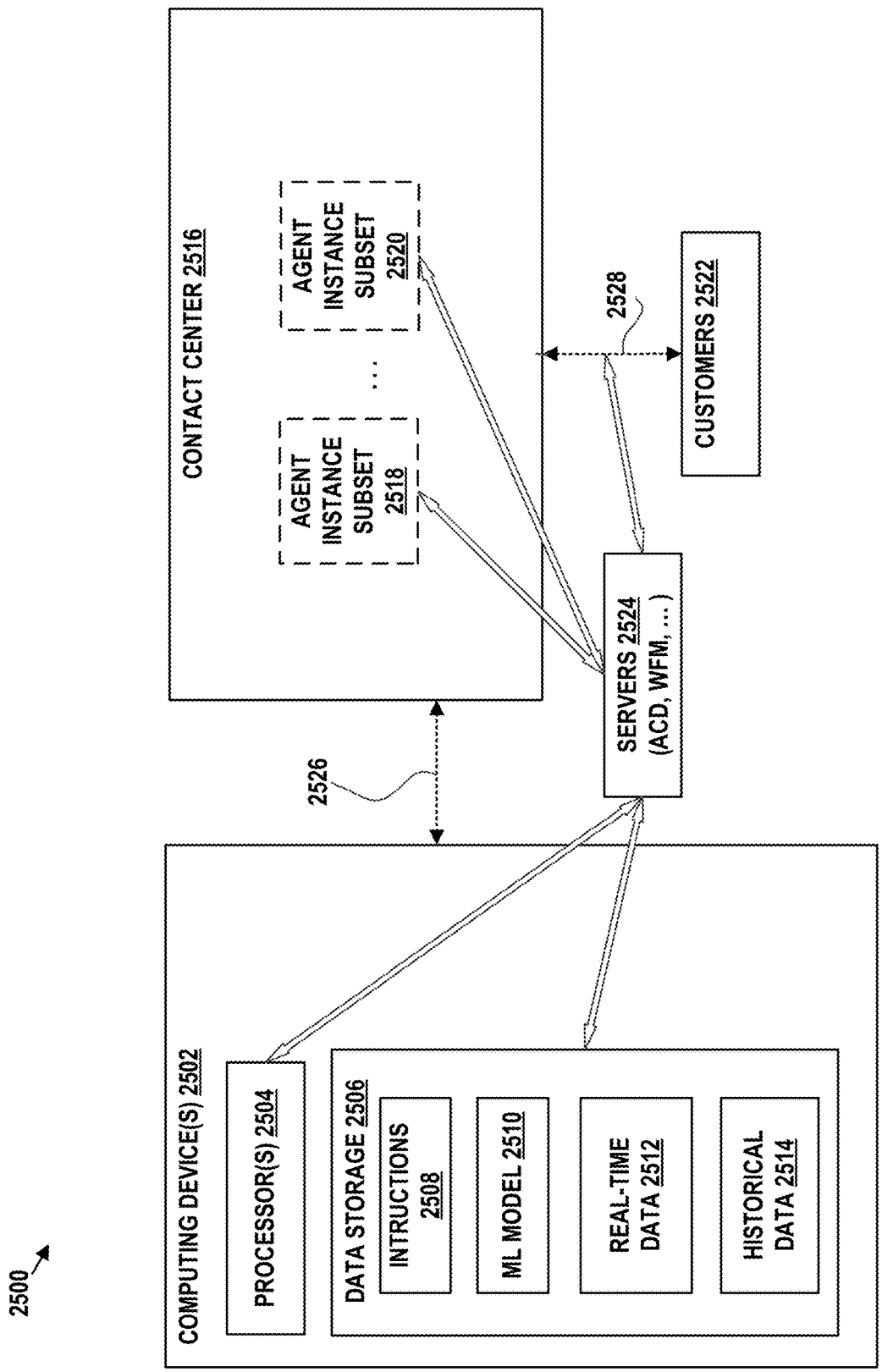
FIG. 25 is a simplified block diagram illustrating a computing system for managing a contact center, including predicting burnout risk, in accordance with an example embodiment.

FIG. 25 is a simplified block diagram illustrating a computing system 2500 for managing a contact center, according to an example embodiment. The computing system 2500 includes at least one computing device 2502 having at least one processor 2504 and accessible data storage 2506. Details regarding the computing device 2502, processor 2504, and data storage 2506 may be found elsewhere herein. For example, the computing device 2502 may comprise or compose part of a management network, end-user network, or other unitary or distributed computing system or network. The data storage 2506 includes a non-transitory computer readable medium storing one or more of the following: (a) instructions 2508 for execution by the at least one processor 2504 to allow for performing computerized tasks, (b) at least one machine learning model 2510 (e.g., a "trained" machine learning model—see description accompanying FIG. 9, for example), (c) real-time data 2512 (e.g., received and stored in a buffer, cache, or memory, or perhaps aggregated over a time period), and (d) historical data 2514.

The computing system 2500 additionally includes a contact center 2516 having a plurality of agents associated with a corresponding plurality of agent instances (i.e., computing devices). As illustrated, the contact center 2516 has a first agent instance subset 2518 and a second agent instance subset 2520. The contact center 2516 could realistically include thousands of agents and agent instances to service a multiplicity of communications 2528 with a large number customers 2522. Servers 2524, which may include automatic communication distributors (ACDs) workforce management (WFM) system servers and others, are shown as being communicatively coupled with communications 2528, the first agent instance subset 2518, the second agent instance subset 2520, the processor(s) 2504, and the data storage 2506 to represent, in simplified/summary form, the server functionality described elsewhere herein. In some examples, the computing device(s) 2502 could manage contact centers for two or more unrelated enterprises. In other examples, the computing device(s) 2502 is administered by the same enterprise serviced by the contact center 2516.

In accordance with an example embodiment, the at least one processor 2504 is configured to execute instructions 2508 stored on at least one non-transitory computer readable medium (e.g., the data storage 2506) to perform computerized tasks. While the following tasks are described in a particular order, other orderings may be possible as well. Example tasks outlined below are shown and described as a method 2600 for managing a contact center, illustrated in FIG. 26. Thus, FIGS. 25 and 26 can be referenced in tandem for the following described example embodiment.

Figure 26:
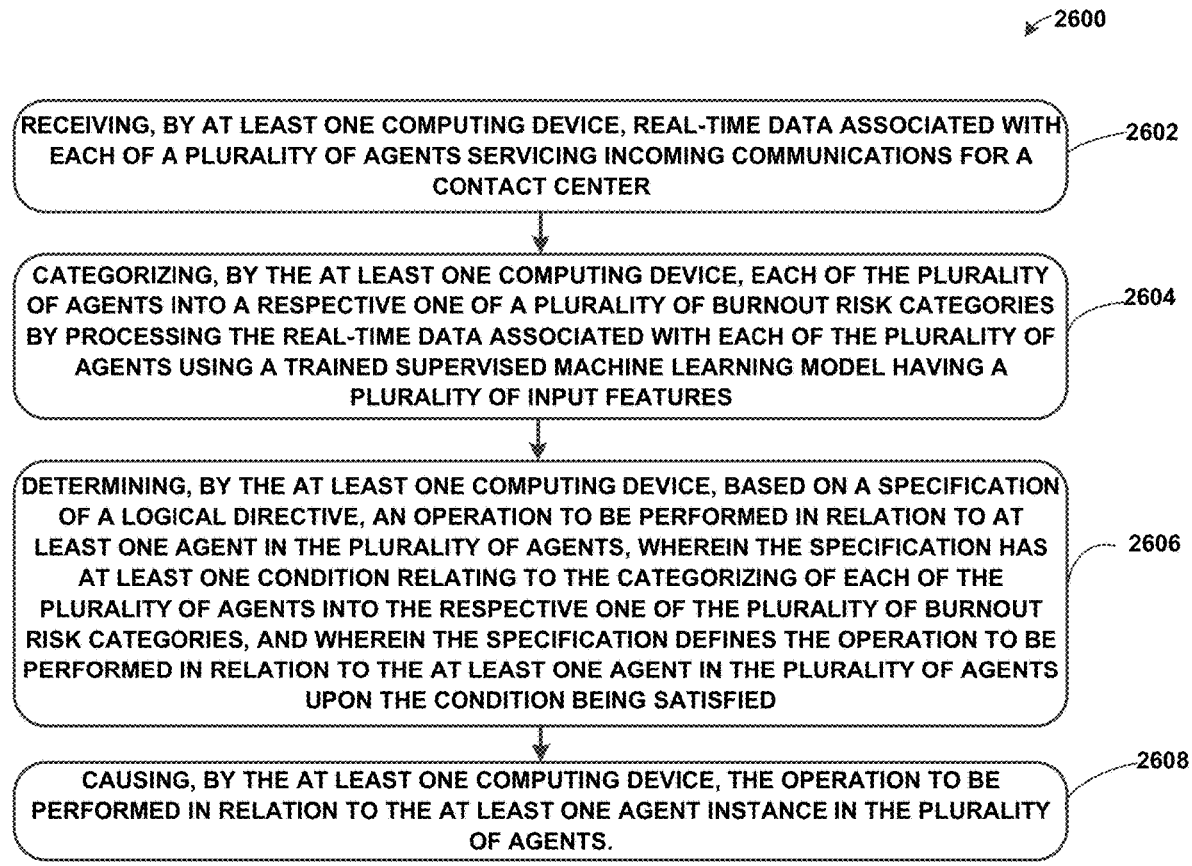
FIG. 26 is a simplified flow diagram illustrating a method for managing a contact center, including predicting burnout risk, in accordance with an example embodiment.

A first computerized task includes receiving real-time data associated with each of a plurality of agents servicing incoming communications for the contact center, as shown in block 2602 of FIG. 26. For example, the received data associated with each of the plurality of agents could include respective agent instance data for each of the plurality of agents. In particular, the received data could include real-time data received from the server(s) 2524, such as from an ACD or WFM, for example. Alternatively, the data could include live-monitoring data (described elsewhere herein) generated from ACD data, WFM data, or other data.

A second computerized task, shown in block 2604, includes categorizing each of the plurality of agents into a respective one of a plurality of burnout risk categories by processing the real-time data associated with each of the plurality of agents using a trained supervised machine learning model having a plurality of input features. In one example, there are four burnout risk categories: low, moderate, high, and critical. However, other numbers of categories or other classification schemes may alternatively be implemented.

A third computerized task, shown in block 2606, includes determining based on a specification of a logical directive, an operation to be performed in relation to at least one agent in the plurality of agents. The specification has at least one condition relating to the categorizing of each of the plurality of agents into the respective one of the plurality of burnout risk categories. The specification additionally defines the operation to be performed in relation to the at least one agent in the plurality of agents upon the condition being satisfied. For example, the operation could be defined in the specification and could include, without limitation, (a) transmitting a message to the at least one agent and/or supervisor, (b) changing a state of the at least agent, (c) modifying an assigned schedule for the at least one agent, (d) modifying an assigned queue of the at least one agent, (e) generating an interactive dashboard to dynamically illustrate burnout risk metrics to a user (e.g., a supervisor), and others.

A fourth computerized task, shown in block 2608 includes causing the operation to be performed in relation to the at least one agent instance in the plurality of agents. For example, causing the operation to be performed could include the at least one computing device 2502 sending an instruction to one or more servers 2524, such as at least one of (a) a communication distributor server, (b) a workforce management server, or (c) a back-office case system server, transmitting a message (e.g., an alert) to one or more agents or supervisors, or displaying a graphical indication of burnout risk on a display device.

An additional computerized task (see FIGS. 27-43, described below) could include generating and displaying, on a display screen, an interactive dashboard comprising a graphical representation illustrating burnout risk information for each of a subset of the plurality of agents in the contact center. The display screen could be associated with the computing device 2502 or with a supervisory computing device in or associated with the contact center 2516, for example. Different colors, patterns, and/or other graphical indicators could distinguish different risk information or different groupings of agents, business units, supervisory units (e.g., managers), and/or other parameters.

While the above-described technology could utilize any of a number of different machine learning models, such as deep learning, random forest, and other black box models, the inventors have found that utilizing a supervised classification prediction model, and in particular, an LDA, QDA, logistic regression, survival analysis, or other model, provides explainable and interpretable results. An explainable model helps to avoid potential discrimination, which is an important consideration in the workplace. Black-box machine learning models could alternatively be used in one or more example implementations but would likely not provide the same explainability and interpretability as the aforementioned supervised classification prediction models.

Therefore, in accordance with some examples, supervised machine learning models are generated for each enterprise's contact center using a customized set of input features tailored for each particular enterprise based on data analysis findings. Customization of input features addresses the situation where some variables might not be relevant or available for enterprises in certain industries. For example, different contact centers may provide different types of customer service, depending on the product or service offered by the underlying enterprise. The data analysis includes model selection, feature selection, and/or feature engineering to beneficially identify higher relative correlations (causal relationships) between input features and desired outputs (e.g., relating to risk categorization, factors, etc.). The supervised machine learning models are trained, such as via Python libraries, using contact center historical data. A correlation measure used for feature selection and feature engineering may be based on a correlation score, such as a Fisher score, which characterizes feature importance via an absolute or relative numerical indicator. A higher Fisher score generally equates to a more important feature, as well as better causality and interpretability, for example. Conversely, a lower Fisher score generally indicates less importance and relatively worse causality and interpretability. Other techniques for determining correlation may also be used for model and/or feature selection/engineering.

Selecting and/or building a suitable supervised machine learning model and suitable features for the model may involve data analysis on a specific customer's historical contact center data in order to identify a set of input features and a type of machine learning model that yields a desired prediction performance level (e.g., an optimal or best level of performance). The set of input features can also include combinations of features, lags, embedders (e.g., managers/supervisors whom an agent reports to, which business unit an agent belongs to, the current date, and others). Each of the plurality of agents can be classified, using a candidate supervised machine learning model, into (a) a first risk attribute category associated with a likely burnout risk or (b) a second risk attribute category associated with an unlikely burnout risk. For example, the trained supervised machine learning model could be a linear discriminant analysis (LDA) model and could be trained using historical data associated with the contact center 2516. The selected plurality of input features could based on each of the plurality of input features having more than a threshold correlation to a risk attribute output associated with agent burnout in the contact center. For example, the threshold correlation could be based on a correlation score (e.g., a Fisher score) exceeding a predefined absolute or relative numerical value. The plurality of input features could include one or more of the following, for example: (a) average handle time, (b) average time in after-call work, (c) average hold time, (d) average on-call time, (e) average occupancy, or others. Classifying could be performed on a recurring time basis using the received data over a predetermined time period. The risk attribute output could relate to at least one burnout risk category or at least one burnout risk factor, for example. A correlation score can be calculated for each of a plurality of input features used by the supervised machine learning model in the classifying of each of the plurality of agents. Calculating the correlation score for each input feature allows for determining how relatively informative each of the plurality of input features is for the classifying of each of the plurality of agents into the first risk attribute category or the second risk attribute category. Calculating the correlation score could be performed on a recurring time basis using the received data over a predetermined time period. One or more burnout risk predictors could be determined based on the calculated correlation score for each of the plurality of input features, according to one example.

Example features to be considered for inclusion in a contact center's supervised machine learning model include statistics commonly tracked by contact centers, such as statistics associated with data provided via one or more servers for workforce management (WFM), automatic communication distributors (ACDs) (e.g., automatic call distributors), and other custom or off-the-shelf local or distributed (e.g., SaaS) software packages. Such data may relate directly to agents and/or to agent instances (i.e., computing devices associated with human agents or robotic agents). In the case of an ACD, such statistics may include, for example, (a) average handle time, (b) time in after-call work, (c) hold time, (d) average on-call time, (e) average occupancy, and others. The statistics may be taken and/or averaged over a time period. For example, a feature involving an average handle time (or other statistic, such as those listed immediately above) may be used in analyzing trends and/or other feature engineering by examining handle time statistics for a trailing time-based average, such as a current day plus five-day average, a current day plus ten-day average, a current day plus 15-day average, or other number of days (or other time segment, such as one, two, or three days) back in time. As another, more computationally-intensive, example, a feature may involve a comparison over a defined time period of a particular agent's statistic to the same statistic across all agents or a group of agents in a contact center for that defined time period.

To determine a customized set of input features for each particular customer, example embodiments utilize the LDA or other supervised machine learning models to classify contact center agents into one of two categories every hour (or other regular time period) using data from that past hour (or other time period). This classification is model-specific, rather than application-specific, and may include, for example, (a) a removed category (for "attrition-risk" agents), corresponding to a binary-one (1) determination and (b) a non-removed category, corresponding to a binary-zero (0) determination. This binary variable indicates whether an agent is still in-system (assume no attrition) or not in-system (assume attrition). Example embodiments then include computing the Fisher score (or other correlation score) of each input feature, which assigns a positive numerical value to each feature that indicates how much each feature is informative to the model for separating contact center agents into those two categories. A higher score indicates that a particular feature is more informative. A lower score indicates that a particular feature is less informative. These scores allow the model to identify predictors of attrition. In one example configuration, a computing device utilizing an LDA model or other supervised machine learning model will make new predictions each night (or other recurring time instance or period) using real-time data collected and stored or aggregated from the previous day (or other time period).

Further to the example, predictions of the supervised machine learning model (e.g., an LDA model) are converted to probabilities of belonging to the "non-removed" category by using the aforementioned binary classification. In other words, a soft classification assigns a probability of belonging to either the removed or non-removed class (e.g., a "70% confidence" agent belongs to "removed" class). The soft classification explicitly estimates class conditional probabilities and then performs classification based on the estimated probabilities. By selecting a series of probabilities, agents can be categorized into a plurality of categories for burnout risk, which serves as a proxy or lead indicator to attrition risk. For example, each agent may be assigned to one of four burnout risk categories (low risk, moderate risk, high risk, or critical risk) according to the probability values (each expressed as a value between 0 and 1 or as a percentile, for example). As an agent's burnout risk category increases (e.g., from moderate to high), that agent's attrition risk typically also increases. The assignment of agents into burnout risk categories may occur hourly, for example. In the case of a supervised machine learning model that uses one hour of data (e.g., the immediately preceding hour) as input, the hourly categories can be aggregated to provide daily, multiday, weekly, bi-weekly, monthly, bi-monthly, and/or quarterly categorizations, for example, which may be beneficial for viewing on an interactive dashboard displayed on a display screen. According to some examples, a manager and/or supervisor can be alerted (e.g., via an automated communication transmitted over a network connection from one computing device to another computing device) when an agent reaches a certain burnout risk category and/or has been in a certain burnout risk category (e.g., a negative burnout risk category, such as high risk or critical risk) for more than a defined amount of time.

In addition to predicting risk of agent burnout and/or attrition, example embodiments described herein include taking/performing automated action(s)/operation(s) in response to determining that one or more agents are at risk of burnout and/or attrition. For example, the manager/supervisor alert described immediately above is one example of an automated action. As another example, the action(s)/operation(s) could include automatically transmitting a message to an agent instance instructing a particular agent to take a 15-minute wellness break upon the particular agent reaching an average occupancy threshold determined be associated with a high risk of burnout and/or attrition. Further to the preceding example, the system could also automatically change the ACD state of the particular agent to "unavailable" and update their schedule in the WFM with a "break" segment. Yet another example could include automatically switching the agent to a different interaction channel, such from a phone channel to an email or chat channel, when the particular agent is categorized into a certain burnout risk category. Again, the system could additionally include automatically changing the ACD state of the particular agent and updating their schedule in the WFM, as with the previous example.

Some example implementations additionally involve generating and displaying an interactive dashboard, described below with respect to FIGS. 27-43, accessible and viewable via one or more display screens associated with one or more computing devices. By viewing the interactive dashboard on a display screen, a contact center supervisor or other user can receive information in support of one or more contact center supervised functions. Such functions may include, for example, (a) investigating attrition within an enterprise's contact center (e.g., at an agent level, at an agent group level, and/or at an organizational (contact-center-wide) level), (b) identifying predicted burnout risk of each agent (or groups of agents), which may serve as a proxy for attrition risk, (c) exploring causality of burnout and attrition by uncovering trends and impact of specific events through visualizations and graphs, (d) better understanding action(s) to take to mitigate risk of burnout and attrition, (e) reviewing data before and after action(s) taken, and (e) supervisor-initiated actions based on observations in data visualizations, such as actions based on automated recommendations, for example. The interactive dashboard(s) may, for example, include various visualizations and graphs that will allow contact centers to better understand agent burnout and attrition in their contact center, as well as investigate the causality of burnout and attrition (drill down for a particular agent (or group) for a desired time period). Such visualizations and graphs can additionally be automated with selected data, such as feedback data. In addition, a variety of graphs can be displayed to present different aspects of agents' behavior and performance throughout a period of time. Agents are grouped by manager or business unit in some graphs, and by burnout risk category in other graphs. Filters are provided in some example implementations to allow for displaying only those agents associated with one or more specified managers and/or business units. Additionally, time-range filters are included in some example implementations to allow a user to select a specific date or time range (e.g., only the past week, or the past month). FIGS. 27-43 are screen shot diagrams illustrating example interactive dashboards that may be generated and displayed on one or more display screens, as described above. Different colors, patterns, and/or other graphical indicators could be implemented in the interactive dashboard(s) to distinguish between different risk information or different groupings of agents, business units, supervisory units (e.g., managers), and/or other parameters.

Figure 27:
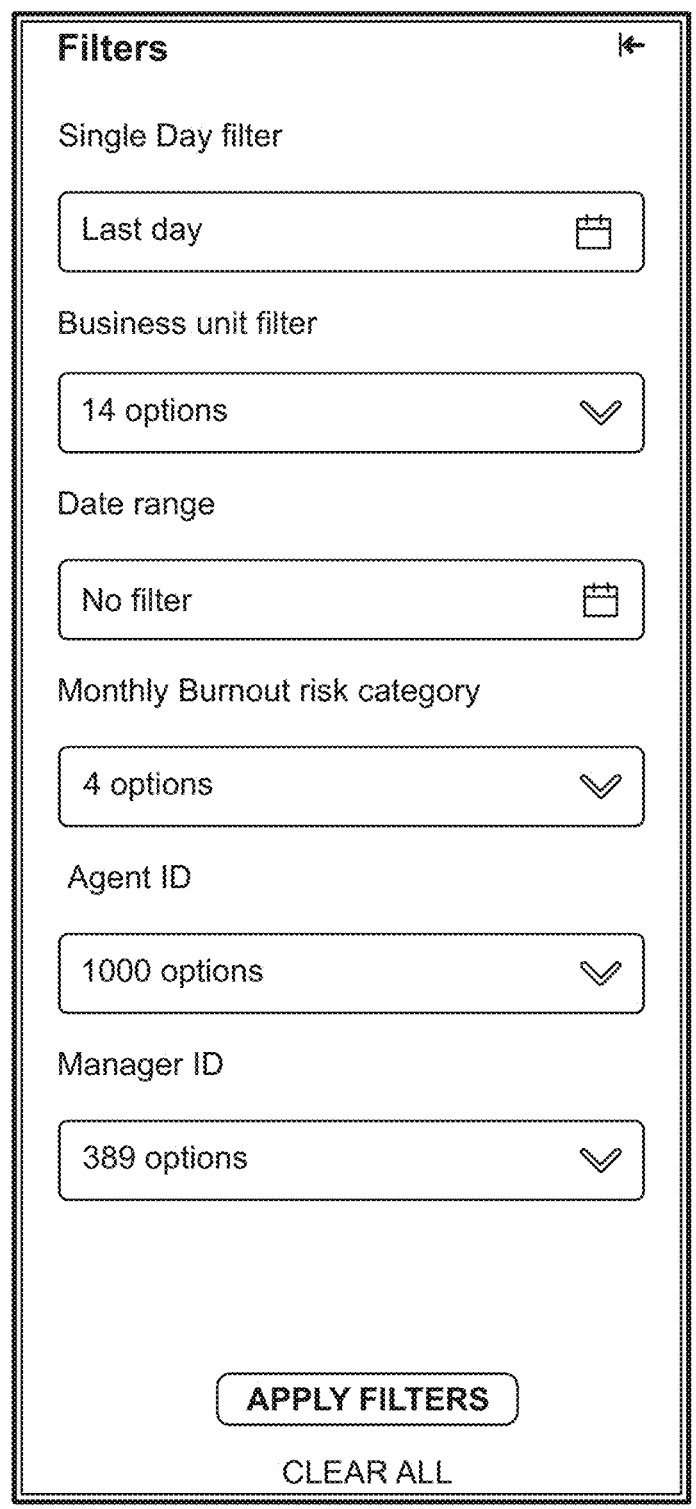
FIG. 27 is a screen shot illustrating a filter selection interface for an interactive dashboard that may be generated and displayed on one or more display screens, in accordance with an example embodiment.

FIG. 27 is a screen shot illustrating a filter selection interface 2700 for an interactive dashboard that may be generated and displayed on one or more display screens, in accordance with an example embodiment. As discussed above, filters may be provided in some example implementations to allow for interactivity in engaging with burnout and attrition risk data. As illustrated, example filters that may be selected include a date filter (indicated by a "date range"), a business unit filter, an agent name filter, a manager name filter, and a burnout risk category filter. Other filters may alternatively be provided to a user of the interactive dashboard displayed on a display device. The user may select filter options and otherwise interact with the dashboard using one or more of the input devices described elsewhere herein.

FIG. 28 is a screen shot illustrating a table 2800 of agents and burnout risk categorizations for an interactive dashboard that may be generated and displayed on one or more display screens, in accordance with an example embodiment. The example table includes columns corresponding to agent IDs, agent names, manager IDs, manager names, current burnout risk categories for each agent, consecutive days in category for each agent, monthly burnout risk category for each agent, average handle time (AHT), and average occupancy. Average occupancy refers to the amount of time an agent is logged into an ACD (or other system) and taking transactions. Average occupancy is expressed as a percentage based on the time an agent is handling customer interactions divided by the time the agent is logged in. Typical contact centers have average occupancies of around 80-85%, with higher average occupancies often leading to agent burnout or attrition.

Figure 29:
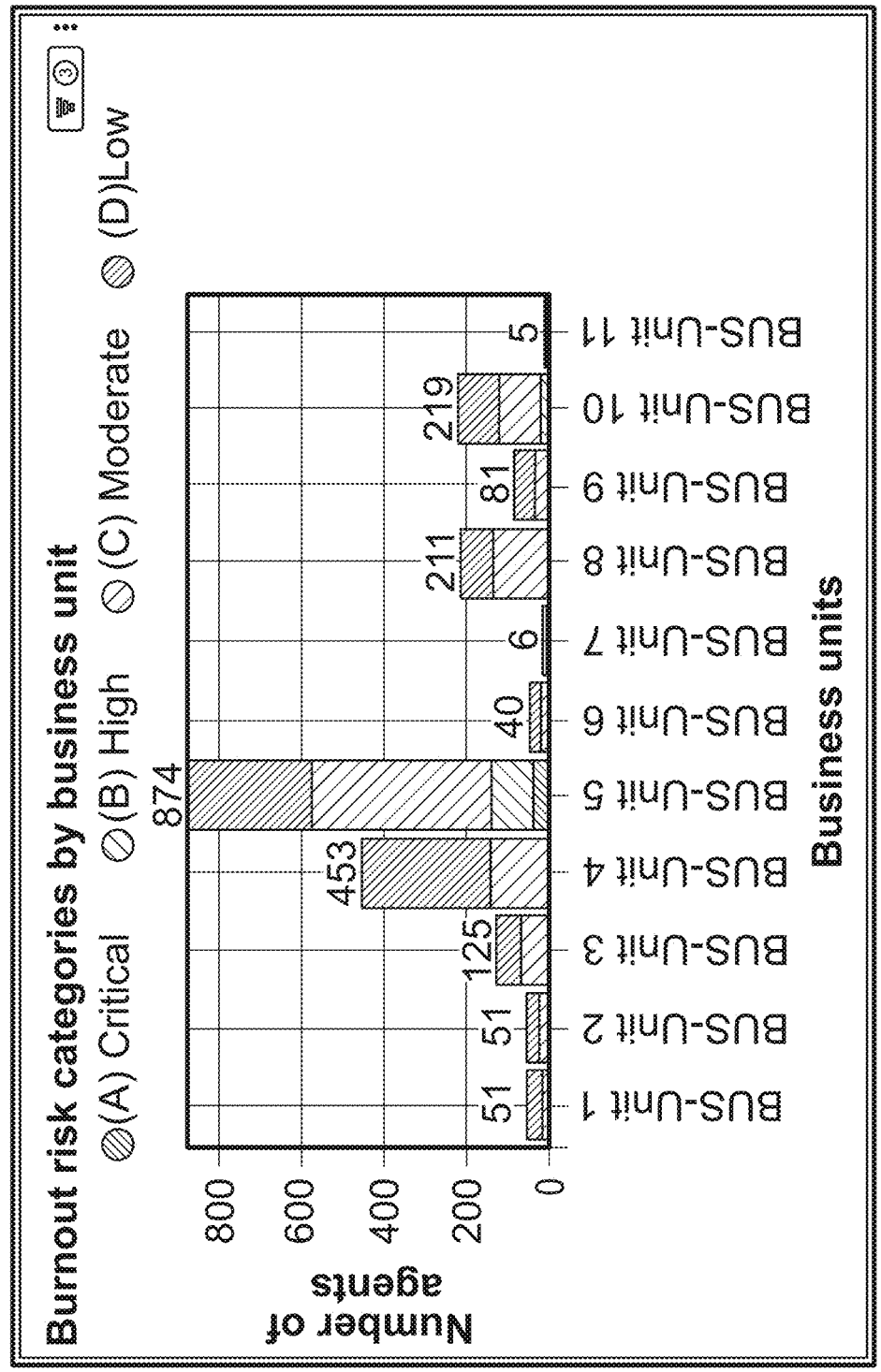
FIG. 29 is a screen shot illustrating a distribution of burnout risk categories by number of agents in different business units for an interactive dashboard that may be generated and displayed on one or more display screens, in accordance with an example embodiment.

FIG. 29 is a screen shot illustrating a distribution of burnout risk categories by number of agents in different business units for an interactive dashboard that may be generated and displayed on one or more display screens, in accordance with an example embodiment. The example distribution is illustrated via a color-coded graph 2900, showing the number of agents in different burnout risk categories (y-axis) for different business units (x-axis). A key is provided to associate different colors with "critical," "high," "moderate," and "low" burnout risk categories, according to the illustrated example.

Figure 30:
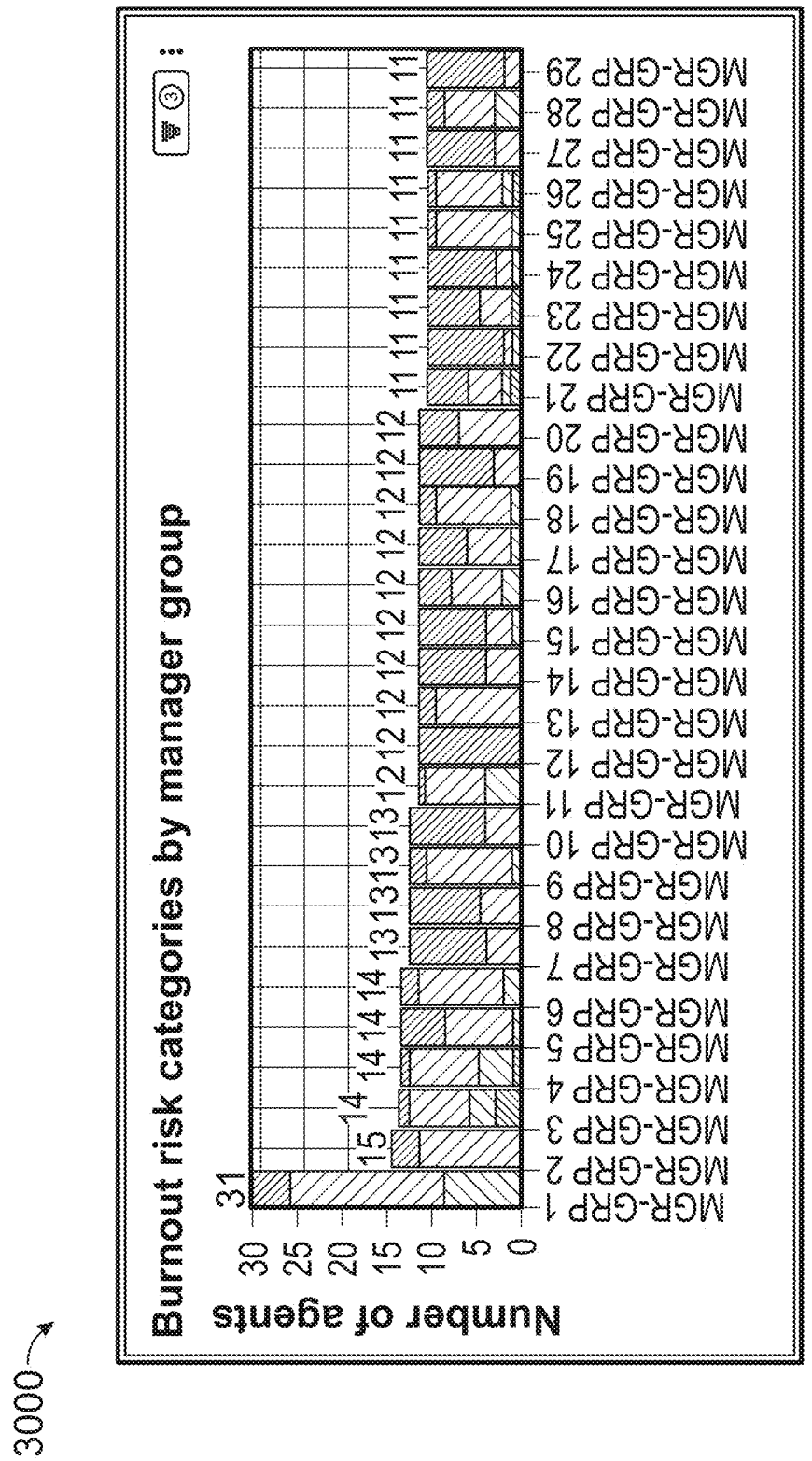
FIG. 30 is a screen shot illustrating a distribution of burnout risk categories by number of agents associated with different managers for an interactive dashboard that may be generated and displayed on one or more display screens, in accordance with an example embodiment.

FIG. 30 is a screen shot illustrating a distribution of burnout risk categories by number of agents associated with different managers for an interactive dashboard that may be generated and displayed on one or more display screens, in accordance with an example embodiment. Similar to the distribution graph 2900 illustrated in FIG. 29, the example distribution graph 3000 shows the number of agents in different burnout risk categories (y-axis) for different managers (or manager groups) (x-axis).

Figure 31:
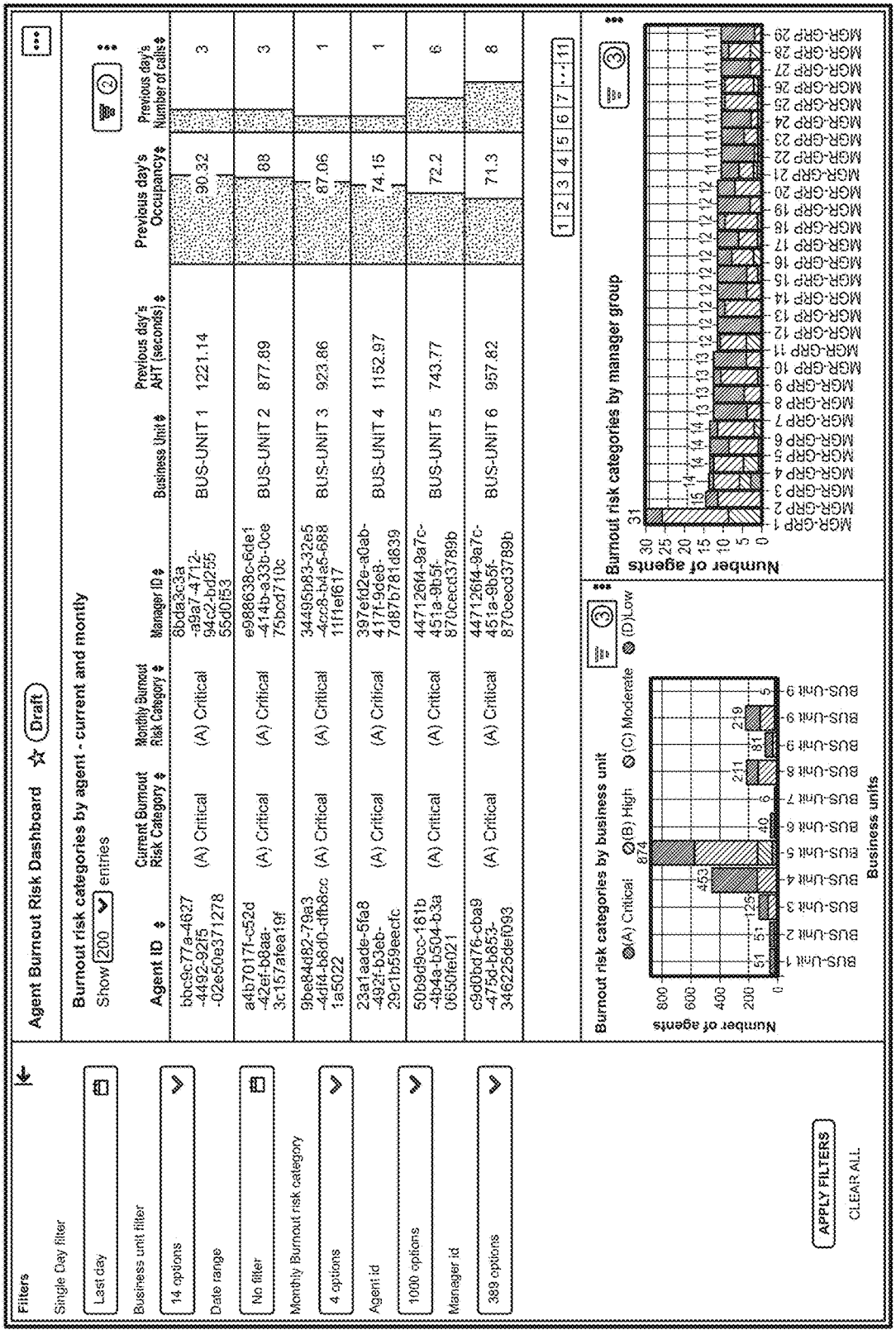
FIG. 31 is a screen shot illustrating a first example interactive dashboard combining the features illustrated in FIGS. 27-30, in accordance with an example embodiment.

FIG. 31 is a screen shot illustrating a first example interactive dashboard 3100 combining the features illustrated in FIGS. 28-30, in accordance with an example embodiment. The dashboard 3100 aggregates a user-selectable set of tables and graphs to allow for better engagement by the user. This aggregation graphically presents trends and other visualizations, which may, in turn, suggest possible supervisory responses, such as new or modified rules definitions.

Figure 32:
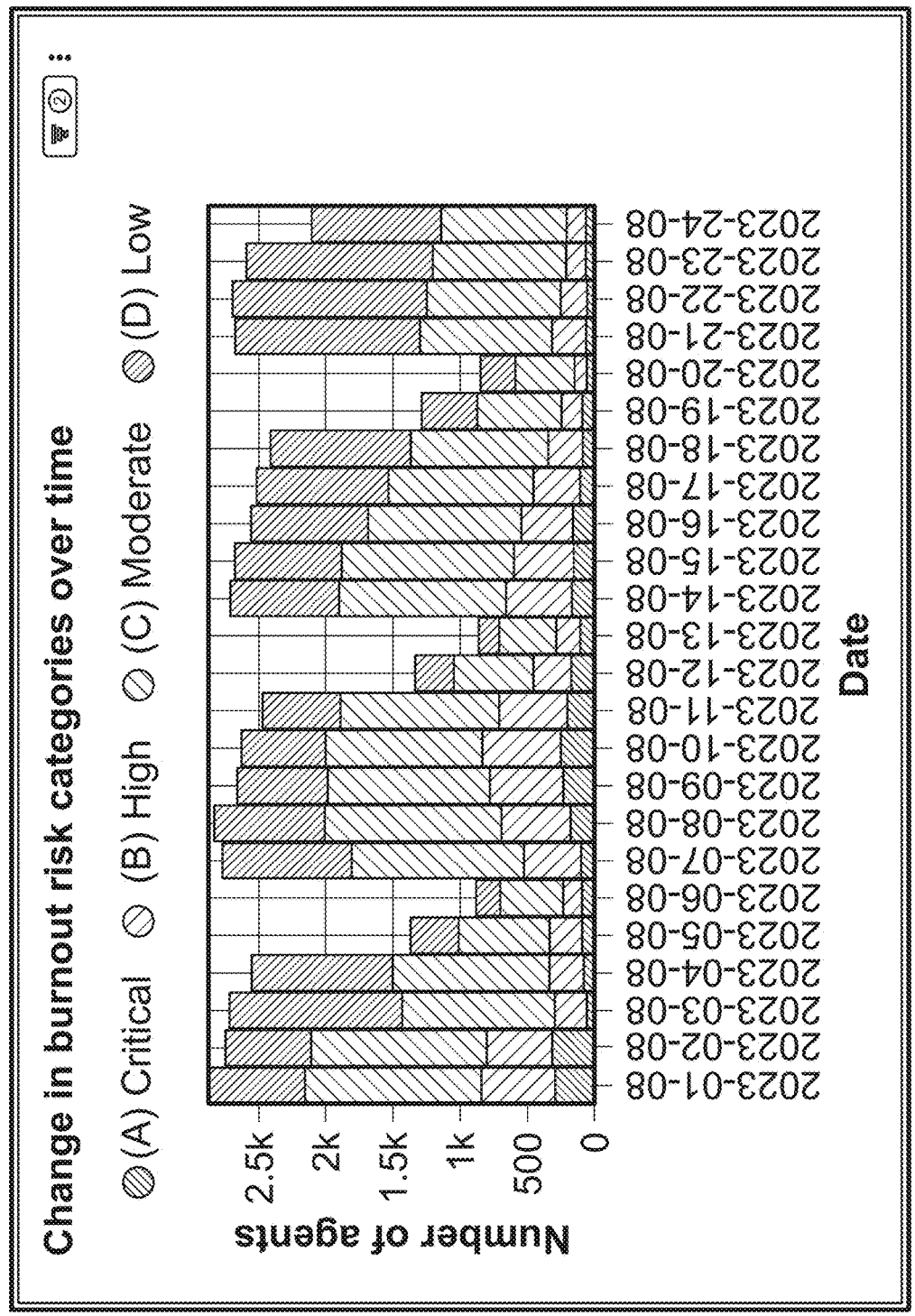
FIG. 32 is a screen shot illustrating changes in burnout risk categories over time for an interactive dashboard that may be generated and displayed on one or more display screens, in accordance with an example embodiment.

FIG. 32 is a screen shot illustrating evolution of burnout risk categories over time for an interactive dashboard that may be generated and displayed on one or more display screens, in accordance with an example embodiment. The evolution is displayed via a color-coded graph 3200, showing the number of agents in different burnout risk categories (y-axis) for over time (x-axis). In the illustrated example, the time is expressed as a plurality of dates with a daily granularity. Other expressions of time (e.g., numbers of hours, days, or weeks rather than specific dates) and granularities may alternatively be displayed.

Figure 33:
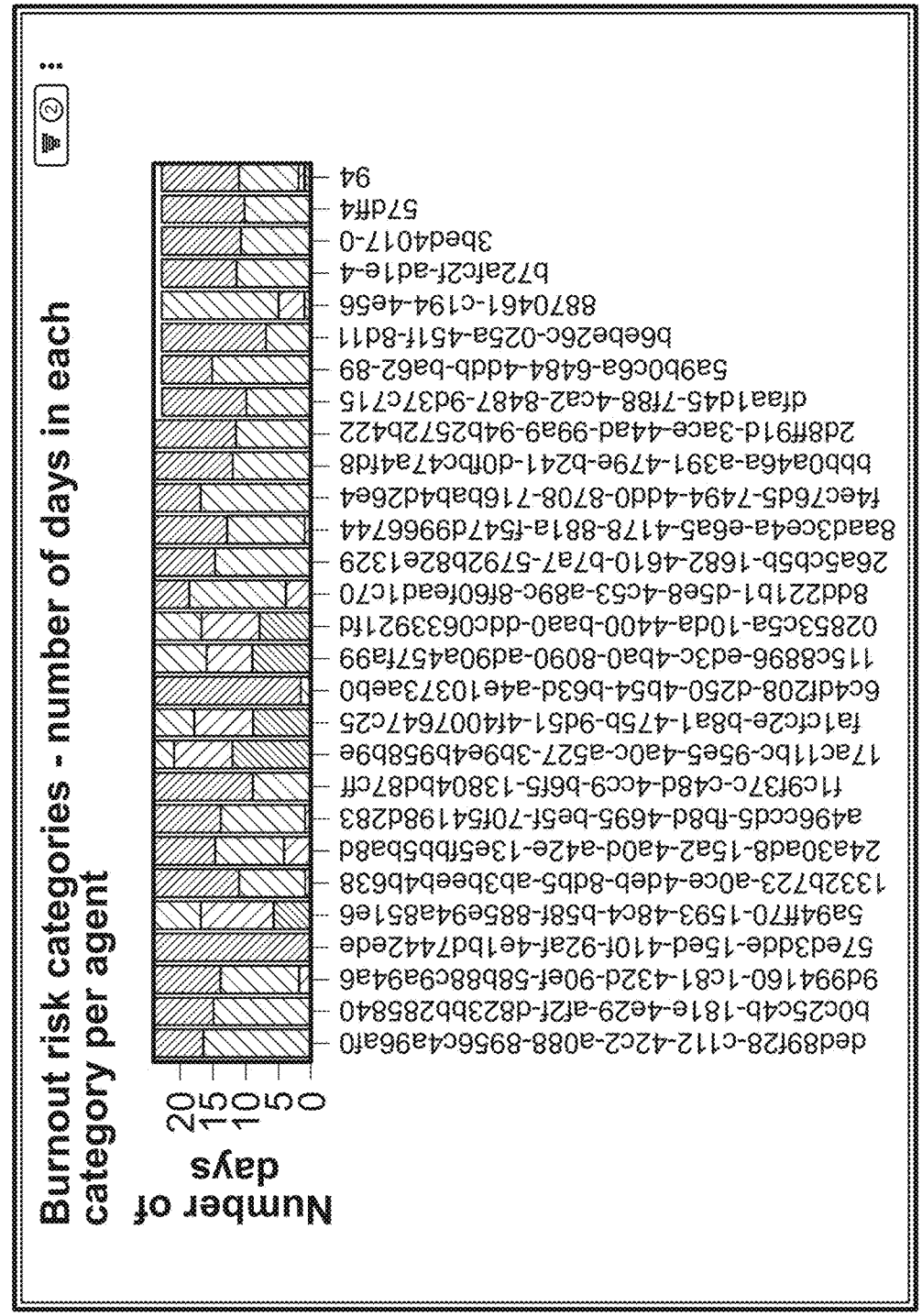
FIG. 33 is a screen shot illustrating total number of days in burnout risk categories over time by agent for an interactive dashboard that may be generated and displayed on one or more display screens, in accordance with an example embodiment.

FIG. 33 is a screen shot illustrating total number of days in burnout risk categories over time by agent for an interactive dashboard that may be generated and displayed on one or more display screens, in accordance with an example embodiment. The data is displayed via a color-coded graph 3300, showing the number of days (y-axis) each agent (e.g., in a subset of agents) (x-axis) is in a particular burnout risk category. Burnout risk categories are expressed as colors represented in a color-coded key in the illustrated example.

Figure 34:
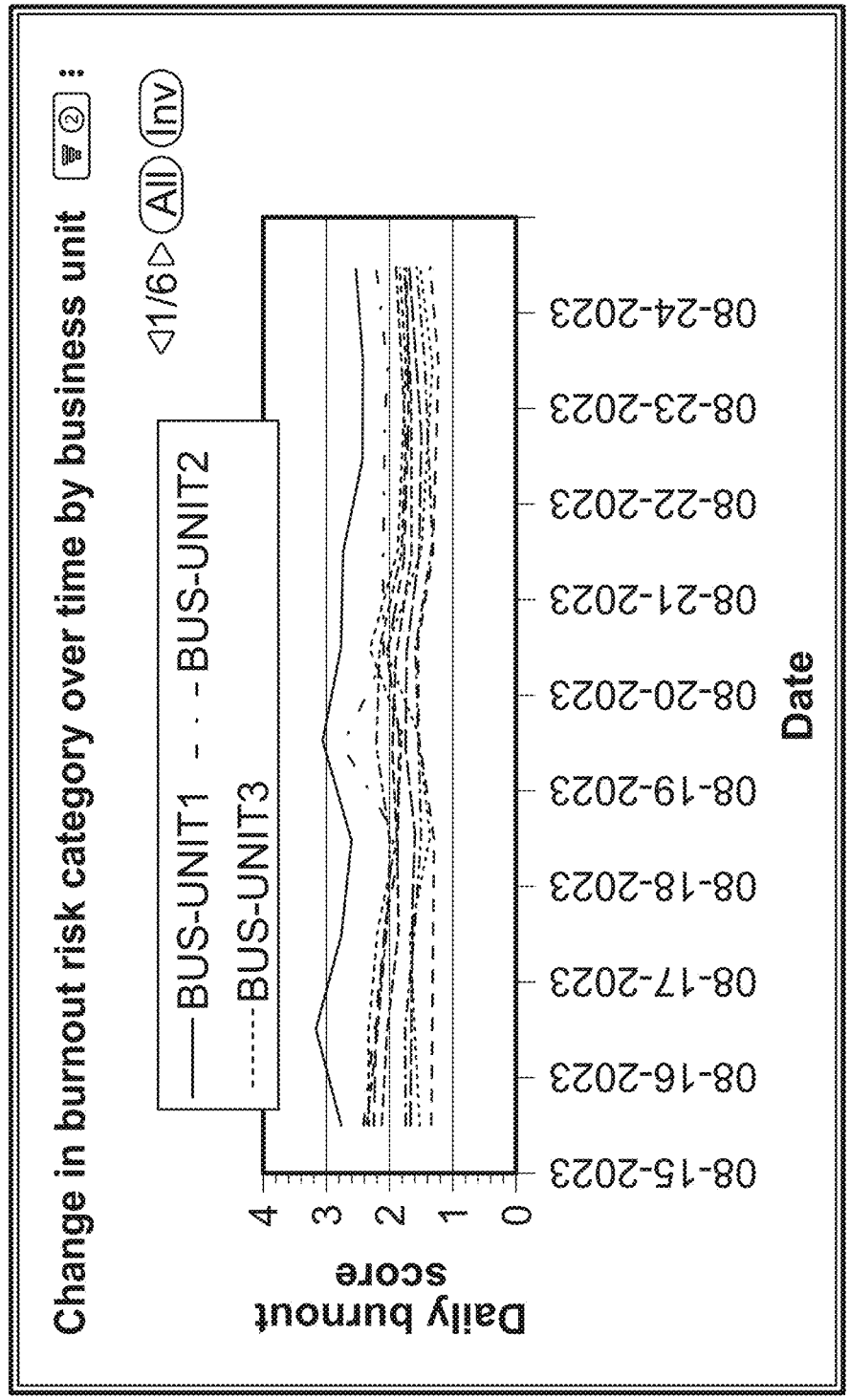
FIG. 34 is a screen shot illustrating change in burnout risk categories over time by business unit for an interactive dashboard that may be generated and displayed on one or more display screens, in accordance with an example embodiment.

FIG. 34 is a screen shot illustrating evolution of burnout risk categories over time by business unit for an interactive dashboard that may be generated and displayed on one or more display screens, in accordance with an example embodiment. The evolution is displayed via a color-coded graph 3400, showing a daily burnout score (y-axis) over time (x-axis). In the illustrated example, the time is expressed as a plurality of dates with a 4-day granularity. Other expressions of time (e.g., numbers of hours, days, or weeks rather than specific dates) and granularities may alternatively be displayed. Different colored lines are associated with different business units, as represented in the displayed color-coded key.

Figure 35:
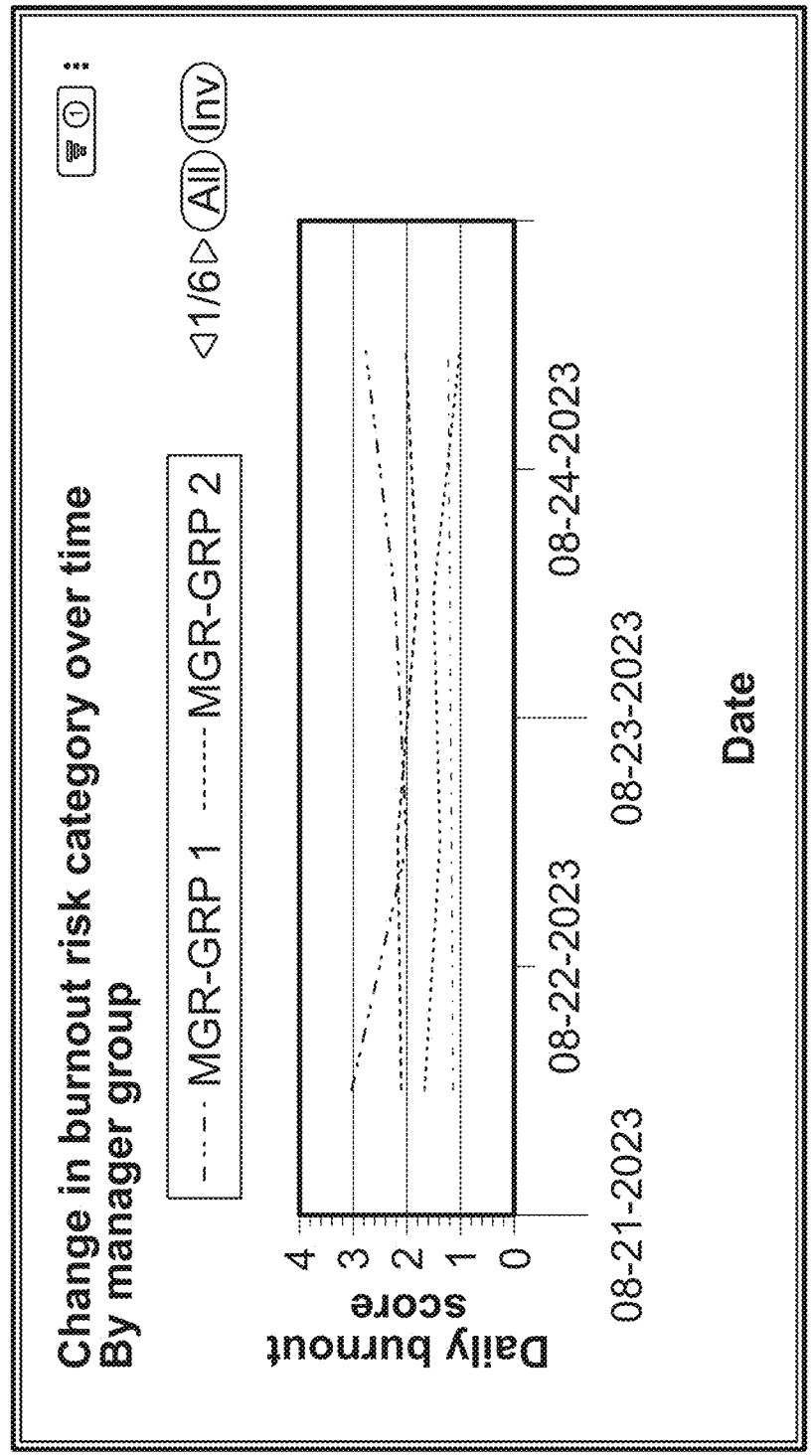
FIG. 35 is a screen shot illustrating change in burnout risk categories over time by manager group for an interactive dashboard that may be generated and displayed on one or more display screens, in accordance with an example embodiment.

FIG. 35 is a screen shot illustrating evolution of burnout risk categories over time by manager group for an interactive dashboard that may be generated and displayed on one or more display screens, in accordance with an example embodiment. Similar to the graph 3400 in FIG. 34, the evolution is displayed via a color-coded graph 3500, showing a daily burnout score (y-axis) over time (x-axis). In the illustrated example, the time is expressed as a plurality of dates with a 4-day granularity. Different colored lines are associated with different managers, as represented in the displayed color-coded key.

Figure 36:
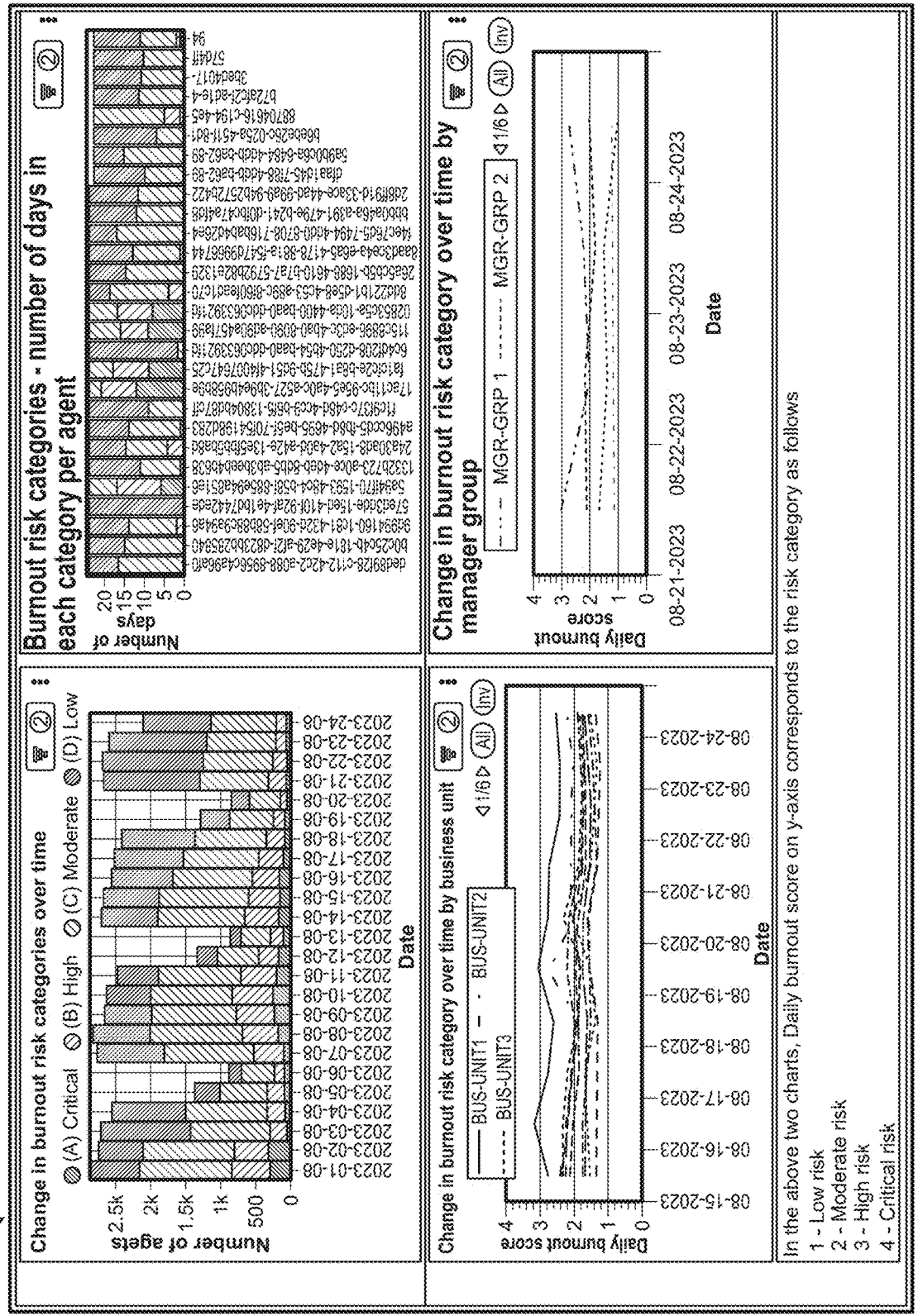
FIG. 36 is a screen shot illustrating a second example interactive dashboard combining the features illustrated in FIGS. 32-35, in accordance with an example embodiment.

FIG. 36 is a screen shot illustrating a second example interactive dashboard combining the features illustrated in FIGS. 32-35, in accordance with an example embodiment. The dashboard 3600 aggregates a user-selectable set of tables and graphs (from FIGS. 32-35 in the illustrated example) to allow for better engagement by the user. This aggregation graphically presents trends and other visualizations, which may, in turn, suggest possible supervisory responses, such as new or modified rules definitions.

Figure 37:
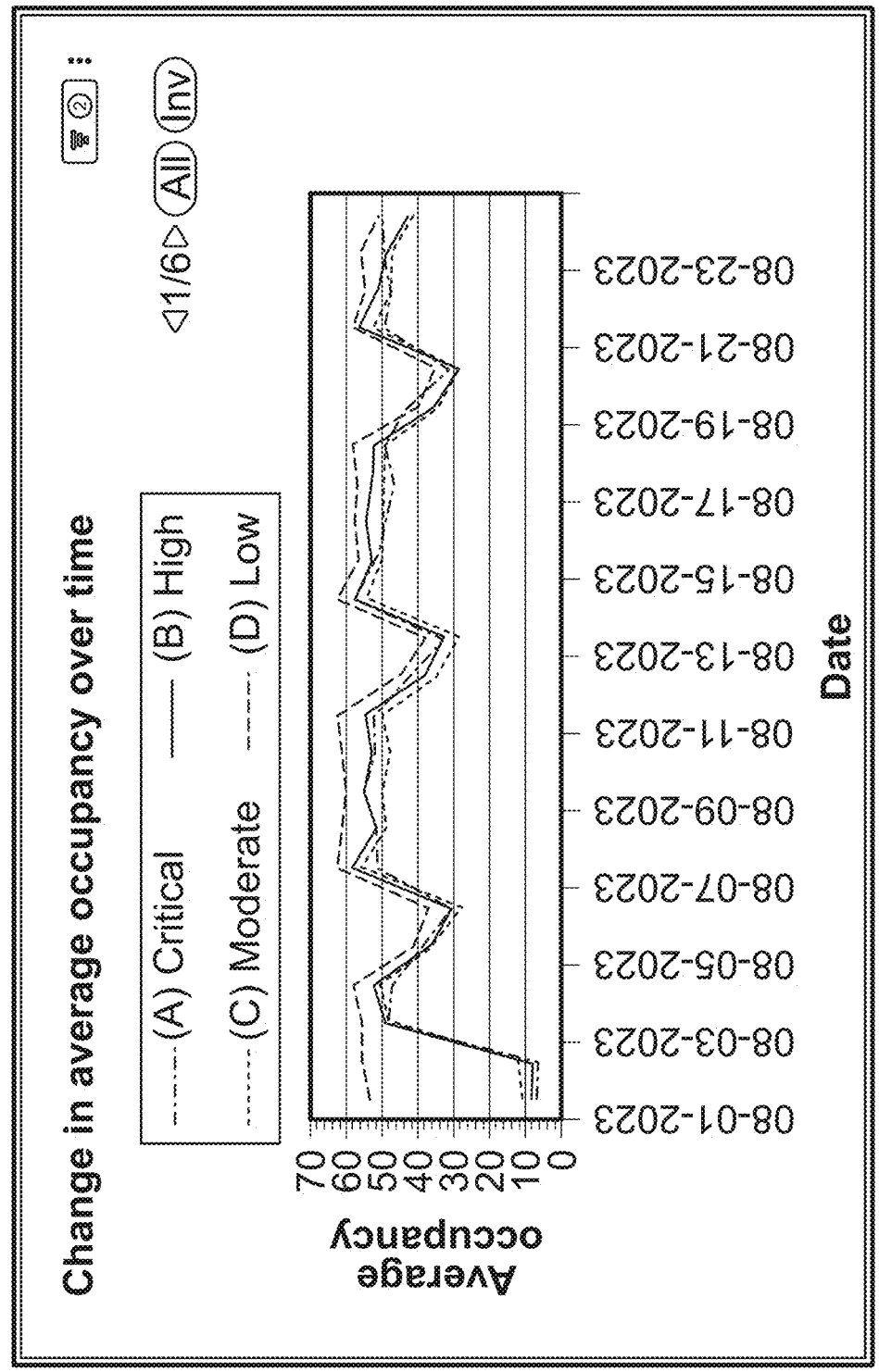
FIG. 37 is a screen shot illustrating change in average occupancy over time for an interactive dashboard that may be generated and displayed on one or more display screens, in accordance with an example embodiment.

FIG. 37 is a screen shot illustrating evolution of average occupancy over time for an interactive dashboard that may be generated and displayed on one or more display screens, in accordance with an example embodiment. The evolution is displayed via a color-coded graph 3700, showing average occupancy (as a percentage) (y-axis) over time (x-axis). In the illustrated example, the time is expressed as a plurality of dates with a 4-day granularity. Different colored lines are associated with different burnout risk categories, as represented in the displayed color-coded key.

Figure 38:
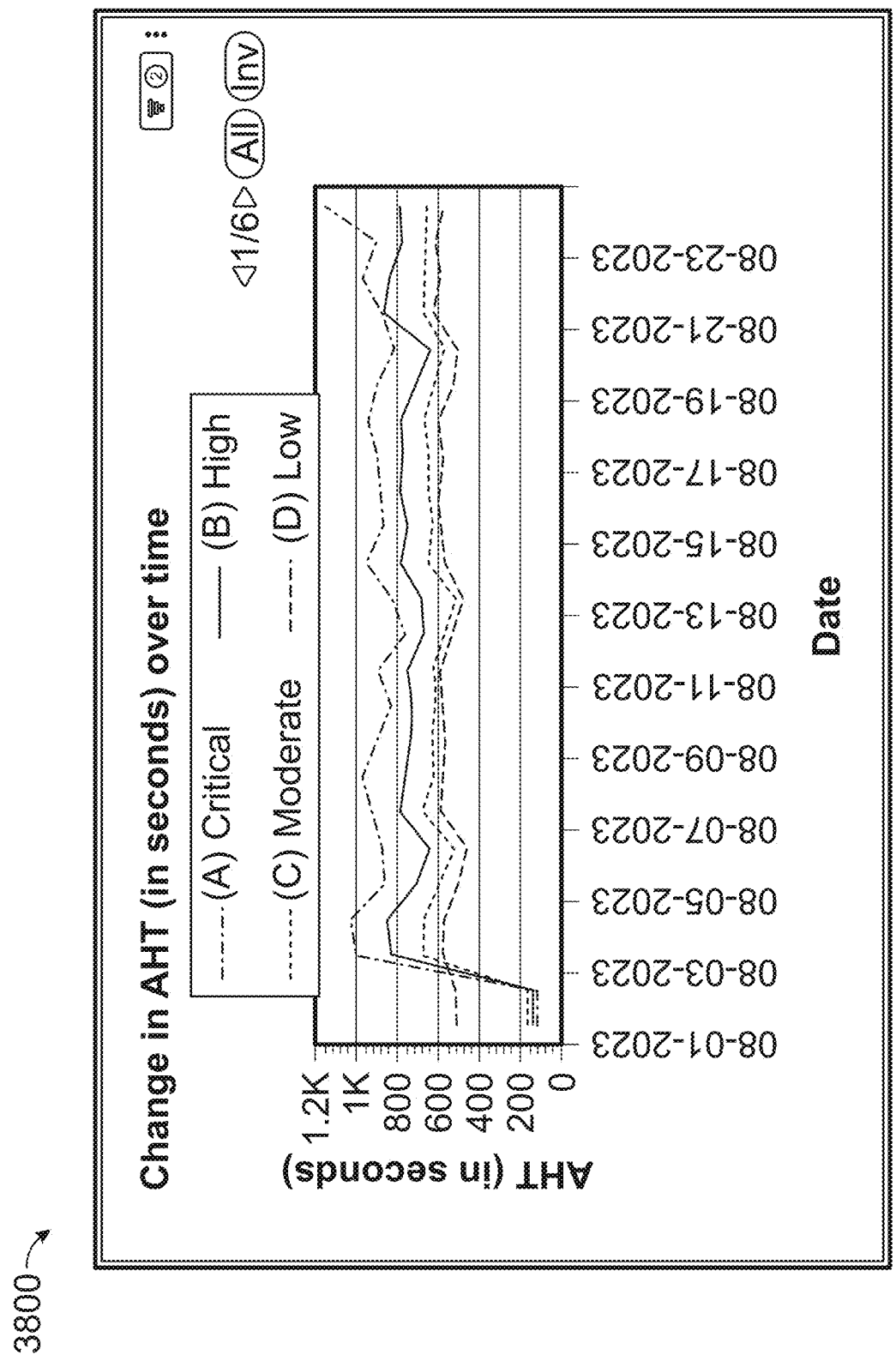
FIG. 38 is a screen shot illustrating change in average handle time (AHT) over time for an interactive dashboard that may be generated and displayed on one or more display screens, in accordance with an example embodiment.

FIG. 38 is a screen shot illustrating evolution of average handle time (AHT) over time for an interactive dashboard that may be generated and displayed on one or more display screens, in accordance with an example embodiment. Similar to the graph 3700 in FIG. 37, the evolution is displayed via a color-coded graph 3800, showing average handle time (AHT) (y-axis) over time (x-axis). In the illustrated example, the time is expressed as a plurality of dates with a 4-day granularity. Different colored lines are associated with different burnout risk categories, as represented in the displayed color-coded key.

Figure 39:
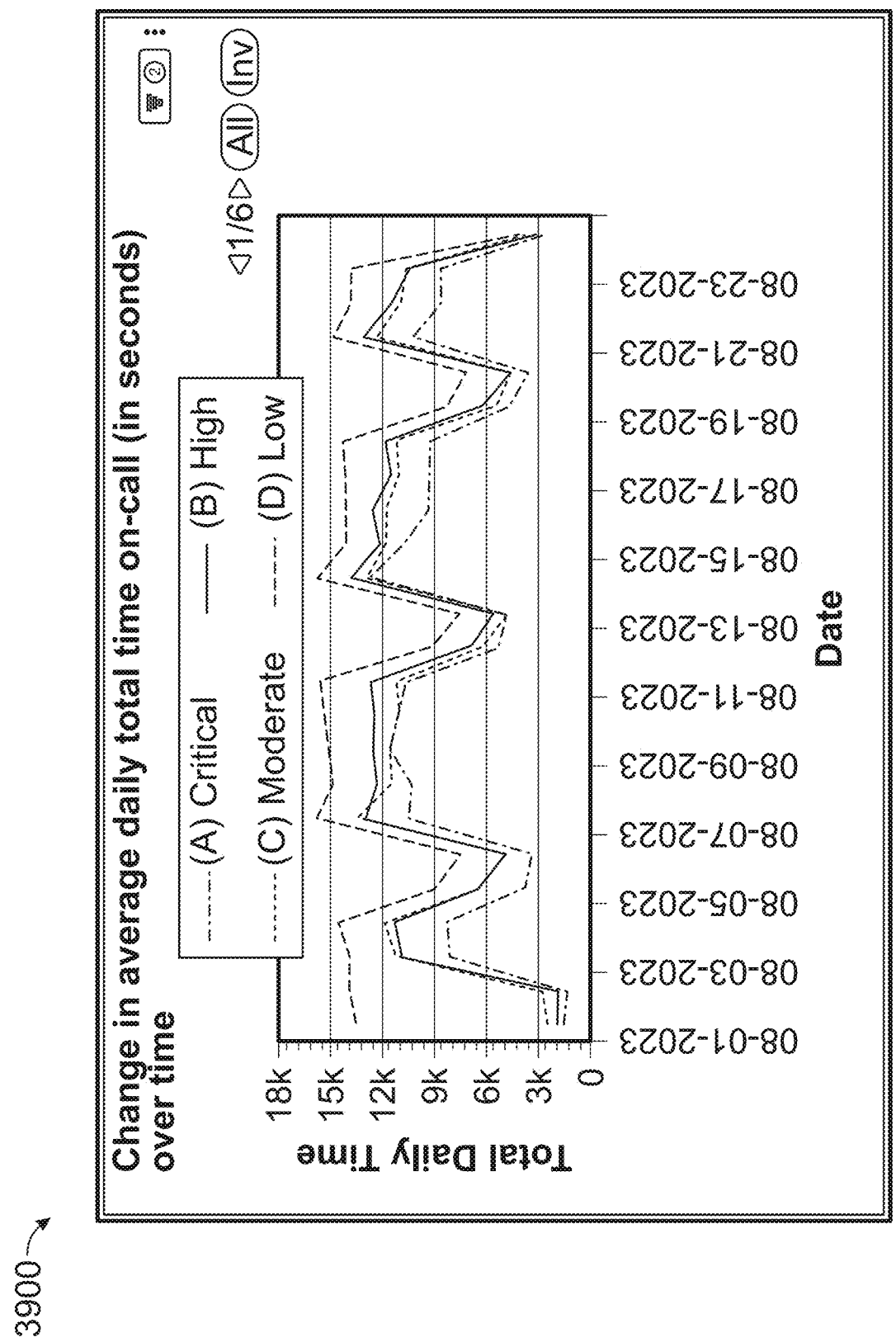
FIG. 39 is a screen shot illustrating change in average total time on-call over time for an interactive dashboard that may be generated and displayed on one or more display screens, in accordance with an example embodiment.

FIG. 39 is a screen shot illustrating evolution of average total time on-call over time for an interactive dashboard that may be generated and displayed on one or more display screens, in accordance with an example embodiment. Similar to the graph 3700 in FIG. 37, the evolution is displayed via a color-coded graph 3900, showing average call time (y-axis) over time (x-axis). In the illustrated example, the time is expressed as a plurality of dates with a 4-day granularity. Different colored lines are associated with different burnout risk categories, as represented in the displayed color-coded key.

Figure 40:
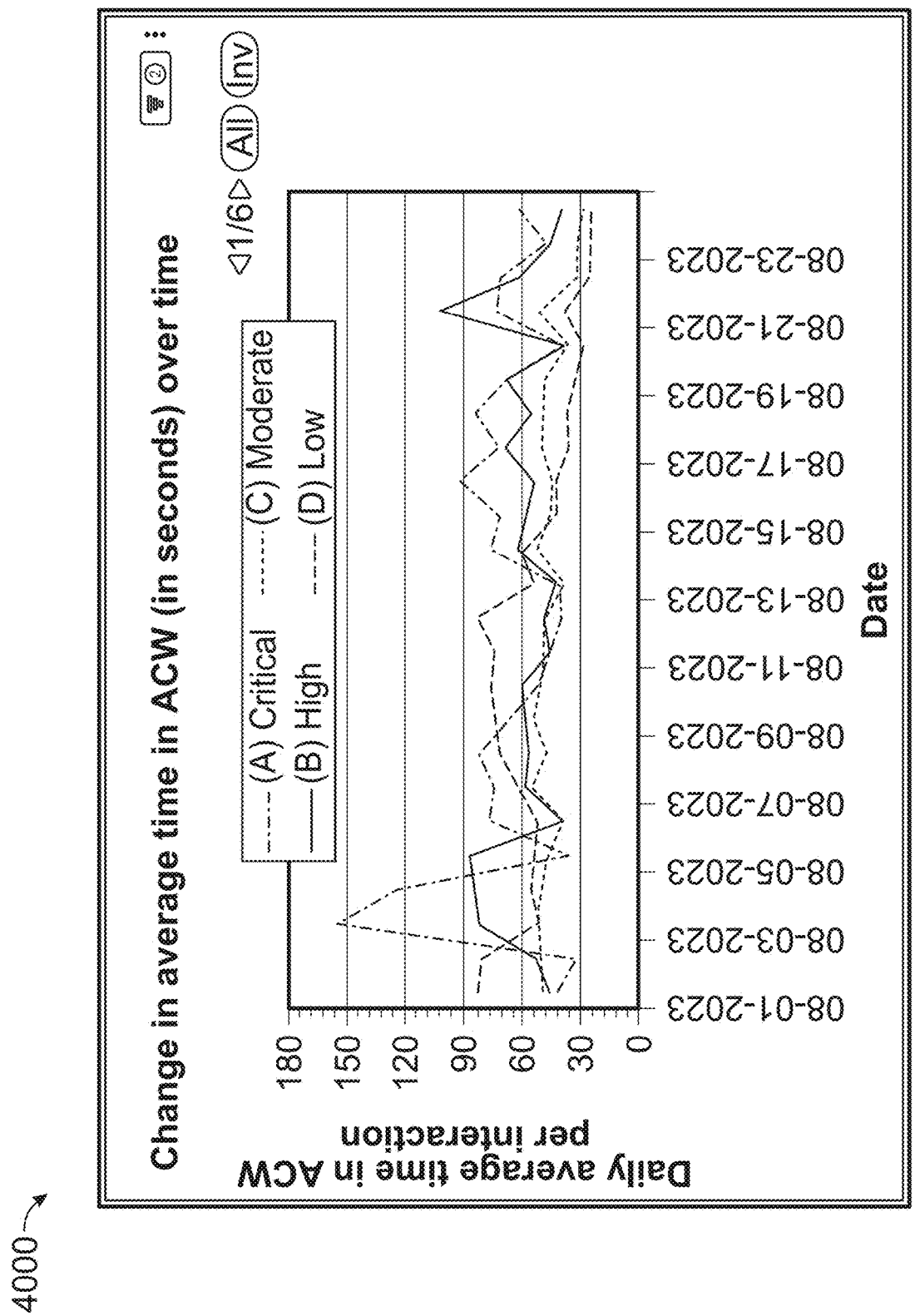
FIG. 40 is a screen shot illustrating change in average time in after-call work (ACW) over time for an interactive dashboard that may be generated and displayed on one or more display screens, in accordance with an example embodiment.

FIG. 40 is a screen shot illustrating evolution of average time in after-call work (ACW) over time for an interactive dashboard that may be generated and displayed on one or more display screens, in accordance with an example embodiment. Similar to the graph 3700 in FIG. 37, the evolution is displayed via a color-coded graph 4000, showing daily average time in after call work (ACW) (y-axis) over time (x-axis). In the illustrated example, the time is expressed as a plurality of dates with a 4-day granularity. Different colored lines are associated with different burnout risk categories, as represented in the displayed color-coded key.

Figure 41:
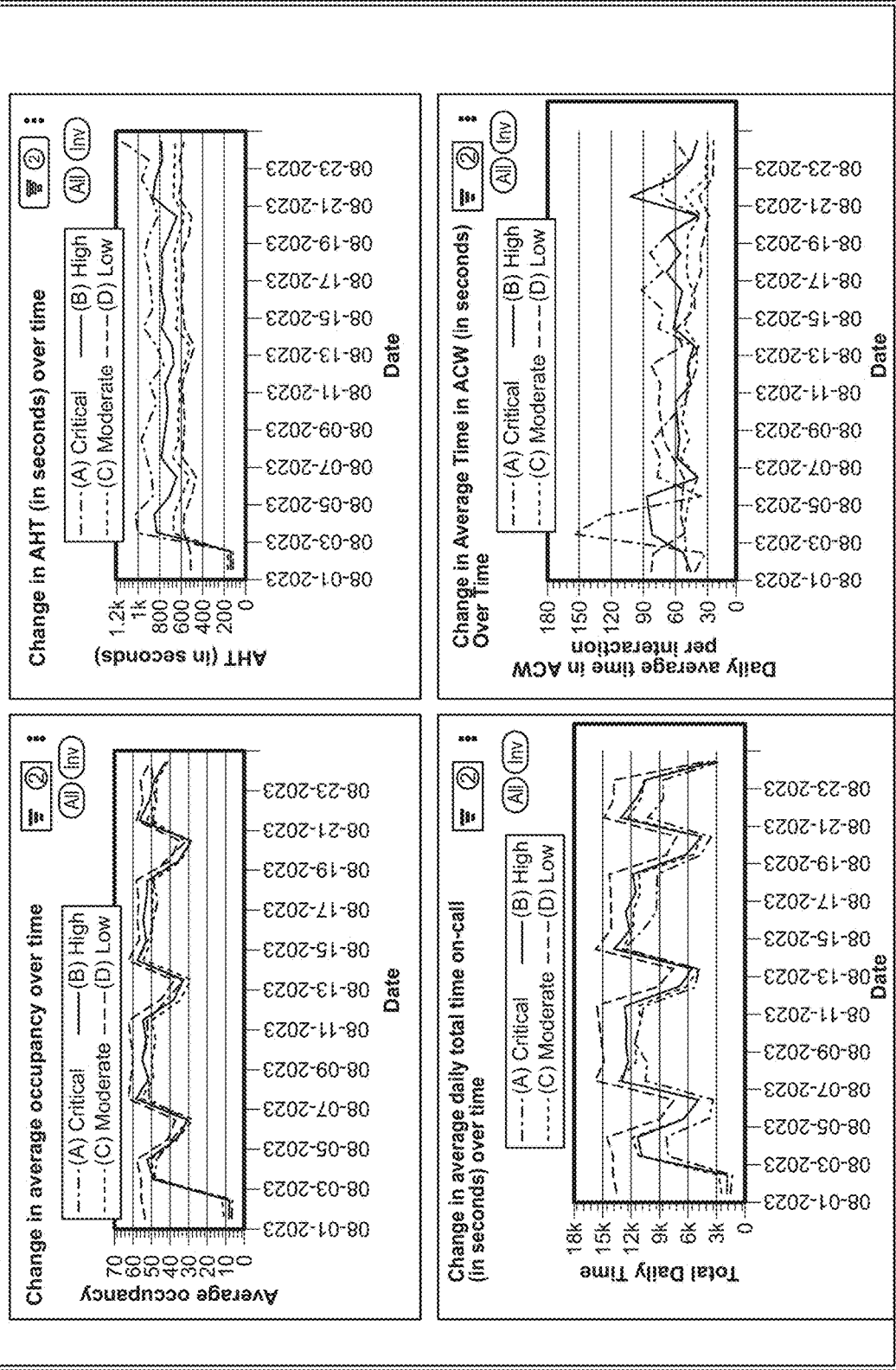
FIG. 41 is a screen shot illustrating a third example interactive dashboard combining the features illustrated in FIGS. 37-40, in accordance with an example embodiment.

FIG. 41 is a screen shot illustrating a third example interactive dashboard 4100 combining the features illustrated in FIGS. 37-40, in accordance with an example embodiment. The dashboard 4100 aggregates a user-selectable set of tables and graphs (from FIGS. 37-40 in the illustrated example) to allow for better engagement by the user. This aggregation graphically presents trends and other visualizations, which may, in turn, suggest possible supervisory responses, such as new or modified rules definitions.

Figure 42:
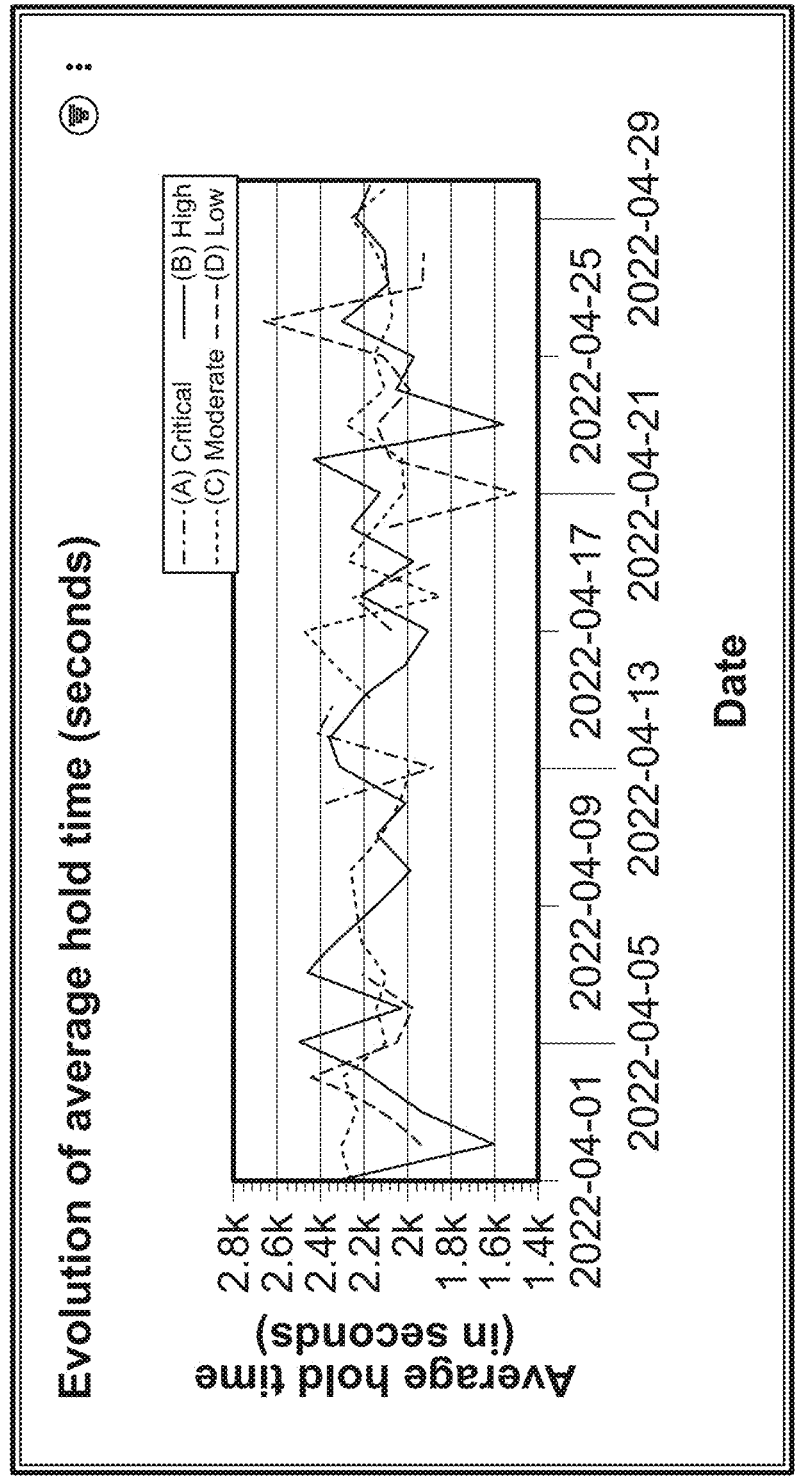
FIG. 42 is a screen shot illustrating evolution of average hold time over time for an interactive dashboard that may be generated and displayed on one or more display screens, in accordance with an example embodiment.

FIG. 42 is a screen shot illustrating evolution of average hold time over time for an interactive dashboard that may be generated and displayed on one or more display screens, in accordance with an example embodiment. Similar to the graph 3700 in FIG. 37, the evolution is displayed via a color-coded graph 4100, showing average hold time (AHT) (y-axis) over time (x-axis). In the illustrated example, the time is expressed as a plurality of dates with a 4-day granularity. Different colored lines are associated with different burnout risk categories, as represented in the displayed color-coded key.

Figure 43:
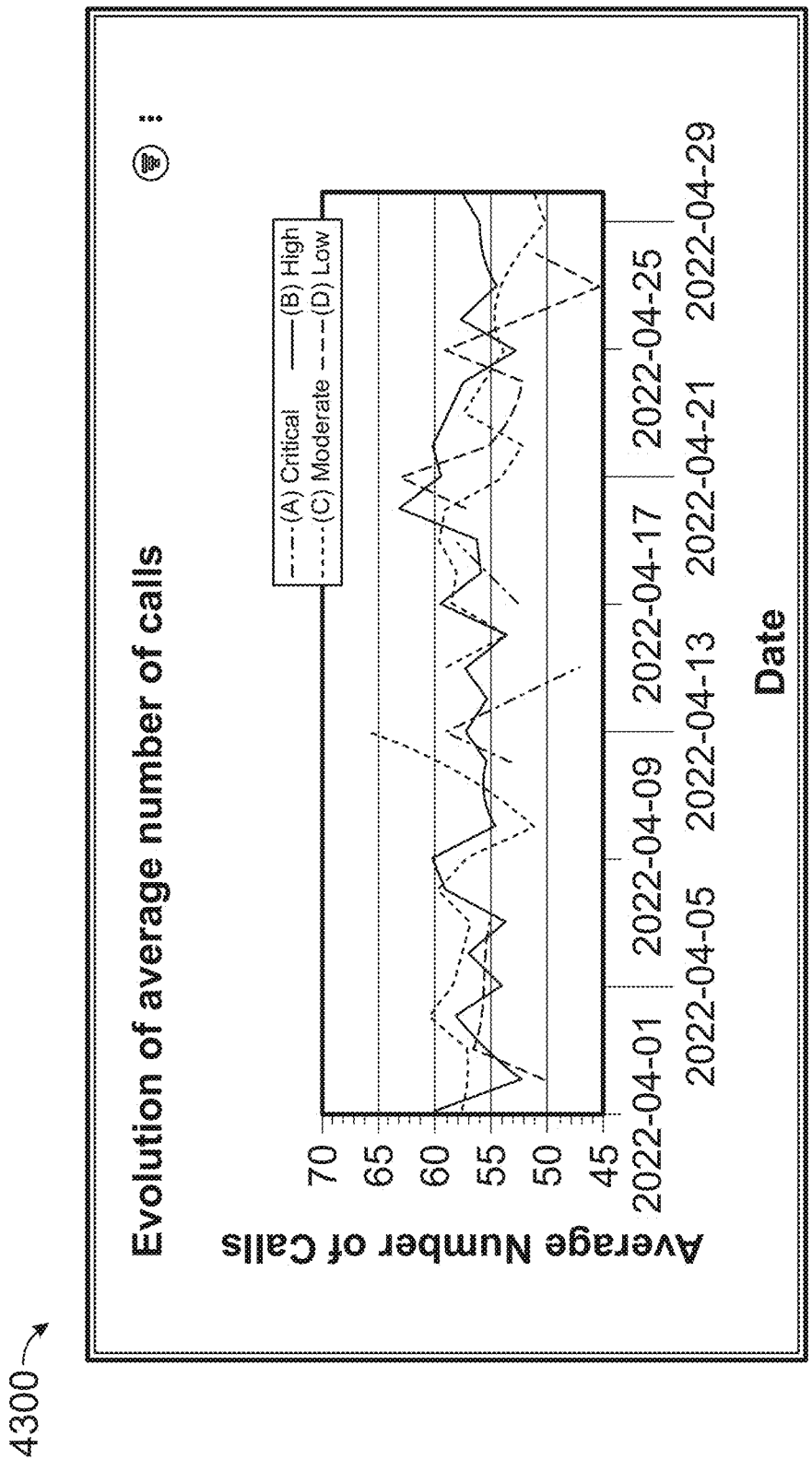
FIG. 43 is a screen shot illustrating evolution of average number of calls over time for an interactive dashboard that may be generated and displayed on one or more display screens, in accordance with an example embodiment.

FIG. 43 is a screen shot illustrating evolution of average number of calls over time for an interactive dashboard that may be generated and displayed on one or more display screens, in accordance with an example embodiment. Similar to the graph 3700 in FIG. 37, the evolution is displayed via a color-coded graph 4200, showing daily average number of calls (y-axis) over time (x-axis). In the illustrated example, the time is expressed as a plurality of dates with a 4-day granularity. Different colored lines are associated with different burnout risk categories, as represented in the displayed color-coded key.

FIG. 43 is a screen shot illustrating a third example interactive dashboard combining the features illustrated in FIGS. 37-42, in accordance with an example embodiment. The dashboard 3600 aggregates a user-selectable set of tables and graphs (from FIGS. 37-42 in the illustrated example) to allow for better engagement by the user. This aggregation graphically presents trends and other visualizations, which may, in turn, suggest possible supervisory responses, such as new or modified rules definitions.

XVI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device. One example of a computer readable medium includes cloud-based data storage.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

The various aspects and embodiments disclosed herein are for purpose of illustration and are not intended to be limiting, with the true scope being indicated by the following claims.

What is claimed is:

1. A computing system comprising:
   one or more hardware processors configured to execute instructions stored on at least one non-transitory computer readable medium to perform tasks including:
      receiving real-time data associated with each of a plurality of agents servicing incoming communications at a contact center;
      determining a relative burnout risk for each of the plurality of agents by processing the real-time data associated with each of the plurality of agents using a trained supervised machine learning model having a plurality of input features;
      determining, based on a specification of a logical directive, an action to be executed by a server in relation to at least one agent in the plurality of agents, wherein the specification has at least one condition relating to the determined relative burnout risk, and wherein the specification defines the action to be executed in relation to the at least one agent in the plurality of agents upon the condition being satisfied; and
      sending an instruction to the server to cause the server to execute the action in relation to the at least one agent instance in the plurality of agents.

2. The computing system of claim 1, wherein the trained supervised machine learning model is trained using historical data associated with the contact center.

3. The computing system of claim 2, wherein the tasks further comprise, in order to train the trained supervised machine learning model:
   calculating a correlation score for each of the plurality of input features used by the supervised machine learning model in determining the relative burnout risk for each of the plurality of agents, in order to determine how relatively informative each of the plurality of input features is for determining the relative burnout risk; and
   identifying at least one burnout risk predictor based on the calculated correlation score for each of the plurality of input features.

4. The computing system of claim 1, wherein the trained supervised machine learning model is periodically retrained using historical data associated with the contact center.

5. The computing system of claim 1, wherein the server is a workforce management server, and wherein the action includes the workforce management server (a) adding, modifying, or deleting a work segment for the at least one agent instance in the plurality of agents and/or (b) modifying an assigned schedule for the at least one agent.

6. The computing system of claim 1, wherein the server is a communication distributor server, and wherein the action includes the communication distributor server (a) changing a state of the at least one agent and/or (b) modifying an assigned queue of the at least one agent.

7. The computing system of claim 1, wherein the real-time data is a data feed from one or more of a communication distributor server, a workforce management server, or a back office case system server.

8. The computing system of claim 1, wherein the plurality of input features includes at least one operational metric related to a workforce management server.

9. The computing system of claim 8, wherein the at least one operational metric relates to a shift start time, a shift end time, and/or an agent schedule.

10. The computing system of claim 1, wherein the plurality of input features includes at least one operational metric related to a communication distributor server.

11. The computing system of claim 10, wherein the at least one operational metric relates to handle time, time in after-call work, hold time, on-call time, and/or occupancy.

12. The computing system of claim 1, wherein the supervised machine learning model is selected from the group consisting of a linear discriminant analysis (LDA) model, a quadratic discriminant analysis (QDA) model, a logistic regression model, and a survival analysis model.

13. A computer-implemented method, the method comprising:
   receiving, by at least one computing device, real-time data associated with each of a plurality of agents servicing incoming communications at a contact center;
   determining, by the at least one computing device, a relative burnout risk for each of the plurality of agents by processing the real-time data associated with each of the plurality of agents using a trained supervised machine learning model having a plurality of input features;
   determining, by the at least one computing device, based on a specification of a logical directive, an action to be executed by a server in relation to at least one agent in the plurality of agents, wherein the specification has at least one condition relating to the determined relative burnout risk, and wherein the specification defines the action to be executed in relation to the at least one agent in the plurality of agents upon the condition being satisfied; and
   sending, by the at least one computing device, an instruction to the server to cause the server to execute the action in relation to the at least one agent instance in the plurality of agents.

14. The computer-implemented method of claim 13, wherein the trained supervised machine learning model is trained using historical data associated with the contact center.

15. The computer-implemented method of claim 14, further comprising, in order to train the trained supervised machine learning model:
   calculating, by the at least one computing device, a correlation score for each of the plurality of input features used by the supervised machine learning model in determining the relative burnout risk for each of the plurality of agents, in order to determine how relatively informative each of the plurality of input features is for determining the relative burnout risk; and
   identifying, by the at least one computing device, at least one burnout risk predictor based on the calculated correlation score for each of the plurality of input features.

16. The computer-implemented method of claim 13, wherein the trained supervised machine learning model is periodically retrained using historical data associated with the contact center.

17. The computer-implemented method of claim 13, wherein the server is a workforce management server, and wherein the action includes the workforce management server (a) adding, modifying, or deleting a work segment for the at least one agent instance in the plurality of agents and/or (b) modifying an assigned schedule for the at least one agent.

18. The computer-implemented method of claim 13, wherein the server is a communication distributor server, and wherein the action includes the communication distributor server (a) changing a state of the at least one agent and/or (b) modifying an assigned queue of the at least one agent.

19. The computer-implemented method of claim 13, wherein the real-time data is a data feed from one or more of a communication distributor server, a workforce management server, or a back office case system server.

20. The computer-implemented method of claim 13, wherein the plurality of input features includes at least one operational metric related to a workforce management server.

21. The computer-implemented method of claim 20, wherein the at least one operational metric relates to a shift start time, a shift end time, and/or an agent schedule.

22. The computer-implemented method of claim 13, wherein the plurality of input features includes at least one operational metric related to a communication distributor server.

23. The computer-implemented method of claim 22, wherein the at least one operational metric relates to handle time, time in after-call work, hold time, on-call time, and/or occupancy.

24. The computer-implemented method of claim 13, wherein the supervised machine learning model is selected from the group consisting of a linear discriminant analysis (LDA) model, a quadratic discriminant analysis (QDA) model, a logistic regression model, and a survival analysis model.

25. An article of manufacture including a non-transitory computer-readable medium, having stored thereon program instructions that, upon execution by one or more processors in at least one computing device, cause the one or more processors to perform tasks comprising:

receiving real-time data associated with each of a plurality of agents servicing incoming communications for a contact center;

determining a relative burnout risk for each of the plurality of agents by processing the real-time data associated with each of the plurality of agents using a trained supervised machine learning model having a plurality of input features;

determining, based on a specification of a logical directive, an action to be executed by a server in relation to at least one agent in the plurality of agents, wherein the specification has at least one condition relating to the determined relative burnout risk, and wherein the specification defines the action to be performed in relation to the at least one agent in the plurality of agents upon the condition being satisfied; and sending an instruction to the server to cause server to execute the action in relation to the at least one agent instance in the plurality of agents.

26. The article of manufacture of claim 25, wherein the plurality of input features includes at least one operational metric related to a workforce management server.

27. The article of manufacture of claim 26, wherein the at least one operational metric relates to a shift start time, a shift end time, and/or an agent schedule.

28. The article of manufacture of claim 25, wherein the plurality of input features includes at least one operational metric related to a communication distributor server.

29. The article of manufacture of claim 28, wherein the at least one operational metric relates to handle time, time in after-call work, hold time, on-call time, and/or occupancy.

30. The article of manufacture of claim 25, wherein the tasks further comprise, in order to train the trained supervised machine learning model:

calculating a correlation score for each of the plurality of input features used by the supervised machine learning model in determining the relative burnout risk for each of the plurality of agents, in order to determine how relatively informative each of the plurality of input features is for determining the relative burnout risk; and identifying at least one burnout risk predictor based on the calculated correlation score for each of the plurality of input features.

* * * * *

UNITED STATES PATENT AND TRADEMARK OFFICE
CERTIFICATE OF CORRECTION

PATENT NO. : 12,218,791 B2
APPLICATION NO. : 18/623651
DATED : February 4, 2025
INVENTOR(S) : Tristan Pahud et al.

Page 1 of 1

It is certified that error appears in the above-identified patent and that said Letters Patent is hereby corrected as shown below:

On the Title Page

The Related U.S. Application Data item (63) and continued on page 2 omits the following domestic priority information. Add to the end of the Related U.S. Application Data on page 2, as follows: "said application No. 17/382,311, filed on Jul. 21, 2021, now Pat. No. 11,228,479, is a continuation of application No. 17/364,851, filed on Jun. 30, 2021, now Pat. No. 11,356,316, which is a continuation-in-part of application No. 17/061,024, filed on Oct. 1, 2020, now Pat. No. 11,075,794, which is a continuation of application No. 16/912,351, filed on Jun. 25, 2020, now Pat. No. 10,833,917, which is a continuation of application No. 16/804,376, filed on Feb. 28, 2020, now Pat. No. 10,833,916, which is a continuation of application No. 16/580,258, filed on Sept. 24, 2019, now Pat. No. 10,623,233; said application No. 17/382,311, is a continuation-in-part of application No. 17/163,126, filed on Jan. 29, 2021, now Pat. No. 11,108,618, which is a continuation-in-part of application No. 17/061,024, filed on Oct. 1, 2020, now Pat. No. 11,075,794, which is a continuation of application No. 16/912,351, filed on Jun. 25, 2020, now Pat. No. 10,833,917, which is a continuation of application No. 16/804,376, filed on Feb. 28, 2020, now Pat. No. 10,833,916, which is a continuation of application No. 16/580,258, filed on Sept. 24, 2019, now Pat. No. 10,623,233; said application No. 17/382,311, is a continuation-in-part of application No. 17/061,024, filed on Oct. 1, 2020, now Pat. No. 11,075,794, which is a continuation of application No. 16/804,376, filed on Feb. 28, 2020, now Pat. No. 10,833,916, which is a continuation of application No. 16/580,258, filed on Sept. 24, 2019, now Pat. No. 10,623,233."

Signed and Sealed this
Second Day of September, 2025

Coke Morgan Stewart
*Acting Director of the United States Patent and Trademark Office*